United States Patent [19]

Dogan et al.

[11] Patent Number: 6,018,317

[45] Date of Patent: Jan. 25, 2000

[54] COCHANNEL SIGNAL PROCESSING SYSTEM

[75] Inventors: Mithat Can Dogan, Sunnyvale; Stephen Deane Stearns, Los Altos, both of Calif.

[73] Assignee: TRW Inc., Redondo Beach, Calif.

[21] Appl. No.: 08/755,775

[22] Filed: Nov. 22, 1996

Related U.S. Application Data

[63] Continuation-in-part of application No. 08/459,902, Jun. 2, 1995, abandoned, and a continuation-in-part of application No. 08/460,335, Jun. 2, 1995, abandoned, and a continuation-in-part of application No. 08/736,630, Oct. 23, 1996, abandoned, and a continuation-in-part of application No. 08/731,201, Oct. 4, 1996, abandoned, and a continuation-in-part of application No. 08/459,139, Jun. 2, 1995, abandoned, and a continuation-in-part of application No. 08/653,093, May 24, 1996, abandoned, and a continuation-in-part of application No. 08/458,381, Jun. 2, 1995, abandoned, and a continuation-in-part of application No. 08/460,329, Jun. 2, 1995, abandoned, and a continuation-in-part of application No. 08/459,074, Jun. 2, 1995, abandoned.

[51] Int. Cl.⁷ ............................ G01S 3/16; G01S 3/28
[52] U.S. Cl. ................................... 342/378; 342/373
[58] Field of Search ........................... 342/378, 417, 342/451, 373

[56] References Cited

U.S. PATENT DOCUMENTS

| | | | |
|---|---|---|---|
| 3,202,990 | 8/1965 | Howells | 343/100 |
| 3,699,444 | 10/1972 | Ghose et al. | 325/21 |
| 3,755,792 | 8/1973 | Harvey | 340/173 R |
| 3,761,716 | 9/1973 | Kapron et al. | 250/199 |
| 3,963,990 | 6/1976 | DiFonzo | 325/476 |
| 4,232,329 | 11/1980 | Horak et al. | 358/9 |
| 4,310,910 | 1/1982 | Sheng | 369/116 |
| 4,430,743 | 2/1984 | Watanabe | 375/13 |
| 4,434,505 | 2/1984 | Gutleber | 455/50 |
| 4,466,131 | 8/1984 | Ghose et al. | 455/278 |
| 4,513,383 | 4/1985 | Hackett, Jr. | 364/517 |
| 4,639,733 | 1/1987 | King et al. | 342/424 |
| 4,703,474 | 10/1987 | Foschini et al. | 370/18 |

(List continued on next page.)

FOREIGN PATENT DOCUMENTS

| | | | |
|---|---|---|---|
| 0 565 479 A1 | 10/1993 | European Pat. Off. | H03H 21/00 |
| 2 190 185 | 11/1987 | United Kingdom | G01N 21/84 |

OTHER PUBLICATIONS

R.O. Schmidt, "Multiple emitter location and signal parameter estimation," IEEE Trans. Antennas and Propagation, vol. AP–34, pp. 276–280, Mar. 1986.

R.O. Schmidt, "A Signal Subspace Approach to Multiple Emitter Location and Spectral Estimation," doctoral dissertation, Stanford Univ., Stanford, CA, Nov. 1981 [cumulative, see ref. Q].

(List continued on next page.)

*Primary Examiner*—Theodore M. Blum
*Attorney, Agent, or Firm*—Michael S. Yatsko

[57] ABSTRACT

A method and apparatus for processing cochannel signals received at a sensor array in a cumulant-based signal processing and separation engine to obtain a desired set of output signals or parameters. For use in a signal recovery system, the output signals are recovered and separated versions of the originally transmitted cochannel signals. An important feature that distinguishes the cumulant-based system from other signal separation and recovery systems is that it generates an estimated generalized steering vector associated with each signal source, and representative of all received coherent signal components attributable to the source. This feature enables the invention to perform well in multipath conditions, by combining all coherent multipath components from the same source. In a receiver/transmitter system, the estimated generalized steering vectors associated with each source are used to generate transmit beamformer weight vectors that permit cochannel transmission to multiple user stations. The basic cumulant-based processing and separation engine can also be used in a variety of applications, such as high density recording, complex phase angle equalization, receiving systems with enhanced effective dynamic range, and signal separation in the presence of strong interference. Various embodiments and extensions of the basic cumulant-based system are disclosed.

85 Claims, 60 Drawing Sheets

U.S. PATENT DOCUMENTS

| | | | |
|---|---|---|---|
| 4,750,147 | 6/1988 | Roy, III et al. | 364/807 |
| 4,780,721 | 10/1988 | Dobson | 342/178 |
| 4,829,590 | 5/1989 | Ghose | 455/63 |
| 4,843,494 | 6/1989 | Cronin et al. | 360/77.03 |
| 4,876,549 | 10/1989 | Masheff | 341/417 |
| 4,965,732 | 10/1990 | Roy, III et al. | 364/460 |
| 4,979,051 | 12/1990 | Eggemeen | 360/21 |
| 5,047,736 | 9/1991 | Ghose | 333/12 |
| 5,048,015 | 9/1991 | Zilberfarb | 370/110.4 |
| 5,091,890 | 2/1992 | Dwyer | 367/99 |
| 5,155,549 | 10/1992 | Dhadwal | 356/336 |
| 5,222,144 | 6/1993 | Whikehart | 381/15 |
| 5,248,982 | 9/1993 | Reinhardt et al. | 342/375 |
| 5,260,968 | 11/1993 | Gardner et al. | 375/1 |
| 5,289,454 | 2/1994 | Mohapatra et al. | 369/112 |
| 5,315,532 | 5/1994 | Comon | 364/553 |
| 5,325,221 | 6/1994 | Van der Tol | 359/116 |
| 5,337,053 | 8/1994 | Dwyer | 367/99 |
| 5,343,212 | 8/1994 | Rose et al. | 342/424 |
| 5,343,404 | 8/1994 | Girgis . | |
| 5,386,239 | 1/1995 | Wang et al. | 348/472 |
| 5,406,588 | 4/1995 | Birchler et al. | 375/346 |
| 5,424,831 | 6/1995 | Kossat et al. | 356/73.1 |
| 5,428,818 | 6/1995 | Meidan et al. | 455/33.3 |
| 5,432,821 | 7/1995 | Polydoros et al. | 375/340 |
| 5,459,668 | 10/1995 | Dogan et al. | 364/456 |
| 5,471,647 | 11/1995 | Gerlach et al. | 455/63 |
| 5,506,688 | 4/1996 | Narita et al. | 358/310 |
| 5,508,707 | 4/1996 | LeBlanc et al. | 342/457 |
| 5,515,378 | 5/1996 | Roy, III et al. | 370/95.1 |
| 5,533,064 | 7/1996 | Ichihara | 375/340 |
| 5,592,490 | 1/1997 | Barratt et al. | 370/310 |
| 5,596,329 | 1/1997 | Searle et al. | 342/374 |
| 5,602,555 | 2/1997 | Searle et al. | 342/374 |
| 5,610,617 | 3/1997 | Ganz et al. | 342/373 |
| 5,615,409 | 3/1997 | Forssen | 455/33.1 |
| 5,617,102 | 4/1997 | Prater | 342/374 |
| 5,621,752 | 4/1997 | Antonio et al. | 375/200 |
| 5,634,199 | 5/1997 | Gerlach et al. | 455/63 |
| 5,642,353 | 6/1997 | Roy, III et al. | 370/329 |
| 5,661,489 | 8/1997 | Baker | 342/373 |
| 5,771,439 | 6/1998 | Kennedy, Jr. et al. | 455/63 |
| 5,790,606 | 8/1998 | Dent | 375/348 |
| 5,876,549 | 10/1998 | Masheff | 342/417 |

OTHER PUBLICATIONS

M. Wax, "Detection and Estimation of Superimposed Signals," doctoral dissertation, Stanford Univ., Stanford, CA, Mar. 1985.

R. O. Schmidt et al., "Multiple source DF signal processing: an experimental system," IEEE Trans. Antennas and Propagation, vol. AP–34, No. 3, pp. 281–290, Mar. 1986.

A. Paulraj et al., "A subspace rotation approach to signal parameter estimation," Proc. IEEE, vol. 74 No. 4, pp. 1044–1045, Jul. 1986.

R. Roy et al., "ESPRIT—A subspace rotation approach to estimation of parameters of cisoids in noise" IEEE Trans. Acoust., Speech and Signal Proc., vol. ASSP–34, pp. 1340–1342, Oct. 1986.

R.H. Roy, "ESPRIT—Estimation of Signal Parameters via Rotational Invariance Techniques," doctoral dissertation, Stanford Univ., Stanford, CA, 1987.

R. Roy et al., "ESPRIT—Estimation of signal parameters via rotational invariance techniques," IEEE Trans. Acoust., Speech and Signal Proc., vol. ASSP–37, No. 7, pp. 984–985, Jul. 1989.

B. Ottersten et al., "Signal waveform estimation in sensor array processing," Proc. 23rd Asilomar Conf. on Signals, Systems and Computers, pp. 787–791, Nov. 1989, Pacific Grove, CA.

R. Roy et al., "ESPRIT—Estimation of signal parameters via rotational invariance techniques," Optical Eng., vol. 29, No. 4, pp. 296–313, Apr., 1990.

Y. Bresler et al., "Optimum beamforming for coherent signal and interferences," IEEE Trans. Acoust., Speech and Signal Proc., vol. ASSP–36, No. 6, pp. 843–995, Jun. 1988.

S.P. Applebaum, "Adaptive Arrays," Syracuse Univ. Research Corp. Report Spl. TR 66–1, 1966, reprinted in IEEE Trans., vol. AP–24, No. 5, pp. 585–598, Sep. 1976.

B. Widrow et al., "Adaptive antenna systems," Proc. IEEE, vol. 55, No. 12, pp. 2143–2159, Dec. 1967.

O. L. Frost III, "An algorithm for linearly constrained adaptive array processing," Proc. IEEE, vol. 60, pp. 926–935, Aug. 1972.

C.L. Zahm, "Applicns. of adaptive arrays to suppress strong jammers in the presence of weak signals" IEEE Trans. Aerosp. & Electr. Sys., vol. AES–9, pp. 260–271, 1973.

B. Widrow et al., "The complex LMS algorithm," Proc. IEEE, vol. 63, pp. 719–720, Apr. 1975.

S. Applebaum et al., "Adaptive arrays with main bean constraints," IEEE Trans. Antennas & Propagation, vol. AP–24, pp. 650–662, Sep. 1976.

W.F. Gabriel, "Adaptive Arrays—An introduction," Proc. IEEE, vol. 64, No. 2, pp. 239–272, Feb. 1976.

R. A. Monzingo et al., "Introduction to Adaptive Arrays," Wiley–Interscience, New York, 1980.

W.F. Gabriel, "Spectral analysis and adaptive array super-resulution techniques," Proc. IEEE, vol. 68, Jun. 1980.

C.M. Hackett, "Adaptive arrays can be used to separate communication signals," IEEE Trans. Aerosp. & Electr. Systems, vol. AES–17, No. 2, pp. 234–247, Mar. 1981.

C.M. Hackett, "Real–time implementation of the signal separator," Proc. 1982 Military Communications Conf., vol. 2, paper 36.2 1–5, Boston, MA, Oct. 17–20, 1982.

C.M. Hackett, "The signal separator with a moving platform," Proc. 1985 IEEE Military Commun. Conf. vol. 3, pp. 668–669, Boston, MA, Oct. 20–23, 1985.

B. Widrow et al., "Adaptive signal processing," Prentice–Hall, Englewood Cliffis, NJ, 1985 (Chapters 12 and 13, pp. 302–458).

R. T. Compton, Jr., "Adaptive antennas: concepts and performance," Englewood Cliffs, NJ, Prentice–Hall, 1988.

B. Agee, "The least–squares CMA: A new technique for rapid correction of constant modulus signals," Proc. ICASSP–86, pp. 953–956, Tokyo, Japan, Apr. 1986.

R. Gooch et al., "The CM array: an adaptive beamformer for constant modulus signals," Proc. ICASSP–86 pp. 2523–2526, Tokyo, Japan, Apr. 1986.

R.P. Gooch et al., "Joint spatial and temporal equalization in a decision directed adaptive antenna system," Proc. 22nd Asilomar Conf. on Signals, Sys. & Computers, pp. 255–259, Nov. 1988.

J. Lundell et al., "Applications of the constant modulus adaptive beamformer to constant and non–constant modulus signals," Proc. 22nd Asilomar Conf. on Signals, Sys. & Computers, pp. 431–436, Nov. 1988.

B.G. Agee, "blind separation and capture of communication signals using a multitarget constant modulus beamformer," Proc. 1989 IEEE Military Communications Conf., pp. 340–346, Boston, MA, Oct. 1989.

B.J. Sublett et al., "Separation and bearing estimation of co–channel signals," Proc. 1989 IEEE Military Communications Conf., pp. 629–634, Boston, MA, Oct. 1989.

R.D. Hughes et al., "A robust CMA adaptive array for multiple narrowband sources," Proc. 26th Asilomar Conf. on Signals, Sys. & Computers, pp. 35–39, Nov. 1992.

S. Mayrargue, "Spatial equalization of a radio–mobile channel without beamforming using the CMA," Proc. ICASSP–93, vol. 3, pp. 344–347, Minneapolis, MN, Apr. 1993.

W. Hosseini et al., "A real–time implementation of the multistage CMA adaptive beamformer," Proc. 27th Asilomar Conf. on Signals, Syst. & Computers, pp. 643–646.

J.J. Shynk et al., "Convergenece properties of the multistage CMA adaptive beamformer," Proc. 27th Asilomar Conf. on Signals, Syst. & Computers, pp. 622–626.

S. Mayrargue, "A blind spatiotemporal equalizer for a radio–mobile channel using the constant modulus algorithm (CMA)," Proc. ICASSP–94, vol. 3, pp. 317–320.

A.–J. van der Veen et al., "Analytical solution to the constant modulus factorization problem," 28th Asilomar Conf. on Signals, Syst. & Computers, pp. 1433–1437, Nov. 1994.

J.–F. Cardoso, "Eigen–structure of the fourth–order cumulant tensor with application to the blind source separation problem," Proc. ICASSP–90, pp. 2655–2658, Albuquerque, NM, Apr. 1990.

J.–F. Cardoso, "Super–symmetric decomposition of the fourth–order cumulant tensor: blind identification of more sources than sensor," Proc. ICASSP–91, pp. 3109–3112, Toronto, Canada, May 1991.

E. Chaumette et al., "ICA–based technique for radiating sources estimation: application airport surveillance," IEE Proc.–F, vol. 140, No. 6, Dec. 1993.

L. Tong et al., "Waveform–preserving blind estimation of multiple independent sources," IEEE Trans. Signal Processing, vol. 41, pp. 2461–2470, Jul. 1993.

J.–F. Cardoso et al., "A new composite criterion for adaptive and iterative blind source separation," Proc. ICASSP–94, vol. 4, pp. 272–276, Adelaide, Australia, Apr. 1994.

P. Ruiz et al., "Extraction of independent sources from correlated inputs: a solution based on cumulants," Proc. Workshop on Higher–Order Spectral Analysis, pp. 146–151, Vail, CO, Jun. 1989.

J.–F. Cardoso, "Blind identification of independent components with higher–order statistics," Proc. Workshop on Higer–Order Spectral Analysis, pp. 157–162, Vail, CO, Jun. 1989.

P. Comon, "Separation of stochastic processes," Proc. Workshop on Higher–Order Spectral Analysis, pp. 174–179, Vail, CO, Jun. 1989.

L. Tong et al., "Eigenstructure–based blind identification of independent signals," Proc. ICASSP–91, pp. 3329–3332, Toronto, Canada, May, 1991.

L. Tong. et al., "A finite–step global convergence algorithm for the parameter estimation of multi–channel MA processes," IEEE Trans. Signal Processing, vol. 40, pp. 2547–2558, Oct. 1992.

E. Moreau et al., "New self–adaptive algorithms for source separation based on contrast functions," Proc. IEEE Signal Processing Workshop on Higher–Order Statistics, pp. 66–70, Lk. Tahoe, CA, Jun. 1993.

N. Delfosse et al., "Adaptive separation of independent sources: a deflation approach," Proc. ICASSP–94, vol. 4, pp. 41–44, Adelaide, Australia, Apr. 1994.

J.–F. Cardoso et al. "Blind beamforming for non–gaussian signals," IEE Proc., Part F, Radar & Signal Proc., vol. 140, pp. 362–370, Dec. 1993.

W.A. Gardner et al., "Frequency–shift filtering for adaptive co–channel interference removal," Proc. 23rd. Asimolar Conf. on Signals, Syst. & Computers, pp. 562–567, Pacific Grove, CA, Nov. 1989.

B.G. Agee et al., "Spectral self–coherence restoral: a new approach to blind adaptive signal extraction using antenna arrays," Proc. IEEE, vol. 78, pp. 753–767, Apr. 1990.

W. A. Gardner et al., "Programmable blind adaptive spatial filtering," Proc. ICASSP–94, vol. 4, pp. 53–56, Adelaide, Australia, Apr. 1994.

L. Castedo et al., "A new cost function for adaptive beamforming using cyclostationary signal properties," Proc. ICASSP–93, vol. 4, pp. 284–287, Minneap., MN Apr. 1993.

T. Biedka, "Subspace–constrained SCORE algorithms," Proc. 27th Asilomar Conf. on Signals, Syst. & Computers, pp. 716–720, Pacific Grove, CA, Nov. 1993.

L. Castedo et al., "Behavior or adaptive beamformers based on cyclostationary signal properties . . . ," Proc. 27th Asilomar Conf. on Signals Syst. & Computers, pp. 653–657.

S. Talwar et al., "Blind estimation of multiple co–channel digital signals using an antenna array," IEEE Signal Processing Letters, vol. 1, No. 2, pp. 29–31, Feb. 1994.

S. Talwar et al., "Blind Estimation of multiple co–channel digital signals arriving at an antenna array," Proc. 27th Asilomar Conf. on Signals Syst. & Computers, pp. 349–353.

S. Talwar et al., "Reception of multiple co–channel digital signals using antanna arrays . . . ," paper 324.3, Proc. IEEE Int'l. Conf. on Communications, New Orleans, May 1994.

S. Talwar et al., "Performance analysis of blind digital signal copy algorithms," Proc. 1994 IEEE Military Communications Conf., pp. 123–128, Ft. Monmouth, NJ, Oct. 2–5, 1994.

R. Mendoza et al., "Interference rejection using time–dependent constant modulus algorithms," Proc. 23rd Asilomar Conf. on Signals, Syst. & Computers, pp. 273–278, Pacific Grove, CA, Nov. 1989.

B.G. Agee, "Maximum–likelihood approaches to blind adaptive signal extraction using narrowband antenna arrays," Proc. 25th Asilomar Conf. on Signals, Syst. & Computers, pp. 716–720, Pac. Grove, Nov. 1991.

D. Torrieri et al., "Blind adaption using maximin algorithm," Proc. 27th Asilomar Conf. on Signals, Syst. & Computers, pp. 638–642, Pacific Grove, CA, Nov. 1993.

N. Yuen et al., "Performance analysis of blind signal estimation using fourth–order cumulants," Proc. 27th Asilomar Conf. on Signals, Syst. & Computers, pp. 1484–1488, Pacific Grove, CA, Nov. 1993.

J. Yang, et al., "Signal copy with array calibratio errors," Proc. 27th Asilomar Conf. on Signals, Systems and Computers, pp. 1533–1537, Pacific Grove, CA, Nov. 1993.

E.H. Satorius et al., "New Criteria for blind adaptive arrays," Proc. 27th Asilomar Conf. on Signals, Syst. & Computers, pp. 633–637, Pac. Grove, CA, Nov. 1993 [cumulative; see refs. K5, L5, A6, B6, C6].

S.V. Schell et al., "Programmable canonical correlation analysis: . . . ," Proc. 27th Asilomar Conf. on Signals Syst. & Comptrs., pp. 647–652, Pac. Grove, Nov. 1993 [cumulative; see refs. K5, L5, A6, B6, C6].

P.A. Voois et al., "A decision feedback equalizer for multiple–head digital magnetic recording," Proc. IEEE Int'l. Conf. Communications, vol. 2, pp. 815–819, Denver, CO, Jun. 23–26, 1991.

T. Howell et al., "The capacity of a magnetic recording system as a function of track width," (abstract) Proc. IEEE In'l. Symp. Inf. Theory, p. 26, Ann Arbor, MI, Oct. 1986 [cumulative; see res.F6].

W. L. Abbott et al., "Performance of digital magnetic recording with equalization and offtrack interference," IEEE Trans. Magnetics, vol. MAG–27, No. 1, pp. 705–716, Jan. 1991 [cumulative; see res.F6].

M.P. Vea et al., "Magnetic recording channel model with intertrack interference," IEEE Trans. Magnetics, vol. MAG–27, No. 6, pp. 4834–4836, Nov. 1991 [cumulative; see res.F6].

P.A. Voois et al., "Achievable radial information densities in magnetic recording systems," Proc. IEEE GLOBECOM '92, vol. 2, pp. 1067–1071, Orlando, FL, Dec. 6–9, 1992 [cumulative; see res.F6].

S. Berdague et al., "Mode division multiplexing in optical fibers," Appl. Optics, vol. 21, No. 11, pp. 1950–1955 (Jun. 1, 1982).

Jean–Francois Cardoso, "Source Separation Using Higher Order Moments," ICASSP '89: Acoustics, Speech & Signal Processing Conf., pp. 2109–2112.

Jean–Francois Cardoso, "Iterative Techniques for Blind Source Separation Using only 4th–Order Cumulants, Signal Processing VI: Theories & Applications," Elsevier Science Publishers B.V. (1992), pp. 739–742.

Eric Moulines et al., "Direction Finding Algorithms Using Fourth Order Statistics . . . ," 1992 IEEE Conf. on Acoustics, Speech & Sig. Proc., 1992, pp. II–437–II–440.

COCHANNEL SIGNAL PROCESSING SYSTEM

CROSS-REFERENCES TO RELATED APPLICATIONS

This is a continuation-part of the following applications by the same inventors:

(1) Ser. No. 08/459,902, now abandoned, filed Jun. 2, 1995, entitled "Cochannel Signal Separation System."

(2) Ser. No. 08/460,335, now abandoned, filed Jun. 2, 1995, entitled "System for Separating and Recovering Multimode or Multipath Radio Signals."

(3) Ser. No. 08/736,630, now abandoned, filed Oct. 23, 1996, which is a continuation of Ser. No. 08/459,726, now abandoned, filed Jun. 2, 1995, entitled "Method and Apparatus for Separating Signals Transmitted over Waveguide and Optical Fiber."

(4) Ser. No. 08/731,201, now abandoned, filed Oct. 4, 1996, which is a continuation of Ser. No. 08/460,377, now abandoned, filed Jun. 2, 1995, entitled "Method and Apparatus for Increasing the Capacity of Communication Networks."

(5) Ser. No. 08/459,139, now abandoned, filed Jun. 2, 1995, entitled "Method and Apparatus for Recovering Communication Signals in the Presence of Interfering Signals."

(6) Ser. No. 08/653,093, now abandoned, filed May 24, 1996, which is a continuation of Ser. No. 08/460,679, filed Jun. 2, 1995, now abandoned, entitled "Radio Direction Finding Method and Apparatus."

(7) Ser. No. 08/458,381, now abandoned, filed Jun. 2, 1995, entitled "Method and Apparatus for Extending the Dynamic Range of a Receiver System."

(8) Ser. No. 08/460,329, now abandoned, filed Jun. 2, 1995, entitled "High Density Recording Method and Apparatus."

(9) Ser. No. 08/459,074, now abandoned, filed Jun. 2, 1995, entitled "Complex Phase Equalizer Using Cumulant Recovery Processing."

BACKGROUND OF THE INVENTION

1. Field of the Invention

This invention relates generally to signal processing systems and, more particularly, to apparatus and methods for receiving and processing signals that share a common receiver frequency band at the same time, referred to as cochannel signals. Even two signals transmitted on slightly separated frequency bands may be "cochannel" signals as seen by a receiver operating to receive signals on a bandwidth that overlaps both of the signals. In a variety of signal processing applications, there is a need to recover information contained in such multiple, simultaneously received signals. In the context of this invention, the word "recover" or "recovery" encompasses separation of the received signals, "copying" the signals (i.e., retrieving any information contained in them), and, in some applications, combining signals received over multiple paths from a single source. The "signals" may be electromagnetic signals transmitted in the atmosphere or in space, acoustic signals transmitted through liquids or solids, or other types of signals characterized by a time-varying parameter, such as the amplitude of a wave. In accordance with another aspect of the invention, signal processing includes transmission of cochannel signals.

In the environment of the present invention, signals are received by "sensors." A sensor is an appropriately selected transducer for converting energy contained in the signal to a more easily manipulated form, such as electrical energy. In a radio communications application, electromagnetic signals are received by antennas and converted to electrical signals for further processing. After separation of the signals, they may be forwarded separately to transducers of a different type, such as loudspeakers, for converting the separated electrical signals into audio signals. In some applications, the signal content may be of less importance than the directions from which the signals were received, and in other applications the received signals may not be amenable to conversion to audible form. Instead, each recovered signal may contain information in digital form, or may contain information that is best understood by displaying it on a chart or electronic display device. Regardless of the environment in which the present invention is employed, it is characterized by multiple signals received by sensors simultaneously at the same or overlapping frequencies, the need to separate, recover, identify or combine the signals and, optionally, some type of output transducer to put the recovered information in a more easily discernible form.

2. Description of Related Art

Separation and recovery of signals of different frequencies is a routine matter and is handled by appropriate filtering of the received signals. It is common knowledge that television and radio signals are transmitted on different frequency bands and that one may select a desired signal by tuning a receiver to a specific channel. Separation and recovery of multiple signals transmitted at different frequencies and received simultaneously may be effected by similar means, using multiple tuned receivers in parallel. A more difficult problem, and the one with which the present invention is concerned, is how to separate and copy signals from multiple sources when the transmitted signals are at the same or overlapping frequencies. A single sensor, such as an antenna, is unable to distinguish between two or more received signals at the same frequency. However, antenna array technology provides for the separation of signals received from different directions. Basically, and as is well understood by antenna designers, an antenna array can be electronically "steered" to transmit or receive signals to or from a desired direction. Moreover, the characteristics of the antenna array can be selectively modified to present "nulls" in the directions of signals other than that of the signal of interest. A further development in the processing of array signals was the addition of a control system to steer the array toward a signal of interest. This feature is called adaptive array processing and has been known for at least two to three decades. See, for example, a paper by B. Widrow, P. E. Mantey, L. J. Griffiths and B. B. Goode, "Adaptive Antenna Systems," Proceedings of the IEEE, vol. 55, no. 12, pp. 2143–2159, December 1967. The steering characteristics of the antenna can be rapidly switched to receive signals from multiple directions in a "time-sliced" manner. At one instant the antenna array is receiving a signal from one source and at the next instant, from a different source in a different direction, but information from the multiple sources is sampled rapidly enough to provide a complete record of all the received signals. It will be understood that, although steered antenna array technology was developed principally in the communications and radar fields, it is also applicable to the separation of acoustic and other types of signals.

In the communications field, signals take a variety of forms. Stated most generally, a communication signal typically includes a carrier signal at a selected frequency, on which is impressed or modulated an information signal. There are a large number of different modulation schemes, including amplitude modulation, in which the amplitude of the signal is varied in accordance with the value of an information signal, while the frequency stays constant, and frequency or phase modulation, in which the amplitude of the signal stays constant while its frequency or phase is varied to encode the information signal onto the carrier. Various forms of frequency and phase modulation are often referred to as constant modulus modulation methods, because the amplitude or modulus of the signal remains constant, at least in theory. In practice, the modulus is subject to distortion during transmission, and various devices, such as adaptive equalizers, are used to restore the constant-modulus characteristic of the signal at a receiver. The constant modulus algorithm was developed for this purpose and later applied to antenna arrays in a process called adaptive beam forming The following references are provided by way for further background on the constant modulus algorithm:

B. Agee, "The least-squares CMA: a new technique for rapid correction of constant modulus signals," *Proc. ICASSP-86*, pp. 953–956, Tokyo, Japan, April 1986.

R. Gooch, and J. Lundell, "The CM array, an adaptive beamformer for constant modulus signals," *Proc. ICASSP-86*, pp. 2523–2526, Tokyo, Japan, April 1986.

J. Lundell, and B. Widrow, "Applications of the constant modulus adaptive algorithm to constant and non-constant modulus signals," *Proc. Twenty-Second Asilomar Conference on Signals, Systems, and Computers*, pp. 432–436, Pacific Grove, Calif., November 1988.

B. G. Agee, "Blind separation and capture of communication signals using a multi-target constant modulus beamformer," *Proc. 1989 IEEE Military Communications Conference*, pp. 340–346, Boston, Mass., October 1989.

R. D. Hughes, E. H. Lawrence, and L. P. Withers, Jr., "A robust adaptive array for multiple narrowband sources," *Proc. Twenty-Sixth Asilomar Conference on Signals, Systems, and Computers*, pp. 35–39, Pacific Grove, Calif., November 1992.

J. J. Shynk and R. P. Gooch, "Convergence properties of the multistage CMA adaptive beamformer," *Proc. Twenty-Seventh Asilomar Conference on Signals, Systems, and Computers*, pp. 622–626, Pacific Grove, Calif., November 1993.

The constant modulus algorithm works satisfactorily only for constant modulus signals, such as frequency-modulated (FM) signals or various forms of phase-shift keying (PSK) in which the phase is discretely or continuously varied to represent an information signal, but not for amplitude-modulated (AM) signals or modulation schemes that employ a combination of amplitude and phase modulation. There is a significant class of modulation schemes used known as M-ary quadrature amplitude modulation (QAM), used for transmitting digital data, whereby the instantaneous phase and amplitude of the carrier signal represents a selected data state. For example, 16-ary QAM has sixteen distinct phase-amplitude combinations. The "signal constellation" diagram for such a scheme has sixteen points arranged in a square matrix and lying on three separate constant-modulus circles. A signal constellation diagram is a convenient way of depicting all the possible signal states of a digitally modulated signal. In such a diagram, phase is represented by angular position and modulus is represented by distance from an origin.

The constant modulus algorithm has been applied with limited success to a 16-ary QAM scheme, because it can be represented as three separate constant-modulus signal constellations. However, for higher orders of QAM the constant modulus algorithm provides rapidly decreasing accuracy. For suppressed-carrier AM, the constant modulus approach fails completely in trying to recover cochannel AM signals. If there are multiple signals, the constant modulus algorithm yields signals with "cross-talk," i.e. with information in the two signals being confused. For a single AM signal in the presence of noise, the constant-modulus algorithm yields a relatively noisy signal.

Because antenna arrays can be steered electronically to determine the directions of signal sources, it was perhaps not surprising that one well known form signal separator available prior to the present invention used direction finding as its basis. The approach is referred to as DF-aided copy, where DF means direction finding. This is an open-loop technique in which steering vectors that correspond to estimated signal source bearings are first determined; then used to extract waveforms of received signals. However, the direction finding phase of this approach requires a knowledge of the geometry and performance characteristics of the antenna array. Then steering vectors are fed forward to a beamformer, which nulls out the unwanted signals and steers one or more antenna beam(s) toward each selected source.

Prior to the present invention, some systems for cochannel signal separation used direction-finding (DF)-beamforming. Such systems separate cochannel signals by means of a multi-source (or cochannel) super-resolution direction finding algorithm that determines steering vectors and directions of arrival (DOAs) of multiple simultaneously detected cochannel signal sources. An algorithm determines beamforming weight vectors from the set of steering vectors of the detected signals. The beamforming weight vectors are then used to recover the signals. Any of several well-known multi-source super-resolution DF algorithms can be used in such a system. Some of the better known ones are usually referred to by the acronyms MUSIC (Multiple SIgnal Classification), ESPRIT (Estimation of Signal Parameters via Rotational Invariance Techniques), Weighted Subspace Fitting (WSF), and Method of Direction Estimation (MODE).

MUSIC was developed in 1979 simultaneously by Ralph Schmidt in the United States and by Georges Bienvenu and Lawrence Kopp in France. The Schmidt work is described in R. O. Schmidt, "Multiple emitter location and signal parameter estimation," *Proc. RADC Spectrum Estimation Workshop*, pp. 243–258, Rome Air Development Center, Griffiss Air Force Base, NY, Oct. 3–5, 1979. The Bienvenu work is described in G. Bienvenu and L. Kopp, "Principe de la goniometrie passive adaptative," *Proc. Colloque GRETSI*, pp. 106/1–106/10, Nice, France, May 1979. MUSIC has been extensively studied and is the standard against which other super-resolution DF algorithms are compared.

ESPRIT is described in many publications in the engineering signal processing literature and is the subject of U.S. Pat. No. 4,750,147 entitled "Method for estimating signal source locations and signal parameters using an array of sensor pairs," issued to R. H. Roy III et al. ESPRIT was developed by Richard Roy, III, Arogyaswami Paulraj, and Prof. Thomas Kailath at Stanford University. It was presented as a super-resolution algorithm for direction finding in the following series of publications starting in 1986:

A. Paulraj, R. Roy, and T. Kailath, "A subspace rotation approach to signal parameter estimation," Proc. IEEE, vol. 74, no. 4, pp. 1044–1045, July 1986.

R. Roy, A. Paulraj, and T. Kailath, "ESPRIT—A subspace rotation approach to estimation of parameters of cisoids in noise," IEEE Trans. Acoust., Speech, and Signal Processing, vol. ASSP-34, no. 5, pp. 1340–1342, October 1986.

R. H. Roy, ESPRIT—Estimation of Signal Parameters via Rotational Invariance Techniques, doctoral dissertation, Stanford University, Stanford, Calif., 1987.

R. Roy and T. Kailath, "ESPRIT—Estimation of signal parameters via rotational invariance techniques," IEEE Trans. Acoust., Speech, and Signal Processing, vol. ASSP-37, no. 7, pp. 984–995, July 1989.

B. Ottersten, R. Roy, and T. Kailath, "Signal waveform estimation in sensor array processing," Proc. Twenty-Third Asilomar Conference on Signals, Systems, and Computers, pp. 787–791, Pacific Grove, Calif., November 1989.

R. Roy and T. Kailath, "ESPRIT—Estimation of signal parameters via rotational invariance techniques," Optical Engineering, vol. 29, no. 4, pp. 296–313, April 1990.

MUSIC and ESPRIT both require the same "narrowband array assumption," which is further discussed below in the detailed description of the invention, and both are modulation independent, a feature shared by all cochannel signal separation and recovery techniques that are based on the DF-beamforming method.

ESPRIT calculates two N-by-N covariance matrices, where N is the number of antenna elements, and solves a generalized eigenvalue problem numerically (instead of using a calibration table search, as MUSIC does). It does this for every block of input samples. MUSIC calculates a single N-by-N covariance matrix, performs an eigendecomposition, and searches a calibration table on every block of input array samples (snapshots).

MUSIC and ESPRIT have a number of shortcomings, some of which are discussed in the following paragraphs.

ESPRIT was successfully marketed based on a single, key advantage over MUSIC. Unlike MUSIC, ESPRIT did not require array calibration. In ESPRIT, the array calibration requirement was eliminated, and a different requirement on the antenna array was substituted. The new requirement was that the array must have a certain geometrical property. Specifically the array must consist of two identical sub-arrays, one of which is offset from the other by a known displacement vector. In addition, ESPRIT makes the assumption that the phases of received signals at one sub-array are related to the phases at the other sub-array in an ideal theoretical way.

Another significant disadvantage of ESPRIT is that, although it purports not to use array calibration, it has an array manifold assumption hidden in the theoretical phase relation between sub-arrays. "Array manifold" is a term used in antenna design to refer to a multiplicity of physical antenna parameters that, broadly speaking, define the performance characteristics of the array.

A well known difficulty with communication systems, especially in an urban environment, is that signals from a single source may be received over multiple paths that include reflections from buildings and other objects. The multiple paths may interpose different time delays, phase changes and amplitude changes on the transmitted signals, rendering reception more difficult, and transmission uncertain. This difficulty is referred to as the multipath problem. It is one that has not been adequately addressed by signal processing systems of the prior art.

Neither MUSIC nor ESPRIT can operate in a coherent multipath environment without major added complexity. A related problem is that, in a signal environment devoid of coherent multipath, no DF-beamforming method can separate signals from sources that are collinear with the receiving array, i.e. signal sources that are in line with the array and have zero angular separation. Even in a coherent multipath environment, DF-beamforming methods like MUSIC and ESPRIT cannot separate and recover cochannel signals from collinear sources.

Another difficulty with ESPRIT is that it requires two antenna sub-arrays and is highly sensitive to mechanical positioning of the two sub-arrays, and to the electromagnetic matching of each antenna in one sub-array with its counterpart in the other sub-array. Also ESPRIT requires a 2N-channel receiver, where N is the number of antenna elements, and is highly sensitive to channel matching.

Another significant drawback in both MUSIC and ESPRIT is that they fail abruptly when the number of signals detected exceeds the capacity, N, equal to the number of antennas in the case of MUSIC, or half the number of antennas in the case of ESPRIT.

A fundamental problem with both MUSIC and ESPRIT is that they use open-loop feed-forward computations, in which errors in the determined steering vectors are uncorrected, uncorrectable, and propagate into subsequent calculations. As a consequence of the resultant inaccurate steering vectors, MUSIC and ESPRIT have poorcross-talk rejection, as measured by signal-to-interference-plus-noise ratio (SINR) at the signal recovery output ports.

ESPRIT is best suited to ground based systems where its antenna requirements are best met and significant computational resources are available. MUSIC has simpler antenna array requirements and lends itself to a wider range of platforms, but also needs significant computational resources.

Another limitation of most signal recovery systems of the prior art is that they rely on first-order and second-order statistical moments of the received signal data. A moment is simply a statistical quantity derived from the original data by mathematical processing at some level. An average or mean value of the several signals received at a given time is an example of a first-order moment. The average of the squares of the signal values (proportional to signal powers) is an example of a second-order moment. Even if one considers just one signal and a noise component, computing the average of the sum of the squares produces a cross-term involving the product of signal and noise components. Typically, engineers have managed to find a way to ignore the cross-term by assuming that the signal and the noise components are statistically independent. At a third-order level of statistics, one has to assume that the signal and noise components have zero mean values in order to eliminate the cross-terms in the third-order moment. For the fourth-order and above, the computations become very complex and are not easily simplified by assumptions. In most prior art signal analysis systems, engineers have made the gross assumption that the nature of all signals is Gaussian and that there is no useful information in the higher-order moments. Higher-order statistics have been long recognized in other fields and there is recent literature suggesting their usefulness in signal recovery. Prior to this invention, cumulant-based solutions have been proposed to address the "blind" signal separation problem, i.e. the challenge to recover cochannel signals without knowledge of antenna array geometry or calibration data. See, for example, the following references:

J. -F. Cardoso, "Source separation using higher order moments," Proc. ICASSP-89, pp. 2109–2112, Glasgow, Scotland, May 1989.

J. -F. Cardoso, "Eigen-structure of the fourth-order cumulant tensor with application to the blind source separation problem," *Proc. ICASSP-90*, pp. 2655–2658, Albuquerque, N. Mex., April 1990.

J. -F. Cardoso, "Super-symmetric decomposition of the fourth-order cumulant tensor: blind identification of more sources than sensors," *Proc. ICASSP-91*, pp. 3109–3112, Toronto, Canada, May 1991.

J. -F. Cardoso, "Higher-order narrowband array processing," *International Signal Processing Workshop on Higher Order Statistics*, pp. 121–130, Chamrousse-France, Jul. 10–12, 1991.

J. -F. Cardoso, "Blind beamforming for non-Gaussian sources," *IEE Proceedings Part F*, vol. 140, no. 6, pp. 362–370, December 1993.

P. Comon, "Separation of stochastic processes," *Proc. Vail Workshop on Higher-Order Spectral Analysis*, pp. 174–179, Vail, Colo., USA, June 1989.

P. Comon, "Independent component analysis," *Proc. of Intl. Workshop on Higher-Order Statistics*, pp. 111–120, Chamrousse, France, 1991.

P. Comon, C. Jutten, and J. Herault, "Blind separation of sources, part II: problems statement," *Signal Processing*, vol. 24, no. 1, pp. 11–20, July 1991.

E. Chaumette, P. Comon, and D. Muller, "ICA-based technique for radiating sources estimation: application to airport surveillance," *IEE Proceedings Part F*, vol. 140, no. 6, pp. 395–401, December 1993.

Z. Ding, "A new algorithm for automatic beamforming," *Proc. Twenty-Fifth Asilomar Conference on Signals, Systems, and Computers*, pp. 689–693, Pacific Grove, Calif., November 1991.

M. Gaeta and J. -L. Lacoume, "Source separation without a-priori knowledge: the maximum likelihood solution," *Proc. EUSIPCO*, pp. 621–624, 1990.

E. Moreau, and O. Macchi, "New self-adaptive algorithms for source separation based on contrast functions," *Proc. IEEE SP Workshop on Higher-Order Statistics*, pp. 215–219, Lake Tahoe, USA, June 1993.

P. Ruiz, and J. L. Lacoume, "Extraction of independent sources from correlated inputs: a solution based on cumulants," *Proc. Vail Workshop on Higher-Order Spectral Analysis*, pp. 146–151, Vail, Colo., USA, June 1989.

E. H. Satorius, J. J. Mulligan, Norman E. Lay, "New criteria for blind adaptive arrays," *Proc. Twenty-Seventh Asilomar Conference on Signals, Systems, and Computers*, pp. 633–637, Pacific Grove, Calif., November 1993.

L. Tong, R. Liu, V. Soon, and Y. Huang, "Indeterminacy and identifiability of blind identification," *IEEE Trans. Circuits and Systems*, vol. 38, pp. 499–509, May 1991.

L. Tong, Y. Inouye and R. Liu, "Waveform preserving blind estimation of multiple independent sources," *IEEE Trans. Signal Processing*, vol. 41, no. 7, pp. 2461–2470, July 1993.

However, all of these approaches to blind signal recovery address the static case in which a batch of data is given to a processor, which then determines the steering vectors and exact waveforms. These prior approaches do not have the ability to identify new sources that appear or existing sources that are turned off. In addition, previously proposed algorithms require multiple levels of eigendecomposition of array covariance and cumulant matrices. Their convergence to reliable solutions depends on the initialization and utilization of the cumulant matrices that can be derived from array measurements. Furthermore, previous cumulant-based algorithms have convergence problems in the case of identically modulated sources in general.

Ideally, a system for receiving and processing multiple cochannel signals should make use of statistics of the measurements, and should not need to rely on knowledge of the geometry or array manifold of the sensors, i.e., the array calibration data. Also, the system should be able to receive and process cochannel signals regardless of their modulation or signal type, e.g. it should not be limited to constant-modulus signals. More generally, the ideal cochannel signal processing system should not be limited to any modulation properties, such as baud rate or exact center frequency. Any system that is limited by these properties has only a limited range of source types that can be separated, and is more suitable for interference suppression in situations where the desired signal properties are well known. Another desirable property of the ideal cochannel signal receiving and processing system is that it should operate in a dynamic way, identifying new signal sources that appear and identifying sources that disappear. Another desirable characteristic is a very high speed of operation allowing received signals to be processed in real time. As will shortly become apparent, the present invention meets and exceeds these ideal characteristics for cochannel signal processing.

SUMMARY OF THE INVENTION

The present invention resides in a system or method for processing cochannel signals received at a sensor array and producing desired recovered signals or parameters as outputs. In the context of this specification, "cochannel" signals are that overlap in frequency, as viewed from a receiver of the signals. Even signals that are transmitted in separate, but closely spaced, frequency bands may be cochannel signals as viewed from a receiver operating in bandwidth wide enough to overlap both of the signals. A key aspect of the invention is that it is capable of separating and recovering multiple cochannel signals very rapidly using only sensor array signals, without knowledge of sensor array geometry and array manifold, (e.g. array calibration data), and without regard to the signal type or modulation. If array calibration data are available, the system also provides direction-of-arrival parameters for each signal source. The invention inherently combines coherent multipath components of a received signal and as a result achieves improved performance in the presence of multipath. One embodiment of the invention also includes a transmitter, which makes use of estimated generalized steering vectors generated while separating and recovering received signals, in order to generate appropriate steering vectors for transmitted signals, to ensure that transmitted signals intended for a particular signal source traverse generally the same path or paths that were followed by signals received from the same signal source.

Briefly, and in general terms, the system of the invention comprises a signal receiving system, including means for generating a set of conditioned receiver signals from received signals of any modulation or type; an estimated generalized steering vector (EGSV) generator, for computing an EGSV that results in optimization of a utility function that depends on fourth or higher even-order statistical cumulants derived from the received signals, the EGSV being indicative of a combination of signals received at the sensors from a signal source; and a supplemental computation module, for deriving at least one output quantity of interest from the conditioned receiver signals and the EGSV.

The basic invention as described in the preceding paragraph employs one of three basic methods for computing EGSVs: two iterative methods and one direct computation method. In the first iterative method, the system includes a linear combiner, for repeatedly computing a single channel combined signal from the conditioned receiver signals and an EGSV; means for supplying an initial EGSV to the linear combiner, to produce the initial output of a single channel combined signal; an EGSV computation module, for computing successive values of the EGSV from successive values of the single channel combined signal received from the linear combiner and the conditioned receiver signals; and means for feeding the successive values of the EGSV back to the linear combiner for successive iteration cycles. Also included is means for terminating iterative operation upon convergence of the EGSV to a sufficiently accurate value.

If the second iterative method is used, the system includes a cross-cumulant matrix computation module, for generating a matrix of cross-cumulants of all combinations of the conditioned receiver signals; a structured quadratic form computation module, for computing successive cumulant strength functions derived from successive EGSVs and the cross-cumulant matrix; means for supplying an initial EGSV to the structured quadratic form computation module, to produce the initial output of a cumulant strength function; an ESGV computation module, for generating successive EGSVs from successive cumulant strength functions received from the structured quadratic form computation module; means for feeding the successive values of the EGSV back to the structured quadratic form computation module for successive iteration cycles; and means for terminating iterative operation upon convergence of the EGSV to a sufficiently accurate value.

Finally, if the direct computation method is used, the system includes a cross-cumulant matrix computation module, for generating a matrix of cross-cumulants of all combinations of the conditioned receiver signals; and an EGSV computation module for computing the EGSV directly from the cross-cumulant matrix by solving a fourth degree polynomial equation.

Regardless which of the foregoing variants is employed, signal processing may employ one of several different cumulant recovery (CURE) techniques. In a first of these techniques, the means for generating the set of conditioned signals includes a covariance matrix computation module, an eigendecomposition module for generating the eigenstructure of the covariance matrix and an estimate of the number of signal sources, and a transformation matrix for conditioning the receiver signals. An EGSV generator then employs signals output by the eigendecomposition module to compute EGSVs. This technique is referred to in this specification as the eigenCURE or eCURE system.

An alternate processing technique uses covariance inversion of the received signals and is referred to as the CiCURE system. In this approach, the means for generating the set of conditioned signals includes a covariance matrix computation module and a matrix decomposition module, for generating the inverse covariance matrix and a transformation matrix for conditioning the receiver signals. An EGSV generator then employs signals output by the eigendecomposition module to compute EGSVs. The system further includes a beamformer, for generating a recovered signal from the receiver signals by using the EGSV(s) and the matrix obtained from the matrix decomposition module.

Yet another processing technique is referred to as pipelined cumulant recovery, or pipeCURE. The means for generating the set of conditioned signals includes a covariance matrix computation module, an eigendecomposition module for generating an estimate of the number of signal sources, a transformation matrix for conditioning the receiver signals, and an eigenstructure derived from the receiver signals. Again, the EGSV generator employs signals output by the eigendecomposition module to compute EGSVs. Processing is on a block-by-block basis, and the system further comprises a multiple port signal recovery unit, including means for matching current EGSVs with EGSVs from a prior data block to impose waveform continuity from block to block.

Another variant that can be used in any of these processing techniques involves the manner in which initial EGSVs are computed at the start of processing a new block of data. In accordance with this aspect of the invention, the initial values of EGSVs for each new processing block are computed by combining a prior block EGSV and a cumulant vector derived from the utility function used in the EGSV generator. More specifically, the means for combining takes the sum of the prior block EGSV multiplied by a first factor, and the cumulant vector multiplied by a second factor. The first and second factors may be selected to provide an initial EGSV that anticipates and compensates for movement of a signal source.

In a practical embodiment of the invention, the system functions to separate a plurality (P) of received cochannel signals. If the first iterative method is employed, there are multiple EGSV generators (P in number), including P EGSV computation modules and P linear combiners, for generating an equal plurality (P) of EGSVs associated with P signal sources. The supplemental computation module functions to recover P separate received signals from the P generalized steering vectors and the conditioned receiver signals. More specifically, the supplemental computation module includes a recovery beamformer weight vector computation module, for generating from all of the EGSVs a plurality (P) of receive weight vectors, and a plurality (P) of recovery beamformers, each coupled to receive one of the P receive weight vectors and the conditioned receiver signals, for generating a plurality (P) of recovered signals.

For recovery of multiple signals using the second iterative method, there is a plurality (P) of EGSV generators, including P EGSV computation modules and P structured quadratic form computation modules, for generating an equal plurality (P) of EGSVs associated with P signal sources. Again, the supplemental computation module includes a recovery beamformer weight vector computation module, for generating from all of the EGSVs a plurality (P) of receive weight vectors, and a plurality (P) of recovery beamformers, each coupled to receive one of the P receive weight vectors and the conditioned receiver signals, for generating a plurality (P) of recovered signals.

If the direct processing method is used to separate two signals, the ESGV computation module generates two EGSVs from the cross-cumulant matrix data; and the supplemental computation module functions to recover two separate received signals from the two generalized steering vectors and the conditioned receiver signals. The supplemental computation module includes a recovery beamformer weight vector computation module, for generating from both of the EGSVs two receive weight vectors, and two recovery beamformers, each coupled to receive one of the receive weight vectors and the conditioned receiver signals, for generating two recovered signals.

Although the system of the invention operates in a "blind" sense, without knowledge of the geometry or calibration data of the sensor array, it will also function as a direction finder if array calibration data are available. Hence, in one embodiment of the invention, the system functions to derive the direction of arrival (DOA) of a received signal; and the supplemental computation module includes a memory for storing sensor array calibration data, and means for deriving the DOA of a received signal from its associated steering vector and the stored sensor array calibration data. More specifically, the sensor array calibration data includes a table associating multiple DOA values with corresponding steering vectors; and the means for deriving the DOA includes means for performing a reverse table lookup function to obtain an approximated DOA value from a steering vector supplied by the generalized steering vector generator. The means for deriving the DOA may also include means for interpolating between two DOA values to obtain a more accurate result.

In another important embodiment of the invention, the supplemental computation module of the signal processing system also includes a transmitter, for generating transmit signal beamformer weights from the received signal beamformer weights, and for transmitting signals containing information in a direction determined by the transmit signal beamformer weights.

Other aspects of the invention pertain to various application of the basic cumulant recovery (CURE) signal processing engine described above. Some of these applications are summarized in the following paragraphs.

An important application of the invention is in two-way radio communication. Because CURE processing generates an estimated generalized steering vector not necessarily for each received signal, but for each signal source, the invention provides an important benefit when used in multipath conditions. Signals reaching a receiving antenna array over multiple paths will be combined in the CURE system if the received components are coherent, and the resultant generalized steering vector represents the combined effect of all the coherent multipath signals received at the antenna. This feature has a number of advantages. First, a radio receiving system using the CURE system is inherently immune to multipath problems encountered by conventional receivers. Second, by using generalized steering vectors, there can be an associated generalized null in the antenna directivity pattern, which can be used to null out an interfering signal having multipath structure in favor of a cochannel signal from another source. Third, the signal recovery method provides a diversity gain in the presence of multipath components, such that a stronger combined signal is received as compared with a system that discards all but one component. Fourth, the generalized steering vector concept allows multiple cochannel signals to be received and transmitted in the presence of multipath effects. Fifth, cochannel signal sources that are collinear with the receiver sensor array can be received and separated if there are multipath components.

In another aspect of the invention, the CURE signal separation system can be used to separate signals transmitted in different modes over a "waveguide," by which is meant any bounded propagation medium, such as a microwave waveguide, an optical waveguide, a coaxial cable, or even a twisted pair of conductors. Although the transmission modes may become mixed in the waveguide, the original signals are easily recovered in the CURE system.

In still another aspect of the invention, the CURE signal separation system can be used to separate signals recorded on closely space tracks on a recording medium. Crosstalk between the signals on adjacent tracks is eliminated by using the CURE system to effect recovery.

In yet another aspect of the invention, the CURE signal separation system can be used to extend the effective dynamic range of a receiver system.

In a further aspect of the invention, the CURE signal separation system can be used to perform a complex phase equalization function automatically, without knowledge of the amount of phase correction that is needed.

The CURE system may be modified to compensate for moving signal sources, and may also be modified to handle a wideband signal separation problem. The wideband signal separator includes multiple narrowband CURE systems, means for decomposing a wide band of signals into multiple narrowbands for processing, and means for combining the narrow bands again.

Other aspects and advantages of the invention will become apparent from the following more detailed description, taken together with the accompanying drawings.

Figure 1:
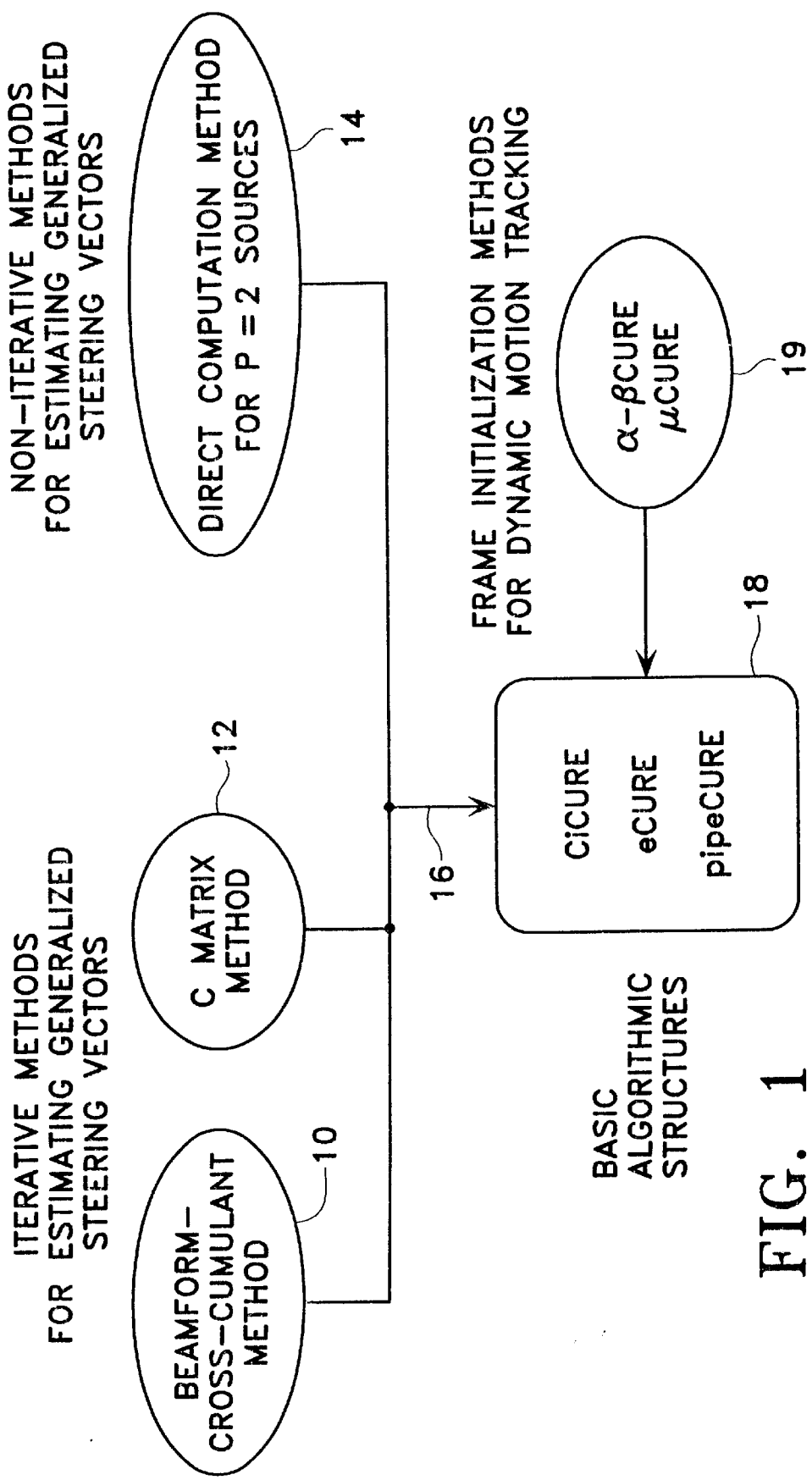
FIG. 1 is a taxonomy diagram depicting the interrelationships of the invention's various cochannel signal processing methods.

DESCRIPTION OF THE PREFERRED EMBODIMENTS 1.0 Introduction:

Because the present invention encompasses a number of different but related concepts and applications, and because the key signal processing concepts of the invention can be implemented in several different embodiments, this detailed description is divided into sections and subsections, each of which covers a different inventive concept, specific embodiment, or practical application of the invention. The following is a table of contents of this description of the preferred embodiments:

1.0 Introduction 2.0 Overview of the Concept of the Invention 2.1 Signal Separation Concept 2.2 Signal Separation Concept in the Multipath Environment 2.3 Direction Finding Concept 2.5 Transmitter/Receiver Concept 2.6 Concept of Separation of Signals in a "Waveguide"

3.0 Preferred Embodiment Using EigenCumulant Recovery (eCURE) System
  3.1 Overview and System Hardware
  3.2 Preprocessing
  3.3 Operation of an Active Signal Extraction Port
  3.4 The Signal Recovery Controller
  3.5 The Orthogonalizer
  3.6 Operation at an Inactive Port
4.0 Alternate Embodiment Using Covariance Inversion Cumulant Recovery (CiCURE) System
5.0 Alternate Embodiment Using Pipelined Cumulant Recovery (pipeCURE) System
  5.1 Overview of the pipeCURE Signal Separator
  5.2 Preprocessor Unit
  5.3 Cumulant Matrix Computer
  5.4 Multiple Port Signal Recovery Unit
6.0 Steering Vector Tracking Method for Situations Having Relative Motion
7.0 Alternate Embodiment Using Direct Computation
8.0 Separation Capacity and Performance When Overloaded
9.0 Performance of the Invention in the Presence of Multipath
  9.1 Performance Against Coherent Multipath
  9.2 Performance Against Noncoherent Multipath
  9.3 Performance Against Mixtures of Coherent and Noncoherent Multipath
10.0 Signal Recovery in the Presence of Strong Interfering Signals
11.0 Diversity Path Multiple Access (DPMA) Communication
  11.1 History and Prior Art of Multiple Access Communication
  11.2 A New Method of Multiple Access Communication
12.0 Application to Two-Way Wireless Communication Systems
  12.1 Transmit Beamforming
13.0 Application to Recovery of Multimode Signals
14.0 Application to Separation of Signals Transmitted Over "Waveguide"
15.0 Application to Radio Direction Finding
16.0 Application to Extending the Dynamic Range of Receiving Systems
17.0 Application to High Density Recording
18.0 Application to Complex Phase Equalization
19.0 Extension to Wideband Signal Separation
  19.1 Partitioning Wideband Measurements to Narrowbands
  19.2 Signal Separation in Narrowbands
  19.3 Combining Narrowbands
20.0 Conclusion
21.0 Mathematical Basis for the Invention
2.0 Overview of the Concept of the Invention:

The present invention resides in a system and method for processing signals received by a sensor receiving system having an array of sensor elements. The system is capable of receiving and processing a signal from a single source, and for purposes of explanation the system will sometimes be described as receiving and processing just one signal. It will, however, shortly become clear that the system is capable of, and best suited for, receiving and processing signals from multiple sources, and that the multiple signals may utilize overlapping signal frequency bands as viewed at the receiver, i.e. they may be cochannel signals. As discussed above in the "background of the invention" section, detection and processing of cochannel signals presents difficulties that have not been adequately addressed by signal processing systems of the prior art.

One central concept that makes the various aspects of overall invention possible is the ability to determine accurate estimates of generalized steering vectors of the source signals incident on a sensor array or, more generally, estimates of the linear combinations that represent the relative amplitudes of the source signals in each channel of a multichannel signal stream. The meaning of the term "generalized steering vector" will become better understood as this description proceeds. A definition for present purposes is that the generalized steering vector associated with a particular signal source represents the weighted sum of ordinary steering vectors corresponding to all multipath components of signals from that source. An ordinary steering vector is the value of the array manifold at a single angle corresponding to a source's DOA. Multipath components arise when a signal from a single source reaches a receiver over multiple propagation paths.

The invention encompasses three distinct methods for determining estimates of the generalized steering vectors of source signals. FIG. 1 illustrates the taxonomy and relationships among the methods. Two of the methods for determining the estimated generalized steering vectors (EGSVs) involve iterative computations. The first of these, indicated by reference numeral 10, is called the "beamform—cross-cumulant" method. In this method, an initial EGSV is iteratively updated and improved by a method that involves using the initial EGSV as a complex weight vector in a linear beamformer that operates on sensor signals (i.e., signal measured at a sensor array, to be discussed shortly with reference to other drawing figures). Cross-cumulants are computed, specifically between the output signal from the beamformer used in this method and each of the beamformer's input signals.

The term "cumulant" is defined more completely in later sections of this specification, but for purposes of this general discussion it is sufficient to note that cumulants are fourth-order (or higher even-order) statistical moments of the received signals. The cross-cumulants are formed into a vector which, upon normalization, becomes the next EGSV. This iteration cycle is repeated until convergence is attained, based on a predefined convergence test or on a selected number of iteration cycles. Upon convergence, the EGSV will have converged to the generalized steering vector of one of the incident source signals.

The second iterative method for obtaining EGSVs is referred to as the "C-matrix" method and is indicated at 12 in FIG. 1. In this method, a particular matrix of cross-cumulants among the sensor signals is calculated first, before the iterative process starts. There are no subsequent calculations of cumulants within the iterative cycle. Instead, an initial EGSV is used to calculate a structured quadratic form, which yields a quantity called "cumulant strength." The EGSV is adjusted to maximize the cumulant strength by means of an iterative optimization procedure. Upon convergence, the EGSV will have converged to the generalized steering vector of one of the incident source signals.

The third method of finding the EGSVs is non-iterative. It is referred to as the "direct computation" or "analytic" method and is indicated at 14 in FIG. 1. This method can only recover up to two incident signals, but is unrestricted as to the number of sensor array elements or processing channels. The method first computes the same matrix of cross-cumulants among the sensor signals as is used in the second iterative method. However, a fourth degree polynomial equation is solved instead of optimizing a structured quadratic form. The solutions to the fourth degree polynomial yield the final EGSVs directly without iteration.

In addition to the three methods for generating the EGSVs of the source signals, the present invention has three alternative basic algorithmic structures on which the preferred embodiments of the invention are based. FIG. 1 shows diagrammatically that the EGSVs generated by either of the three methods (10, 12 or 14) are coupled over line 16 to a selected one of three algorithmic structures 18, referred to as CiCURE, eCURE, and pipeCURE. As will be further explained below, the acronym CURE stands for cumulant recovery. The terms CiCURE, eCURE and pipeCURE refer to specific embodiments of the invention known as covariance inversion CURE, eigenCURE and pipelined CURE, respectively. Each structure encompassed by the block 18 in FIG. 1 can employ any of the three methods (10, 12 or 14) described above for determining the source signal EGSVs.

By way of example, a subsequent section of this specification (Section 3.0) describes a preferred embodiment consisting of the eCURE algorithmic structure and the beamform—cross-cumulant method. Another section (Section 5.0) details a preferred embodiment consisting of the pipeCURE structure and the C-matrix method. However, all other combinations are possible and may be preferable depending on the specific engineering application.

The algorithmic structures (18) are described below in subsequent descriptive sections as processing input samples in a "batch processing" mode, meaning that sampled data from the sensor signals are grouped into blocks of samples, which are then processed one block at a time. The block size is arbitrary and is not intended to limit the scope of the present invention. For example, the block size can be as small as one, in which case, the batch mode reduces trivially to "sample-by-sample" processing.

In some situations, the EGSVs of the source signals vary with time, due, for example, to changing geometric relationships among the locations of the sources, the receiving sensor array, or multipath reflectors. For such situations, two methods are presented for determining the initial EGSVs for each block of samples. These methods incorporate a technique known as $\alpha$-$\beta$ tracking into the block initialization process and thereby make the acquisition, capture, separation, and recovery of source signals more stable when any of the sources or the receive sensor array is moving. Two block initialization methods are presented for this purpose and are called $\alpha$-$\beta$CURE and $\mu$CURE. As indicated by block 19 in FIG. 1, these two methods are applicable to any of the basic algorithmic structures 18.

Figure 2A:
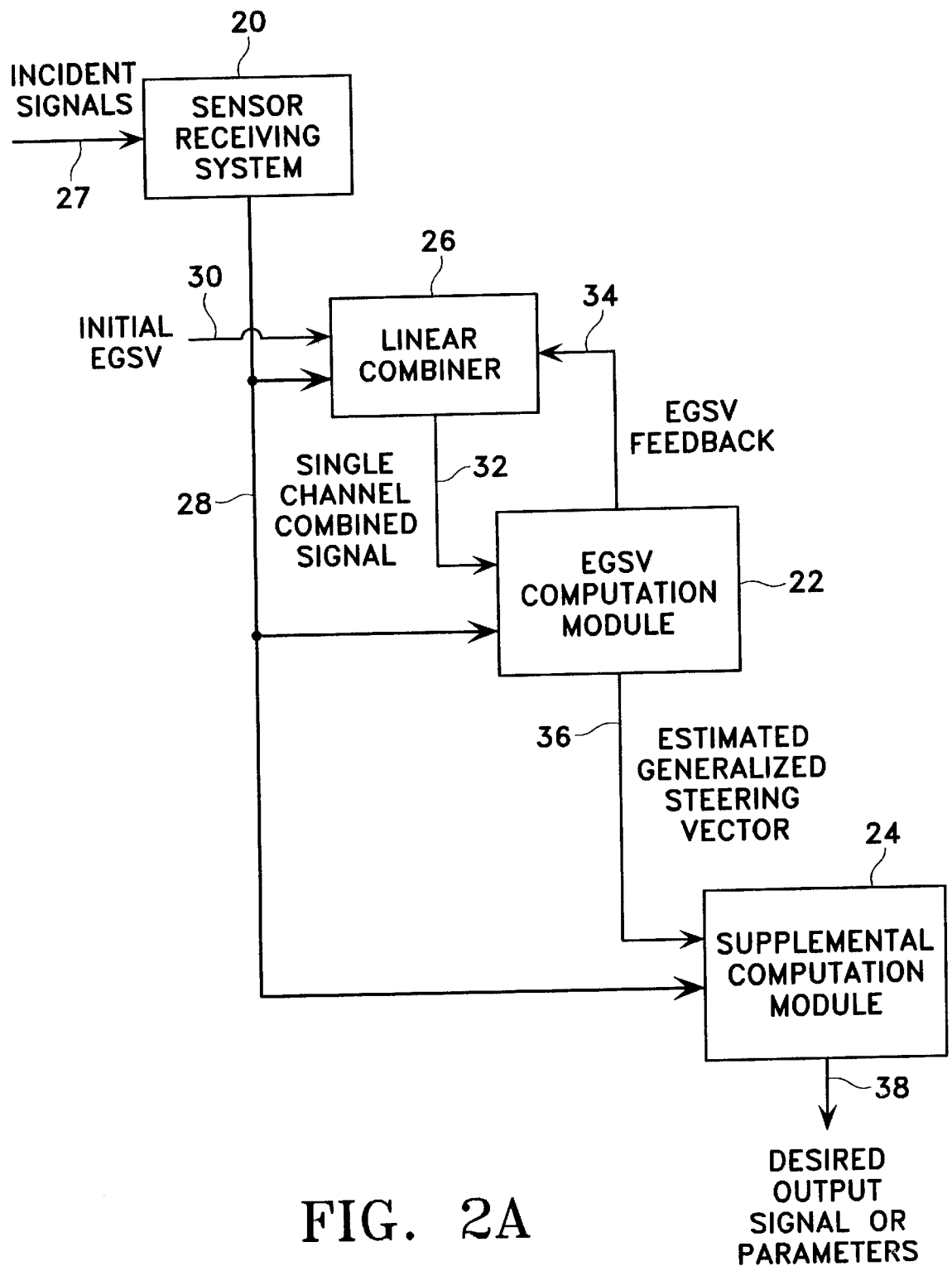
FIG. 2A is a block diagram of the cumulant recovery (CURE) system of the invention in general form, depicting a first iterative method.

FIG. 2A shows the system of the present invention in general form, employing the first iterative method referred to above as the beamform—cross-cumulant method. The system includes four principal components: a sensor receiving system 20, an estimated generalized steering vector (EGSV) computation module 22, a supplemental computation module 24 and a linear combiner 26.

The sensor receiving system 20 includes components not shown in FIG. 2A, but which will be discussed in more detail below, including an array of sensors to convert incident signals into electrical form, and some form of signal conditioning circuitry. In each of the embodiments and applications of the invention, incident signals 27 are sensed by the sensor receiving system 20 and, after appropriate processing, the supplemental processing module 24 generates desired output signals or parameters as needed for a specific application of the invention. For example, in a signal separation application, the output signals will be the reconstructed cochannel signals received from separate signal sources. An important aspect and advantage of the invention is that the received signals may be of any modulation or type.

A key component of the signal processing system of the invention is the estimated generalized steering vector (EGSV) computation module 22, which receives the conditioned received signals over line 28 from the sensor receiving system 20, and computes an EGSV from the conditioned signals. The EGSV, in accordance with the invention, results in optimization of a utility function that depends on fourth or higher even-order statistical cumulants derived from the received signals. At this point in the description, cumulants have not yet been defined, but they are discussed in Sections 4.0 and 21.0. For the present, it is sufficient to note that cumulants are fourth-order (or higher even-order) statistical moments of the received signals.

The EGSV computation module 22 functions in an iterative manner in cooperation with the linear combiner 26. The linear combiner 26 begins a first iteration with an initial EGSV, indicated at 30, which may be an estimate or simply a random initial vector quantity. The linear combiner 26 then combines the received signals on line 28 with the initial EGSV and generates a single-channel combined signal on line 32 to the EGSV computation module 22. The latter performs its cumulant computation and generates a revised EGSV, which is fed back to the linear combiner 26 over line 34. The iterative process continues until the EGSV has converged to an appropriately accurate solution, which is output to the supplemental computation module 24 over line 36. The output on line 36 is also referred to as an estimated generalized steering vector, which closely approximates the actual generalized steering vector and represents the weighted sum of ordinary steering vectors corresponding to all multipath components of signals from a source. Where no multipath components are present, the generalized steering vector reduces to an ordinary steering vector for the source. However, the term "generalized" steering vector is used frequently in this specification, to convey the meaning that the steering vector generated automatically and dynamically takes into account the possibility of receiving a signal over multiple paths.

The function of the supplemental computation module 24 depends on the specific application of the invention. This module makes use of the conditioned received signals on line 28 and the generalized steering vector on line 36, and generates the desired output signal or parameters on output line 38.

It should be understood that the components shown in FIG. 2A, and in particular the EGSV computation module 22 and the linear combiner 26, function to generate a single estimated generalized steering vector on line 36, corresponding to a single signal source from which signals are received at the sensor receiving system 20. In a number of applications, as will be further described, multiple linear combiners 26 and multiple EGSV computation modules 22 will be needed to separate signals from multiple sources. Similarly, in most applications the supplemental computation module 24 must also be replicated, at least in part, to generate multiple desired output signals.

Another aspect of FIG. 2A to keep in mind is that it is an imperfect attempt to depict a number of the invention's many possible forms in a single conceptual diagram. The concept of the generalized steering vector is central to all forms of the invention. The estimated generalized steering vector (EGSV) provides a means for tracking sources through time free of discontinuity. The estimated generalized steering vector computational module, 22 in FIG. 2A, may be partially merged with the supplemental computation module 24 or the order of computation modified to accommodate physical implementation. This is true in the case of a specific implementation of a signal recovery system, described subsequently, in which recovered signals are generated as outputs of the supplemental computation module 24.

An important aspect of the invention is that the EGSV computation module 22, or multiple modules in some embodiments, compute estimated generalized steering vectors extremely rapidly, either by direct computation or by an iterative process that converges superexponentially. Moreover, each EGSV represents the weighted sum of steering vectors associated with multipath components derived from a single signal source. As will be described in the next descriptive subsection, multiple EGSVs can be conveniently processed to reconstruct and separate signals from multiple signal sources.

As the description of the various embodiments proceeds, it will become apparent that certain components of the invention are common to many applications. In terms of the components shown in FIG. 2A, the common components include the EGSV computation module 22, the linear combiner 26 and signal conditioning portions of the sensor receiving system 20. Accordingly, in many instances it would be advantageous to fabricate these components as a monolithic semiconductor device or chip, to be mounted in close association with other components in the supplemental computation module 24, which vary by application. Alternatively, a set of semiconductor chips could include various embodiments of the supplemental computation module 24, such as for signal separation, direction finding and so forth.

Figure 2B:
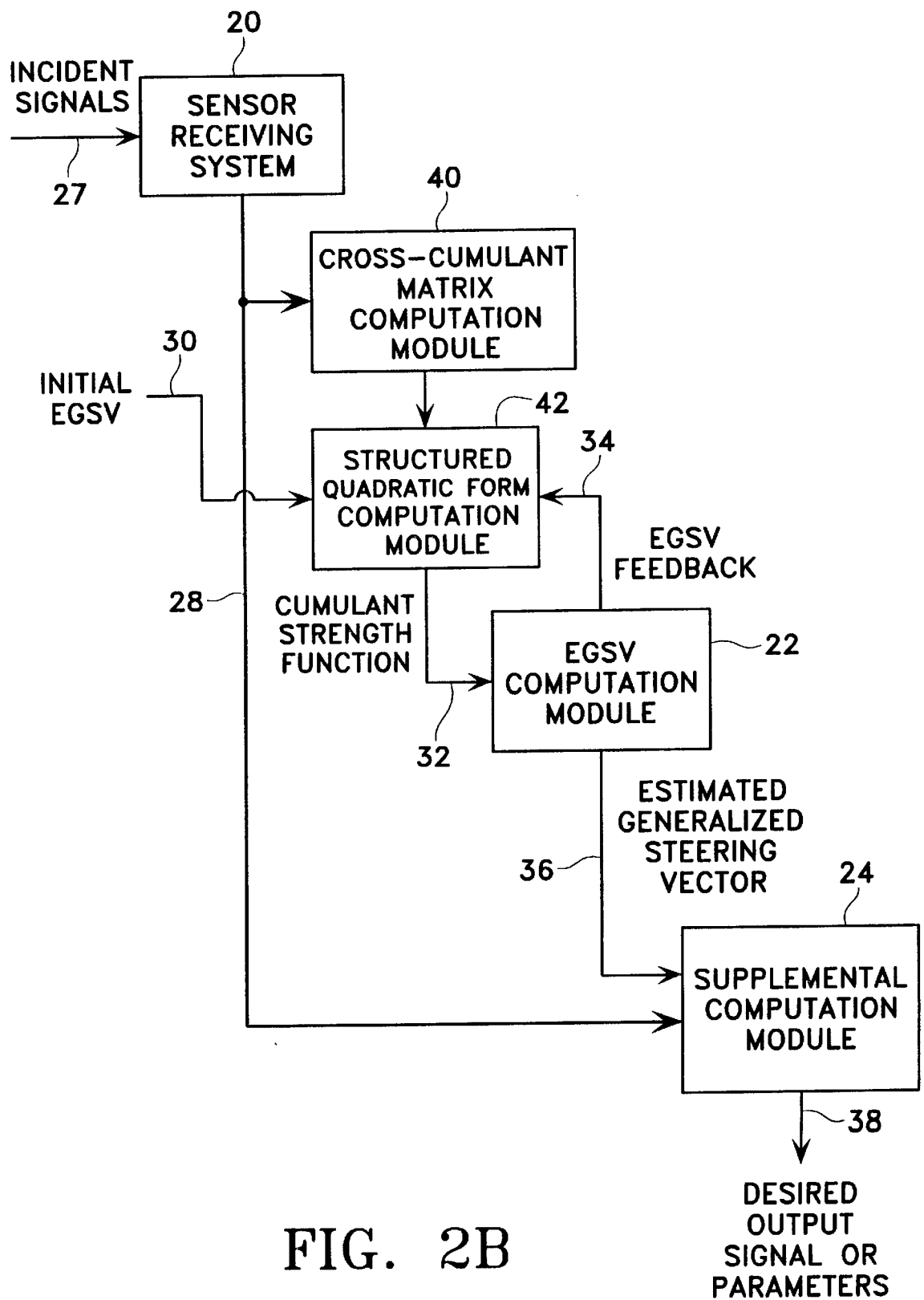
FIG. 2B is a block diagram similar to FIG. 2A, but depicting a second iterative method.

FIG. 2B illustrates the form of the invention that uses the second iterative method (12, FIG. 1), called the C-matrix method, for generating EGSVs. It will be observed that the figure is similar to FIG. 2A, except that there is no linear combiner. Instead there is a cross-cumulant matrix computation module 40 and a structured quadratic form computation module 42.

The cross-cumulant computation module 40 receives conditioned sensor signals over line 28 from the sensor receiving system 20, computes the cross-cumulants of all combinations of the sensor signals and stores the results in a matrix having a particular mathematical structure. This matrix of cross-cumulants, denoted C, has dimensions $P^2 \times P^2$, where P is the number of signal sources, and is stored for subsequent computations. This C matrix is computed before any iterative computations are performed, and it will be noted that the EGSVs fed back from the EGSV computation module 22 over line 34 are coupled to the structured quadratic form computation module 42 and not to the cross-cumulant matrix computation module 40.

The structured quadratic form computation module 42 is used in an iterative computational loop that, starting with an initial estimated generalized steering vector (EGSV) on line 30, produces a series of successively improved values for the EGSV, until a termination test is satisfied. In each cycle of the iterative loop the module 42 receives an input EGSV and outputs a cumulant strength function (on line 32), which is obtained by computing a structured quadratic form involving the C matrix and the input EGSV. The mathematical details of the computation are described in a later section. The cumulant strength function, so obtained, is output to the EGSV computation module 22 to update the EGSV. As in FIG. 2A, the nature of the supplemental computation module 24 in FIG. 2B depends on the particular application of the invention.

The EGSV computation module 22 together with the structured quadratic form computation module 42 are part of an iterative computational loop that produces a series of successively improved values for an EGSV of a source signal, starting from an initial value. The EGSV computation module 22 receives as input a cumulant strength value for the current value of an EGSV. Based upon this cumulant strength, the module 22 determines a new value for the EGSV that will cause the value of the cumulant strength value to increase in absolute value. This new EGSV is output to the structured quadratic form computation module, where it replaces the old EGSV, and the computation cycle is repeated until a termination test is satisfied.

Figure 2C:
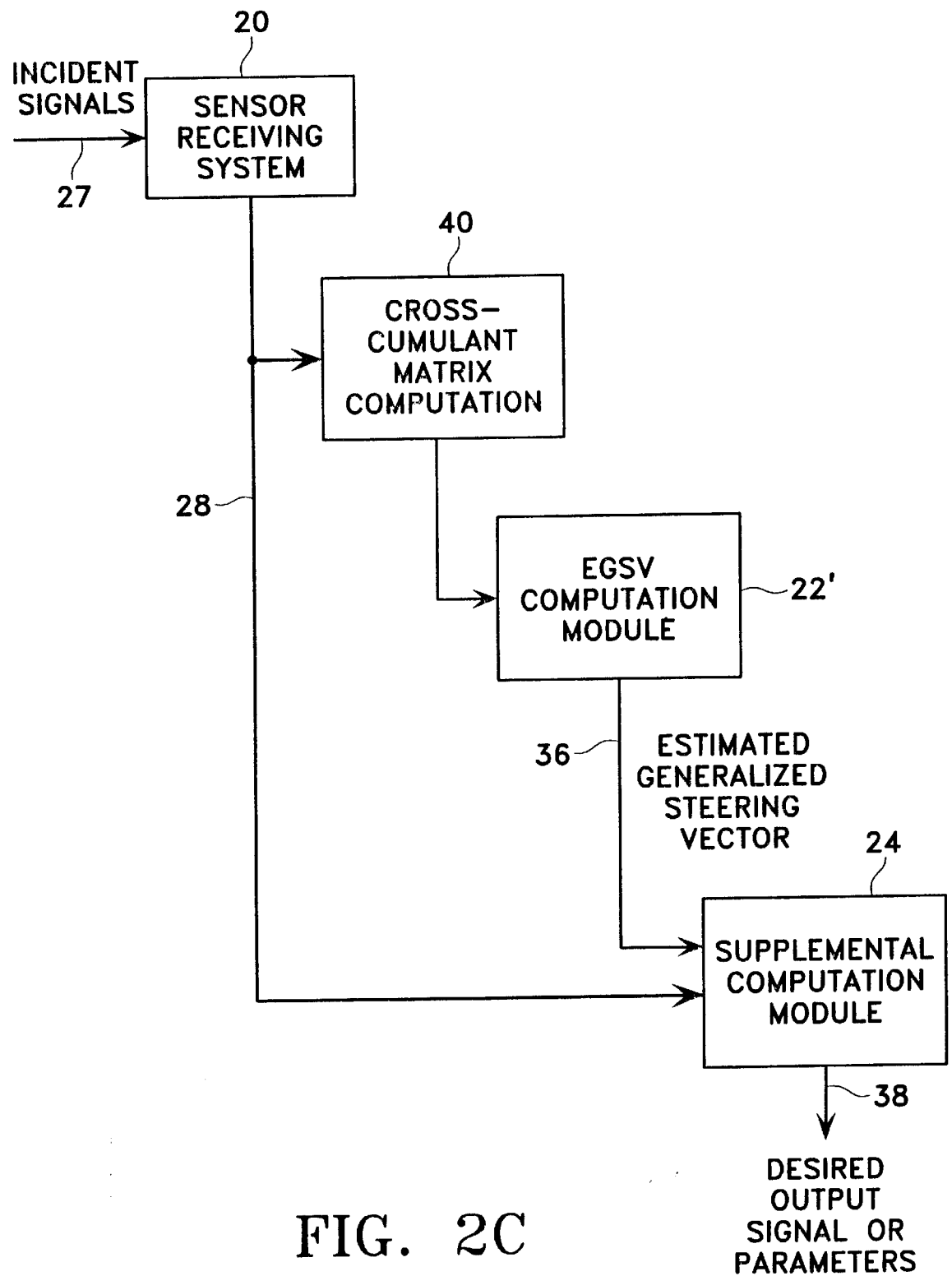
FIG. 2C is a block diagram similar to FIG. 2A, depicting a direct computation method.

FIG. 2C depicts the direct computation method of the invention in conceptual form using the same basic structure as FIGS. 2A and 2B. The EGSV computation module in this figure is referred to by numeral 22', since it performs its function differently from the module 22 in FIGS. 2A and 2B. The EGSV computation module 22' receives as input the C matrix computed by the cross-cumulant matrix computation module 40. The EGSV computation module 22' computes the solutions to a fourth degree polynomial equation, from which the EGSVs of one or two sources are directly determined. The mathematical details of the particular polynomial equation are described in a Section 7.0. The values of the EGSVs, so determined, are output to the supplemental computation module 24.

It will be understood that FIGS. 2A, 2B and 2C illustrate the processing required to recover a single source signal from among a plurality of possible source signals, for purposes of explanation. We will now turn to the case of recovery of multiple signals.

Figure 3A:
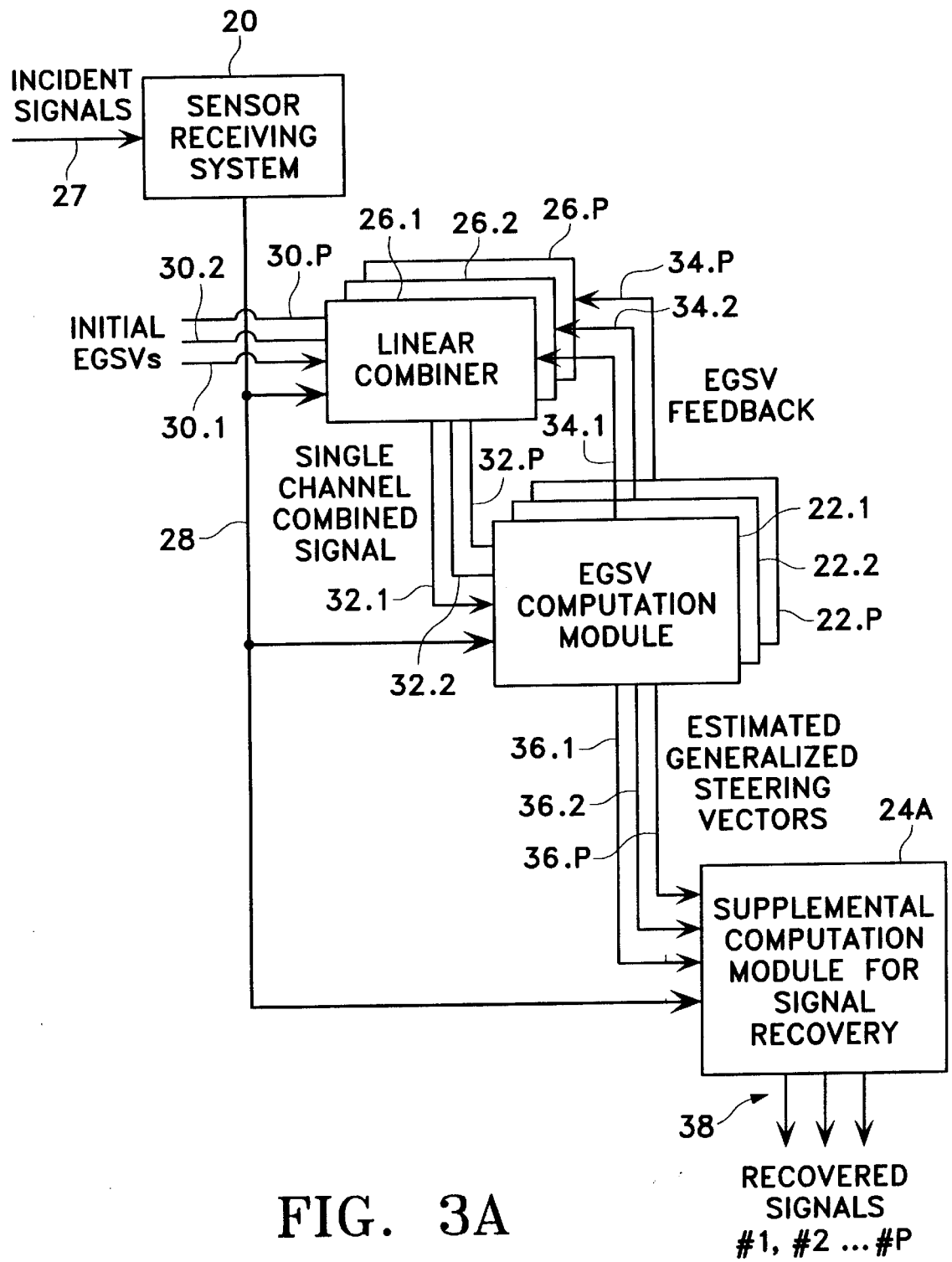
FIG. 3A is a block diagram similar to FIG. 2A, but modified to depict how the invention functions to separate multiple received cochannel signals.

2.1 Signal Separation Concept:

The present invention has a number of applications in the communications field and, more specifically, in the separation of cochannel signals. FIG. 3A illustrates the concept of signal separation using the first iterative method (10, FIG. 1) and differs from FIG. 2A in that there are multiple linear combiners 26.1 through 26.P and multiple estimated generalized steering vector (EGSV) computation modules 22.1 through 22.P. The supplemental computation module 24 has been replaced by a supplemental computation module 24A for signal recovery, the details of which will be explained with reference to FIG. 4A. The sensor receiving system 20 outputs the received signals in conditioned form on line 28, which is connected to each of the linear combiners 26 and EGSV computation modules 22. Signal conditioning in the sensor receiving system, 20, which is described subsequently, may be used to transform the received signals to P sets of signals, where P is the number of signal sources being received, and to be separated. As in FIG. 2A, the EGSV computation modules 22 and the linear combiners 26 cooperate to produce converged values of estimated generalized steering vectors on output lines 28.1 through 28.P. The supplemental computation module 24A uses these generalized steering vectors and the received signals on lines 28 to generate P separate recovered signals on lines 38. How this latter step is accomplished is best understood from FIG. 4A, which will be discussed after consideration of FIGS. 3B and 3C.

Figure 3B:
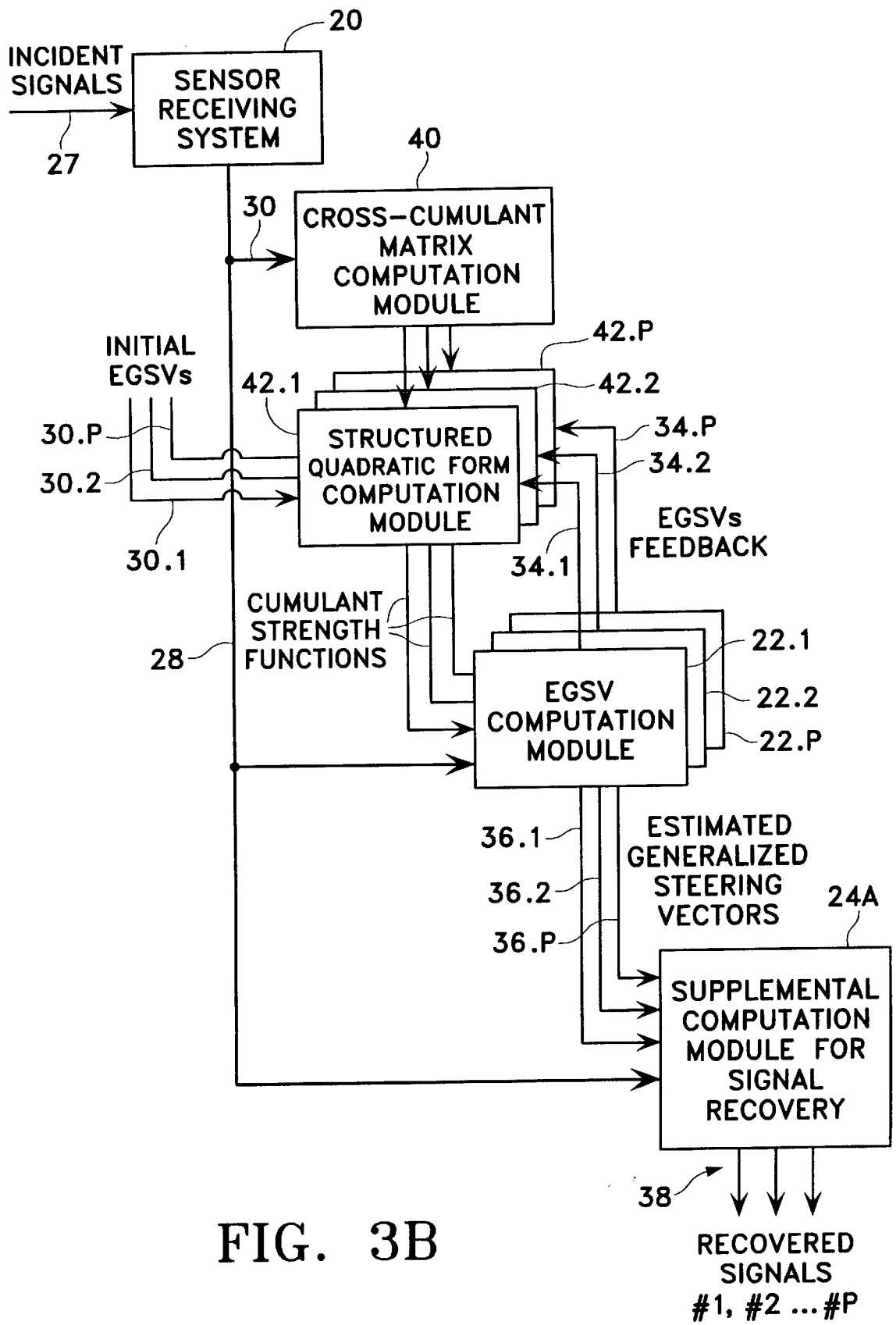
FIG. 3B is a block diagram similar to FIG. 3A, but depicting the first iterative method.

FIG. 3B depicts a cochannel signal separation and recovery system similar to that of FIG. 3A, but using the second iterative method (12, FIG. 1). As in FIG. 2B, there is a single cross-cumulant matrix computation module 40 but, unlike the FIG. 2B system, there are multiple (P) structured quadratic form computation modules 42.1, 42.2 . . . 42.P, each of which receives cross-cumulants from the matrix computation module 40 and conditioned input signals from line 28. Cumulant strength values generated by the structured quadratic form computation modules 42 are supplied to respective EGSV computation modules 22.1, 22.2 . . . 22.P, which output recomputed EGSVs for feedback over lines 34.1, 34.2 . . . 34.P, respectively, to the structured quadratic form computation modules 42.1, 42.2 . . . 42.P, and converged values of the EGSVs on lines 36.1, 36.2 . . . 36.P.

Figure 3C:
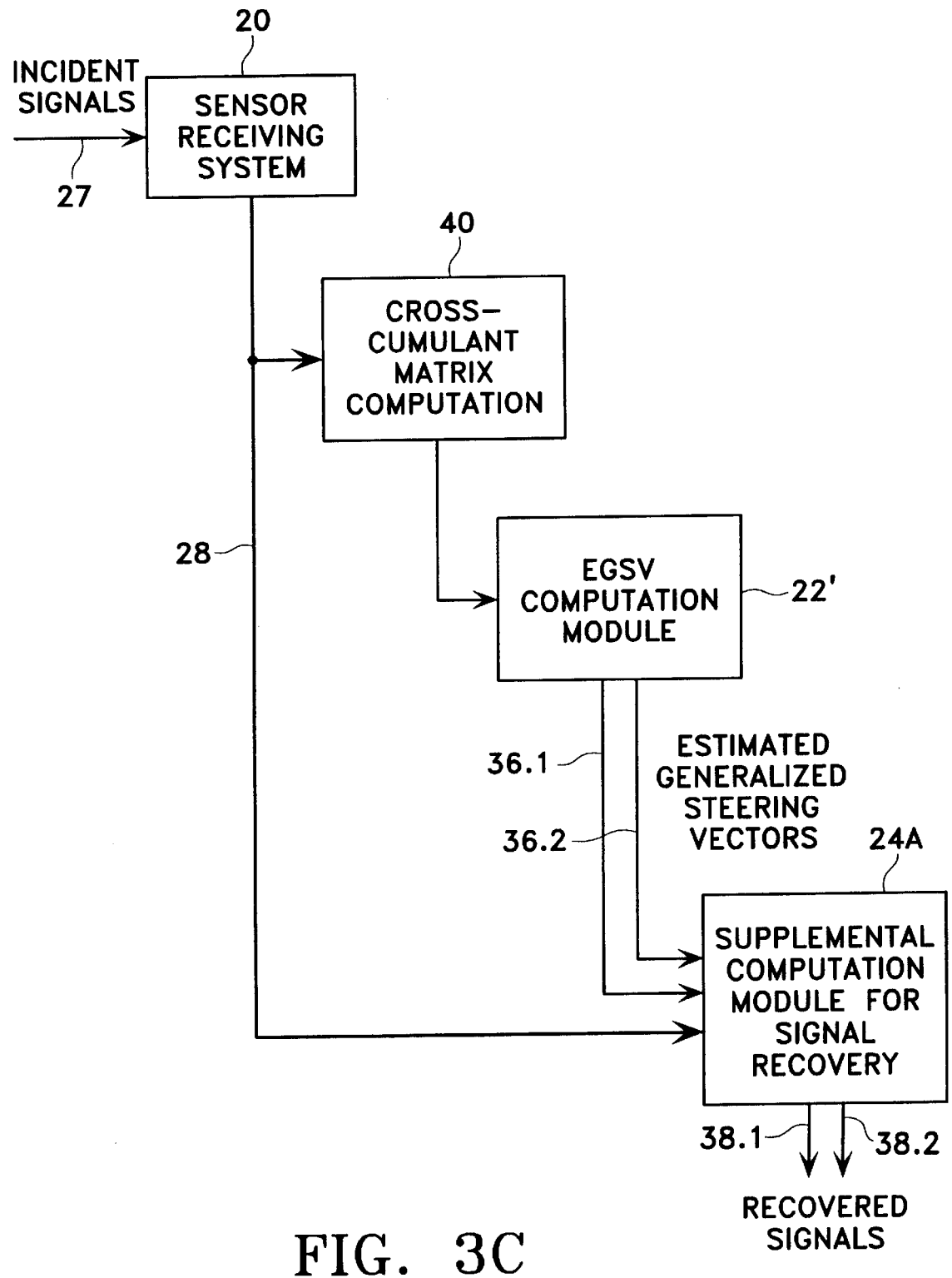
FIG. 3C is a block diagram similar to FIG. 3A, but depicting the direct computation method.

FIG. 3C depicts a signal separation and recovery system similar to those of FIGS. 3A and 3B, but using direct computation instead of an iterative method. This figure is also closely similar to FIG. 2C, except that the ESGV computation module 22' generates two EGSVs on output lines 36.1 and 36.2, and supplemental processing is performed in the supplemental computation module for signal recovery, which generates two recovered signals for output on lines 38.1 and 38.2.

Figure 4A:
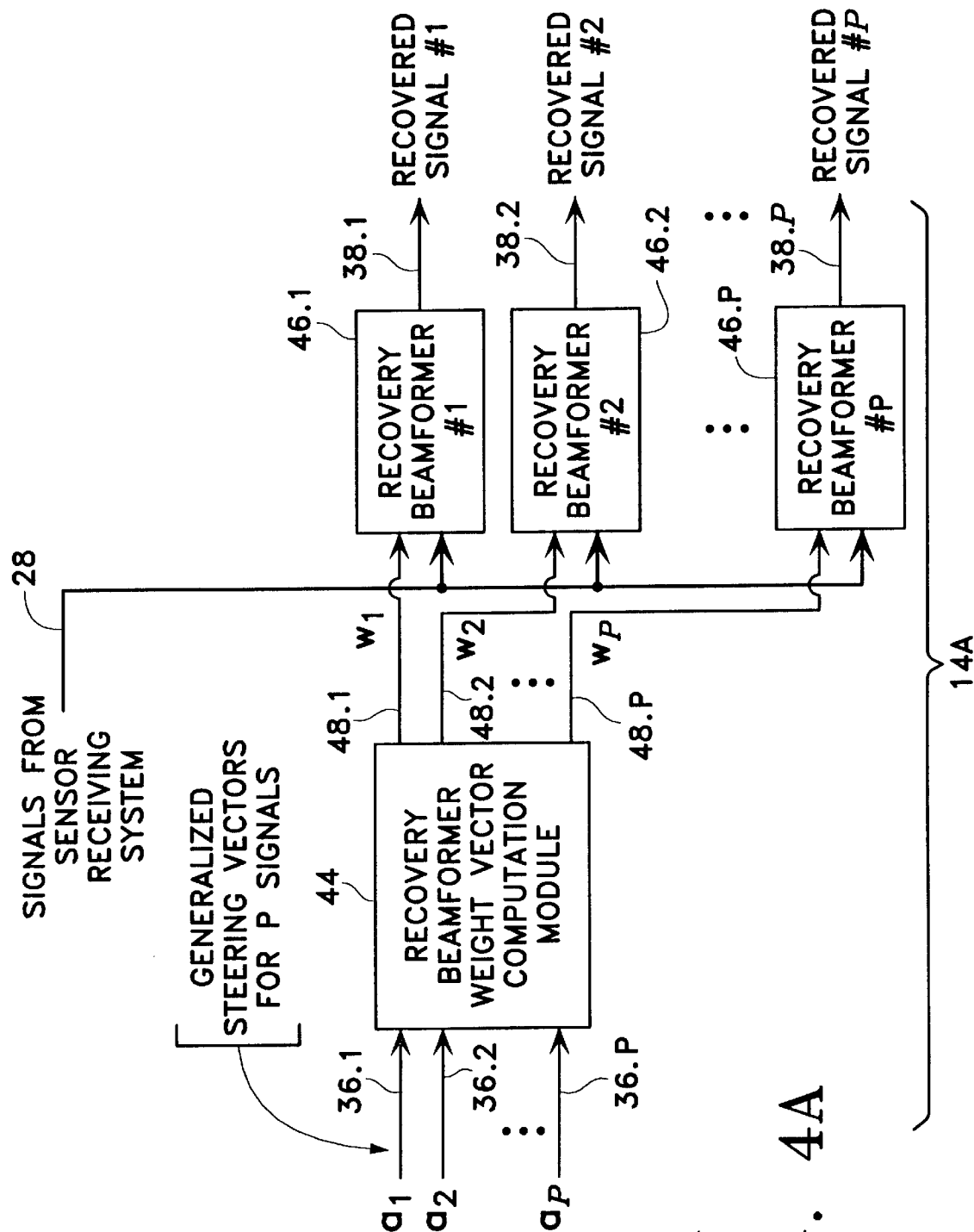
FIG. 4A, is a block diagram of a supplemental computation module for signal recovery, shown in FIGS. 3A, 3B and 3C.

As shown in FIG. 4A, the supplemental computation recovery module for signal recovery 24A includes a recovery beamformer weight vector computation module 44 and multiple recovery beamformers 46.1 through 46.P. Computation of the weight vectors in module 44 is made in accordance with a selected known technique used in signal processing. The beamforming weight vectors for signal recovery are computed directly from the generalized steering vectors. This is done by one of two methods: (1) by projecting each generalized steering vector into the orthogonal complement of the subspace defined by the span of the vectors of the other sources by matrix transformation using the Moore-Penrose pseudo-inverse matrix; or (2) by using the Capon beamformer, also called the Minimum Variance Distortionless Response (MVDR) beamformer in the acoustics literature. The module 44 generates, from the P input estimated generalized steering vectors (EGSVs), a set of P weight vectors $w_1$ through $w_P$, on lines 48.1 through 48.P. Implicit in the function performed by the module 44 is the orthogonalization of the output signals, such that the weight vectors are mutually orthogonal, i.e. each is representative of a separate signal. Alternatively, the module 44 may be implemented in the manner described in Section 3.0 and Section 21.0.

The weight vectors $w_1$ through $w_P$ are applied to the received, conditioned signals on line 28, in the recovery beamformers 46.1 through 46.P. This is basically a process of linear combination, wherein each signal component is multiplied by a corresponding component of the weight vector and the results are added together to produce one of the recovered signals.

As will be seen from the more detailed description of the preferred embodiments, the functions of the linear combiners 26 (in the case of FIG. 3A), the EGSV computation modules 22, the recovery beamformer weight vector computation module 44 and the recovery beamformers 46 may be combined in various ways. Moreover, all of these functions, together with signal conditioning performed in the sensor receiving system 20, may be conveniently implemented in one or more integrated circuits.

2.2 Signal Separation Concept in the Multipath Environment:

As will be later described in more detail, signal separation in accordance with this invention has important advantages in the context of multipath signal processing. Communication signals, particularly in an urban environment, often reach a receiver antenna over multiple paths, after reflection from geographical features, buildings and other structures. The multiple signals arrive at the antenna with different signal strengths and subject to relative time delays and other forms of distortion. Because they arrive from different directions, such signals may be separated in a conventional cochannel signal separation system. However, the cochannel signal processing system of the present invention will automatically combine the multipath components if they are still coherent with each other. Coherency, in this context, is a relative term that simply indicates the degree to which the signals are identical. Multiple signals are classified as coherent if they are relatively similar to each other, as measured by a cross-correlation function over a finite time interval. Multipath components are noncoherent, and therefore not combinable, when they suffer large relative time delays or when a signal transmitter or receiver is in motion, causing a Doppler shift in the transmitted signal that affects one path more than another.

The key to successful processing of multipath components is that each generalized steering vector referred to with reference to FIGS. 1, 2A–2C and 3A–3C corresponds to the sum of all of the mutually coherent multipath components of a signal source incident on the sensor receiving system 20. The generalized steering vectors from all signal sources are then converted to a set of beamforming weight vectors (in recovery beamformer weight vector computation module 44), without the need for knowledge of array geometry or array manifold calibration data (which relates array steering vectors with angles of arrival for a particular array). For many of its applications, the invention is, therefore, completely "blind" to the array manifold calibration data and the physical parameters of the array.

Figure 4B:
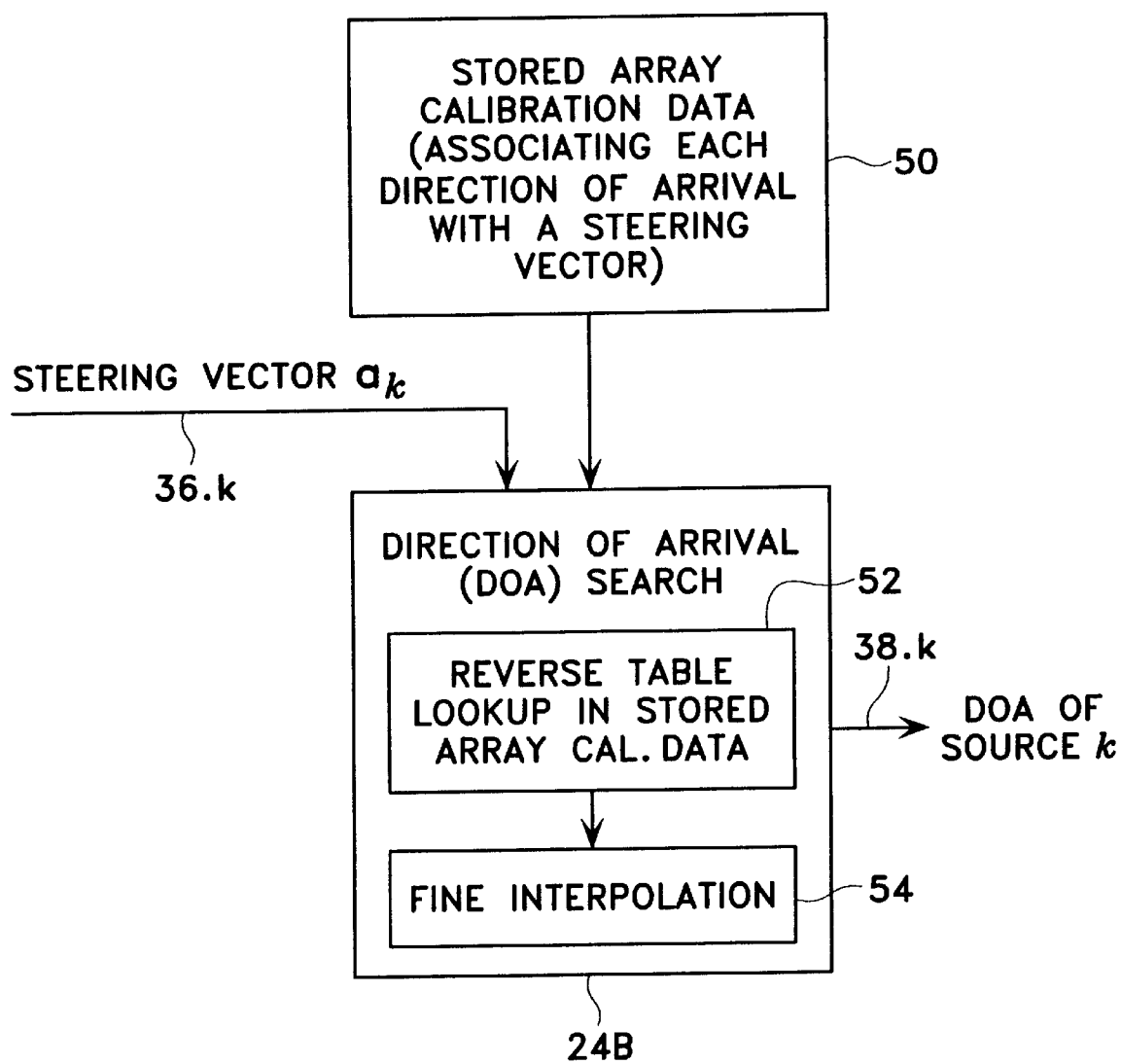
FIG. 4B is a block diagram of a supplemental computation module for use in conjunction with the system of FIGS. 2A, 2B or 2C, to provide a direction finding function.

2.3 Direction Finding Concept:

The invention as described with reference to FIGS. 2A–2C, 3A–3C and 4A provides for cochannel signal separation, even in a multipath environment, without use of specific sensor array manifold information. The array parameters, and specifically array calibration data that relate array steering vectors with directions of signal arrival, are needed if one needs to know the angular directions from which signals are being received. FIG. 4B illustrates this concept for a single signal source referred to as source k. Although the concept depicted in FIG. 4B is conventional, the manner in which the present invention generates the input steering vectors is novel. A generalized steering vector, referred to as $a_k$, is received from one of the EGSV computation modules 22.k (FIG. 3A) on line 36.k and is processed in a direction of arrival (DOA) search module 24B, which is a specific form of the supplemental computation module 14 (FIGS. 2A–2C). The DOA search module 14B uses stored array calibration data 50, which associates each possible direction of arrival with a steering vector. These calibration data are typically stored in a memory device as a lookup table. In the DOA search module 24B, a reverse table lookup is performed to obtain the two closest directions of arrival from the input steering vector, as indicated in block 52. Then a more precise angle of arrival is obtained by performing an interpolation between the two angle values retrieved from the calibration data 50, as indicated in block 54. The direction of arrival (DOA) parameter for the $k^{th}$ signal source is output from computation module 24B on line 38.k.

2.4 Transmitter/Receiver Concept:

As will be discussed further in section 12.0, an important application of the invention is to two-way communication systems. In many communication systems, the allocation of transmission frequencies within a geographical area, such as in a predefined cell in a cellular telephone system, is often a limiting factor that determines the maximum number of active users that the system can handle. In accordance with this aspect of the present invention, information derived from signals received and separated in a receive mode of operation are used to generate signals to a transmit antenna array, in such a way that separate information signals can be transmitted to respective remote stations using the same frequency.

As already discussed, the present invention makes use of an array of sensors or antennas to separate received signals of the same frequency (cochannel signals). In a two-way communication system of the type having multiple mobile units, it would be impractical, in general, to require the use of an antenna array at each remote or mobile transmitter/receiver. These remote units may be installed in vehicles or be hand-held devices for which the use of an antenna array is either inconvenient or simply impossible. However, in most communication systems, the communication path between remote units is completed through one or more base stations operating as a receiver and transmitter. Since the base stations are generally larger and more powerful than the mobile units and are fixed in location, they may be conveniently structured to include antenna arrays for both receiving and transmitting. As discussed above, a receive array connected to the system of the invention provides for separation of received cochannel signals. Moreover, an important by-product of the signal separation process is a set of generalized steering vectors, each associated with a separate signal source.

Figure 5:
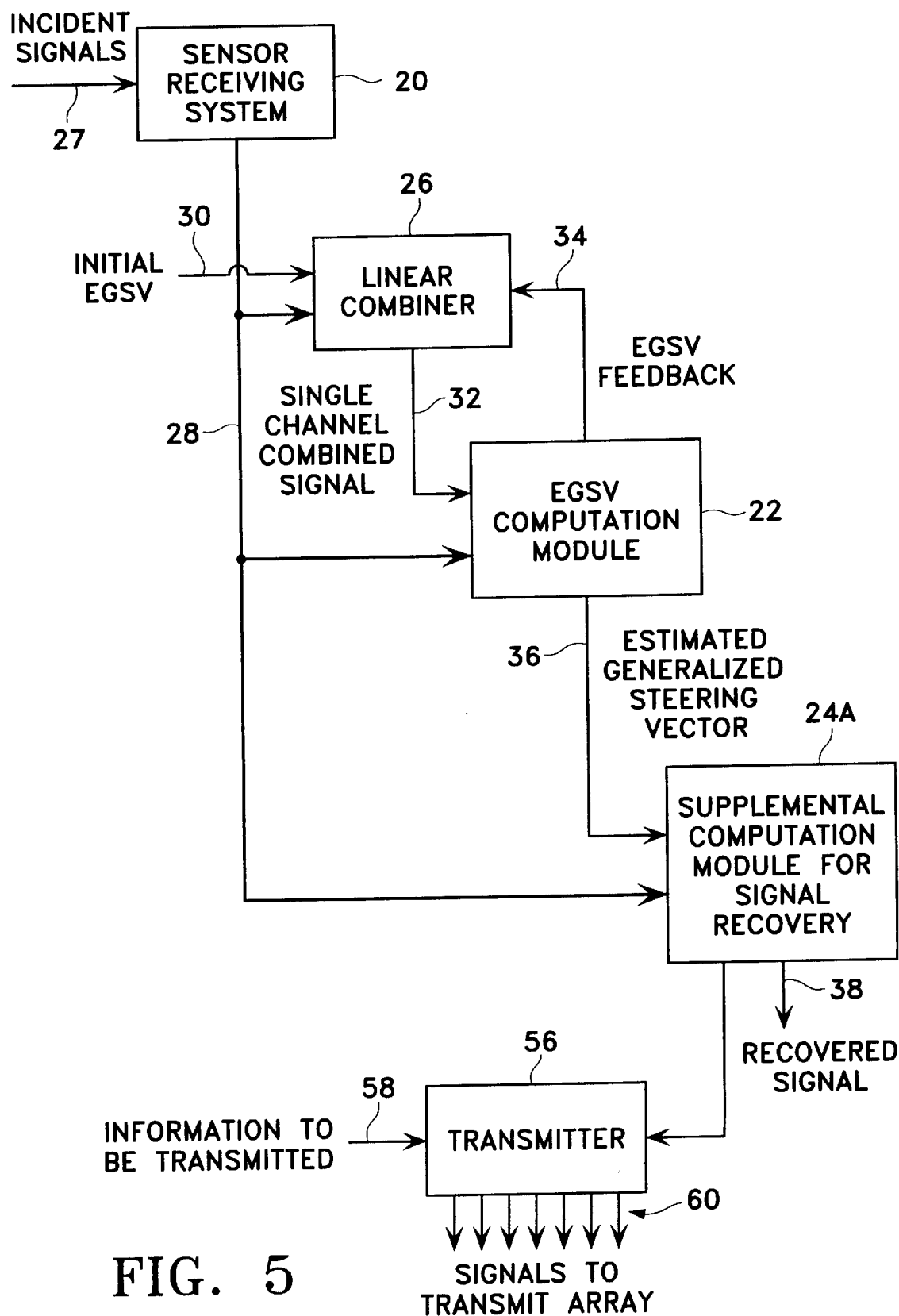
FIG. 5 is a block diagram similar to FIG. 2A, but modified to depict a receiver/transmitter function.

As shown in FIG. 5 for a single remote transmitter/receiver station, received signals are recovered on line 38, in the manner discussed with reference to FIG. 2A. In a two-way communication system, a transmitter 56 uses the generalized steering vector corresponding to the received signal source, obtained from the EGSV computation module 22, in order to generate a weight vector for application to a transmit antenna array (not shown). The transmitter 56 also receives, on line 58, an information signal to be transmitted. Typically, this will be in the form of a digitized voice signal, although it may be a data signal of some other type. The transmitter 56 generates the transmit weight vector in accordance with a technique to be described below in Section 12.0, modifies the information signal in accordance with the weight vector, modulates a carrier signal with the weighted information signal components, and sends a set of signals to the transmit array, as indicated by lines 60. The carrier frequency, although the same for each of the transmitted cochannel signals, is usually selected to have a frequency different from the receive signal frequency. As will also be further discussed below, in the more general case of multiple received signals and multiple transmitted signals, the transmitter 56 generates multiple weight vectors, which are applied to the respective information signals to be transmitted, then linearly combined, antenna element by antenna element, and finally modulated to produce a set of composite antenna element signals for coupling to the transmit antenna array.

It will be appreciated that this aspect of the invention provides a simple but effective technique for use in a communication system base station, for receiving cochannel signals from, and transmitting cochannel signals to, multiple remote stations in close proximity to a base station and to each other. Limited only by the number of elements in the receive and transmit arrays, the technique allows for re-use of the same frequencies in the multiple remote stations, with a resultant increase in system capacity or user density, e.g. the number of users per frequency per unit area (per cell or sector thereof).

2.5 Concept of Separation of Signals in a "Waveguide":

Up to this point in the description, it has been tacitly assumed that the "incident signals" 27 shown in FIGS. 2A–2C and 3A–3C are signals transmitted through space, the atmosphere, the ocean or some other relatively unbounded medium.

As will be described in more detail in descriptions of various embodiments of the invention, cochannel signals transmitted on a waveguide of some type may also be received and processed in accordance with the principles of the invention. The term waveguide is used in quotation marks in the heading of this descriptive subsection because the term is not intended to be limited to a waveguide operating at microwave frequencies, or to an optical waveguide in the form of an optical fiber or planar optical waveguide. Instead, the word waveguide as used in this specification is intended to cover any of various types of bounded transmission media, including microwave waveguides, optical waveguides, coaxial cables, or even twisted pairs of conductors operating at relatively low frequencies.

Figure 6:
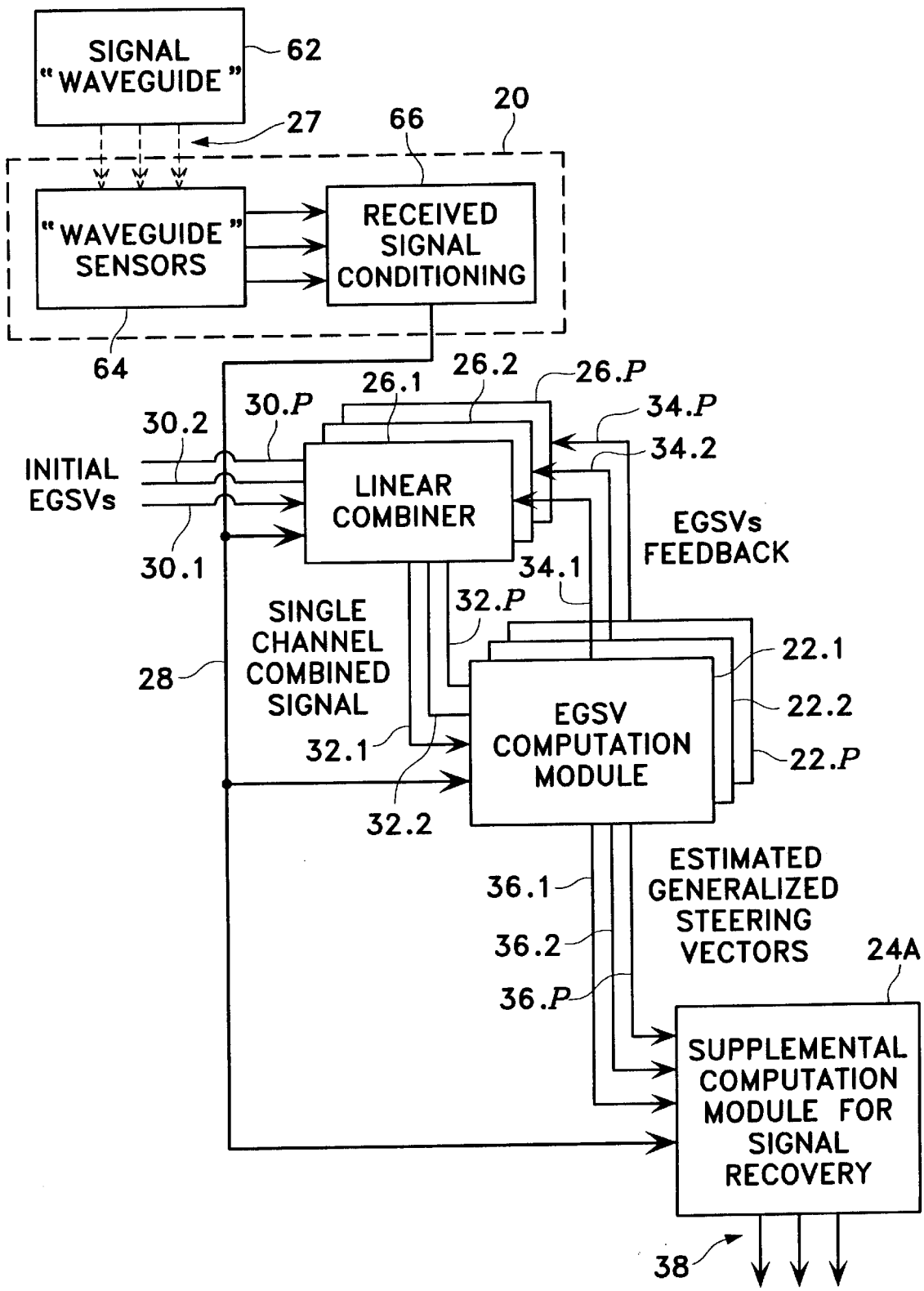
FIG. 6 is a block diagram similar to FIG. 3A, but modified to show input of signals from a signal "waveguide."

A common attribute of these "waveguides" is that multiple signals may be transmitted along them using the same frequency but different modes of transmission, such as different polarization modes for microwave or optical waveguides, or, in the case of twisted-pair conductors, different signals being applied to different wire-to-ground combinations. For various reasons, however, the propagation modes may become scrambled in the propagation medium and may become difficult or impossible to separate in a receiver. As shown in FIG. 6, a system in accordance with the invention can be usefully employed to separate such signals. Except for the sensor receiving system 20, the system of FIG. 6 is identical with the FIG. 3A system for separating received signals. The "incident signals" 27 are received from a signal "waveguide" 62, as defined in the preceding paragraph, and are sensed by "waveguide" sensors 52. In the case of a microwave or optical waveguide, the sensors 64 take the form of electromagnetic probes or optical sensors appropriately inserted into the waveguides. For twisted-pair conductors, the sensors may include appropriate circuitry connected to the conductors and ground. Signals from the sensors 64 are subject to received signal conditioning, as indicated in block 66, and are then input to the signal separation system of the invention in the same way as signals from multiple elements of an antenna array. The system recovers the original signals as indicated on lines 38.

Another application of the invention is similar in some respects to the recovery of signals from a bounded waveguide. In magnetic recording systems using a high density recording medium in which recording tracks are positioned very close to each other, there is always the potential for crosstalk between the signals on adjacent parallel tracks. Maintaining an acceptably low level of crosstalk imposes a limitation on the proximity of the tracks and the overall recording density. In this embodiment of the invention, a higher level of crosstalk can be tolerated because signals retrieved from adjacent tracks can be separated using the signal recovery system of the invention. In this case, the "waveguide" sensors 64 are adjacent playback sensors in a magnetic recording apparatus. There is no "waveguide" as such; nor are the signals transmitted through an unbounded medium. Instead they are sensed electromagnetically from a recording medium on a moving magnetic tape or disk.

Figure 7:
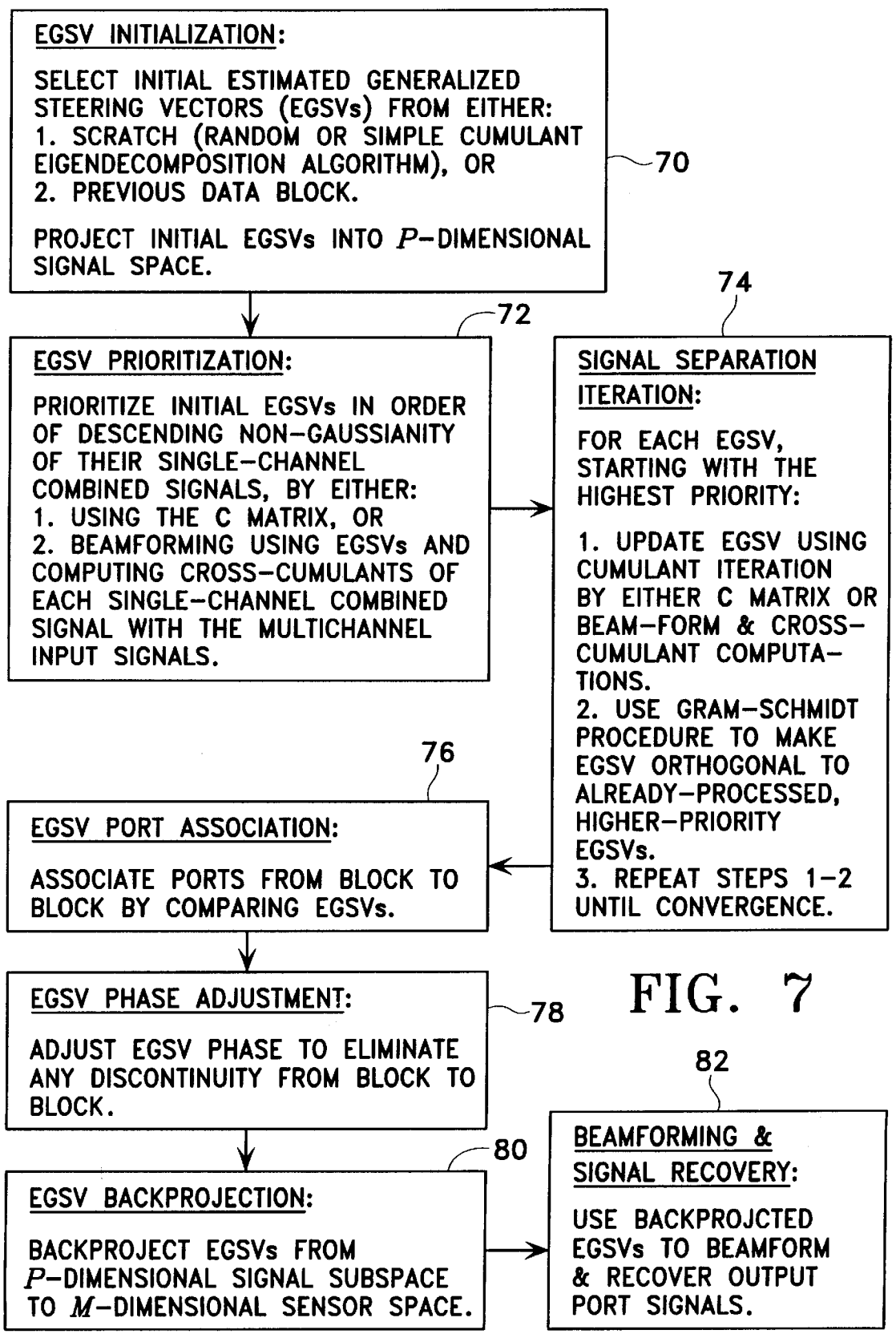
FIG. 7 is a block diagram showing in more detail the functions performed in accordance with the two iterative methods for cochannel signal separation and recovery.

2.6 Preview of Iterative Embodiments to be Described:

As discussed in more general terms above, there are two alternative iterative methods that may be used in accordance with the invention in the context of separation and recovery of cochannel signals. Before proceeding with the detailed descriptions of those methods in terms of specific embodiments, it may be helpful to provide a an overview of the iterative methods at a different level of abstraction from that of the preceding figures. FIG. 7 provides the basis for this overview. Some of the technical terms used in FIG. 7 are introduced for the first time in this specification and may not be completely clear until the complete description is studied.

As shown in FIG. 7, the signal separation and recovery process involves a number of manipulations of the estimated generalized steering vectors (EGSVs) pertaining to the multiple signal sources. In block 70 EGSV initialization is performed. This is simply the selection of initial EGSV values (on line 30 in FIGS. 2A and 2B) from which to begin processing. It will be recalled that processing is performed in a batch mode in which sequential blocks of data are processed. The initial EGSVs may be estimates carried forward from an already processed previous block of data, or they may be generated from scratch, using either random quantities or a cumulant eigen-decomposition algorithm.

Another function performed in block 70 is to "project" the initial EGSVs into a P-dimensional signal space, where P is the number of signal sources. The antenna array provides sets of input data signals that are M-dimensional, where M is the number of elements in the array. Throughout the computations performed in accordance with the invention, there is often a design choice to be made because the mathematical manipulations may be performed on these M-dimensional vector quantities, or on corresponding P-dimensional quantities, where P is the number of signal sources. Ultimately, the recovered signals are output as P one-dimensional signals, since there is one recovered signal per source, but signal recovery requires beamforming in the sensor space. The transformation from M-dimensional sensor space to P-dimensional signal space is called "projection," and the reverse transformation, from P-dimensional signal space to M-dimensional sensor space, is called "backprojection."

Block 72 in FIG. 7 describes EGSV prioritization. This aspect of the invention has not yet been discussed but, simply stated, prioritization is needed to provide a rational basis for choosing which of multiple signals should be recovered first. The sensor array, having M elements, inherently limits the number of cochannel signals that may be recovered to M. If more than M signal sources are actively transmitting, the first M signals are selected on the basis of their non-Gaussianity, as determined by either of two methods: using the C-matrix or beamforming and computing cross-cumulants. The resulting priority list of sources is passed to a signal separation iteration block 74, which uses one of the two iterative methods to obtain convergence for each EGSV in turn, starting with the highest priority source. The steps of the iterative procedure include updating the EGSV using either the C-matrix or the beamforming and cross-cumulant computations, then using a conventional technique, such as the Gram-Schmidt procedure, to ensure that each EGSV is orthogonal to already-processed higher-priority EGSVs. These steps are repeated until convergence is achieved for each signal source.

Block 76 of FIG. 7 describes another practical issue in signal recovery systems that use batch processing. Each "port" from which a recovered signal is output in processing a block of data must be correctly associated with a recovered signal from the previous data block. This association is performed by comparing the EGSVs. The ports cannot be associated merely on their positions in the priority list because signal sources may come and go from list as time passes.

Another batch processing issue is addressed in block 78 of FIG. 7. The phase angle of an EGSV generated in processing one block of data may not exactly match the phase angle as determined in the next block. This processing step applies an EGSV phase adjustment to eliminate any discontinuity from block to block.

Next, in block 80 of FIG. 6, the EGSVs are "back-projected" from the P-dimensional signal subspace to the M-dimensional sensor space and then, in block 82, the backprojected EGSVs are used to beamform and recover the output port signals.

This overview provides an introduction into the various embodiments and forms that the invention may take. The foregoing and other aspects of the invention will now be discussed in more detail.

3.0 Preferred Embodiment Using eCURE:

As discussed more generally above, the present invention pertains to a system and method for processing and recovering cochannel signals received at a sensor array. In this descriptive section, a practical embodiment of the <u>c</u>umulant <u>re</u>covery (CURE) system is disclosed. Because this embodiment uses eigenvectors and eigenvalues in part of its computation, it is referred to as the eigenCURE system, or simply the eCURE system. The embodiment disclosed uses the first iterative method (the beamform and cross-cumulant method, first introduced at 10 in FIG. 1). It will be understood, however, that the eCURE system may be modified to use the C-matrix iterative method (12, FIG. 1).

Figure 8A:
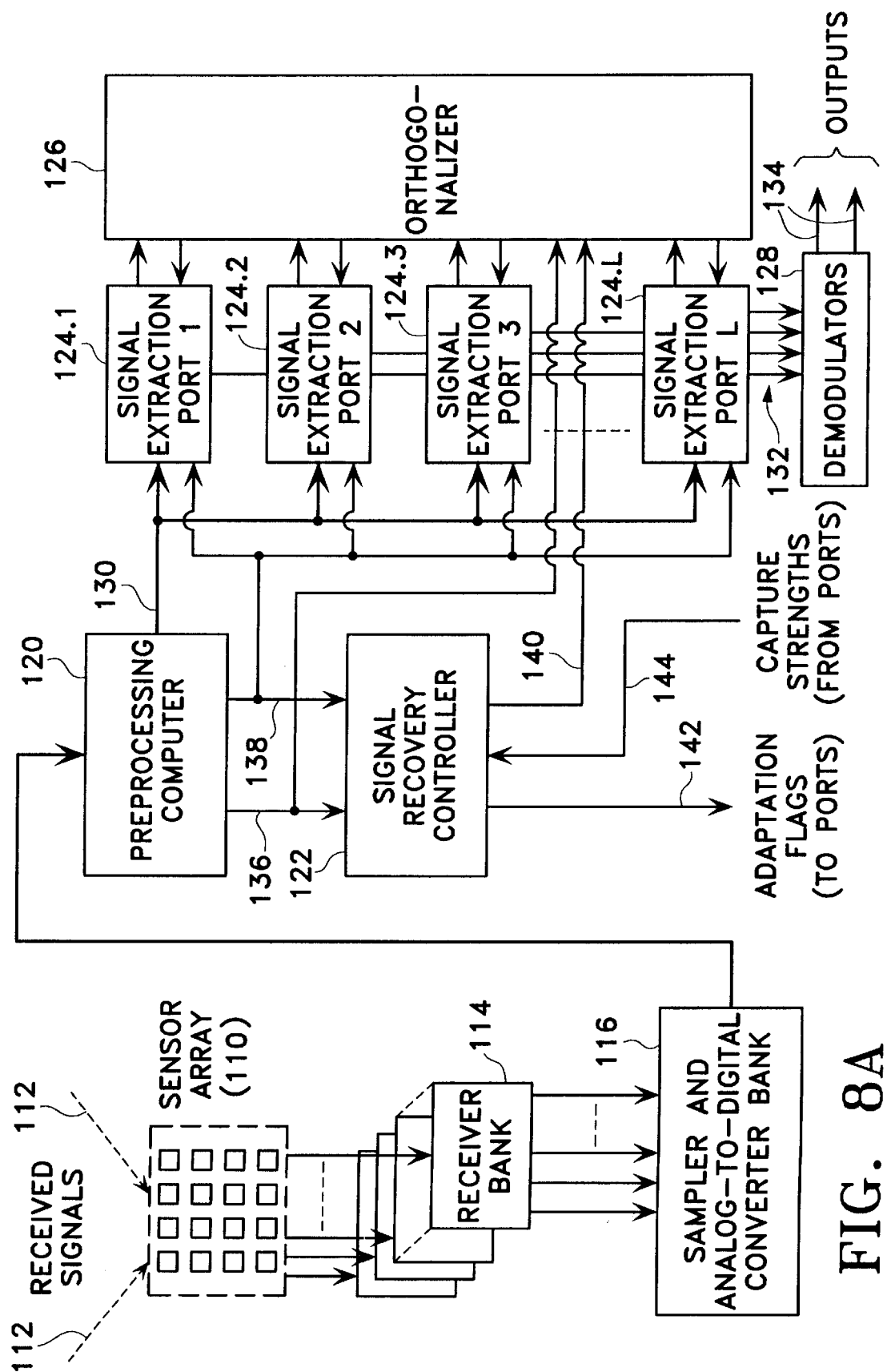
FIG. 8A is simplified block diagram of a cochannel signal recovery system in accordance with the present invention.

3.1 Overview And System Hardware:

FIG. 8A shows the basic components of the eCURE system, including a sensor array, indicated by reference numeral 110, which receives signals from various directions, as indicated at 112, a bank of receivers 114, and a sampler and analog-to-digital converter bank 116. The separate signals from the elements of the sensor array 110 are coupled directly to the receiver bank 114, which performs conventional filtering and frequency downconversion functions. The sensor signals are then sampled at a high rate and converted to digital form in the sampler and analog-to-digital converter bank 16. At this point, the signals have been filtered, downconverted and digitized and processing is about to begin. It can be appreciated that, because each sensor in the array 110 provides a stream of digitized signals, processing may be conveniently performed in batches or blocks of data. From time to time, reference will be made in this description to current and previous data blocks. The block size is critical only in the sense that the size selected affects processing speed and accuracy of estimation.

The first major processing step is preprocessing the sensor data, which is performed in a preprocessing computer 120. As will be discussed in more detail with reference to FIG. 10, the preprocessing computer 120 performs four important functions:

- It "whitens" the directional components of the signals using a technique known as eigendecomposition, which will be discussed further below.
- It estimates the number of signal sources being received. P is the number of sources and $P_e$ is the estimated number of sources.
- It reduces the dimensionality of the sensor data from M, the number of sensors, to $P_e$, the estimated number signal sources.

It scales the numerical values of the signals to normalize the powers of the sources, permitting weak signals to be separated in addition to stronger ones.

The other major components of the cochannel signal recovery system are a signal recovery controller 122, multiple signal extraction ports 124.1 through 124.L, an orthogonalizer 126, and multiple demodulators 128. Preprocessed sensor signals are transmitted over lines 130 in parallel to each signal extraction ports 124.1. Each port in this embodiment of the invention is implemented as a separate computer processor. Using the iterative technique described above with reference to FIGS. 2A and 3A, each of the signal extraction ports 124 generates output signals derived from a separate source. These signals are output on lines 132 to the demodulators 128, which produce usable output signals on lines 134. If the information contained in the signals is audio information, the outputs on lines 134 may be connected to separate loudspeakers or other audio processing equipment (not shown). The function of the orthogonalizer 126 is to ensure that each of the ports 124 is associate with a separate signal source. The signal recovery controller 122 performs various control functions in conjunction with the signal extraction ports 124 and the orthogonalizer 126. The controller 122 receives the source count estimate $P_e$ from the preprocessing computer 120 over line 136 and also receives eigenstructure parameters from the preprocessing computer over line 138. The latter are also transmitted to the signal extraction ports 124, and the source count estimate is transmitted to the orthogonalizer 126. The controller 122 also sends a priority list to the orthogonalizer 126 over line 140. Finally, the controller 122 sends adaptation flags to the signal extraction ports 124 over lines 142 and receives capture strength values from the signal extraction ports over lines 144. The specific functions of these signals will become apparent as the description proceeds. Basically, one function of the controller 122 is to keep track of signal sources as they appear and disappear and to make sure that the signal extraction ports 24 and the orthogonalizer 126 handle appearing and disappearing signal sources in an appropriate manner.

In the general terms used in FIG. 3A, the sensor receiving system 20 includes the sensor array 110, the receiving bank 114, the sampler and analog-to-digital converter 116 and the preprocessing computer 120. The functions performed by the linear combiners 26, the EGSV computation modules 22 and the supplemental computation module for signal recovery 24A, are performed in the signal recovery controller 122, the signal extraction ports 124 and the orthogonalizer 126. Because this practical embodiment must maintain association of signal sources to physical output ports, and must be able to adapt dynamically to the appearance and disappearance of signal sources, the architecture of the system is necessarily different from the conceptual architecture of FIGS. 2A, 3A and 4A. The fundamental functions performed in the system of FIG. 8A are, however, the same as those described with reference to the earlier figures.

Figure 8B:
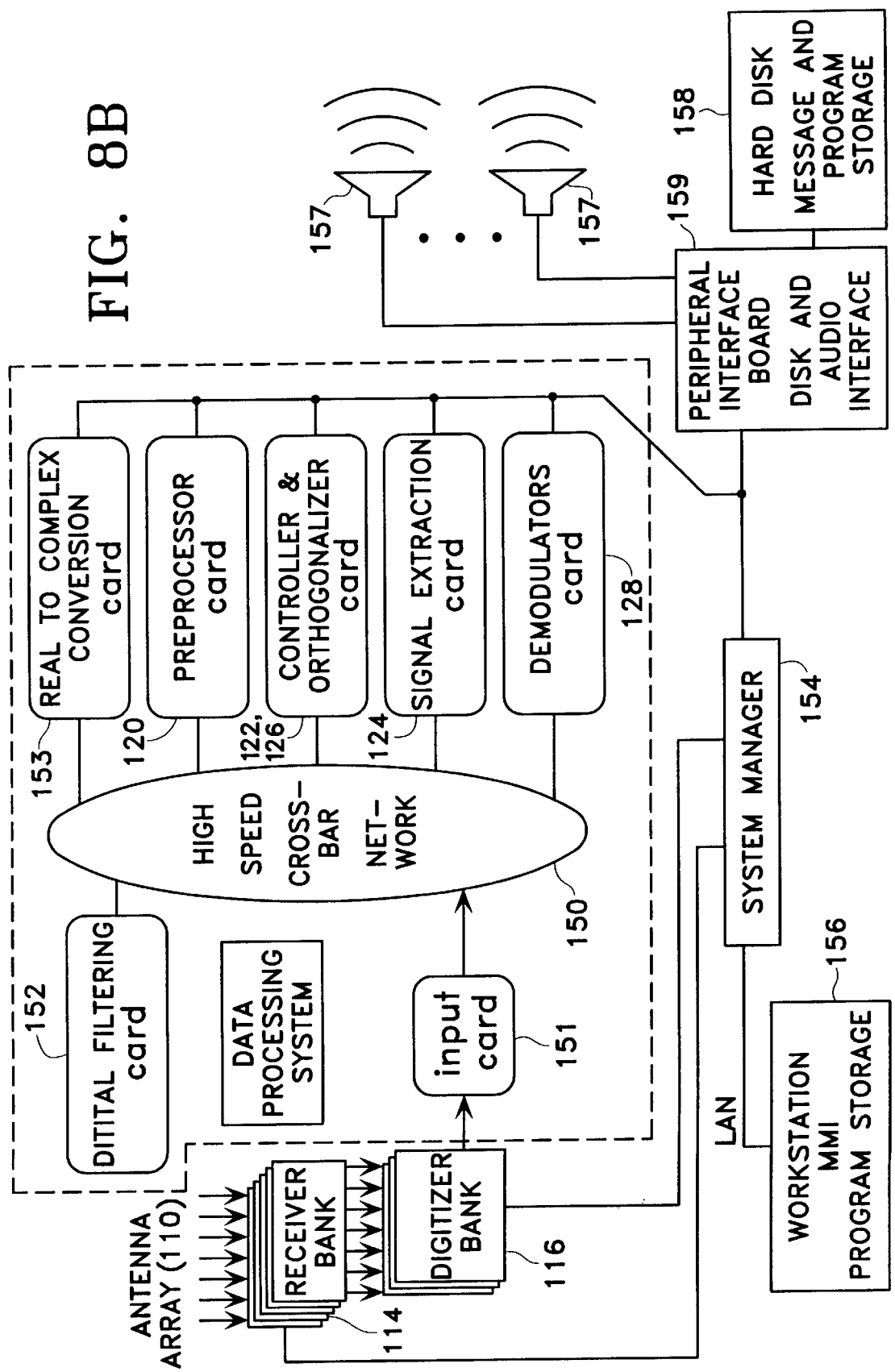
FIG. 8B is a hardware block diagram similar to FIG. 8A, of one preferred embodiment of the invention.

FIG. 8B is a hardware block diagram of one implementation of the eCURE system of the present invention, as used to separate multiple signals containing audio information. Identical reference numbers have been used in this figure to refer to components that appear in both FIG. 8A and FIG. 8B. The preprocessor computer 120 is implemented as a separate circuit card. It is of little significance whether the preprocessor computer is implemented on a single circuit card or in a stand-alone computer. The functions performed in both cases would be identical. Similarly, the controller 122 and orthogonalizer 126 are implemented in one computer on a single circuit card, as indicated in FIG. 8B. The signal extraction ports 124, one of which is shown, are implemented on separate computers on circuit cards and the demodulators 128 are also implemented on a separate computer. All of the computers mentioned above may be of any appropriate type, but in a presently preferred demonstration embodiment, they are Intel model i860 processors. The computers are connected to a high-speed crossbar switching network 150, such as Part No. ILK-4, from Mercury Computer Systems, Lowell, Mass., 01854.

The sensors 110 may be of any appropriate type, such as Part No. 10-183-244, from TRW Inc., Sunnyvale, Calif., 94088. The receivers 114 in this embodiment include a VME synthesizer module (Part No. 1600M SYN-5, from APCOM Inc., Gaithersburg, Md., 20878), a local oscillator module (Part No. 1600M LOD-1, also from APCOM Inc.) and a VME RF converter module (Part No. 1600M RFC-5, also from APCOM Inc.). The digitizer bank 116 may include an Access256 motherboard (Part No. MOB2564) and analog input and digital output cards from Celerity Systems, Inc., San Jose, Calif., 95117.

The receiver bank 114 tunes each sensor to the desired frequency and downconverts any signals received. One receiver is allocated to each sensor. The receivers 114 enable the system to isolate a single frequency of interest and to translate it to a frequency where it can be more conveniently digitized and processed. No demodulation is performed at this point. For example, one embodiment of the invention has receivers that downconvert the received signals to a center frequency of 225 kHz and a bandwidth of 100 kHz (specifically the 3 dB bandwidth).

The digitizer bank 116 converts the received signals to digital samples. Only real samples, not complex samples, are generated at this stage. In the illustrative system, the digitizer bank 116 consists of a digitizer motherboard and an input daughtercard that samples up to eight channels simultaneously at a rate of up to 10 megasamples per second. The samples are exported for further processing through an input card 151. The data processing system performs digital filtering of the input data, with the digital filtering card 152, and converts the real samples to complex values needed for processing, using a real-to-complex conversion card 153.

All of the processor cards mentioned above are connected to the high-speed crossbar switching network 150. A system manager 154 in the form of a Model 68040 CPU (Part No. CPU40B/16-02, from Force Computers Inc., San Jose, Calif., 95124) controls this demonstration system, with operator interface being provided by a workstation 56, such as a Powerlite notebook workstation (Part No. 1024-520-32, from RDI Computer Corporation, San Diego, Calif., 92008). In this hardware architecture, the demodulated signal outputs are connected to loudspeakers 157 and a hard disk drive 158 is provided for storage of received messages. The system manager tunes the receivers 116, instructs the digitizer to record samples, configures and initiates operation of the data processing system, and controls a peripheral interface board (Part No. MVME 162-63, from Motorola Computer Group, Tempe, Ariz., 85282), through which communication is had with the loudspeakers and the hard disk. It must be understood that, because this is a demonstration system, many of these components would not be needed in some implementations of the invention. As noted earlier, many of the components could be conveniently implemented in the form of a single integrate-circuit chip, or multiple chips.

Figure 9:
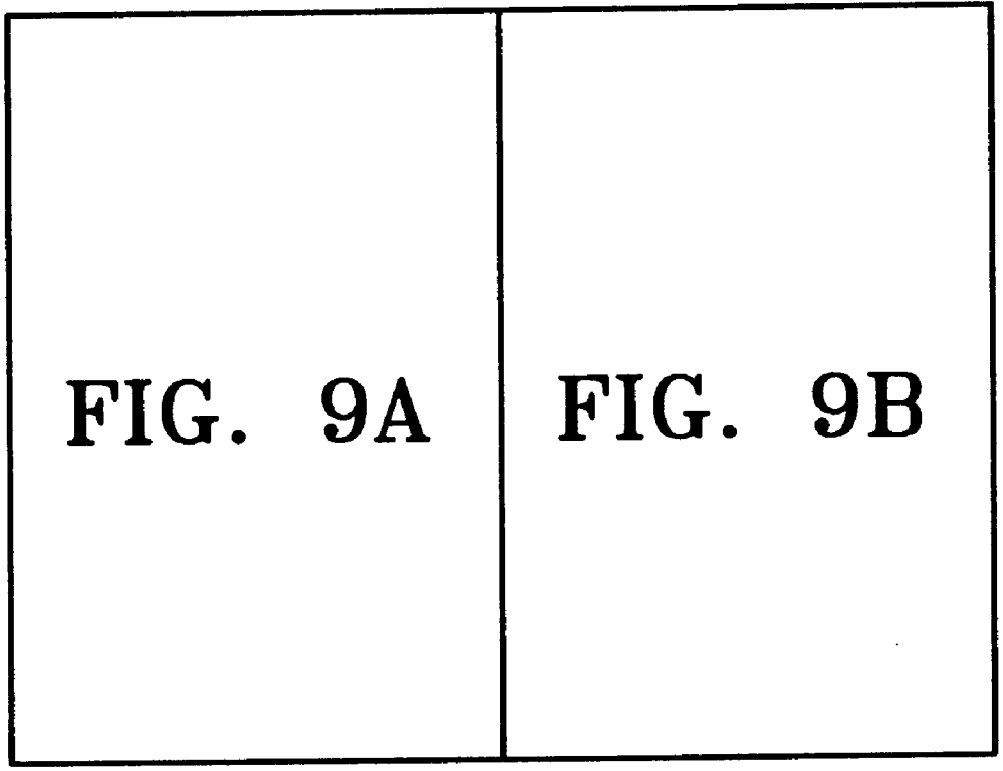
FIG. 9 (comprising FIGS. 9A and 9B) is another block diagram of the system of FIG. 7, with some of the subsystem functions recited in each of the blocks.
Figure 9A:
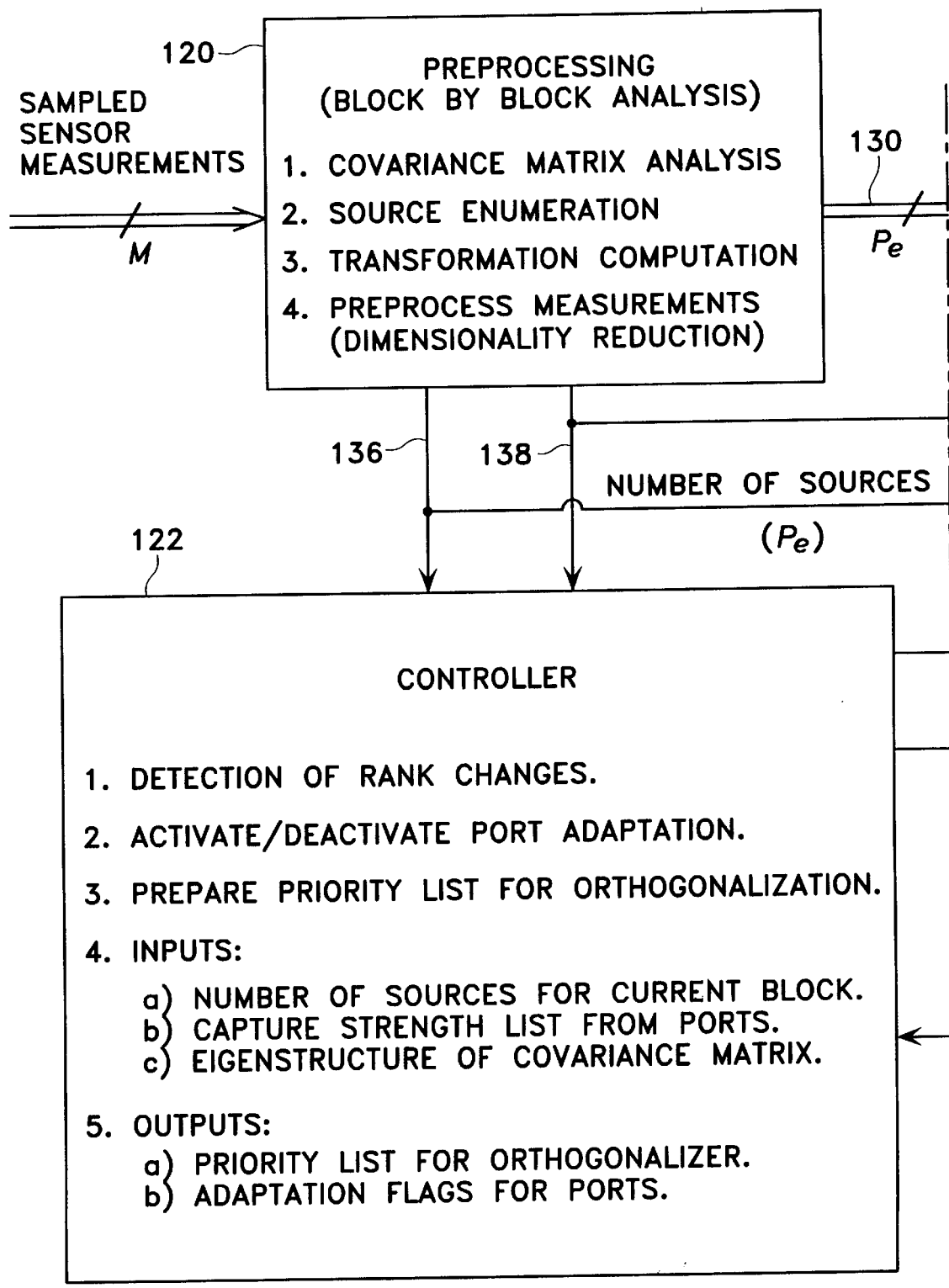
Figure 9B:
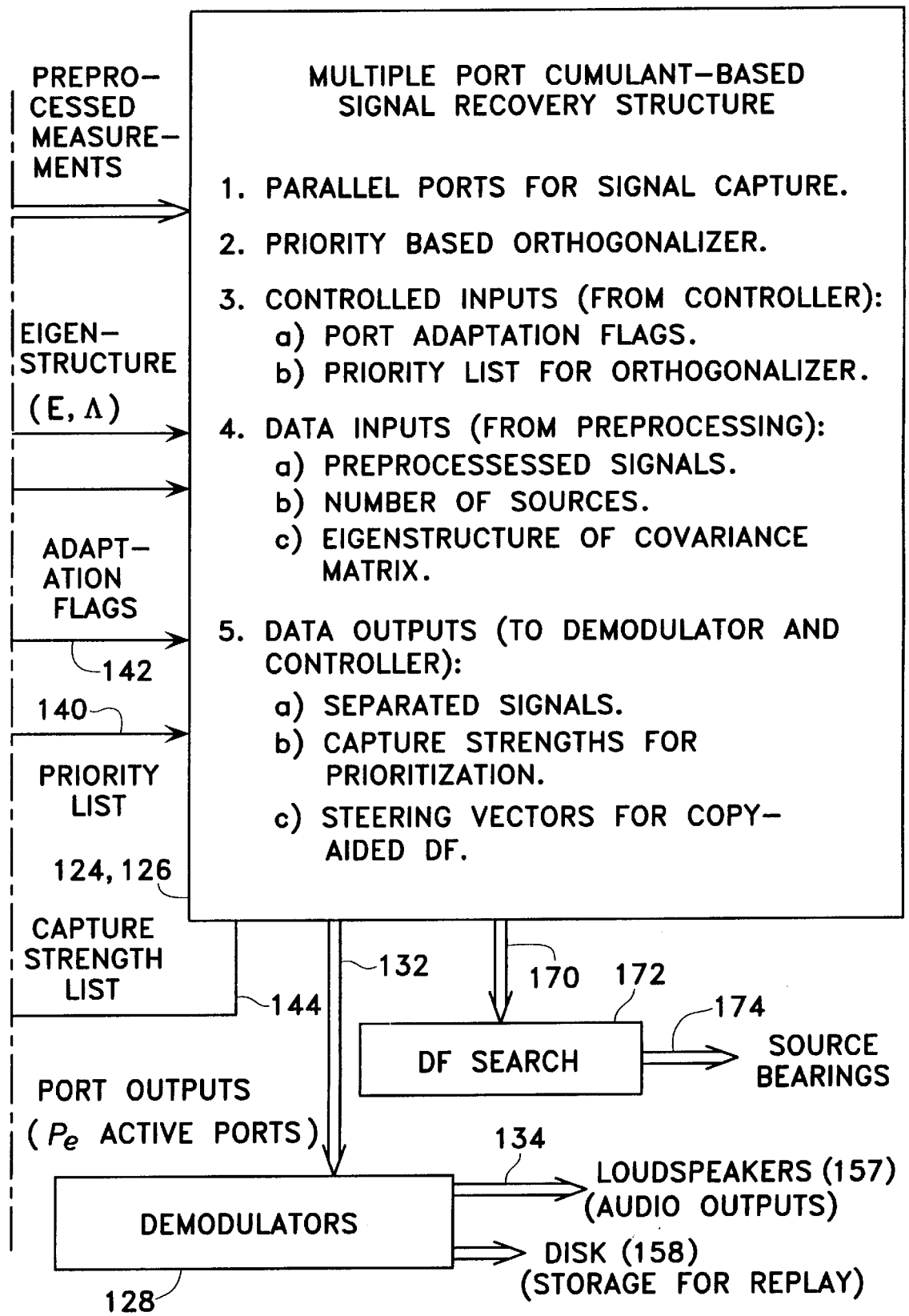

FIG. 9, which is broken into two figures designated FIGS. 9A and 9B, is a block diagram similar to FIG. 8A but showing in each block more detail of the functions performed by each component of the system. The functions will be described with reference to the more detailed diagrams that follow. Another feature shown in FIG. 9 but not in FIG. 8A is the output of generalized steering vectors on lines 170. The generalized steering vectors, as discussed earlier in this specification, are an important product of the signal recovery process, along with the recovered signal outputs. The generalized steering vectors are shown as being used in a DF search processor 172, which generates signal source bearings or directions of arrival (DOA), output on lines 174, consistent with the description with reference to FIG. 4B.

Figure 10:
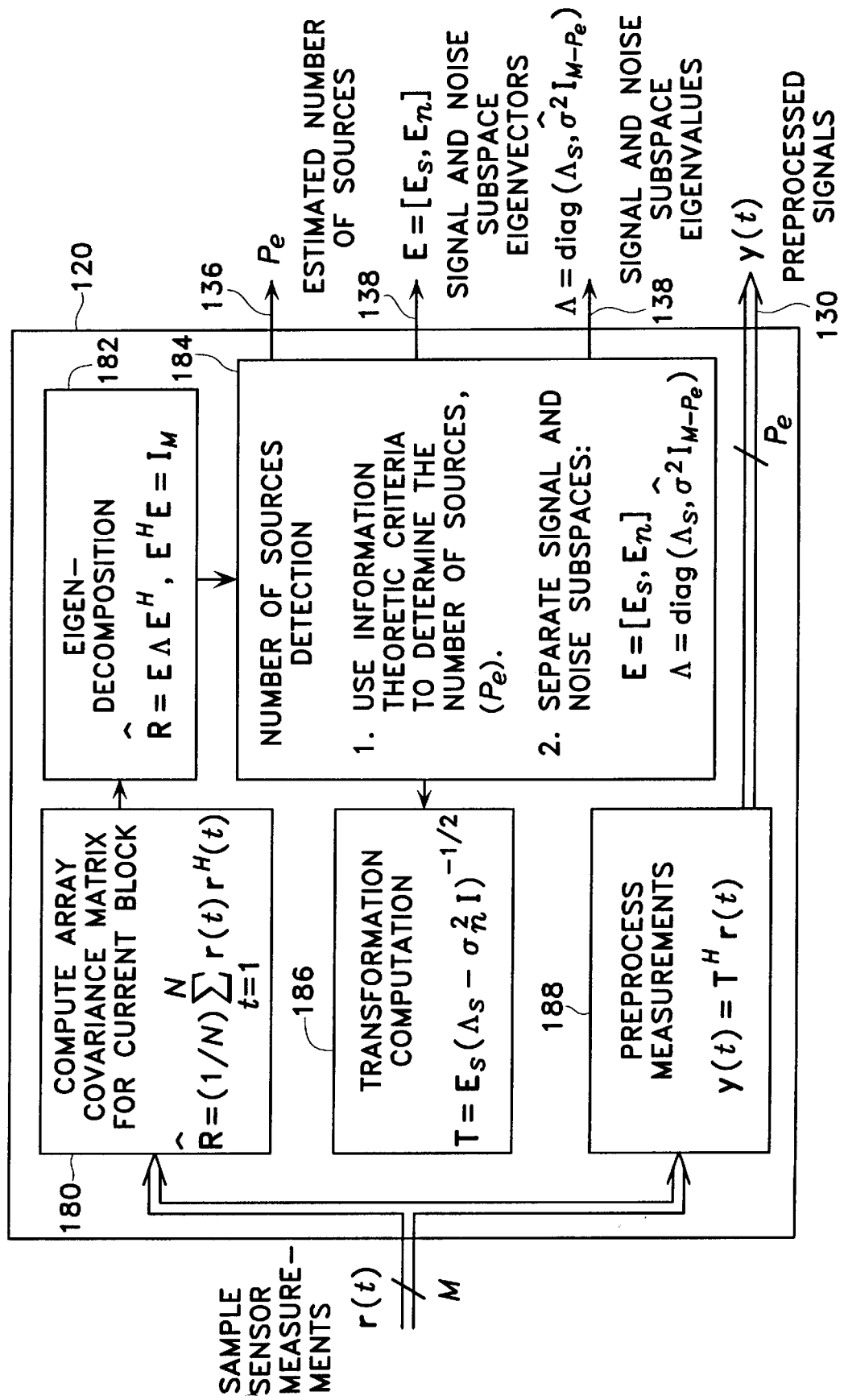
FIG. 10 is a block diagram of the preprocessor computer of FIG. 7.

3.2 Preprocessing:

The functions performed by the preprocessing computer 120 are shown in detail in FIG. 10. The preprocessor performs a block-by-block analysis of "snapshots" of data from the sensor array, which has M elements. The preprocessor determines the eigenvectors, the number of signal sources P, and the signal subspace of the received array measurement data. The preprocessor also filters the received array data, transforming it from M-dimensional sensor space to P-dimensional signal subspace. This transformation also renders the steering vectors of the transformed sources orthogonal to each other, which greatly accelerates convergence on recovered signal solutions later in the processing, and the transformed source powers are made equal.

A received signal that satisfies the narrow-band assumption (to be defined below) can be described by the following equation:

$$r(t)=As(t)+n(t),$$

where r(t) denotes the array measurements collected by M sensors, n(t) is the measurement noise, A is the steering matrix that models the responses of the sensors to the directional sources, and s(t) is a time-varying signal. The sampled sensor signals, represented by a function of time r(t), are input to the preprocessing computer until a complete block of data has been received. While the block is being further processed, another block of data is input to a buffer in the computer (not shown). As indicated at 180, each block of data is first subject to computation of an array covariance matrix for the current block of data. The sample covariance matrix $\hat{R}$ from N samples or "snapshots" of data is given by:

$$\hat{R} = \frac{1}{N}\sum_{t=1}^{N} r(t)r^H(t).$$

As indicated at 182, a further important step in preprocessing is eigendecomposition, which decomposes the covariance matrix as:

$$\hat{R}=E\Lambda E^H, \quad E^H E=I_M,$$

where the diagonal matrix $\Lambda=\mathrm{diag}(\lambda_1, \lambda_2, \ldots \lambda_M)$ contains the eigenvalues of $\hat{R}$ (which are positive) in a descending order, and the columns of the matrix E consists of the corresponding eigenvectors. In this description, the subscript appended to the identity matrix I indicates its size. In the case of true statistics and with fewer sources than sensors (P<M), the last (M−P), eigenvalues are identical and they are equal to the noise variance $\lambda_{M-P+1}=\ldots=\lambda_M=\sigma^2$. With sample statistics, the last (M−P) eigenvalues are different with a probability of one, and a statistical test has to be performed to determine the number of sources P.

In the presently preferred embodiment of the invention, the preprocessing computer uses a combination of two estimates of the number of sources, as indicated in block 184: the estimate determined by Akaike's Information Criteria (AIC) and the estimate determined by Rissanen's Minimum Description Length principle (MDL). Specifically, the preprocessing computer averages the AIC and MDL functions and finds the single maximizer of the average. The equations for making this estimation are given, for example, in a dissertation by Mati Wax submitted to Stanford University in March 1985, and entitled "Detection and Estimation of Superimposed Signals," and in particular the subsection headed "Estimating the Number of Signals," beginning on page 69 of the paper. AIC generally overestimates the number of sources, and MDL generally underestimates the number of sources. By averaging the two estimates, a good result is obtained. The averaged estimate of the number of sources is given as the minimizer of the cost function:

$$P_e = \underset{0 \leq k < M}{\mathrm{argmin}}\left\{N\log\left[\left(\frac{1}{M-k}\sum_{i=k+1}^{M}\lambda_i\right)^{M-k} \Big/ \prod_{i=k+1}^{M}\lambda_i\right] + \frac{1}{2}k(2M-k)\left(1+\frac{1}{2}\log(N)\right)\right\}.$$

After the number of sources is estimated, the preprocessor computer computes estimates of the eigenvectors and eigenvalues of the signal and noise subspaces:

$$E = [E_s, E_n], \Lambda = [\Lambda_s, \hat{\sigma}^2 I_{M-P_e}], \hat{\sigma}^2 = \frac{1}{M-P_e}\sum_{k=P_e+1}^{M}\lambda_k.$$

$E_s$ and $E_n$ are estimates of signal and noise subspace eigenvectors, respectively, and $\hat{\sigma}_n^2$ is an estimate of the noise power. The diagonal matrix $\Lambda_s$ contains the estimates of signal subspace eigenvalues. Once the subspaces are found, the preprocessor computer determines the transformation matrix T, as indicated in block 186, from:

$$T=E_s(\Lambda_s-\hat{\sigma}_n^2 I)^{-\frac{1}{2}}.$$

The transformation T is then applied to the sampled measurements r(t), as indicated in block 188:

$$y(t)=T^H r(t)=T^H As(t)+T^H n(t)=y_s(t)+T^H n(t),$$

where $y_s(t)$ denotes the signal component in y(t). It can be proved that the covariance matrix of $y_s(t)$ is the identity matrix. This indicates that the steering vectors of the sources after transformation to the $P_e$-dimensional subspace are orthogonal to each other and the source powers are equalized.

The transformation reduces the dimensionality of the sensor measurements from M, the number of sensors, to $P_e$, the estimated number of signal sources. The eigendecomposition performed in the preprocessing computer is a well known technique, sometimes referred to as spatial prewhitening, originally developed for use in passive sonar signal processing. It is described in more detail in a number of texts on signal processing. For example, see "Detection of Signals in Noise," by Anthony D. Whalen, Academic Press, New York (1971), beginning at page 392. In spatial prewhitening, noise components at each sensor are assumed to correlated (i.e., not completely random noise). The prewhitening process operates on the noise signals to render them uncorrelated (i.e,. "whitened"). An alternative to eigendecomposition is to use covariance inversion in preprocessing. In effect, the latter process whitens both noise and signal components of the sensor signals and it can be at least intuitively understood that this is a less desirable approach since it renders the signals less easy to separate from the noise than if spatial prewhitening of the signal only were used. However, the present invention will still separate cochannel signals using covariance inversion instead of eigendecomposition as a preprocessing step. Currently, eigendecomposition, or spatial prewhitening, is the preferred approach for preprocessing.

Figure 11:
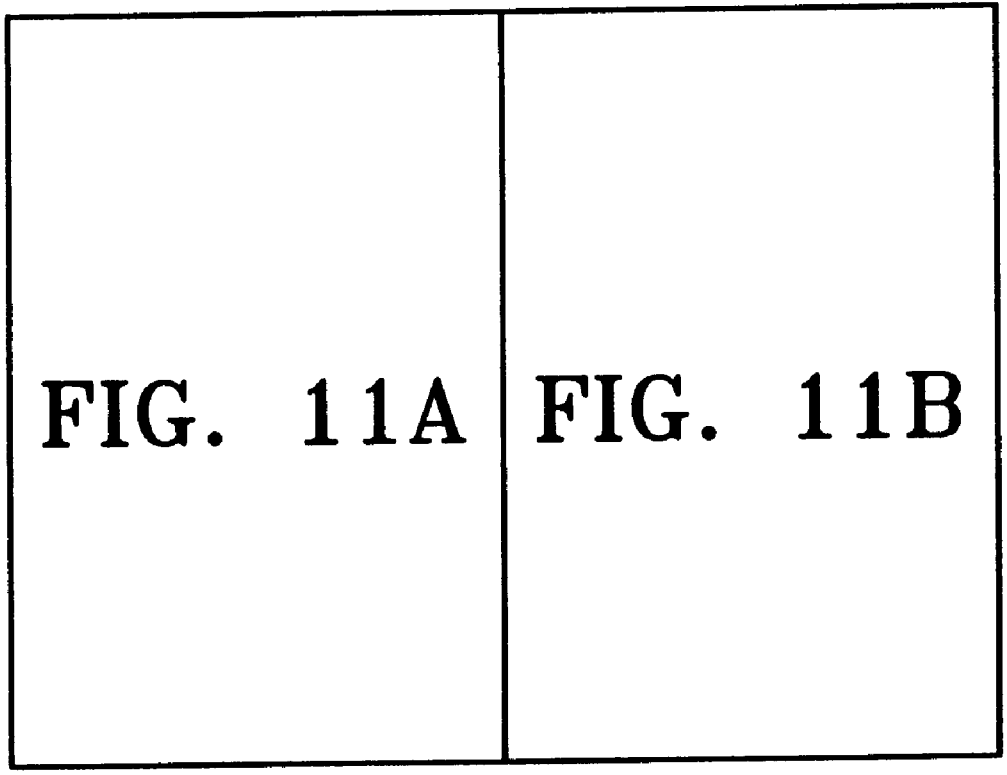
FIG. 11 (comprising FIGS. 11A and 11B) is a block diagram of a signal extraction port in an active state.
Figure 11A:
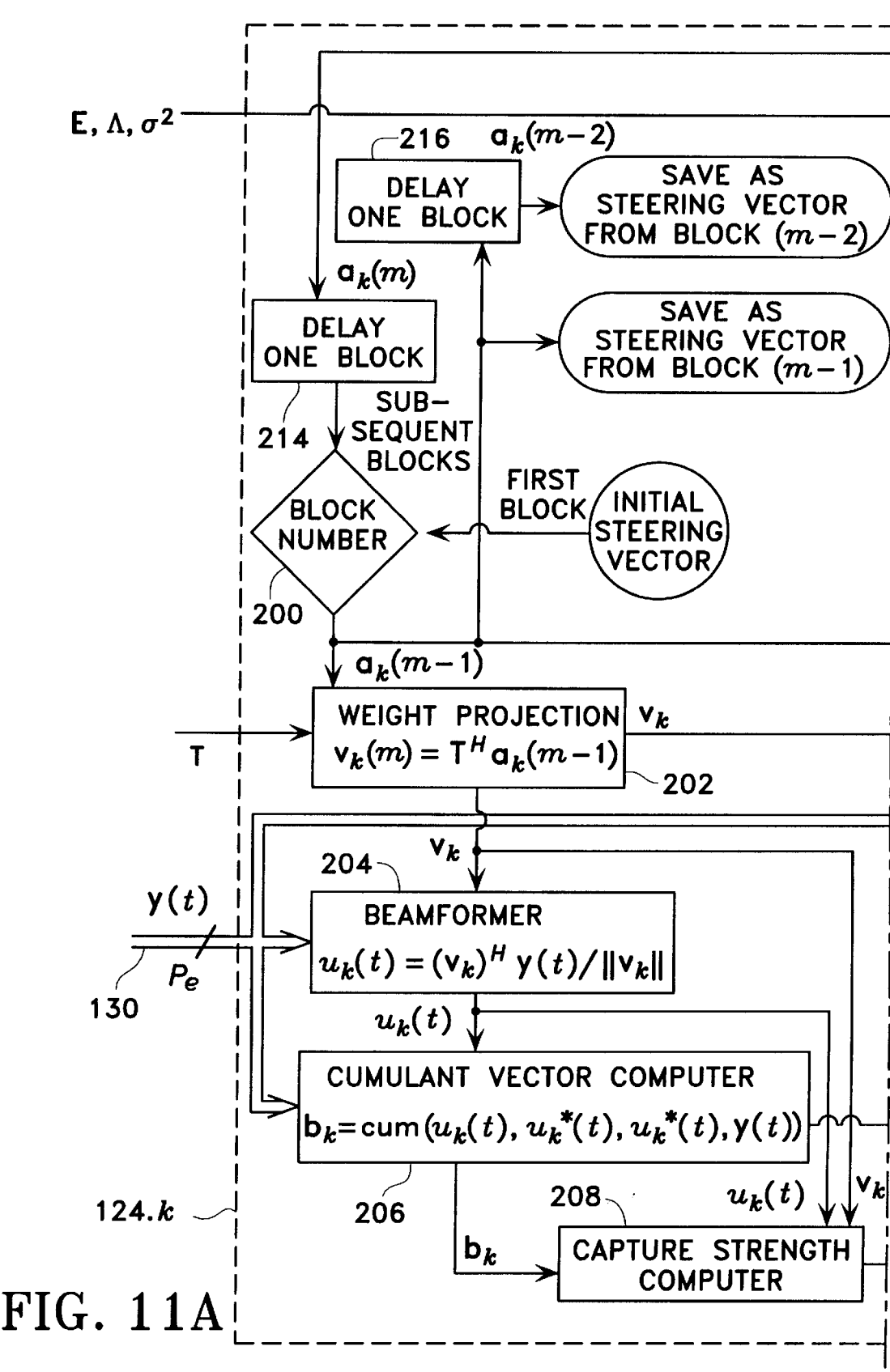
Figure 11B:
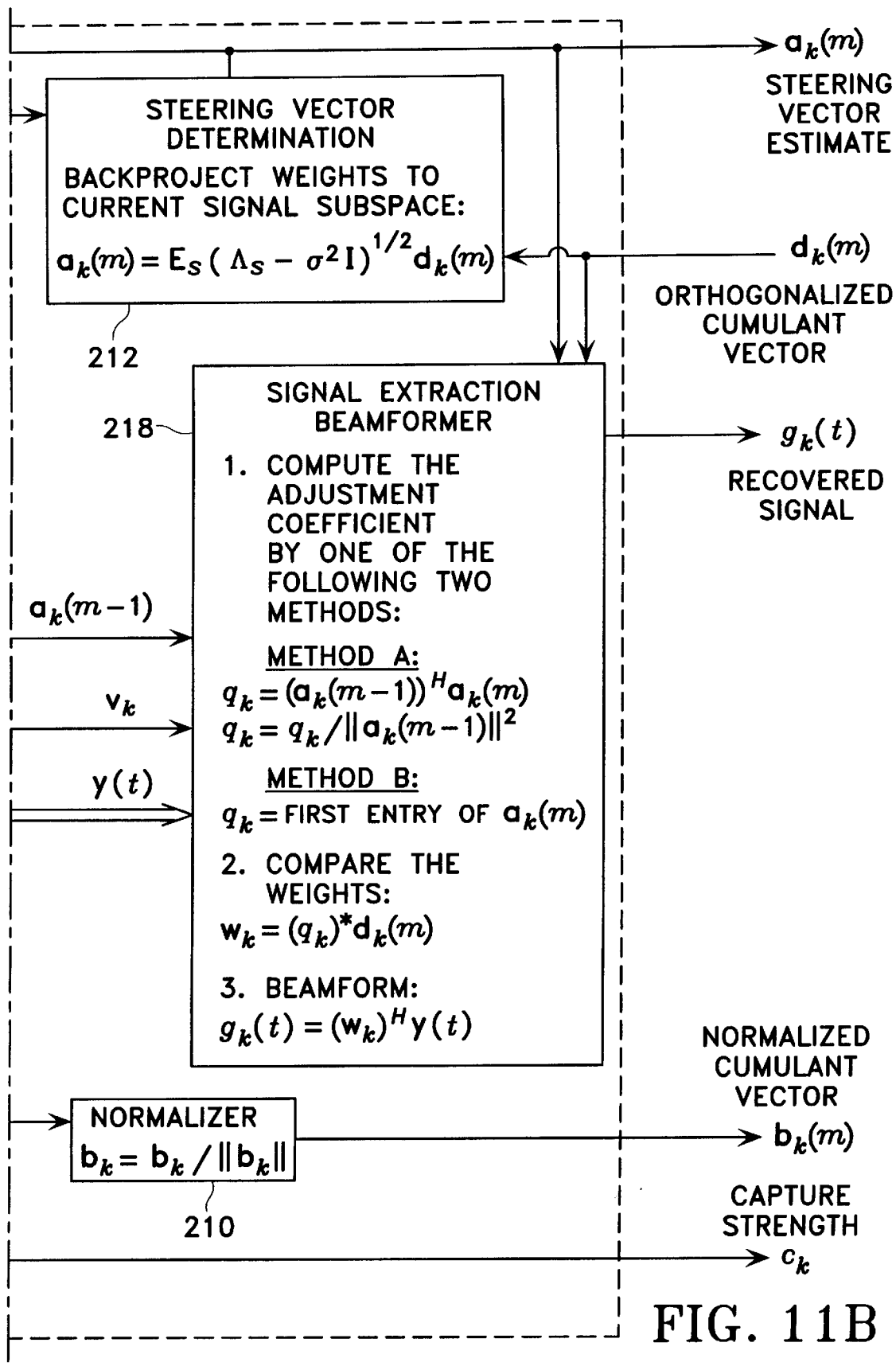
Figure 12:
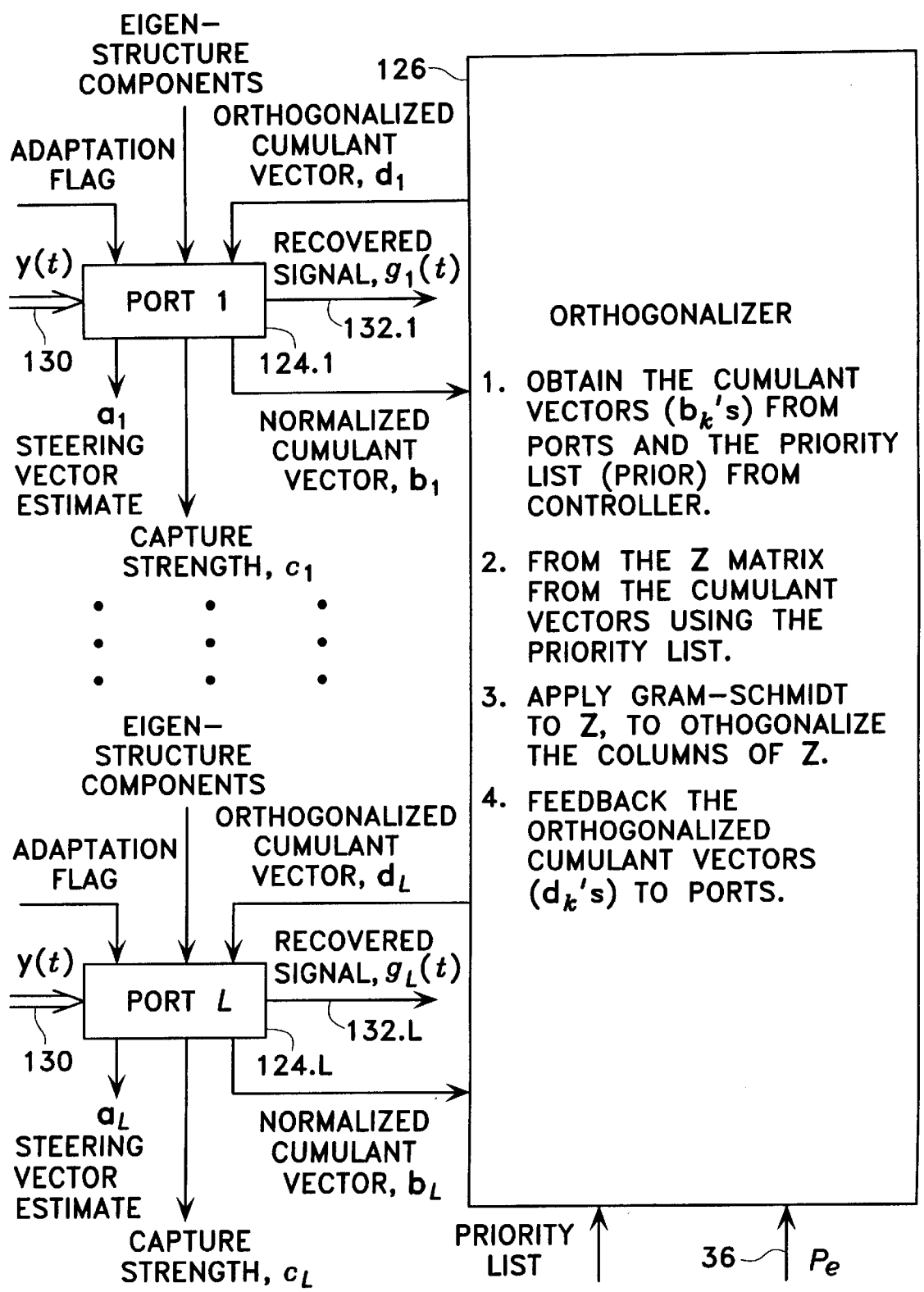
FIG. 12 is a block diagram of the multiple port recovery unit of FIG. 9, including multiple signal extraction ports and an orthogonalizer.

3.3 Operation of an Active Signal Extraction Port:

A single active signal extraction port, one of the L ports 124 shown in FIG. 8A, is shown in detail in FIG. 11, which extends over two sheets, as FIGS. 11A and 11B. L is the number of physical ports allocated for signal extraction and is less than M, the number of sensors. For generality, the illustrated port is referred to as the kth port 124.k, and signals pertaining specifically to this port are referred to by signal names that include the prefix k. An "active" port is one that has been assigned responsibility for separating a signal from the received signal data. The functions performed in an active port are critical to the invention and are illustrated in FIG. 11.

The active signal extraction port 124.k receives as inputs over line 130 the preprocessed sensor data y(t). As in the preprocessing computer 120 (FIG. 7), the sensor signals are described as being processed in blocks, although it will be understood that an alternative embodiment of the invention could be devised to process the signals continuously. The principal output from the port is a recovered signal, designated $g_k(t)$. An important intermediate output is a vector quantity called the normalized cumulant vector, referred to as $b_k$. Another important output is the generalized steering vector $a_k$, which defines the directional location of the signal source.

To highlight the (block) iterative nature of the algorithm, the quantities related to the mth analysis block are identified in this descriptive section by using the additional index m. For example, the steering vector estimate provided by the kth port after the mth block is processed is denoted as $a_k(m)$. The time variable t spans from the start of the mth block to the end of the mth block, and, with N snapshots per block, can be expressed at $t \in [(m-1)N+1, mN]$. The quantities E, $\Lambda$ and T are obviously obtained by processing the mth block of data, so, for simplicity, they are not written with the (m) index.

It is both logical and convenient to begin describing operation of the signal extraction port at the point in time when the port has just been made active. No accurate signal has been recovered and no cumulant vector has been computed since the port became active. The block number being of input data is examined, as indicated at 200, to determine whether the current block is the first block. If so, the steering vector $a_k(0)$ is set to an initial random vector with a unit norm. As shown in processing block 102, the steering vector $a_k(m-1)$ is first projected to the signal subspace by transforming it into a value $v_k$, using the transformation T, which is input to block 202 as shown. The steering vector projected into the signal subspace is computed as:

$$v_k = T^H a_k(m-1).$$

These computed values are passed to a beamformer 204, which recovers an auxiliary waveform using $v_k$ as weights:

$$u_k(t) = v_k^H y(t) / \|v_k\|.$$

The scaling by the norm of $v_k$ is performed to ensure numerical stability in the cumulant computations. At convergence, the norm of $v_k$ should be unity (because of the preprocessing performed on the measurements). The auxiliary source waveform is provided to the cumulant vector computer 206, which computes sample estimates of the cross-cumulant vector $b_k$, which has components defined by:

$$(b_k)_i = cum(u_k(t), u_k^*(t), u_k^*(t), y_i(t)), \quad 1 \le i \le P_e,$$

where $(b_k)_i$ denotes the ith component of $b_k$. The asterisk indicates that the conjugate of the process $u_k(t)$ is used in two of the four quantities of which the cumulant is computed. The cumulant vector computer computes a fourth-order cumulant vector of the input signals. More specifically, the vector is the cumulant of four quantities derived from the input signals. An introduction to cumulants and their properties is provided in Section 20.4 to this specification.

After the cumulant vector $b_k$ has been computed in the cumulant vector computer 106, the capture strength $c_k$ is computed in a capture strength computer 208.

The capture strength computer 208 determines the convergence condition of a port by evaluating the degree of non-Gaussianity of the auxiliary signal $u_k(t)$, and the amount of change between $b_k$ and $v_k$. At convergence, these two vectors should be pointing at the same direction. The non-Gaussianity of the auxiliary signal can be determined from the ratio of its fourth-order cumulant to its squared power:

$$\xi_k = \frac{|cum(u_k(t), u_k^*(t), u_k^*(t), u_k(t))|}{(E\{u_k(t)u_k^*(t)\})^2}$$

Using cumulant properties, we obtain $$\xi_k = \frac{|cum(u_k(t), u_k^*(t), u_k^*(t), v_k^H y(t)/\|v_k\|)|}{(E\{u_k(t)u_k^*(t)\})^2} = \frac{|v_k^H b_k|/\|v_k\|}{(E\{u_k(t)u_k^*(t)\})^2}$$

The denominator can be computed from the auxiliary signal $u_k(t)$. Since the covariance matrix of the signal component of y(t) is the identity matrix, the denominator can be ignored when the signal to noise ratios (SNRs) are high enough. The similarity between $b_k$ and $v_k$ can be computed from the following:

$$\eta_k = \frac{\|v_k^H b_k\|}{\|v_k\| \|b_k\|}.$$

The capture strength $c_k$ can be determined from $\xi_k$ and $\eta_k$. One way is to let $c_k = \xi_k \cdot \eta_k$. Alternatively, we can set $c_k = \xi_k$ or $c_k = \eta_k$.

The capture strengths $c_k$ are provided to the controller unit for priority determination. The cross-cumulant vector is normalized by its norm and fed to the orthogonalizer:

$$(b_k(m) = b_k/\|b_k\|).$$

If the active ports capture different sources, their cross-cumulant vectors should be orthogonal. To force the active ports to capture different sources, the orthogonalization unit uses the Gram-Schmidt procedure and outputs orthogonalized cumulant vectors (d vectors) to the ports. The steering vectors are determined from the orthogonalized cumulant vectors according to $$a_k(m) = E_s(\Lambda_s - \hat{\sigma}^2 I_{P_e})^{1/2} d_k(m) = T(\Lambda_s - \hat{\sigma}^2 I_{P_e}) d_k(m).$$

The steering vectors are provided to the controller unit in order to determine the port that loses its signal in the event of a source drop-out or to determine which port will be activated in the case of a new signal. The steering vectors can also be used by an optional DF search unit to determine the source bearings.

Finally, the active port determines the signal waveform from the source it is tracking. However, it is necessary for an active port to maintain gain and phase continuity of its recovered signal at block transitions in order to prevent block-to-block gain and phase modulation of the recovered signal. To accomplish this goal, we need to examine the properties of the algorithm in more detail. The algorithm normalizes the source waveforms to have unit variance and estimates the steering vectors based on this normalization, i.e., eCURE views the measurements as:

$$r(t) = (A\Sigma_{ss}^{1/2} D)(D^* \Sigma_{ss}^{-1/2} s(t)) + n(t),$$

where $\Sigma_{ss}$ is the covariance matrix of the directional sources which is diagonal since the sources are independent ($\Sigma_{ss} = E\{s(t)s^H(t)\}$). The diagonal matrix D contains arbitrary phase factors associated with the blindness of the steering vector estimation procedure. Even when the sources are stationary, there can be gain (due to $\Sigma_{ss}$) and phase modulations (due to D) on the steering vectors estimates and waveform estimates.

There are two different ways to determine gain and phase modulations for each block. We can compare the steering vector estimates $a_k(m)$ and $a_k(m-1)$, which should be pointing to the identical direction at convergence. Suppose, due to power changes and arbitrary phase rotations, the following relationship holds between the steering vectors:

$$a_k(m) \approx q_k a_k(m-1)$$

where $q_k$ accounts for the gain and phase factor between the two steering vector estimates. We can estimate $q_k$ using least-squares:

$$\hat{q}_k = a_k^H(m-1) a_k(m) / \|a_k(m-1)\|^2$$

Using $$a_k(m) = E_s(\Lambda_s - \hat{\sigma}^2 I)^{1/2} d_k(m)$$

and $$a_k(m-1) = E_s(\Lambda_s - \hat{\sigma}^2 I)^{1/2} v_k$$

we obtain an alternative way to compute $q_k$:

$$\hat{q}_k = v_k^H(\Lambda_s - \hat{\sigma}^2 I) d_k(m) / (v_k^H(\Lambda_s - \hat{\sigma}^2 I) v_k).$$

In the mth block, the kth block scales the steering vector estimate by $q_k$, relative to the previous block. Therefore, it scales the waveform estimate at the mth block by the reciprocal of this quantity. Hence we need to multiply the waveform estimate by $q_k$ (or by its estimate) in order to undo the scaling done by the processor, which is described as below:

$$g_k(t) = \hat{q}_k (d_k^H y(t)) = (\hat{q}_k * d_k)^H y(t) = w_k^H y(t)$$

The second way to compute $q_k$ is to force the first component of the steering vector estimate to be unity. In this process, we simply let $q_k$ be the first component of $a_k(m)$. After $q_k$ is determined, $w_k$ will be determined using the orthogonalized cumulant vector $d_k(m)$ and $q_k$.

Once a source waveform is recovered, it is available for subsequent processing as desired. It can be recorded or demodulated and listened to with headphones or loudspeakers.

3.4 The Signal Recovery Controller:

Now that the basic signal extraction method has been described and before proceeding to a description of the orthogonalizer function, it is logical to consider next how the signal recovery controller 122 (FIG. 8A) operates because this affects operation of the orthogonalizer 126 and the signal extraction ports 124. As briefly discussed with reference to FIG. 9, an important function of the controller 122 is to detect changes in the status (ON or OFF) of signal sources and to identify lost sources. In addition, the controller 122 maintains a priority list of ports and a related set of adaptation flags that indicate which ports are active.

Figure 13:
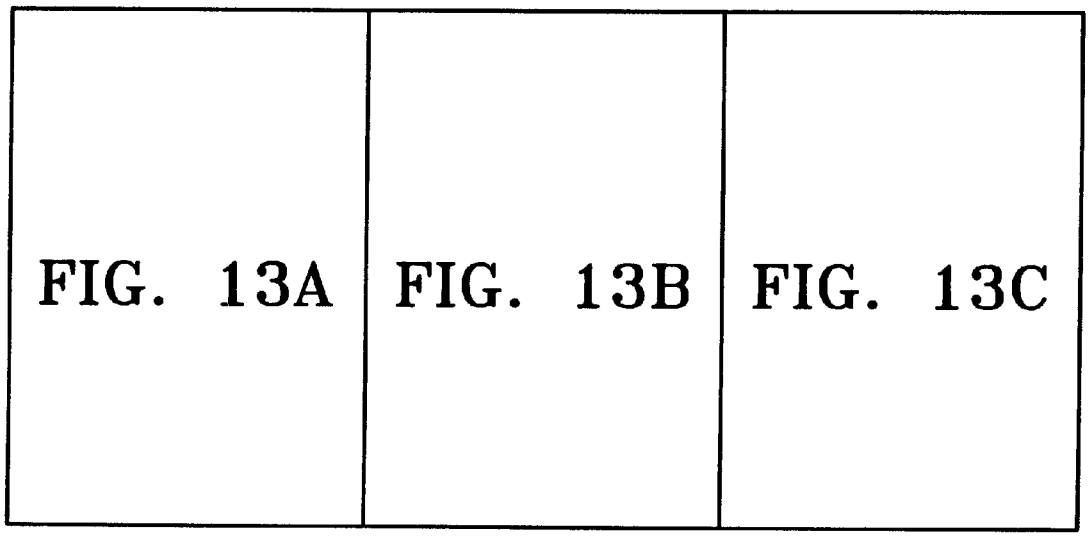
FIG. 13 (comprising FIGS. 13A, 13B and 13C) is a block diagram of the signal recovery controller of FIG. 7.
Figure 13A:
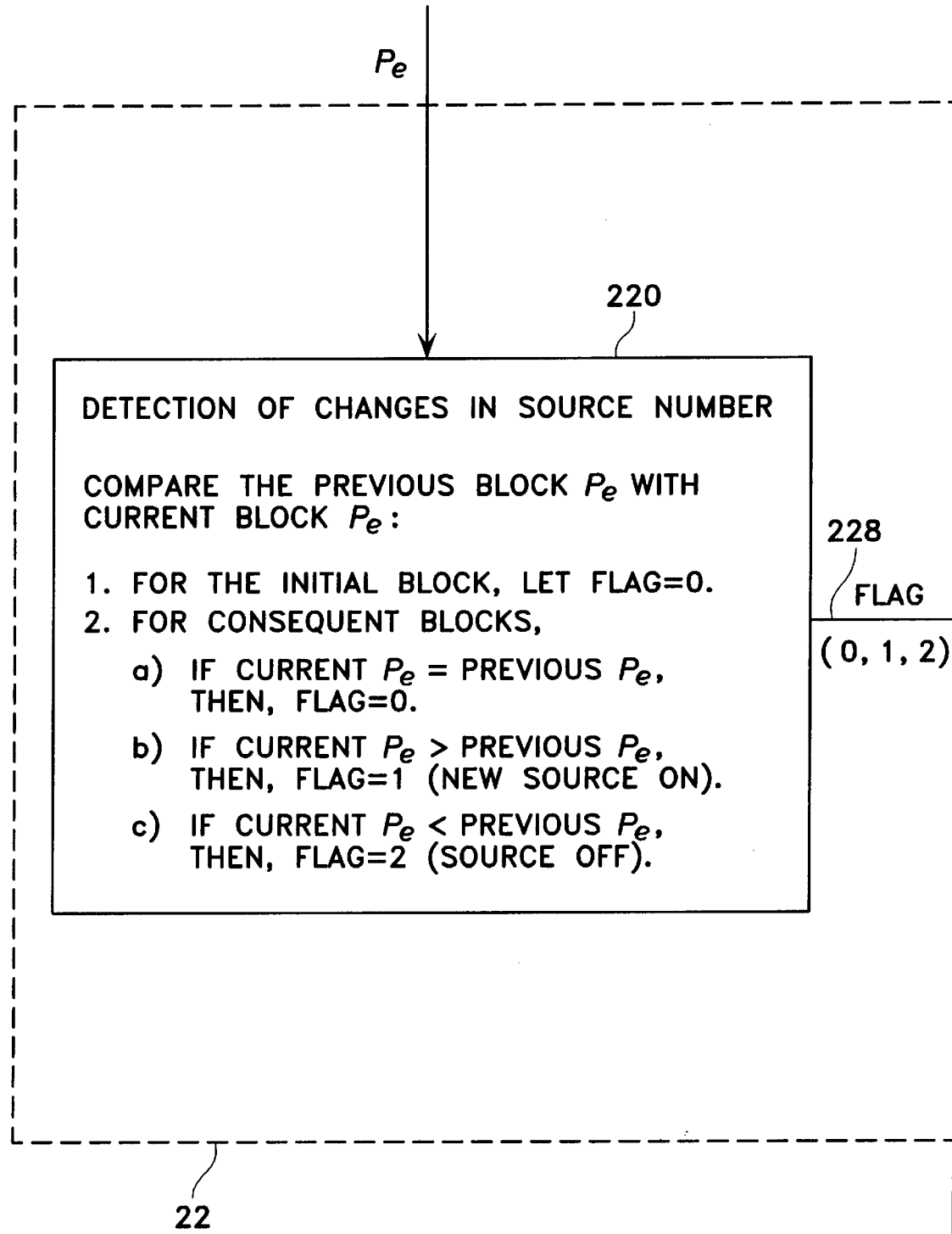
Figure 13B:
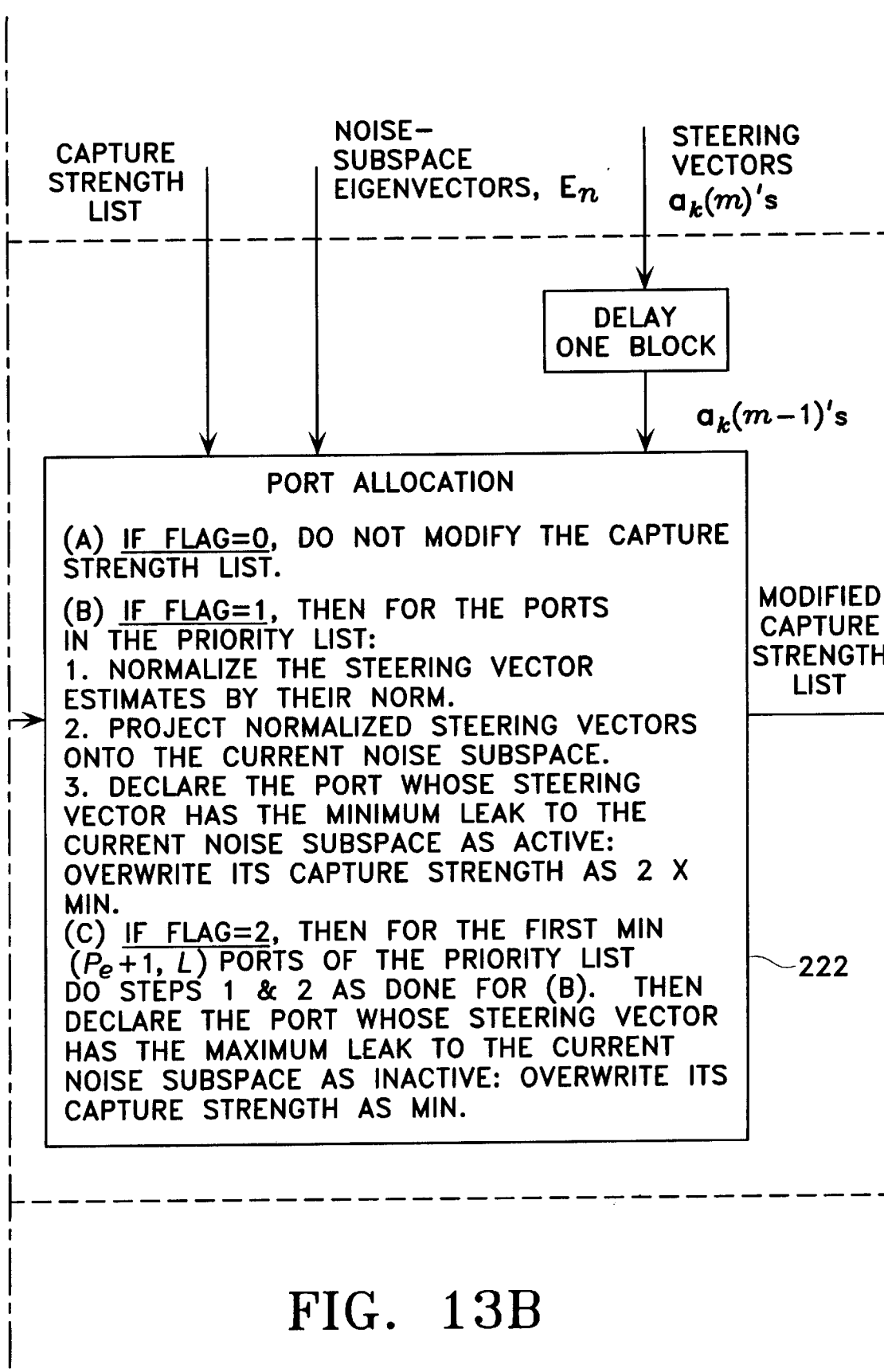
Figure 13C:
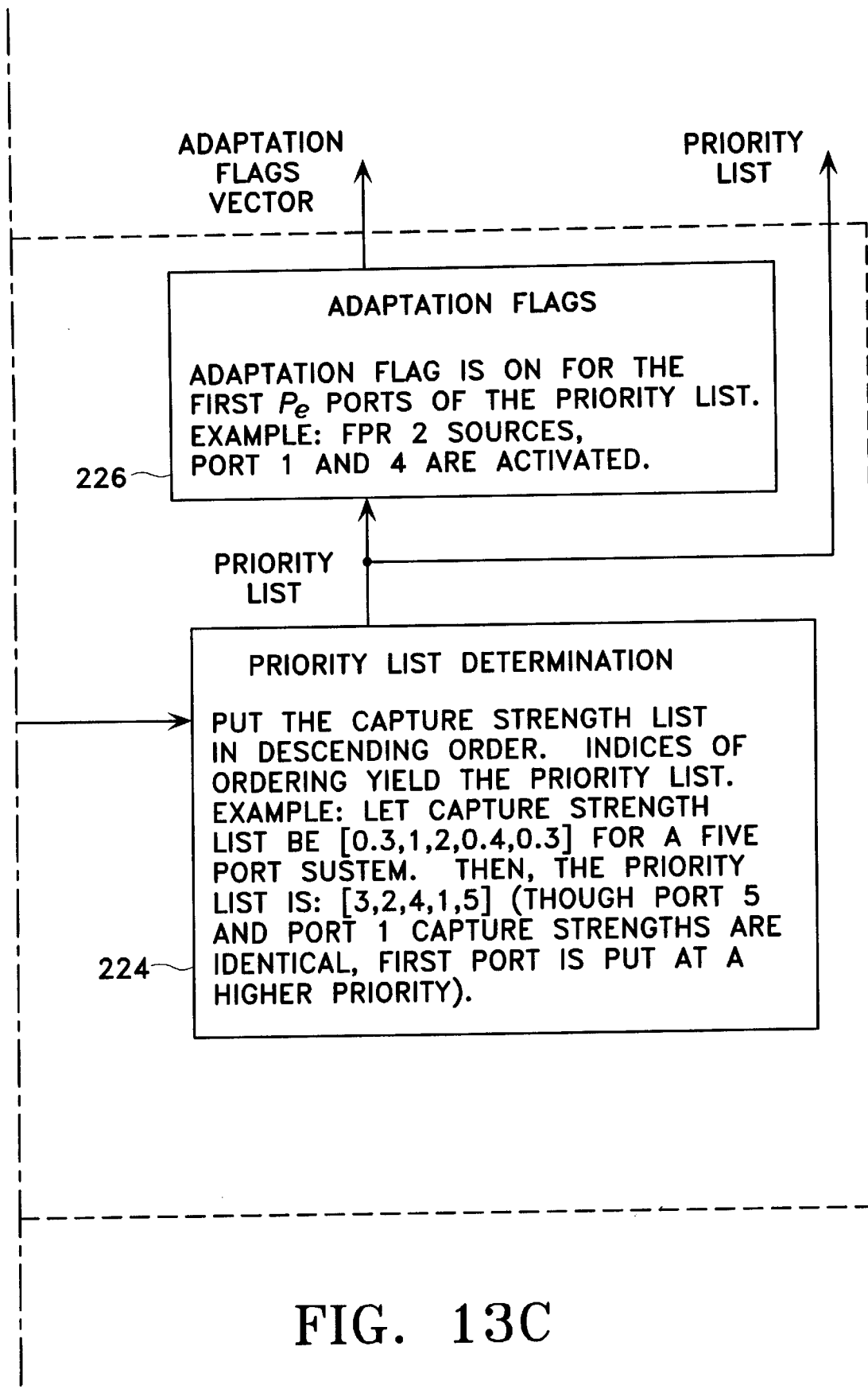

As shown in FIG. 13, which is spread over three pages as FIGS. 13A, 13B and 13C,, the functions of the controller 122 include logic to detect changes in the number of signal sources, indicated by block 220, port allocation logic 222, priority list determination logic 224, and adaptation flag logic 226. The logic 220 to detect changes in the number of sources assumes that there is no more than one change in the number of sources from one data block to the next. The logic receives the estimated number of signals $P_e$ from preprocessing computer 120 and compares the $P_e$ of the previous block with the $P_e$ of the current block. The results of the comparison determine the value of source change flag, referred to simply as "Flag." Flag is set to zero for the initial block. There are three possible outcomes of the comparison for subsequent blocks of data:

1. If current $P_e$=previous $P_e$, Flag=0
2. If current $P_e$>previous $P_e$, Flag=1 (new source ON)
3. If current $P_e$<previous $P_e$, Flag=2 (source OFF).

The Flag value is transmitted over line 228to the port allocation logic 222, which is called into operation only if Flag=2, indicating that a source has been lost. The function of the port allocation logic 222 is to determine which of the active ports 124 was last processing signals from the source that has just been lost. The basic principle employed to make this determination is to identify which port has a steering vector with the greatest component in the current noise subspace. Each signal that contributes to the measurements has a steering vector that is orthogonal to the current noise subspace determined from the sample covariance matrix $\hat{R}$. (In a simple three-dimensional space, one could think of a first signal eigenvector aligned with the x-axis direction and a second signal eigenvector aligned with the y-axis direction. The signal subspace for the two active signals includes the x-axis and y-axis directions. The noise subspace is the space defined by all remaining axes in the space. In this case, the noise subspace eigenvector is in the z-axis direction.)

When a signal disappears and drops out of consideration, the current noise subspace then includes the space previously occupied by the signal. In the three-dimensional example, if the x-axis signal disappears, leaving only the y-axis signal, the noise subspace is redefined to include a plane in the x and z directions. To recognize which signal was lost, the port allocation unit uses the steering vector estimates from the previous data block (indicative of the active sources before one was lost), and projects these vectors into the noise subspace as defined for the current data block. The steering vector from the previous data block that lies completely in the current data block noise subspace, or the one that has the largest component in the noise subspace, is determined to be the signal that was lost between the previous and current data blocks. Again, using the three-dimensional example, if x-axis signal disappears and the new noise subspace is redefined be the x-z plane, then projection of the previous x and y signals into the current noise subspace results in a finding that the x-axis signal, lying wholly in the current noise subspace, is the signal that was lost.

More specifically, the logic 222 obtains the steering vector estimates from all of the ports that were active in the previous data block, and normalizes them (i.e., scales them have a unit norm). Steering vector estimates are obtained for only the first ($P_e$+1) ports in order of decreasing capture strength. The port allocation logic is concerned with the direction of the steering vectors in space and any differences in magnitude arising from different signal strengths should be eliminated. Then the normalized steering vectors are projected onto the current noise subspace, as provided from the preprocessing computer 120 in the form of noise subspace eigenvectors $E_n$. For example, if $a_k(m-1)$ is a steering vector estimate from the kth port that was active in the previous block, then the port allocation logic 222 computes the "leakage" of the steering vector of the kth port into the current noise subspace from:

$$\|E_n E_n^H a_k(m-1)\| a_k(m-1)\|\|.$$

The logic then declares the port that has the greatest leakage into the noise space to be inactive by setting its adaptation flag to zero. Also the port's capture strength is set to a value MIN, which is a system parameter set to some very low value, such as 0.001. It will be recalled that the capture strength is computed in each active port as described earlier. However, the controller 222 can overwrite the previously computed value when it is determined that a port has become inactive.

For example, suppose that five ports are available for use, with three sources present in the previous data block. Port 1 was locked onto Source 3, Port 3 was locked onto Source 1, and Port 5 was locked onto Source 2. Assume further that Source 3 turned off just before the current block and that the following capture strengths were determined for the previous and current data blocks:

| Port No. | Previous Source No. | Previous Capture Strength | Current Source No. | Current Capture Strength |
|---|---|---|---|---|
| 1 | 3 | 0.99 | — | 0.001 |
| 2 | — | 0.001 | — | 0.001 |
| 3 | 1 | 0.995 | 1 | 0.995 |
| 4 | — | 0.001 | — | 0.001 |
| 5 | 2 | 0.98 | 2 | 0.98 |

In the previous data block, Port 2 and Port 4 were inactive and had their capture strengths set to 0.001. When Source 3 turned off, the port allocation logic 222 determined that Port 1 had lost its signal, using the analysis discussed above.

Inherent in the list of capture strengths is a priority list of ports (i.e., a list of port numbers in order of decreasing capture strength). Therefore, the priority list based on the previous data block is [3,1,5,2,4] and the priority list based on the current data block is [3,5,1,2,4]. The convention adopted is that, when ports have identical capture strengths, they are assigned priorities based on port numbers. The priority list determination logic 224 generates the priority list in this manner, based on the capture strength list transferred from the port allocation logic 222. The priority list is used by the adaptation flags logic 226 to generate a list or vector of adaptation flags. The adaptation vector contains L elements, where L is the number of physical ports in the system. In the example given above, the adaptation flags vector for the previous data block is [1,0,1,0,1] and for the current data block is [0,0,1,0,1]. The adaptation flags vector is supplied to multiple port signal recovery unit (124, 126, FIG. 9), and specifically to the signal extraction ports 124. The priority list is also supplied to the multiple port signal recovery unit, and specifically to the orthogonalizer 126, which will be discussed in the next descriptive section.

The purpose of the priority list is to facilitate an orderly allocation of signal sources to ports, from the lowest port number to the highest. Further, when a signal source turns on, it is desirable that the most recently freed port be made available for assignment to the new signal, to provide continuity when a source turns off and on again without a change in the status of other sources.

If there is a new source (i.e., Flag=1), then this unit first obtains the previous block steering vector estimates from the ports that are inactive in the previous block (Ports $P_e$ to L in the priority list), and normalizes them to have unit norm. It then projects these steering vectors onto the current noise subspace. For example, if $a_k(m-1)$ is a steering vector estimate from a port that was inactive in the previous block, then the Port Allocation Unit computes the port's leakage from (here $\|a_k(m-1)\|$ denotes the norm of vector $a_k(m-1)$):

$$\|E_n E_n^H a_k(m-1)/\|a_k(m-1)\|\|,$$

and declares the port which has the minimum leakage as active (sets its adaptation flag to one) and overwrites the port's capture strength with 2×MIN, where MIN is a system parameter that is nominally set to 0.001. This is done to make the newly activated port be the last in the priority list. (The capture strength of a port is computed by the multiple port signal recovery unit described earlier in this specification. The controller, however, can overwrite the computed value as described above.)

3.5 The Orthogonalizer:

As already briefly discussed, the orthogonalizer 126 functions to ensure that each port is consistently assigned to process only one signal source, which is to say that each active port captures a different source. The orthogonalizer 126 receives a normalized cumulant vector from each active port, the vector being represented by $b_k$ for the kth port. The orthogonalizer 126 outputs back to each port an orthogonalized cumulant vector, which is $d_k$ for the kth port. The orthogonalizer also receives the priority list from the signal recovery controller 122, so has knowledge of the identities of the active ports and their respective associated capture strengths, and also receives the estimated number of signals $P_e$, from the preprocessing computer 120.

The orthogonalizer forces the active ports to capture different sources by orthogonalizing their cumulant vectors, which, in turn, are estimates of the steering vectors in the dimensionally reduced space. (It will be recalled that, in the preprocessing computer 120, the dimensionality of the data is reduced from M, the number of sensor elements, to $P_e$, the estimated number of sources.) Ideally, the cumulant vectors for active ports should be orthogonal to each other, to cause the ports to capture different source signals and to prevent two ports from locking up on the same source signal. From the priority list and the estimated number of signals $P_e$, the orthogonalizer forms a $P_e$ by $P_e$ matrix Z from the active port steering vectors $b_k$ such that the kth column of the matrix Z is the steering vector of the port that is the kth item in the priority list. The orthogonalizer uses a known procedure known as the classical Gram-Schmidt (CGS) algorithm to perform the orthogonalization operation. The Gram-Schmidt algorithm is described in a number of texts on matrix computations, such as Matrix Computations, by Gene H. Golub and Charles F. Van Loan (The Johns Hopkins University Press, 1983), pp. 150–154.

As applied to the present system, the Gram-Schmidt algorithm is applied to the matrix Z to obtain a decomposition of the type:

$$Z=QR,$$

where Q is an orthogonal matrix ($Q^H Q=I$), and R is an upper triangular matrix. Although the Gram-Schmidt orthogonalization procedure is used because of its simplicity, there are alternatives that might also be used in the invention, such as QR-decomposition and the Modified Gram-Schmidt (MGS) procedure. After the orthogonal matrix Q is determined, its columns are shipped back to the ports as orthogonalized cumulant vectors $d_k$. Specifically, the kth column of the Q matrix is sent back as $d_k$ to the port that is the kth entry in the priority list. Regardless of the method used, the effect of the orthogonalizer is to produce a set of $P_e$ cumulant vectors that are orthogonal to each other.

Figure 14:
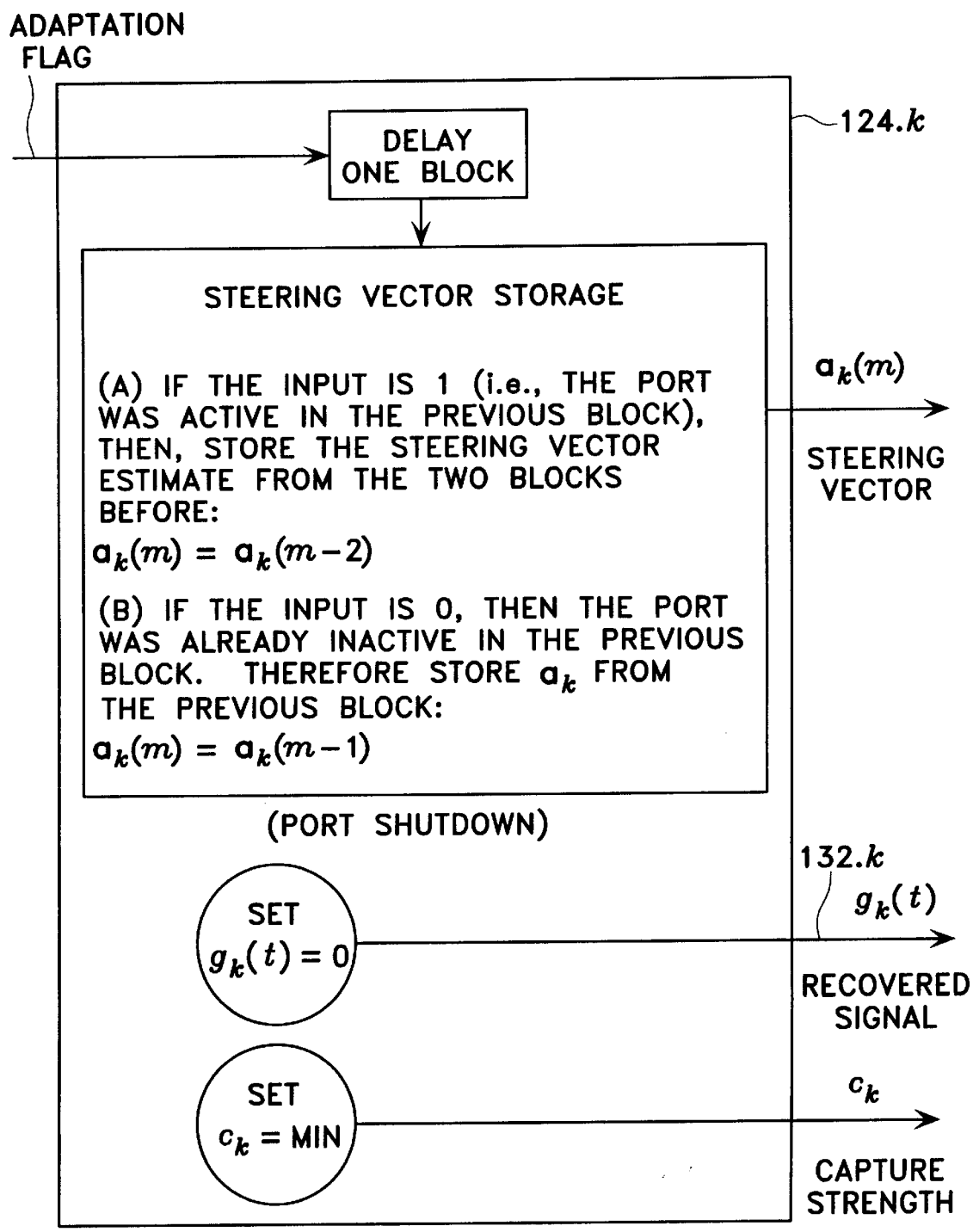
FIG. 14 is a block diagram of a signal extraction port in the inactive state.

3.6 Operation at an Inactive Port:

When a port is determined to be inactive, as indicated by a zero adaptation flag, the port performs three simple functions, as shown in FIG. 14. First, its output signal gk(t) is set to zero. Second, its capture strength $c_k$ is set to a minimum value MIN. Finally, the last steering vector $a_k$, estimated in the port just before it became inactive, is stored in a memory device associated with the port, to facilitate recapture of the same signal that was lost, if it should turn on again in the near future. More specifically, the adaptation flag input to the inactive port is delayed by one data block time. Then, using the delayed adaptation flag, the port stores a steering vector either from two blocks earlier, if the delayed flag has a value of 1, or one block earlier, if the delayed flag has a value of zero.

4.0 Alternate Embodiment Using Covariance Inversion Cure (CiCURE):

The basic cumulant recovery (CURE) system described in Section 3.0 uses eigendecomposition in preprocessing and is referred to as eigenCURE (eCURE) for convenience. Another variant of the CURE system uses covariance inversion instead of eigendecomposition and is referred to as covariance-inversion CURE (CiCURE). CiCURE is best thought of as a low-cost approximation to the high-performance eCURE system. As such, it shares most of the same advantages over standard CURE as the eCURE method.

Certain conditions must be met in order for CiCURE to mimic eCURE and realize the same advantages. The conditions are:

Sensor noises must be additive Gaussian noise (eCURE assumes independent, identically distributed, additive Gaussian noise).

Received signal powers must be much greater than the noise.

Sample covariance matrix and its inverse used by CiCURE must be accurate enough to prevent leakage into noise subspace.

Under stationary or steady-state signal conditions, this implies a need for a sufficiently long processing block size. Under these conditions, the prewhitening transformation used in CiCURE is a good approximation to that used in eCURE, and the two systems have similar performance properties. This section of the specification describes the components of a signal separation/recovery system that is based on the CiCURE algorithm.

The CiCURE signal separation/recovery system incorporates a spatial prewhitening transformation based on the inverse of the input sample covariance matrix (this operation is performed by using an eigendecomposition in the eCURE). The received signal data is filtered or transformed by the prewhitening operation in the CiCURE, unlike eCURE. The prewhitening done in the CiCURE is implicit in the mathematics of the signal recovery ports, and it is only necessary to compute a matrix decomposition of the input sample covariance matrix. This latter operation is done in a preprocessor, whose output is made available to all of the signal recovery ports. Key characteristics of the implementation described below are that the iterative convergence of the CURE algorithm is realized over several blocks instead of within a single block, and "high-priority" ports converge sooner than "low-priority" ports.

A signal recovery system based on the CiCURE method is simpler than one based on the eCURE. There are two main architectural components to the method: a preprocessor unit which computes a matrix decomposition and a set of signal recovery ports hierarchically arranged.

In addition, there can be two optional units: demodulators, to complete the recovery of the separated signal for the purpose of recording or listening, and a direction-finding (DF) search unit to provide copy-aided DF.

Figure 15:
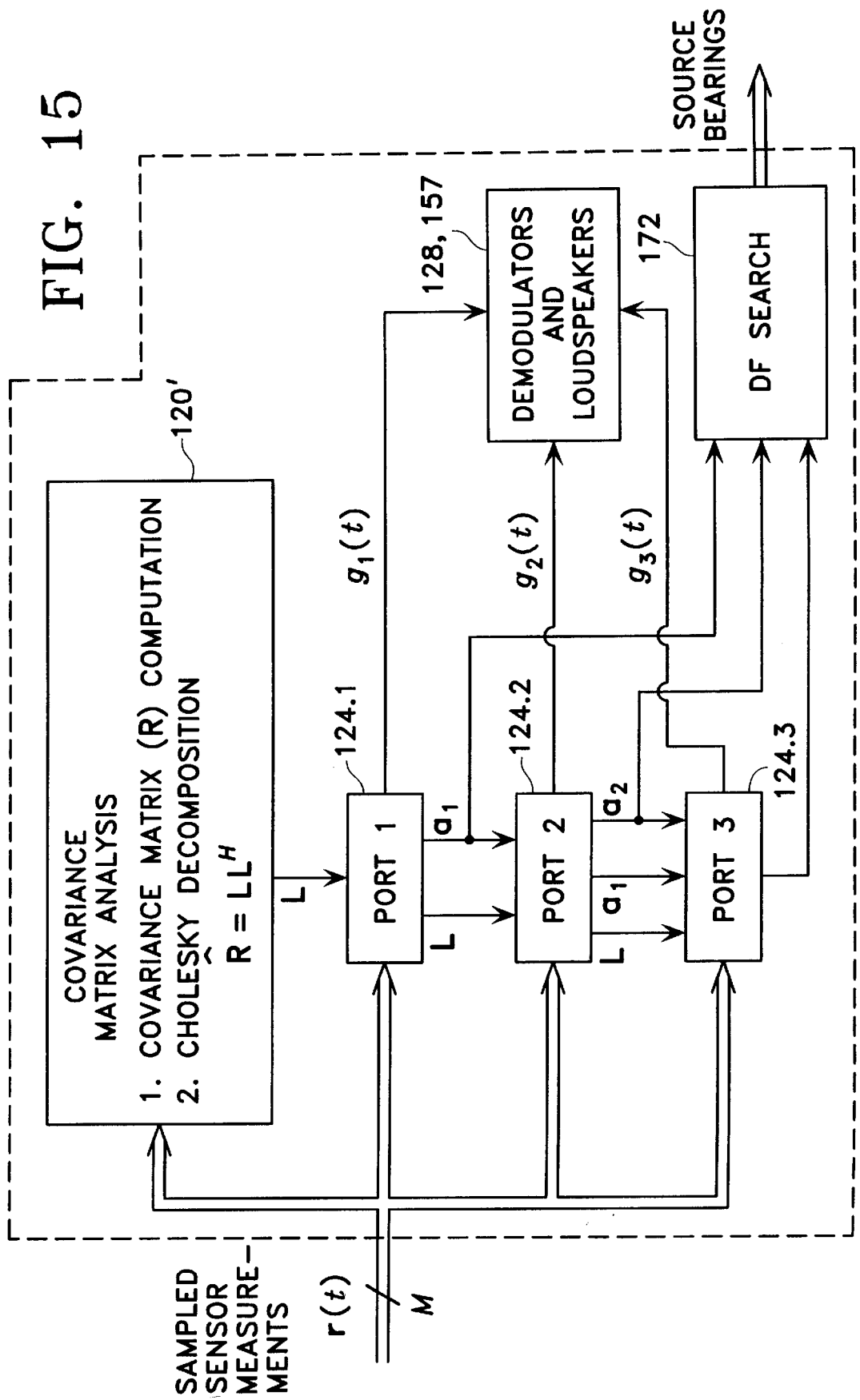
FIG. 15 is a block diagram of signal recovery system using covariance inversion cumulant recovery (CiCURE).

A block diagram for an overall signal recovery system based on the CiCURE method is shown in FIG. 15. The details of the preprocessor 120' and the signal recovery ports (124.1, 124.2, etc.) that are unique to the CiCURE method are described below. All other system details are as previously described for the eCURE system.

The preprocessor 20' computes a matrix decomposition of the input sample covariance matrix. It does this on a block-by-block basis by first computing the sample covariance matrix of the array snapshots within a processing block and then computing the Cholesky decomposition of the sample covariance matrix. The Cholesky decomposition is output to the signal recovery ports 124.1, 124.2, 124.3, which use this information to adapt their weight vectors to separate the cochannel source signals.

The signal model for the narrowband array case is described by the following equation:

$$r(t)=As(t)+n(t),$$

where r(t) denotes the array signals collected by M sensors. We assume that for each block N snapshots are collected for analysis and that there are P sources contributing to the measurements. We also assume that the measurement noise, n(t), is spatially white and noise power at each sensor is identical but unknown and it is denoted by $\sigma^2$. The preprocessor 20' first forms the sample covariance matrix from the snapshots according to:

$$\hat{R} = \frac{1}{N}\sum_{t=1}^{N} r(t)r^H(t).$$

After forming the sample covariance matrix, the Cholesky decomposition is performed:

$$\hat{R}=LL^H,$$

where L is a lower triangular matrix with positive diagonal terms. L is sent to the signal recovery ports 124.1, 124.2, 124.3, as indicated in the drawing.

In the CiCURE structure, there is no controller unit to detect source ON/OFF transitions as in the eCURE system. The signal recovery ports have a predetermined hierarchy or priority order. The first port has highest priority and so on. Therefore, CiCURE is not able to compensate for dynamic changes in the signal environment as can the eCURE algorithm. Each port receives as input the current block steering vector estimates from the ports that are higher in priority, the sensor signal data, and the Cholesky decomposition of the sample covariance matrix for the current block. Each port outputs the recovered signal and associated steering vector for a captured source.

Figure 16:
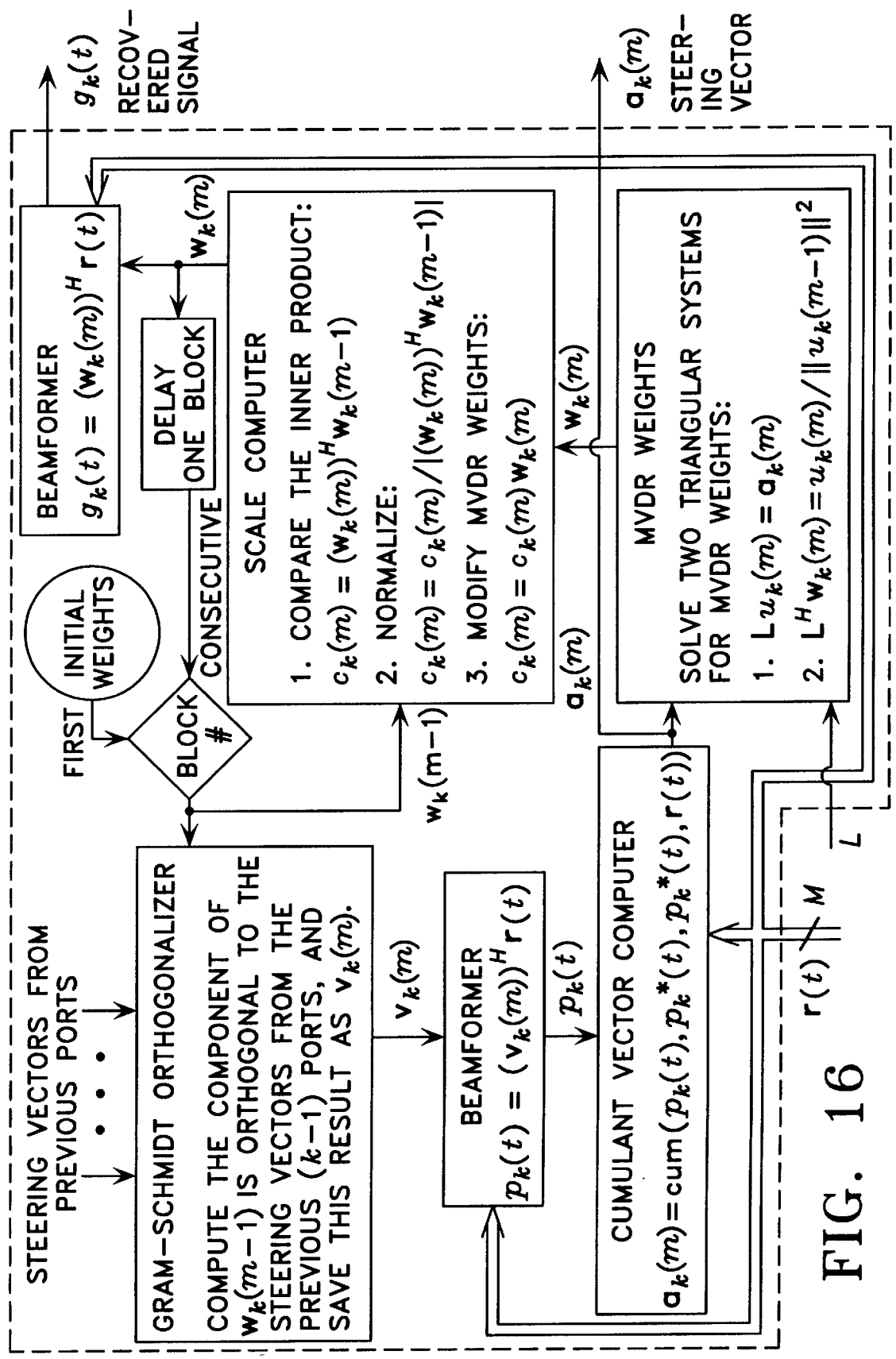
FIG. 16 is a block diagram of a signal extraction port in the active state using the CiCURE system illustrated in FIG. 15.

FIG. 16 shows the operations of a single signal recovery port. Suppose the higher-priority ports produce a set of steering vectors for the current block, defined as $\{a_1(m), \ldots, a_{k-1}(m)\}$. The weight vector to produce $p_k(t)$ for the current block (the mth block) is determined by modifying the MVDR weights for the kth port on the previous block by a computation carried out in the kth port as described next. The first step is to compute Gram-Schmidt orthogonalized weights $(v_k(m))$ according to:

$$v_k(m) = w_k(m-1) - \sum_{l=1}^{k-1}(a_l^H(m)w_k)a_l(m)/\|a_l(m)\|^2.$$

The port then uses the Gram-Schmidt orthogonalized weights $(v_k(m))$ to determine the waveform $p_k(t)$ according to $$p_k(t)=v_k^H(m)r(t).$$

Next, a vector, $a_k(m)$, of sample cross-cumulants involving this waveform is computed having components:

$$[a_k(m)]_l = cum(p_k(t), p_k^*(t), p_k^*(t), r_l(t)), \ 1 \leq l \leq M,$$

in which, $[a_k(m)]_l$ is the lth component of $a_k(m)$. This vector provides an estimate of a source steering vector and is sent to all the ports that have lower priority than the kth port and the optional direction-finding unit. In addition, the MVDR weight vector for the kth port is determined using $a_k$ and L.

The MVDR weight vector is computed in a two-step procedure that exploits the lower triangular structure of the Cholesky decomposition. First, the temporary solution, $u_k$ is computed by solving the linear system of equations:

$$Lu_k(m)=a_k(m).$$

Next, the MVDR weights are computed by solving the second linear system:

$$L^H w_k(m)=u_k(m)/\|u_k(m)\|.$$

It is necessary to maintain phase continuity with the weights of the previous block. This requirement resolves the complex phase ambiguity inherent in the blind signal separation problem, which would otherwise cause "glitches" in the recovered signals at the block boundaries. Therefore, before using the weight vector $w_k(m)$ estimate the signal waveform, the complex phase ambiguity is resolved by computing the scale factor:

$$c_k(m)=w_k^H(m)w_k(m-1)/|w_k^H(m)w_k(m-1)|,$$

and then scaling the MVDR weights according to:

$$w_k(m)=c_k(m)w_k(m).$$

This operation forces the current and previous block signal extraction weights to have a real inner product (i.e., no abrupt phase rotation at the block boundary). This method eliminates block-to-block phase discontinuities, leaving only a bulk phase rotation ambiguity that is constant over all blocks recovered by the port. This bulk phase rotation is unimportant to the recovery of analog AM and FM modulated signals; however, for digital modulations, its removal is desired. Section A subsequent section on phase rotation equalization presents a method for doing so. For now, we skip over this minor detail.

Using the modified MVDR weights, the waveform estimate is computed according to:

$$g_k(t)=w_k^H r(t)$$

The recovered waveform is available for subsequent processing, which may consist of recording of the predetected waveform, demodulation, signal recognition, or other operations.

The current block weights are fed into a one-block delay unit which makes them available to the Gram-Schmidt orthogonalization unit as the initial weights for processing the next block. Key characteristics of this implementation are that the iterative convergence of the CURE algorithm is realized over several blocks instead of within a single block, and high-priority ports converge sooner than low-priority ports.

5.0 Alternate Embodiment Using Pipelined Cumulant Recovery (pipeCURE):

This section describes a variant or extension of the eigendecomposition-based CURE (eCURE) system, which will be called the pipelined eigenCURE (pipeCURE) system. The eigenCURE (eCURE) algorithm analyzes measurements on a block by block basis and has dynamic capabilities to eliminate port switching and port allocation in the case of transient sources. Received signal data are filtered or transformed by a prewhitening operation before reaching cumulant based signal separation processing. eCURE (described in Section 3.0) has several advantages over the covariance-inversion CURE (CiCURE) (described in Section 4.0), which uses covariance-inversion instead of eigendecomposition:

It has better signal separation performance (i.e., better crosstalk rejection at port outputs).

It has guaranteed fast convergence, specifically a super-exponential convergence rate which is mathematically guaranteed.

It has improved port stability which helps minimize random port switching.

It can operate with a much wider range of input signal strengths.

This last property is particularly useful when trying to recover a weak signal in the presence of strong interfering signals.

The pipeCURE system "pipelines" the eCURE algorithm in order to have:

Simpler implementation (no feedback between operational blocks).

An ability to iterate more times over one block of data.

An option to use further eigendecompositions to improve results.

Figure 17:
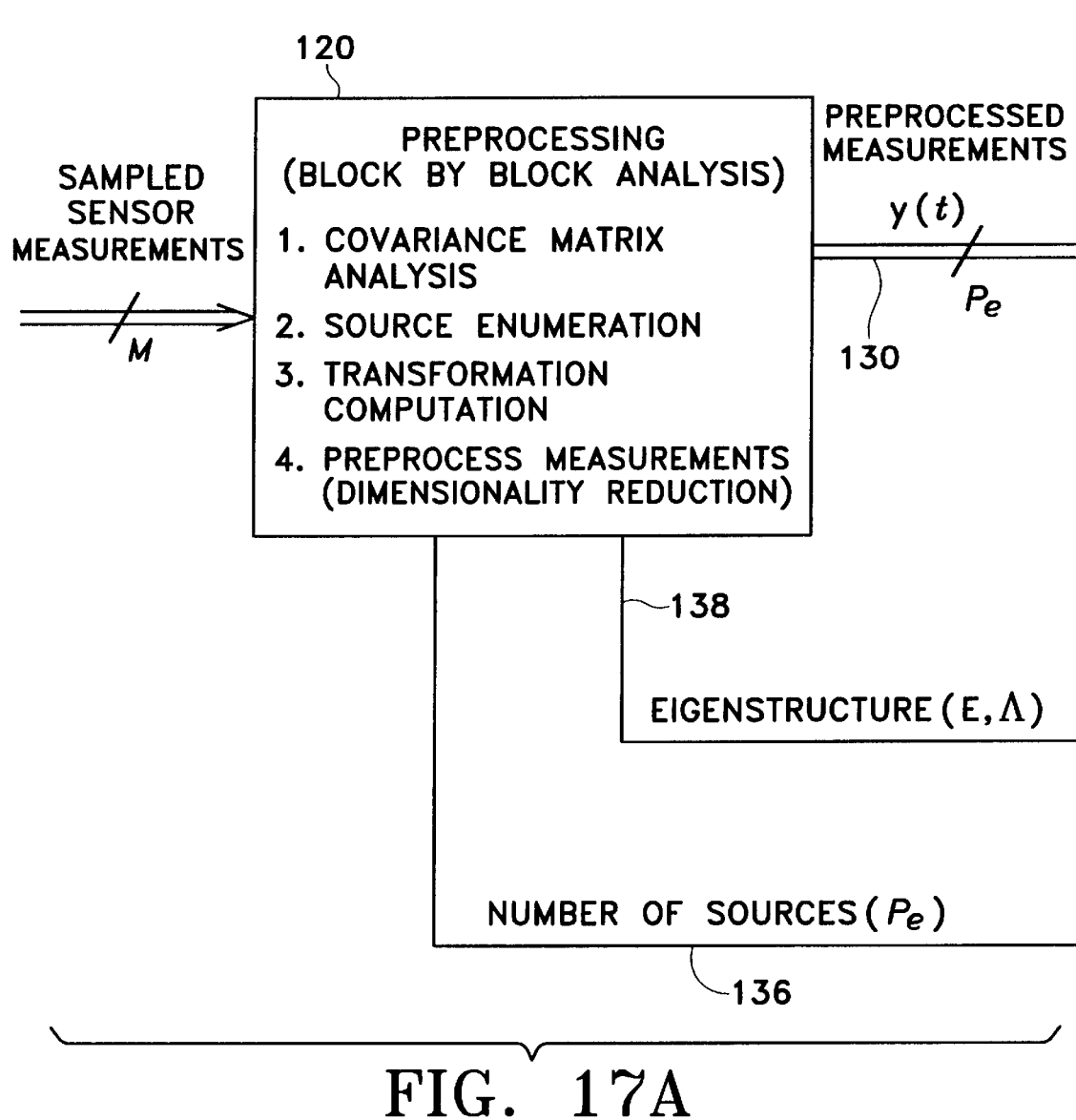
FIG. 17 is a block diagram of an alternate embodiment of the invention referred to as pipeCURE.
Figure 17:
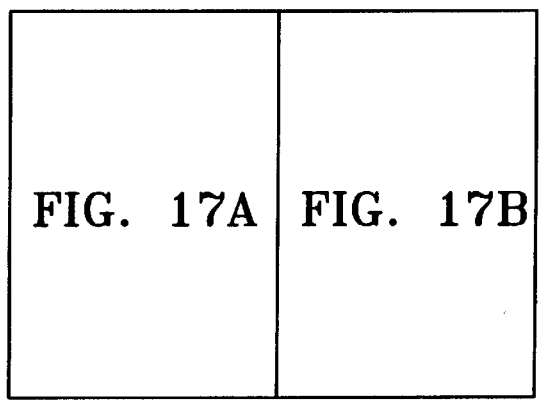
Figure 17B:
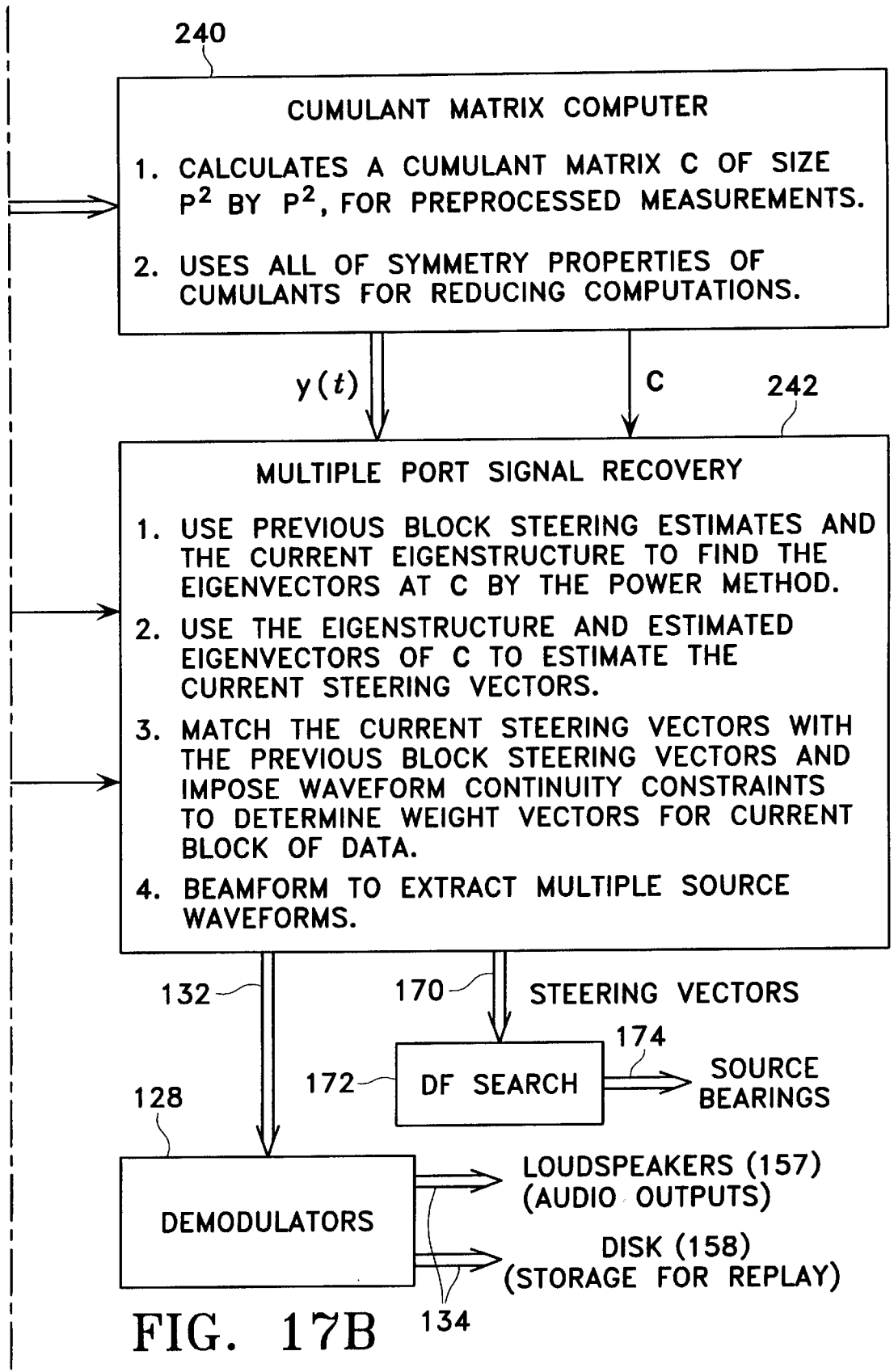
Figure 18:
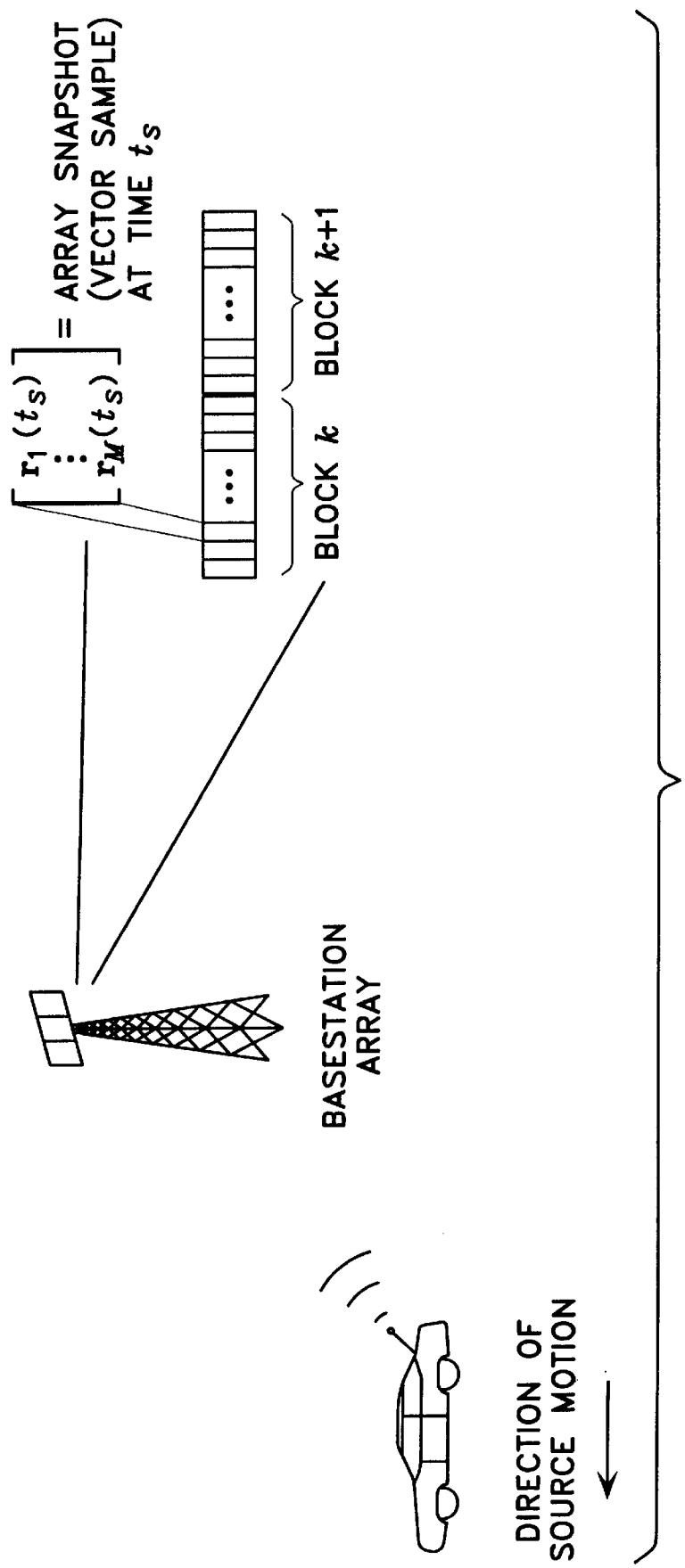
FIG. 18 is a schematic diagram depicting a processing difficulty associated with moving signal sources.

5.1 Overview of the pipeCURE Signal Separator:

The pipeCURE signal separator has three main components, which are shown in FIG. 17: a preprocessor unit 120, which is basically the same as in the eCURE system, a cumulant matrix computer 240, and a multiple port signal recovery unit 242. In addition, there are two optional units: the demodulators 128, to complete the recovery of the separated signals for the purpose of recording and the direction-finding (DF) search unit 172 to provide copy-aided directions of arrival on output line 174.

5.2 Preprocessor Unit:

The preprocessor 120 performs a block-by-block analysis of the element array snapshots, determining the eigenvectors, number of signal sources, and signal subspace of the received array measurement data. It filters the received array data, transforming it from the M-dimensional sensor space to the P-dimensional signal subspace. In so doing, the steering vectors of the transformed sources are made orthogonal to each other in the range of this projection, and the transformed source powers are made equal (at high signal-to-noise ratios). The details of the preprocessor operation were described in Section 3.0 in relation to the eCURE system

5.3 Cumulant Matrix Computer:

In this section, we introduce the cumulant matrix computer, a unit that computes the statistics as required by the iterative blind signal separation processor. The cumulant matrix computer computes a $P^2 \times P^2$ (here we assume the number of sources and its estimate are identical) cumulant matrix C is defined as:

$$C(P \cdot (i-1)+j, P \cdot (k-1)+l) = \text{cum}\ (y_i^*(t), y_j(t), y_k(t), y_l^*(t))\ 1 \le i,j,k,l \le P$$

With finite samples, this matrix can be estimated as:

$$C(P \cdot (i-1) + j, P \cdot (k-1) + l) =$$

$$\frac{1}{N} \sum_{t=1}^{N} y_i^*(t) y_j(t) y_k(t) y_l^*(t) - \frac{1}{N^2} \sum_{t_1=1}^{N} y_i^*(t_1) y_j(t_1) \sum_{t_2=1}^{N} y_k(t_2) y_l^*(t_2) -$$

$$\frac{1}{N^2} \sum_{t_1=1}^{N} y_i^*(t_1) y_k(t_1) \sum_{t_2=1}^{N} y_j(t_2) y_l^*(t_2) -$$

-continued $$\frac{1}{N^2} \sum_{t_1=1}^{N} y_i^*(t_1) y_l^*(t_1) \sum_{t_2=1}^{N} y_j(t_2) y_k(t_2)$$

$$1 \le i, j, k, l \le P$$

in which the signal vector y(t) is defined as:

$$y(t) = T^H r(t), \text{ where } T \triangleq E_s(\Lambda_s - \sigma_n^2 I)^{-1/2} = US^{-1}$$

5.4 Multiple Port Signal Recovery Unit:

The multiple port signal recovery unit 242, receives as inputs the preprocessed array measurement y(t), the cumulant matrix C the eigenstructure (E, Λ) derived from the array measurements in the preprocessor 120 and the estimated number of sources ($P_e$) generated in the preprocessor. Using these input signals, the multiple port signal recovery unit derives recovered signals for output on lines 132 and steering vectors for output on lines 170, in accordance with the following equations and steps:

(a) Inputs to multiple port signal recovery unit:

Number of sources, P.

Transformation matrix $T \triangleq E_s(\Lambda_s - \sigma_n^2 I)^{-1/2}$

Preprocessed signals: $y(t) = T^H r(t)$

Eigenstructure of the covariance matrix: $\{E_s, \Lambda_s, \sigma_n^2\}$

Initial estimates of the steering vectors for sources stored as the columns of $\tilde{A}$.

Cumulant matrix C:

$$C(P \cdot (i-1)+j, P \cdot (k-1)+l) = \text{cum}\ (y_i^*(t), y_j(t), y_k(t), y_l^*(t))\ 1 \le i,j,k,l \le P$$

(b) Outputs from multiple port signal recovery unit:

Estimated steering vector $\hat{A}$ that will be used in the next block as a starting point (in place of $\tilde{A}$).

Recovered signals for the analysis block, $\hat{s}(t)$.

(c) Processing in the multiple port signal recovery unit:

1. Transformation of Steering Vectors: Project the steering matrix estimate onto the reduced dimensional space by the transformation matrix T:

$$\tilde{B} = T^H \tilde{A}$$

2. Cumulant Strength Computation: Normalize the norm of each column of $\tilde{B}$ and store the results in $\tilde{V}$, and then compute the cumulant strength for each signal extracted by the weights using the matrix vector multiplication:

$$\tilde{v}_m = \tilde{b}_m / \|\tilde{b}_m\|, \text{ where } \tilde{v}_m\ (\tilde{b}_m) \text{ is the mth column of } \tilde{V}(\tilde{B}).$$

$$O_m = |(\tilde{v}_m^* \otimes \tilde{v}_m)^H\ C(\tilde{v}_m^* \otimes \tilde{v}_m)|, \text{ for } 1 \le m \le P.$$

3. Priority Determination: Reorder the columns of $\tilde{V}$ and form the matrix $\tilde{W}$, such that the first column of $\tilde{W}$ yields the highest cumulant strength, and the last column of $\tilde{W}$ yields the smallest cumulant strength.

Columns of $\tilde{V}$ in descending cumulant strength $\rightarrow \tilde{W}$

4. Capture of the kth source: Starting with the kth column of $\tilde{W}$, proceed with the double power method followed by Gram-Schmidt orthogonalization with respect to higher priority columns of $\tilde{W}$, i.e., for column k:

$$\tilde{w}_k(b+1) = \alpha_{b+1} \cdot (\tilde{w}_k^*(b) \otimes I_P)^H C(\tilde{w}_k^*(b) \otimes \tilde{w}_k(b)), \text{ b is the iteration number,}$$

where the constant $a_b+1$ is chosen so that the norm of $\tilde{w}_k(b+1)$ is unity and b is the iteration number. This operation is followed by the Gram-Schmidt orthogonalization:

$$\tilde{w}_k(b+1) = \beta_{b+1}\left(\tilde{w}_k(b+1) - \sum_{l=1}^{k-1} w_l \cdot (w_l^H \tilde{w}_k(b+1))\right), \text{ since } \|w_l\| = 1,$$

where the constant $\beta_{b+1}$ is chosen so that the norm of $\tilde{w}_k(b+1)$ is unity. In the last expression, $w_l$ denotes the final weight vector with source of priority l.

5. Capture of the remaining sources: Repeat step 4, for each column for a predetermined K times. After iterations are complete for the kth column, declare the resultant vector as $w_k$, and proceed with the remaining columns. After all sources are separated, form the matrix W that consists of $w_k$'s as its columns.

Converged weight vectors $w_k$'s→form the columns of W.

6. Port Association: After all the power method and Gram-Schmidt iterations are complete, we compare the angle between columns of W and the columns of $\tilde{V}$.

Calculate the absolute values of the elements of the matrix $Z = W^H \tilde{V}$.

Take the arccosine of each component of Z.

To find the port number assigned to the first column of W in the previous block, simply take the index of the largest element of the first row of the matrix Z.

For the second column of W, we proceed the same way except this time we do not consider previously selected port for the first column. Using this rule, we reorder the columns of W, such that there is no port switching involved.

Reorder the columns of W, based on Z→results in $\hat{V}$.

7. Steering Vector Adjustment: Due to the blindness of the problem, estimated steering vectors are subject to arbitrary gain and phase ambiguities. The gain ambiguities are corrected by the unit amplitude constraint on the columns of $\hat{V}$. However, this does not prevent phase modulations on the columns of this matrix. To maintain this continuity, we compute the inner product of each column of $\hat{V}$ with the corresponding column in $\tilde{V}$ and use the resulting scalar to undo the phase modulation, i.e., $$\epsilon_m = \text{angle}(\tilde{v}_m^H v_m), \text{ and } v_m = v_m \cdot \exp(-j\epsilon_m).$$

8. Backprojection: In order to use the current steering vector estimates for the next processing block, we need to backproject the steering vector estimates for the reduced dimensional space to the measurement space. This yields the estimate of the steering matrix and can be accomplished as:

$$\hat{A} = E_s(\Lambda_s - \hat{\sigma}^2 I_{P_e})^{+\frac{1}{2}} \hat{V}.$$

$\hat{A}$ will be used in the next block as $\tilde{A}$ as an estimate of the steering matrix in the first step of the multiple port signal extraction unit.

9. Beamforming: It is important to note that beamforming for P sources requires a matrix multiplication of two matrices: the $\hat{V}$ matrix that is P by P, and the reduced dimensional observation matrix y(t), which is P by N, where N is the number of snapshots. Usually N is larger than P and this matrix multiplication may take a long time because of its size. Therefore, it may be appropriate to do final beamform ing in another processor since it does not introduce any feedback. Final beamforming is accomplished as:

$$\hat{s}(t) = \hat{V}^H y(t)$$

The estimated signals will be sent to the correct post processing units because of the orderings involved.

6.0 Steering Vector Tracking Method For Situations Having Relative Motion:

For situations in which there is relative motion of the source, receiving array, or multipath reflectors, it is desirable to generalize the CURE algorithms to exploit or compensate for the motion. One rather complicated way of doing this is to use an extended Kalman filter to track the changes in the generalized steering vectors derived by the CURE algorithms. Here we present a simpler method which merely involves using a variant of the iterative update equation used in the CURE algorithms. We present two such variants of the update equations, called α-βCURE and μCURE, that can be used principally to provide an improved initial weight vector for each block of array samples (snapshots). These update equations can be used with any of the CURE algorithms discussed in previous sections (CiCURE, eCURE, pipeCURE). Consequently α-βCURE and μCURE are not independent stand-alone algorithms, but rather are enhancements to CiCURE, eCURE, and pipeCURE that provide greater stability and less port-switching in dynamic situations.

The iterative update equations are given by:

$$w_{k+1} = \alpha w_k + \beta \text{ vect}[\text{cum}(.,.,.,.)] \quad (\alpha - \beta\text{CURE})$$

$$w_{k+1} = (1-\mu)w_k + \mu \text{ vect}[\text{cum}(.,.,.,.)] \quad (\mu\text{CURE})$$

$$= w_k + \mu[\text{vect}[\text{cum}(.,.,.,.)] - w_k].$$

These iterative update equations may be compared to the standard iterative update equation presented in previous sections for CiCURE, eCURE, and pipeCURE.

$$w_{k+1} = vect[cum(.,.,.,.)]. \quad \text{(CiCURE, eCURE, pipeCURE).}$$

In these equations, k is a time index, and $w_k$ is the linear combiner weight vector that converges to the generalized steering vector of one of the input source signals. The iteration on the index k is on individual snapshots or block of snapshots occurring through time, as opposed to multiple iterations within a block. The α-β and μ update method does not preclude iteration within a block. Indeed, within-block iteration can be used in conjunction with block-to-block updating or initialization. Generally, there is no advantage to using the α-β or μ update equations for within-block iteration. Within-block iteration should be done by the standard update equation. The α-β and μ update equations are best used for block-to-block updating, that is, to initialize a block's weight vector based on the final converged weight vector from the previous block.

Figures 19, 20:
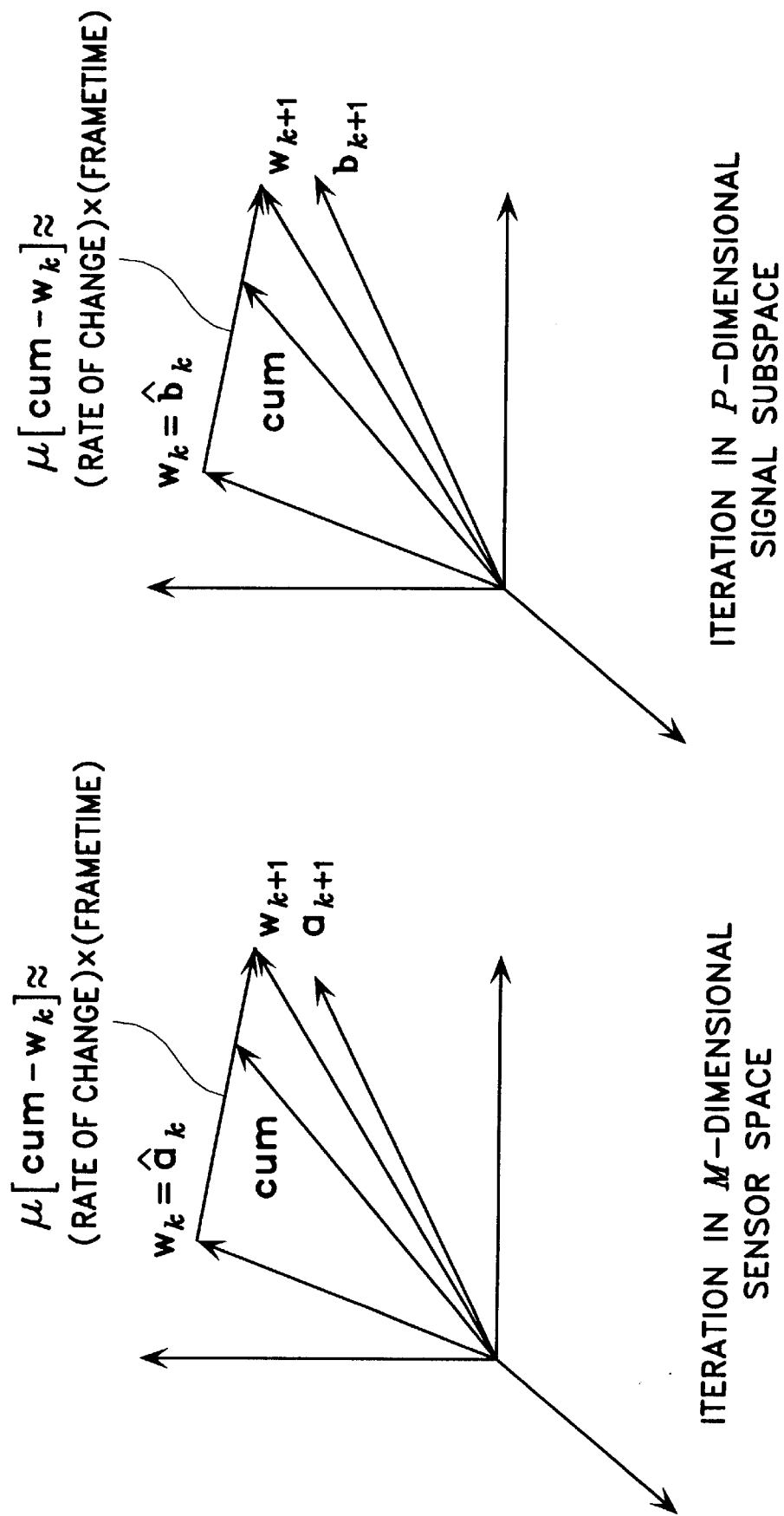
FIGS. 19 and 20 are vector diagrams depicting the effect of using α-βCURE and μCURE updating to initialize a block of samples for eCURE processing in the moving source situation such as shown in FIG. 18.

Two equivalent forms are given for the μCURE update equation. As is discussed below, the first form is most convenient when the purpose is to predict ahead, whereas the second form is most convenient when the purpose is to average previous data with new data. Although α-βCURE and μCURE appear to involve different update equations, the algorithms are equivalent provided there is a renormalization of the weight vector at every iteration. Because a weight vector renormalization is always used in the iterative steps to prevent the weight vector from shrinking monotonically, α-βCURE and μCURE are equivalent.

α-βCURE and μCURE updating can be used for determining the initial EGSV(s) of a block of samples subject to eCURE or pipeCURE processing. When used with eCURE, the block initialization can be performed in either the M-dimensional sensor space or the P-dimensional signal subspace. FIG. 19 and FIG. 20 show these two cases, respectivly. The application of α-βCURE and μCURE to CiCURE is similar to FIG. 19 but is not shown.

FIG. 19 shows the relations among various vectors in one cycle of the μCURE update operating in the M dimensions of the sensor space. Five vectors are shown. $w_k$ is the current weight vector at time k and is also the current estimate of the generalized steering vector $a_k$. The generalized steering vector at time k+1 is denoted $a_{k+1}$. $a_{k+1}$ is the generalized steering vector of which $w_{k+1}$ is an approximation. The cumulant vector cum=vect[cum(.,.,.,.)] is represented as a vector emanating from the origin. The scaled difference vector $\mu[\text{cum}-w_k]$ is shown as a vector originating at the tip of $w_k$ and extending through the tip of cum. The tip of this vector defines $w_{k+1}$.

For the case shown, μ is greater than unity, and the algorithm is anticipatory. This form of the μCURE update is useful when the purpose is to predict a generalized steering vector that is varying with time. It is instructive to think of the μCURE update as an equation of motion:

New Position=Old Position+Velocity×Elapsed Time, where New Position is identified with $w_{k+1}$; Old Position is identified with $w_k$; Velocity is identified with [cum-$w_k$]; and Elapsed Time is identified with μ.

Conversely, if μ is less than unity, the μCURE update functions as an averager rather than a predictor, putting weight (1-μ) on the current weight vector $w_k$ and weight μ on cum which is an estimate of the generalized steering vector $a_{k+1}$ (or its projection $b_{k+1}$). In this case, the tip of cum would lie to the right of $w_{k+1}$, and the scaled difference vector $\mu[\text{cum}-w_k]$ would point to, but not pass through, cum.

FIG. 20 similarly shows the vector relations for one cycle of the μCURE update when the iteration is performed in the P dimensions of the signal subspace. The vectors are similar to those in FIG. 19 with the key difference being that $b_k$ is the projection of the generalized steering vector $a_k$ into the signal subspace, and $w_{k+1}$ approximates $b_{k+1}$, the projection of $a_{k+1}$. At the conclusion of the iterations, the estimated generalized steering vector may be obtained by backprojecting the terminal weight vector w into the M dimensional sensor space.

α-β and μ iterative updating has an advantage in the situation where signal sources are persistent but moving (i.e., non-static geometry). CiCURE, eCURE, and pipeCURE are formulated in the batch-processing mode (i.e., array snapshots are processed one block of samples at a time) assuming the source geometry is static during a block. With these algorithms, only small changes in source geometry are allowed to occur from one block to the next. α-β CURE and μCURE accommodate greater changes from block to block by providing for tracking of the generalized steering vectors via the α-β tracking method, which is well known in the sonar and radar engineering literature.

In summary, α-βCURE and μ iterative updating have tracking capability inherently built in which can be used to improve the performance of CiCURE, eCURE, and pipeCURE in situations in which EGSVs are changing dynamically. This tracking capability enables the adaptation to geometrical changes that occur gradually over time. Abrupt changes, like the appearance of new signals or disappearance of old signals, and attendant port switching are a different problem. Detection logic is still required to mitigate port switching caused by abrupt changes.

7.0 Alternate Embodiment Using Direct or Analytic Computation:

Unlike the iterative methods presented in previous sections, this section presents a method for separating signals that is non-iterative. It is, in fact, a closed form, analytic solution for computing the cumulant vectors and generalized steering vectors without the need for iteration. Because the method is non-iterative, the issues of convergence and convergence rate are no longer of concern. Convergence is both assured and instantaneous.

In the direct method, the generalized steering vectors for a small number of sources (two in this example) are computed directly as set forth below, using one of two computational methods:

Steps of Operation for Method 1:

Compute the covariance matrix R for M channel measurements:

$$R = \frac{1}{N}\sum_{t=1}^{N} r(t)r^H(t)$$

Compute the eigendecomposition for R:

$$R = E_s \Lambda_s E_s^H + \sigma_n^2 E_n E_n^H$$

Compute the transformation matrix T:

$$T = E_s(\Lambda_s - \sigma_n^2 I)^{-\frac{1}{2}}$$

Preprocess the measurements by the transformation matrix:

$$y(t) = T^H r(t)$$

Compute the four by four cumulant matrix C from y(t):

$$C(P \cdot (i-1)+j, P \cdot (k-1)+l) = \text{cum}(y_i^*(t), y_j(t), y_k(t), y_l^*(t)) \quad 1 \leq i,j,k,l \leq 2$$

From its definition, the C matrix can be decomposed as:

$$C = \begin{bmatrix} C_{11} & C_{21}^H \\ C_{21} & C_{22} \end{bmatrix}$$

in which the three matrices $\{C_{11}, C_{22}, C_{21}\}$ are defined (because of prewhitening and circular symmetry assumption):

$$C_{11} = \begin{bmatrix} E\{|y_1(t)|^4\} - 2 & E\{|y_1(t)|^2 y_1(t) y_2^*(t)\} \\ E\{|y_1(t)|^2 y_2(t) y_1^*(t)\} & E\{|y_1(t)|^2 |y_2(t)|^2\} - 1 \end{bmatrix} = \begin{bmatrix} c_1 & c_2 \\ c_2^* & c_3 \end{bmatrix}$$

$$C_{21} = \begin{bmatrix} E\{|y_1(t)|^2 y_1(t) y_2^*(t)\} & E\{(y_1(t) y_2^*(t))^2\} \\ E\{|y_1(t)|^2 |y_2(t)|^2\} - 1 & E\{y_1(t) y_2^*(t) |y_2(t)|^2\} \end{bmatrix} = \begin{bmatrix} c_2 & c_4 \\ c_3 & c_5 \end{bmatrix}$$

-continued $$C_{22} = \begin{bmatrix} E\{|y_1(t)|^2|y_2(t)|^2\} - 1 & E\{|y_2(t)|^2 y_1(t)y_2^*(t)\} \\ E\{|y_2(t)|^2 y_2(t)y_1^*(t)\} & E\{|y_2(t)|^4\} - 2 \end{bmatrix} = \begin{bmatrix} c_3 & c_5 \\ c_5^* & c_6 \end{bmatrix}$$

Construct the fourth-order polynomial in terms of the complex variables $\{v_1, v_2\}$.

$$\frac{v_1}{v_2} = \frac{|v_1|^2(c_1 v_1 + c_2 v_2) + |v_2|^2(c_3 v_1 + c_5 v_2) + v_1^* v_2(c_2 v_1 + c_4 v_2) + v_2^* v_1(c_2^* v_1 + c_3^* v_2)}{|v_1|^2(c_2^* v_1 + c_3 v_2) + |v_2|^2(c_5 v_1 + c_6 v_2) + v_1^* v_2(c_3 v_1 + c_5 v_2) + v_2^* v_1(c_4^* v_1 + c_5^* v_2)}.$$

This requires the computation of the cumulants $\{c_1, \ldots c_6\}$ defined in the above item from the measurements.

Solve the polynomial for $\{v_1, v_2\}$. There is one trivial solution $\{v_1 = v_2 = 0\}$. Also note that if the vector $(v_1, v_2)^T$ is a solution, then the vector $(-v_2^*, v_1)^T$ is also a solution.

Evaluate the resultant cumulant strengths from the solutions to the polynomial:

$$|(v^* \otimes v)^H C(v^* \otimes v)|, \, v = [v_1, v_2]^H.$$

Determine the solution for the polynomial that results in the highest cumulant strengths to estimate sources. Let this be $(v_1, v_2)^T$. Then, $(-v_2^*, v_1)^T$ is the the second solution.

For each accepted solution v, we can find the corresponding steering vector in the M dimensional sensor space:

$$a = E_s(\Lambda_s - \sigma_n^2)^{1/2} v$$

Once the steering vector estimates are found as in the previous step:
1. Port association, and
2. Waveform continuity, can be implemented as described in Section 5.0 (pipeCURE).

Steps of Operation for Method 2

Compute the covariance matrix R for M channel measurements:

$$R = \frac{1}{N} \sum_{t=1}^{N} r(t) r^H(t)$$

Compute the eigendecomposition for R:

$$R = E_s \Lambda_s E_s^H + \sigma_n^2 E_n E_n^H$$

Compute the transformation matrix T:

$$T = E_s(\Lambda_s - \sigma_n^2 I)^{-\frac{1}{2}}$$

Preprocess the measurements by the transformation matrix:

$$y(t) = T^H r(t)$$

after which the measurements take the form:

$$y(t) = T^H r(t) = b_1 s_1(t)/\sigma_1^2 + b_2 s_2(t)/\sigma_2^2 + e(t)$$

Because of prewhitening, we have the following result for the steering vectors for the two sources in the two dimensional space:

$$b_1 = \begin{bmatrix} \cos\theta \\ \sin\theta e^{j\phi} \end{bmatrix}, \, b_2 = \begin{bmatrix} -\sin\theta e^{-j\phi} \\ \cos\theta \end{bmatrix}, \, \|b_1\| = \|b_2\| = 1, \, |b_2^H b_1| = 0.$$

Construct the three by two matrix F using five of the six cumulants:

$$F = \begin{bmatrix} c_1 & c_2 \\ c_2^* & c_3 \\ c_4^* & c_5 \end{bmatrix} = \begin{bmatrix} E\{|y_1(t)|^4\} - 2 & E\{|y_1(t)|^2 y_1(t) y_2^*(t)\} \\ E\{|y_1(t)|^2 y_2(t) y_1^*(t)\} & E\{|y_1(t)|^2 |y_2(t)|^2\} - 1 \\ E\{(y_1^*(t) y_2(t))^2\} & E\{y_1^*(t) y_2(t) |y_2(t)|^2\} \end{bmatrix}$$

which can be decomposed into the following three matrices:

$$F = \underbrace{\begin{bmatrix} 1 & 1 \\ \frac{\sin\theta}{\cos\theta} e^{j\phi} & -\frac{\cos\theta}{\sin\theta} e^{j\phi} \\ \left(\frac{\sin\theta}{\cos\theta} e^{j\phi}\right)^2 & \left(-\frac{\cos\theta}{\sin\theta} e^{j\phi}\right)^2 \end{bmatrix}}_{G}$$

$$\underbrace{\begin{bmatrix} \frac{\gamma_{4,1}}{(\sigma_1^2)^2} \cdot \cos^4\theta & 0 \\ 0 & \frac{\gamma_{4,2}}{(\sigma_2^2)^2} \cdot \sin^4\theta \end{bmatrix}}_{D} \underbrace{\begin{bmatrix} 1 & \frac{\sin\theta}{\cos\theta} e^{-j\phi} \\ 1 & -\frac{\cos\theta}{\sin\theta} e^{-j\phi} \end{bmatrix}}_{H}$$

Also form the four by four cumulant matrix C:

$$C(P \cdot (i-1) + j, P \cdot (k-1) + l) = \text{cum}(y_i^*(t), y_j(t), y_k(t), y_l^*(t)) \quad 1 \leq i, j, k, l \leq 2$$

The symmetries involved in this matrix reduces the number of distinct cumulants to six. In addition, five of the six cumulants necessary are already computed when we formed F.

Compute the Singular Value Decomposition (SVD) of the matrix F:
1. If the rank of F is zero, then source separation is not possible.
2. If the rank of F is one, then the principal eigenvector can be used to separate sources: assume $e_1$ is the principal eigenvector of F, and let its components are defined as:

$$e_1 = \begin{bmatrix} \alpha_1 \\ \alpha_2 \\ \alpha_3 \end{bmatrix}, \, |\alpha_1|^2 + |\alpha_2|^2 + |\alpha_3|^2 = 1$$

Then, we can obtain the estimate of the first source, using:

$$g_1(t) = \begin{bmatrix} \alpha_1 \\ \alpha_2 \end{bmatrix}^H y(t)$$

and the second source waveform can be estimated using:

$$g_2(t) = \begin{bmatrix} -\alpha_2^* \\ \alpha_1 \end{bmatrix}^H y(t)$$

3. If the rank of F is two, then the null eigenvector can be used to separate sources together with a solution of a quadratic equation: let x denote the 3 by 1 vector that is orthogonal to the columns of of F (which can be obtained using SVD or QR decomposition of F):

$$x^H F = 0, \ x = [x_1, x_2, x_3]^T$$

Then, due to the Vandermonde structure of the columns of G, we can obtain the parameters $$\left\{ \frac{\sin\theta}{\cos\theta} e^{j\phi}, -\frac{\cos\theta}{\sin\theta} e^{j\phi} \right\},$$

as the roots of the quadratic equation:

$$x^H z = 0, \ z = [z_1, z_2, z_3]^T \rightarrow x_1^* + x_2^* z + x_3^* z^2 = 0$$

Since we know the roots of the above equation should be $$\left\{ \frac{\sin\theta}{\cos\theta} e^{j\phi}, -\frac{\cos\theta}{\sin\theta} e^{j\phi} \right\},$$

and we have the weight vectors to separate the sources as:

$$g_1(t) = \begin{bmatrix} 1 \\ \frac{\sin\theta}{\cos\theta} e^{j\phi} \end{bmatrix}^H y(t) = s_1(t)/(\sigma_1^2 \cos\theta) + 0 \cdot s_2(t) + \begin{bmatrix} 1 \\ \frac{\sin\theta}{\cos\theta} e^{j\phi} \end{bmatrix}^H e(t)$$

$$g_2(t) =$$

$$\begin{bmatrix} 1 \\ -\frac{\cos\theta}{\sin\theta} e^{j\phi} \end{bmatrix}^H y(t) = s_2(t) e^{-j\phi}/(\sigma_2^2 \sin\theta) + 0 \cdot s_1(t) + \begin{bmatrix} 1 \\ -\frac{\cos\theta}{\sin\theta} e^{j\phi} \end{bmatrix}^H e(t)$$

In addition, we can normalize the weights to conform to the structure of the problem:

$$v_1 = \beta_1 \begin{bmatrix} 1 \\ \frac{\sin\theta}{\cos\theta} e^{j\phi} \end{bmatrix}, \ v_2 = \beta_2 \begin{bmatrix} 1 \\ -\frac{\cos\theta}{\sin\theta} e^{j\phi} \end{bmatrix}$$

in which $\{\beta_1, \beta_2\}$ are determined to make $\|v_1\| = \|v_2\| = 1$.

After the weights for signal separation are determined, then it is possible to compute cumulant strengths using: $|(v^* \otimes v)^H C(v^* \otimes v)|$, $v = [v_1, v_2]^H$ is one of the weight vectors.

For each solution represented by v, we can find the corresponding steering vector in the M dimensional sensor space:

$$a = E_s (\Lambda_s - \sigma_n^2)^{1/2} V$$

Once the steering vector estimates are found as in the previous step:
1. Port association, and
2. Waveform continuity
can be implemented as described in Section 5.0 (pipeCURE).

8.0 Separation Capacity and Performance When Overloaded:

When the number of incident signals exceeds the capacity of the system to separate signals, one would expect system performance to degrade. Unlike some other cochannel signal separation methods, the present invention is able to operate under such overload conditions.

Cochannel signal separation systems are designed to be able to separate and recover signals provided the number of cochannel signals incident on the array does not exceed a number that defines the separation capacity of the system. In the present invention, the separation capacity is equal to the number of sensors M in the receiving array. Consequently, a cochannel signal separation system based upon this method can have no more than M output ports. Of course, the number of output ports can be less than M. For instance, a system can have P output ports, where P<M. In this case the system could recover each of P signals from among M signals incident on the array. Each of the P signals is recovered by a different set of beamformer weights. Each such set or weight vector defines a sensor directivity pattern having M−1 nulls.

Next consider cochannel signals received at the receiving array consisting of a mixture of coherent and noncoherent multipath components. A complete description of how CURE algorithms behave in the presence of multipath is given in Section 9.0. In brief, signals with noncoherent multipath components are recovered on more than one output port. Each output port is associated with a single generalized steering vector. The system of the invention automatically creates groups of mutually coherent multipath arrivals and a different generalized steering vector is formed for each such group. Each group is treated as an independent signal and counts as one signal against the capacity M. The maximum number of such noncoherent groups that can be incident on the array for which the system can perform separation and recovery equals the separation capacity. In the present invention, this capacity equals the number of array elements M.

In overload situations, the cumulant optimization or iteration, which is the basis of the invention, still converges to a generalized steering vector of a signal or noncoherent multipath group. Consequently, the system of the invention determines up to M generalized steering vectors from which beamforming weights are computed and which can form up to M−1 generalized nulls. However, because the number of signals is greater than capacity, it is not possible to recover a given signal while simultaneously rejecting all other signals by means of generalized nulls. In particular, there are P−M excess signals (or G−M noncoherent groups) that leak through the beamformers for the recovered signals. These excess signals are rejected merely by the sidelobe suppression associated with each beamformer's directivity pattern. The signals that are captured for recovery by the system tend to be the strongest signals, while the excess signals tend to be among the weakest. The excess signals contribute to the noise floor of the output ports. However, their contribution is minimal because of their low relative power and the sidelobe attenuation. Consequently, the recovered signals at the output ports generally have low crosstalk levels and high signal-to-interference-plus-noise ratio (SINR).

Figures 21, 22:
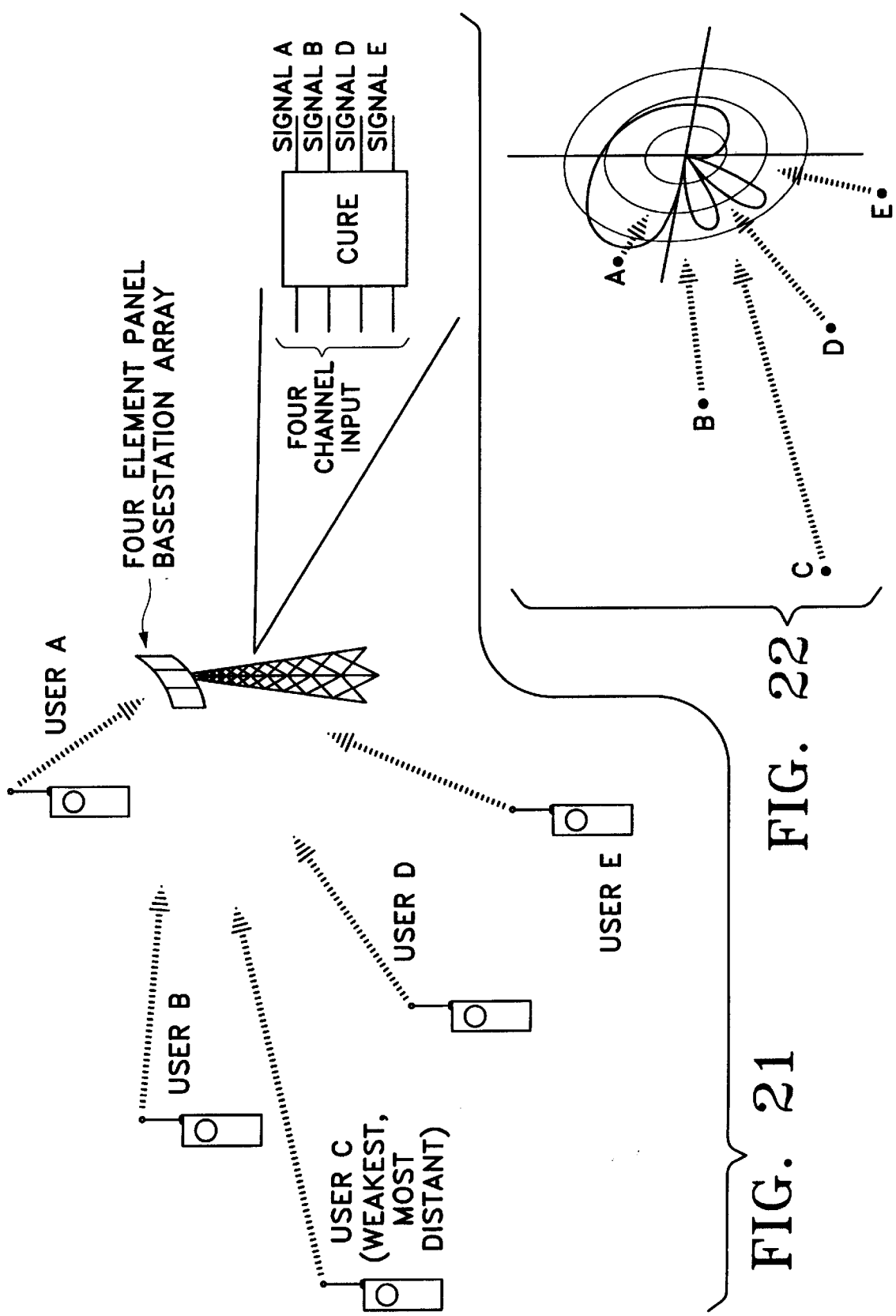
FIG. 21 is a schematic diagram showing an overload condition in which there are more signal sources that antenna elements.
FIG. 22 is a diagram of an antenna array directivity pattern for handling the situation shown in FIG. 21.

FIGS. 21 and 22 illustrate the overload concept diagrammatically. FIG. 21 shows a basestation having a four-element antenna array, which provides input signals to a CURE system for separating received cochannel signals. Because the antenna array has only four elements, the system has a capacity of four channels. The figure also shows five users, designated User A, User B, User C, User D and User E, all attempting to transmit signals to the basestation array. FIG. 22 shows a directivity pattern associated with the antenna array as conditioned by the CURE system to receive signals from User A. Because the array has only four elements, it can present directivity nulls in only three directions. In the example, the directivity pattern presents a strong lobe in the direction of User A, to receive its signals, and presents its three available nulls toward User B, User D and User E. User C, which produces the weakest and most distant signal, cannot be completely nulled out. Similar directivity patterns will be generated for receiving signals from User B, User D and User E. In each case, the weakest signal (from User C) will not be completely nulled out by the directivity pattern. The system continues to operate, however, and is degraded only in the sense that weaker sources exceeding the system capacity cannot be recovered and will produce some degree of interference with the signals that are recovered.

A general conclusion is that the various embodiments of the invention are tolerant of separation capacity (or number-of-signals) overload conditions. In other words, the various embodiments of the invention are "failsoft" with respect to overload beyond the signal separation capacities, and the ability to separate signals degrades gracefully as the number of signals is increased above the separation capacity. This property distinguishes CURE algorithms from DF-beamforming cochannel signal copy algorithms, such as MUSIC and ESPRIT, which do not function when overloaded. (MUSIC is an acronym for MUltiple Signal Identification and Classification, and ESPRIT is an acronym for Estimation of Signal Parameters via Rotational Invariance Techniques. For more information on these systems, see the papers cited in the "background" section of this specification.

9.0 Performance of the Invention in the Presence of Multipath:

This section discusses the performance of the CURE systems (CiCURE, eCURE, pipeCURE, etc.) when the signal environment includes multipath propagation. We confine the discussion to the phenomenon known as discrete multipath, as opposed to continuous volumetric scattering, which is more complicated to describe. However, the statements below apply to volumetric scattering under certain conditions.

Multipath propagation occurs when a signal from a source travels by two or more distinct paths to arrive at a receiving antenna from several directions simultaneously. A novel feature of the present invention is its ability to separate cochannel signals in a multipath signal environment.

Multipath propagation is caused by the physical processes of reflection and refraction. A similar effect is caused by repeater jamming, wherein a signal is received and retransmitted at high power on the same frequency. Repeaters are commonly used in radio communication to fill in shadow zones, such as around hills or inside tunnels, where the communication signal does not propagate naturally. Cochannel repeaters are also used in electronic warfare (EW) systems to "spoof" a radar system by retransmitting a radar signal with a random delay at sufficiently high power to mask the actual radar return. The amount of delay is set in order to cause a false distance to be measured by the radar.

Naturally occurring multipath propagation can consist of a small number of discrete specular reflections, or it can consist of a continuum of reflections caused by scattering from an extended object. The various multipath components arriving at the receiving antenna will generally be somewhat different. Differences among the various multipath components of a given source signal are (1) different directions of arrival (DOAs); (2) different time delays due to the different path lengths traveled; and (3) different Doppler shifts on each multipath component due to motion of the transmit antenna, receive antenna, or reflecting body.

Array-based cochannel signal separation and recovery systems traditionally have difficulty working in a multipath environment (i.e., when the one or more of the arriving signals incident on the array come from several distinct directions simultaneously). For example, most multiple source DF-beamforming signal copy systems generally do not work properly or well in a multipath environment, and special techniques such as spatial smoothing and temporal smoothing must be employed to DF on the individual multipath components of an arriving signal. The resultant system and processing complexities make DF-based cochannel signal recovery systems largely impractical for reception in signal environments characterized by significant multipath propagation. The cochannel signal separation capability of the CURE family of systems overcomes these limitations.

To understand how the CURE system behaves in the multipath context requires understanding the different types of multipath effects and how the system handles each type. In general, multipath arrivals of a source signal can be classified as either coherent or noncoherent depending on whether the arrivals' cross-correlation function computed over a finite time interval is large or small. Thus the designation coherent or noncoherent is relative to the length of the measurement interval. Coherent multipath components frequently occur in situations where the scatterering bodies are near either the transmit or receive antennas and are geometrically fixed or moving at low velocities. Noncoherent multipath is caused by path delay differences and Doppler shift differences that are large compared to the measurement window.

The CURE algorithms recover generalized steering vectors as opposed to ordinary steering vectors. An ordinary steering vector is the value of the array manifold at a single angle corresponding to a source's DOA. However in a multipath environment the received wavefield that the array spatially samples is composed of many plane waves for each source signal. Each source, therefore cannot be characterized by a single DOA or steering vector. We consider how the CURE algorithms behave under three cases:

Coherent multipath components,
Noncoherent multipath components,
Mixtures of coherent and noncoherent multipath components.

9.1 Performance Against Coherent Multipath:

In a coherent multipath signal environment, the CURE system finds a single steering vector for each independent signal source. However, these steering vectors do not correspond to the ordinary steering vectors, which could be innumerable in the presence of many multipath scatterers. Rather, the CURE vectors are generalized steering vectors that correspond to the sum of all the mutually coherent multipath components of a signal source incident on the array. In the case of a finite number of discrete multipaths, the generalized steering vector depends on the relative power levels, phases, and ordinary steering vectors of the multipath components.

The CURE signal recovery process is blind to the array manifold. Once the generalized steering vectors for the cochannel sources have been obtained, it is unnecessary to convert them to source directions of arrival (DOAs) by using the array manifold, as would generally be done in a system employing direction finding (DF). Instead, the beamforming weight vectors for signal recovery are computed directly from the generalized steering vectors. This is done by one of two methods: (1) by projecting each generalized steering vector into the orthogonal complement of the subspace defined by the span of the vectors of the other sources (by matrix transformation using the Moore-Penrose pseudo-inverse matrix); or (2) by using the Capon beamformer, also called the Minimum Variance Distortionless Response (MVDR) beamformer in the acoustics literature, to determine the recovery weight vectors from the generalized steering vectors. These solutions are both well known in the signal processing engineering literature. (See, for example, pp. 73–74 of Hamid Krim and Mats Viberg, "Two Decades of Array Signal Processing Research," IEEE Signal Processing Magazine, vol. 13, no. 4, pp. 67–94, July 1996, ISSN 1053-5888, or Norman L. Owsley, "Sonar Array Processing," Chapter 3 of Array Signal Processing, S. Haykin (ed.), Prentice-Hall, 1985, 445 pp., ISBN 0-13-046482-1.) If the generalized steering vectors are determined perfectly, i.e., no estimation error, then the former solution would provide zero crosstalk (or maximum signal-to-interference ratio) among the recovered signals at the beamformer output. The latter solution would provide recovered signals having maximum signal-to-interference-plus-noise ratio (SINR).

Each output port of the CURE-based system has a beamforming weight vector that is orthogonal or nearly orthogonal to the generalized steering vectors of the cochannel signals that are rejected by the output port. Each beamforming weight vector has a corresponding directivity pattern that assigns a gain and phase to every possible direction of arrival. These directivity patterns can have up to N−1 nulls, where N is the number of array elements. The nulls can be either physical nulls in prescribed directions-of-arrival (DOAs) or, in the case of coherent multipath, generalized nulls. Generalized nulls are not directional nulls but rather are formed when a directivity pattern assigns gains and phases in the directions of the coherent multipath components of an interfering signal such that the components sum to zero. Generalized nulls have a major advantage over physical nulls for combating cochannel interference from coherent multipath because fewer degrees of freedom (i.e., fewer array elements) are required to cause coherent multipath components to sum to zero than are required to directionally null each component separately.

Figure 23:
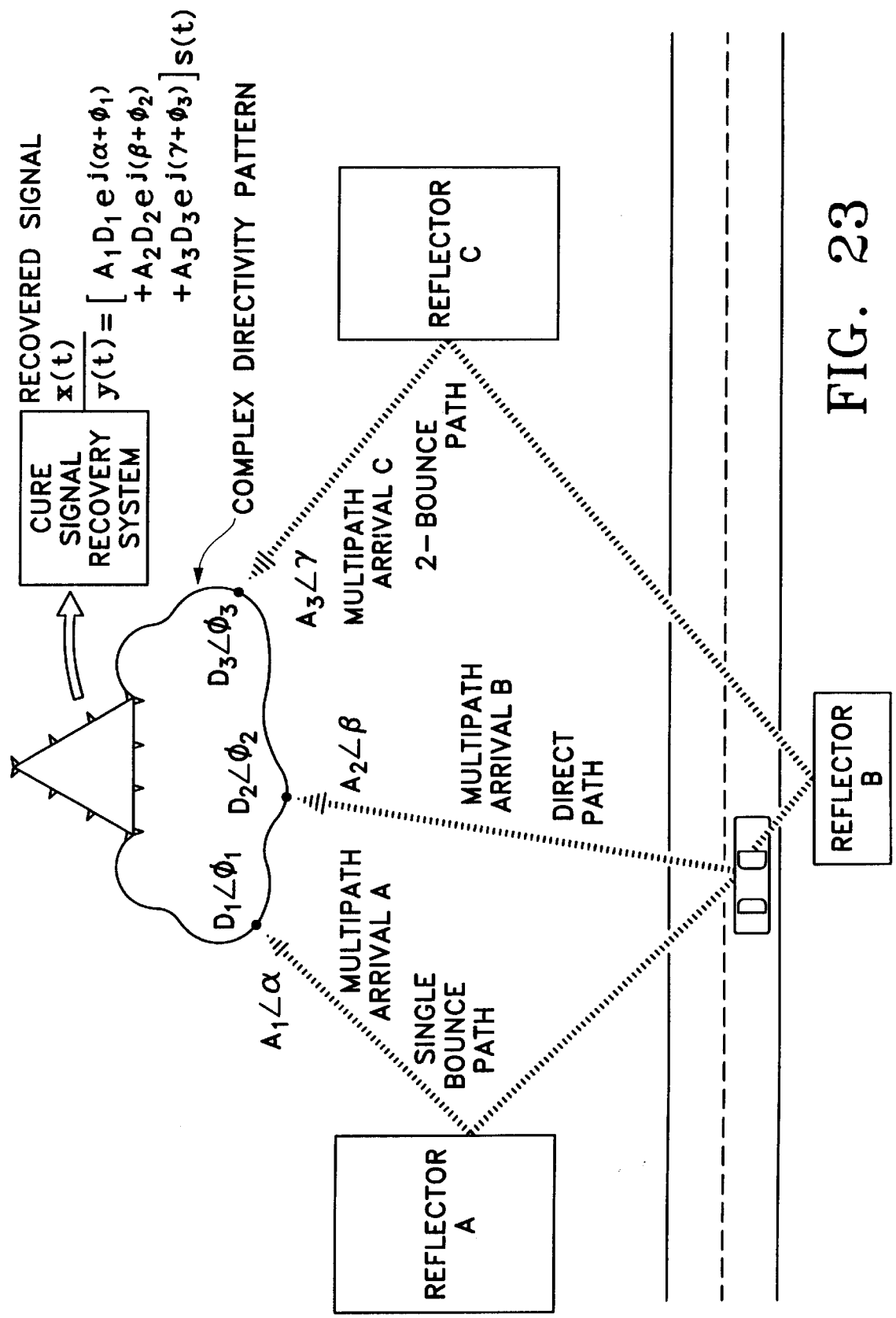
FIG. 23 is a schematic diagram depicting multipath propagation paths from a transmitter to a receiver array.

FIG. 23 illustrates these concepts for the case of a transmission received over a single-bounce path, designated multipath arrival A, a direct path, designated multipath arrival B, and a two-bounce path, designated multipath arrival C. The three multipath components are indicated as having steering vectors of amplitude and angle combinations $A_1 < \alpha$, $A_2 < \beta$, and $A_3 < \gamma$, respectively. The CURE signal recovery system of the invention presents a directivity pattern that assigns a gain and phase to every possible direction of arrival. The gains and phases corresponding to the three multipath components in this example are shown as $D_1 < \phi_1, D_2 < \phi_2$, and $D_3 < \phi_3$. The corresponding recovered signal for the combination of multipath components is derived from signals of the form:

$$y(t) = [A_1 D_1 e^{j(\alpha + \phi_1)} + A_2 D_2 e^{j(\beta + \phi_2)} + A_3 D_3 e^{j(\gamma + \phi_3)}] S(t).$$

Because the coherent multipath components of each output port's desired signal are optimally phased, weighted, and combined in the recovery process, the CURE method realizes a diversity gain in the presence of multipath in addition to eliminating cochannel interference. The amount of the gain depends on the number and strengths of the distinct multipaths that are combined.

9.2 Performance Against Noncoherent Multipath:

Multipath arrivals of a source signal are not always coherent and capable of being combined. The coherency requirement for CURE is that the multipath components of a signal must have high cross-correlation computed over the duration of a processing block or data collection interval. Multipath coherency can be destroyed by large path delay differences and large Doppler shift. When this happens (i.e., when the multipath arrivals are noncoherent), the CURE algorithms recognize and treat the arrivals as independent cochannel signals. The steering vector is estimated for each arrival, and each arrival is separately recovered and assigned to a different output port. Thus, multiple recovered versions of the source signal are formed. It is straightforward to recognize a noncoherent multipath situation because the same signal will be coming out of two or more output ports, each with a slightly different time delay or frequency offset.

Figure 24:
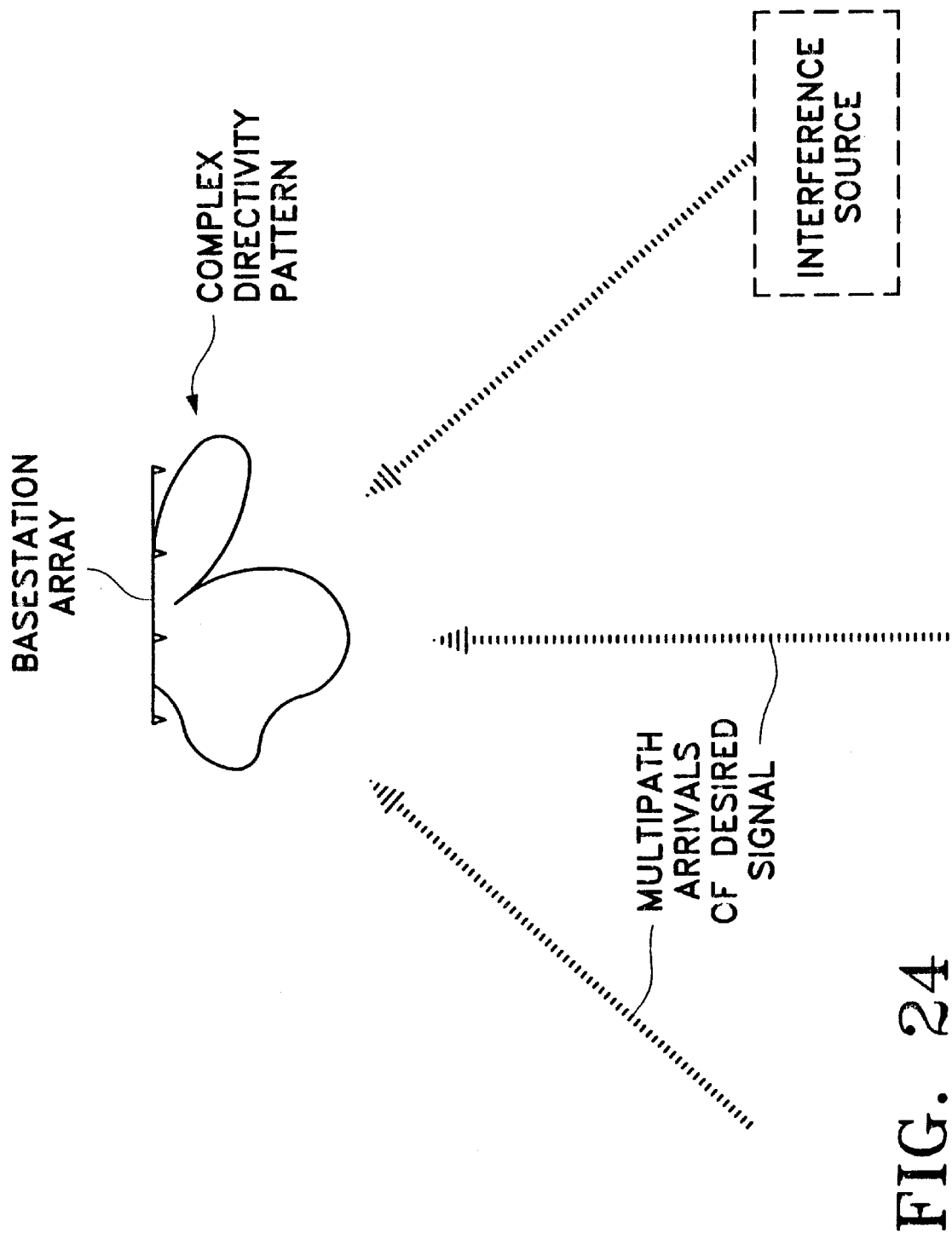
FIG. 24 is a schematic diagram depicting how the system of the invention handles coherent multipath signals in the presence of interference.

FIG. 24 shows the sensor array complex directivity pattern in a situation involving receipt of two coherent multipath components of a desired signal and a non-coherent signal from an interference source. As indicated in the drawing, the complex directivity pattern includes a null presented toward the interference source, while the two multipath components are received and combined in the same way as discussed above with reference to FIG. 23.

9.3 Performance Against Mixtures of Coherent and Noncoherent Multipath:

In the general case of both coherent and noncoherent multipath, the CURE algorithms automatically partition the multipath arrivals into mutually coherent groups, and determine a generalized steering vector for each group. As in the case of noncoherent multipath, multiple recovered versions of the source signal are formed. The diversity gain is diminished relative to what would have been achieved had the multipath arrivals all belonged to a single coherent group. However, the loss of diversity gain is offset by having multiple replicas of the recovered signal appear at the beamformer's outputs. Moreover, a post-recovery combining gain is possible by adding the signals at the output ports after correction for delay and Doppler shift. If the recovered signals are to be demodulated, this post-recovery combining step would precede demodulation.

Figure 25:
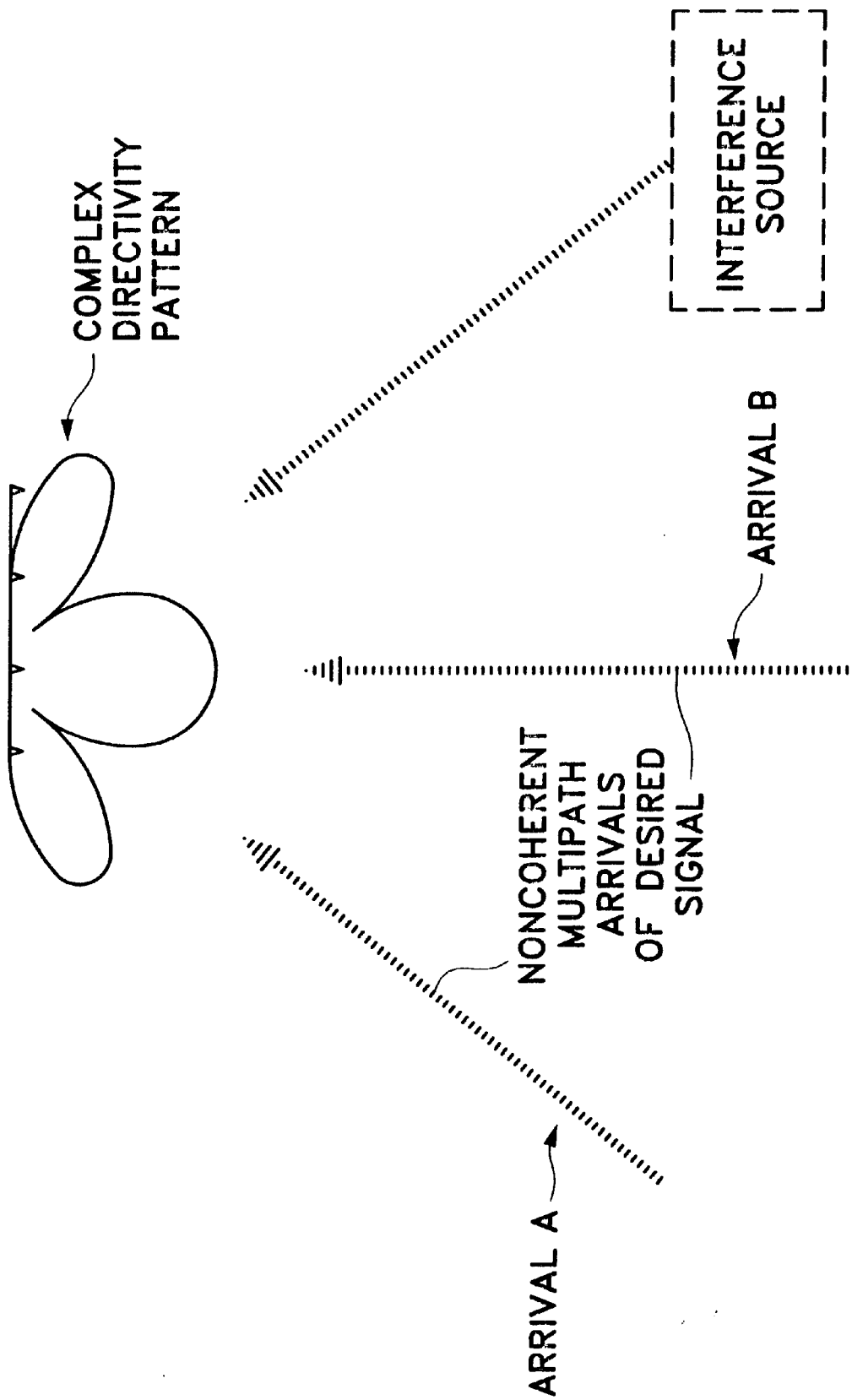
FIG. 25 is a schematic diagram depicting how the system of the invention handles non-coherent multipath signals in the presence of interference.

FIG. 25 shows the complex directivity pattern formed by the beamformer of the CURE system in a situation similar to that discussed above for FIG. 24, except that the desired signal multipath components are non-coherent instead of coherent. The CURE system treats the three arriving signals (the non-coherent multipath components and the interfering signal) as being from separate sources. The directivity pattern shown is the one that would be presented for recovery of the multipath component designated Arrival B. Physical nulls are presented toward the other arriving signals.

Figure 26:
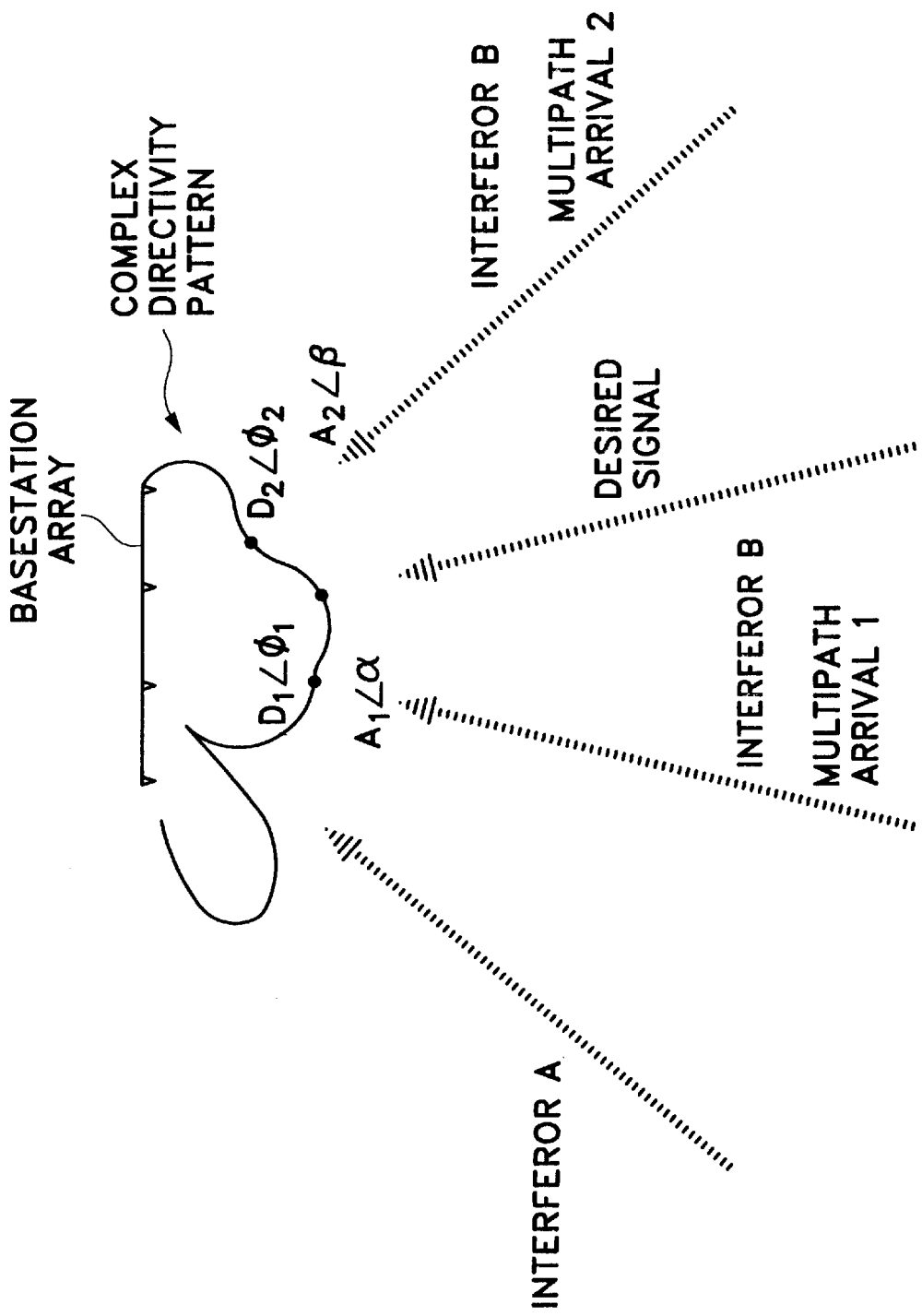
FIG. 26 is a schematic diagram depicting how the system of the invention handles receiving a desired signal in the presence of an interference signal with multipath components and a second interference source.

FIG. 26 shows a slightly different situation, in which the received signals include a first interferer (A), a second interferor (B) having two coherent multipath components, and a desired signal. Interferor A is rejected by a physical null in the complex directivity pattern. Interferor B is rejected by a generalized null in the directivity pattern, such that the algebraic sum of the multipath arrivals of the signal from Interferor B is zero. If the Interferor B signal arrivals are characterized by gains and phases $A_1 < \alpha$ and $A_2 < \beta$, and the directivity pattern at the angles of arrival of these components has gains and angles $D_1<\phi_1$ and $D_2<\phi_2$, then the necessary condition for rejection of the Interferor B signals by the generalized null is:

$$A_1 D_1 e^{j(\alpha+\phi 1)} + A_2 D_2 e^{j(\beta+\phi 2)} = 0.$$

10.0 Recovering Communication Signals In The Presence Of Interfering Signals:

This section describes how the present invention is used separate and recover signals received in the presence of other interfering signals emanating either from a local "friendly" source or from a deliberately operated jamming transmitter located nearby. The apparatus of the invention includes an antenna array and a cumulant recovery (CURE) processing system, which processes signals received through the antenna array and produces outputs at multiple ports corresponding to the multiple sources from which signals are received at the antenna array. The processing system converges rapidly on estimates of the desired signals, without knowledge of the geometry of the antenna array.

Two primary problems in this area are addressed by this aspect of the present invention. In one situation, an interfering transmitter may be "friendly," that is to say operated necessarily near a radio receiver, or even on the same ship or vehicle. Even if the transmitter is operating on a different frequency, there is often "spectral spatter" into the receiving band. In a related situation, the interfering transmitter is not "friendly" and is much more powerful than the communication signals to be received and recovered.

In the first case, it might be desired to listen and receive while jamming and transmitting simultaneously. Normally such simultaneous transmit and receive operations are not possible, but the friendly transmitter can be selectively turned off to permit reception. Prior to this invention, however, true simultaneous operation of the interfering transmitter and the receiver were often impossible.

In the second case, where a strong jamming signal is not under "friendly" control, recovery of the received communication signal requires the use of a nulling antenna array. In the past, systems for recovering a communication signal in the presence of jamming required knowledge of the antenna array geometry and did not always provide rapid convergence on the desired signal solution.]

Figure 27:
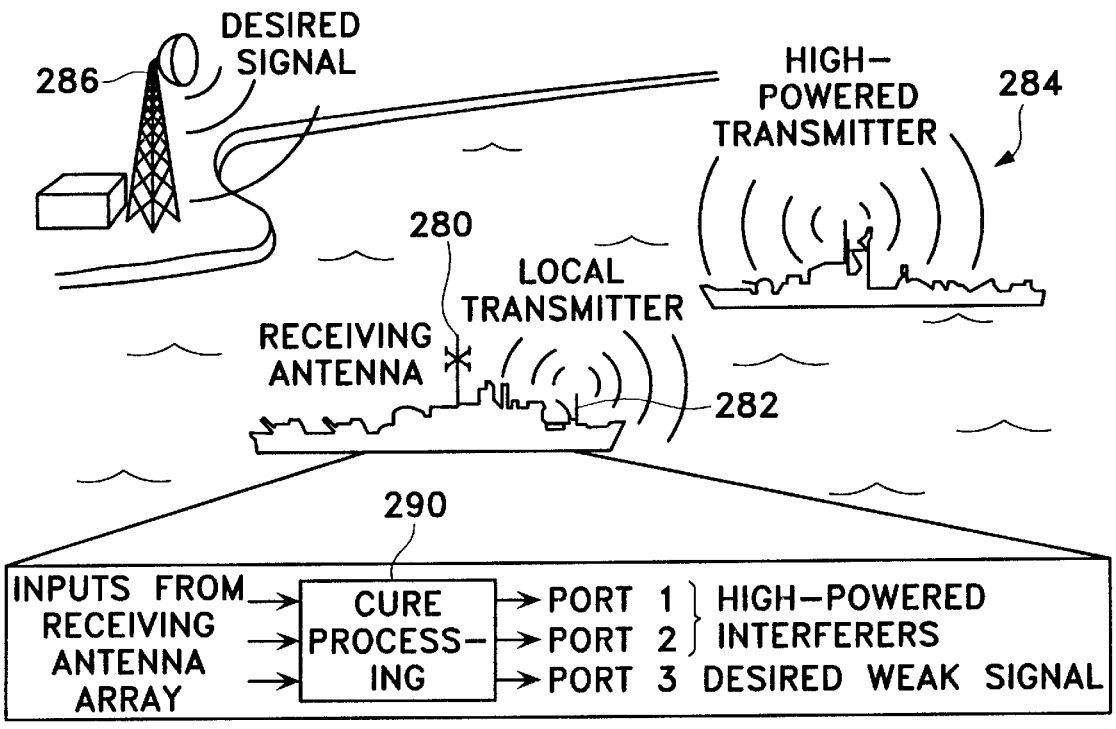
FIG. 27 is a schematic diagram depicting the invention as used in the recovery of a received signal in the presence of a strong local transmitter.

As shown in the drawings, the present invention pertains to systems for recovering communication signals in the presence of interfering or jamming signals, whether or not on the same frequency. More specifically, as shown in FIG. 27, a receiving antenna 280 may be located on the same vehicle or vessel as a local transmitter 282, and there may be a high-powered transmitter 284 located on a nearby friendly vessel operating at the same or a different frequency. A desired signal is received from another transmitter 106, located on land or on another vessel, but is subject to interference from the high-powered transmitter 284 and from the local transmitter 282. In accordance with the invention, the receiving antenna 280 is coupled to a cumulant recovery (CURE) processing system 290, which rapidly processes the signals from the antenna array 280 and generates outputs on multiple ports, effectively separating the signals received from the high-powered interfering transmitters and the desired received signal onto separate output channels, as indicated for ports #1, #2 and #3.

Figure 28:
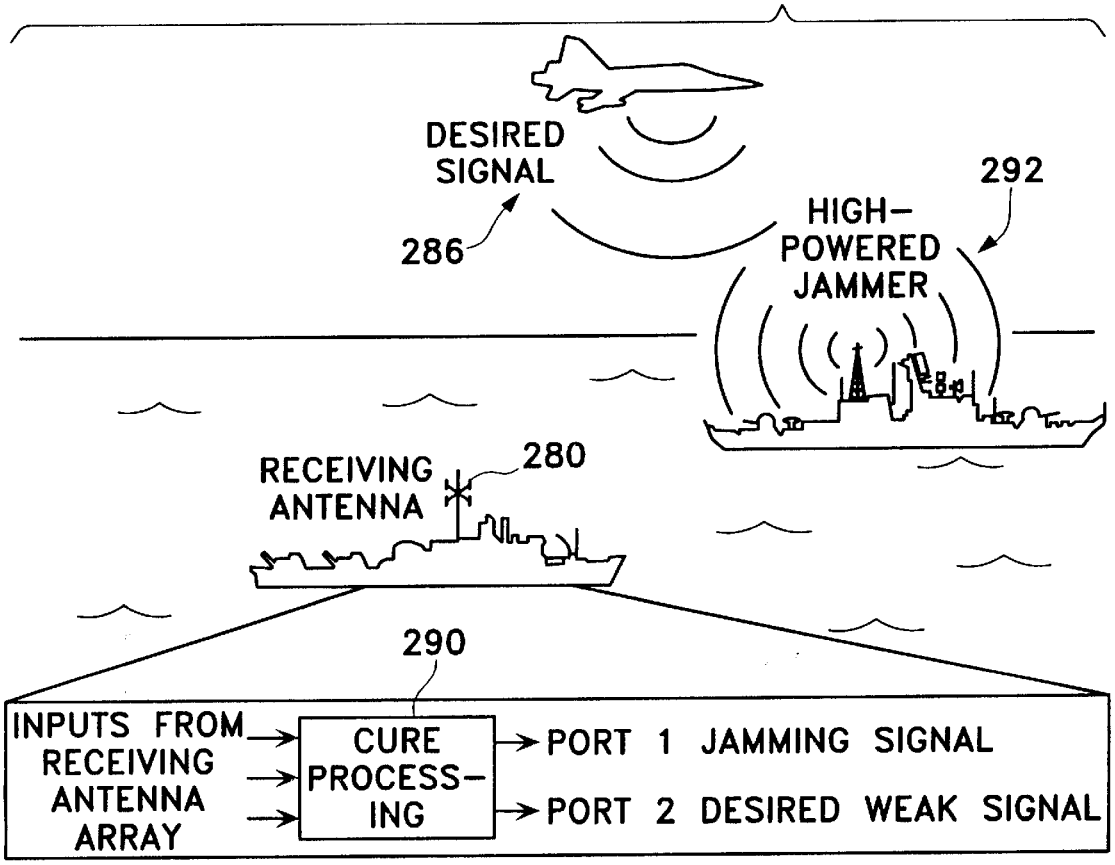
FIG. 28 is a schematic diagram depicting the invention as used in the recovery of a weak received signal in the presence of a strong jamming signal located nearby.

As shown in FIG. 28, a related situation is one in which reception at the receiving antenna 280 is interfered with by a high-powered jamming transmitter 292, perhaps on an enemy vessel. As in the previous case, the CURE processing system 290 separates and recovers the desired weak signal on one output port (#2), while the jamming signal is isolated and may be discarded from port #1.

11.0 Diversity Path Multiple Access (DPMA) Communication:

The blind cochannel signal separation capability of the CURE algorithms can be used to make possible a new communication channel access scheme: Diversity Path Multiple Access (DPMA). This technique enables the design of new communication networks that can accommodate more users simultaneously in a given bandwidth allocation.

The demand for communication services has grown steadily over the past three decades. To a limited extent this demand has been offset by technological improvements that have made new bandwidth available at higher frequencies up to the optical frequency band. Such bandwidth improvements, however, have been unable to keep pace with the growing demand for communication, and new communication methods became necessary. In response, communication system engineers have developed new methods for communication, including networks, control protocols, channel access schemes, and modulation schemes. The principal goal of these developments is to enable more users to use and share a communication resource simultaneously without degrading the quality or creating mutual interference.

11.1 History and Prior Art of Multiple Access Communication:

Prior to this invention, communication engineers had six channel-access schemes at their disposal whereby multiple users in a network could share an RF communication channel in order to transmit simultaneously, more or less, to a central receiving site (e.g., cell base station or satellite). Communication engineers would use any of the following schemes to enable radio communication between multiple users and a single or multiple base stations. For a wireless network design, a communication engineer would pick one or more of the following methods as the basis for the design.

Frequency division multiplexing/multiple access (FDM/FDMA)

Spatial division multiplexing/multiple access (SDM/SDMA)

Time division multiplexing/multiple access (TDM/TDMA)

Code division multiplexing/multiple access (CDM/CDMA)

Frequency hop multiplexing/multiple access (FHM/FHMA)

Angle division multiplexing/multiple access (ADM/ADMA).

Although the terminology in this technology is still evolving, the following distinction is often made. If two transmissions are cooperative, in the sense of being part of a common communication network, the term "multiple access" is used. If the transmissions are independent and not part of a network, the term "multiplexing" is commonly used. The distinction is minor and we shall largely ignore it in this description.

In FDMA, different transmitting users are assigned to different frequencies. More precisely each transmitting user is assigned a different spectral slice that doesn't overlap with those of other users. FDMA was historically the first multiplexing/multiple access method to develop. Its origin is traced back to the beginning of radio, and it is the basis for radio and television broadcast services, whereby an individual is able to receive and select among the signals transmitted by many stations. In an FDMA network, the transmitting users signals are not cochannel, and cochannel interference is thereby avoided.

The remaining five channel access schemes enable two or more users to be on the same frequency at the same time (i.e., user transmitted signals can be cochannel). The schemes mitigate or prevent mutual interference by different means.

Figure 29:
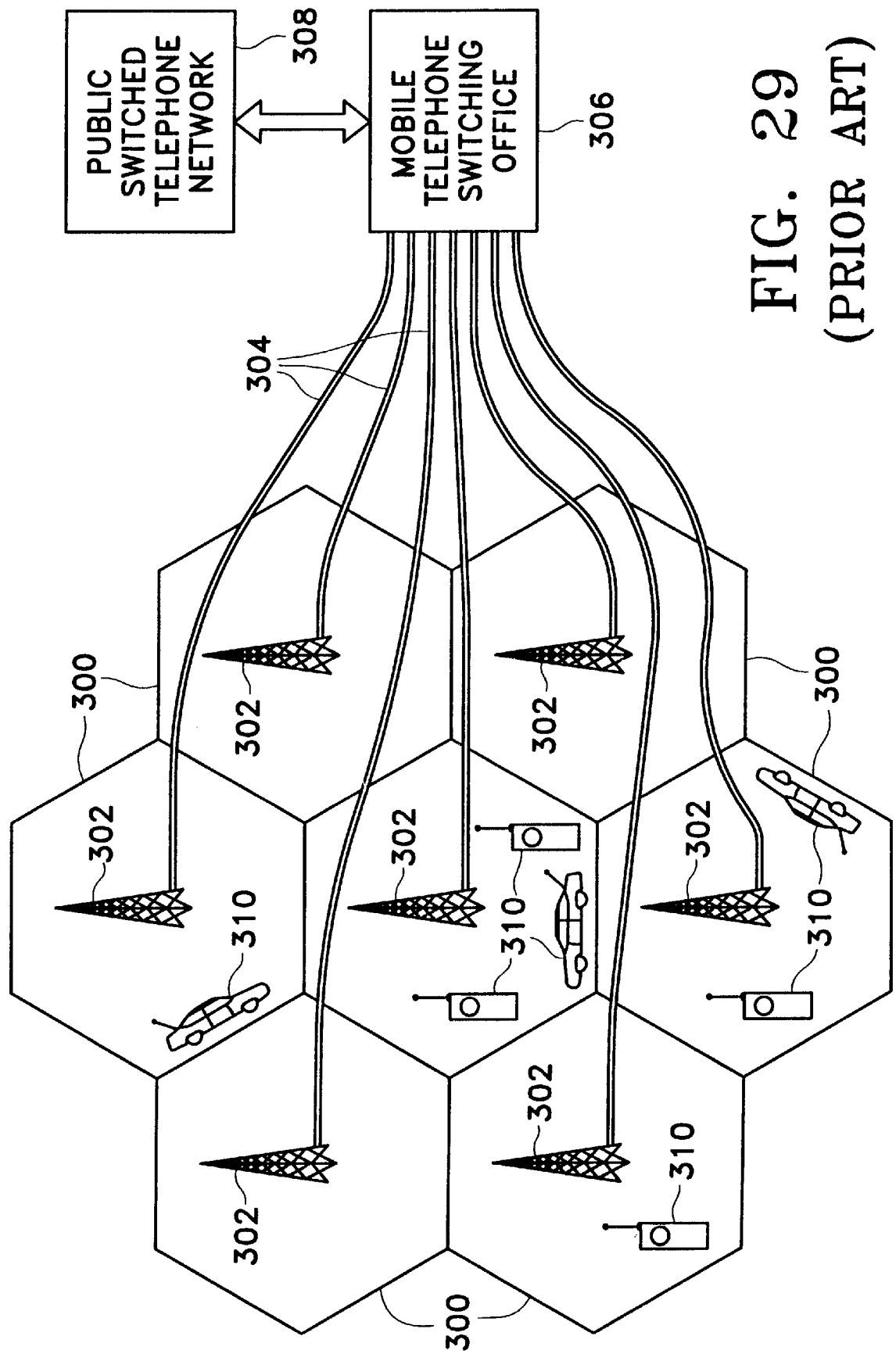
FIG. 29 is a schematic diagram depicting portions of a cellular telephone communication system of the prior art.

SDMA is the cellular concept, which originated at Bell Laboratories (*The Bell System Technical Journal,* special issue on Advanced Mobile Phone Service, vol. 58, no. 1, January 1979). Users are divided geographically into cells, seven of which are indicated at 300 in FIG. 29. Each cell 300 has a base station 302, and the base stations are linked together via fixed land lines 304 or point to point microwave links. A central facility, the mobile telephone switching office (MTSO) 306, controls network operation and generally serves as a gateway for tying the mobile network to other communication services such as the public switched telephone network (PSTN) 308. The set of base stations 302 and the MTSO 306 form the "backbone" infrastructure of the mobile network. Each base station 302 has a finite set of frequencies for sending and receiving, and adjacent cells 300 have different sets of frequencies. Within each cell, FDMA is employed to prevent cochannel interference. There are only a finite number of frequency sets available, and base stations 302 that are separated by some minimum distance use the same frequency sets. Thus, two transmitting users, indicated at 310 that are on the same frequency are necessarily in different cells some distance apart. Each users signal enters the backbone through a different base station. The geographic distance between cells prevents cochannel interference.

SHMA prevents cochannel interference by prohibiting intracell frequency reuse and allowing only intercell frequency reuse. The remaining four channel access schemes TDMA, CDMA, FHMA, and ADMA overcome this restriction and enable frequency reuse among users within a cell-intracell frequency reuse.

In TDMA, all users transmit on the same frequency. Each transmitting user is assigned a unique time slot in which to transmit. The average rate of information transmission equals the peak or instantaneous rate times a duty factor which is the slot duration divided by the revisit interval. Although the users are sending at the same time, TDMA prevents cochannel interference because the users do not actually transmit simultaneously.

CDMA is a form of direct sequence spread spectrum in which the various users encode their transmissions with orthogonal or nearly orthogonal spreading sequences. All transmitting users use the same frequency. In order to receive a particular signal, a receiver must despread the signal using the same sequence that was used to spread it at the transmitter. Because of the orthogonality property, the cross-correlation between any two spreading codes is near zero. For this reason, the user signals after reception and despreading are free of cochannel interference. CDMA is the basis of the IS-95 communication standard.

FHMA is used to apply frequency hop spread spectrum technology to communication networks. A set of frequency hopping (FH) radios operate in the same band on the same hop frequencies and transmit to a central receiving facility or base station without mutual interference provided the radios use non-interfering hop sequences. Unlike CDMA, the required sequence property is not orthogonality or low cross-correlation, but rather a mathematical relative of the Latin Square. FHMA can be thought of as a dynamic form of FDMA in which the frequency assignments change regularly.

Figure 30:
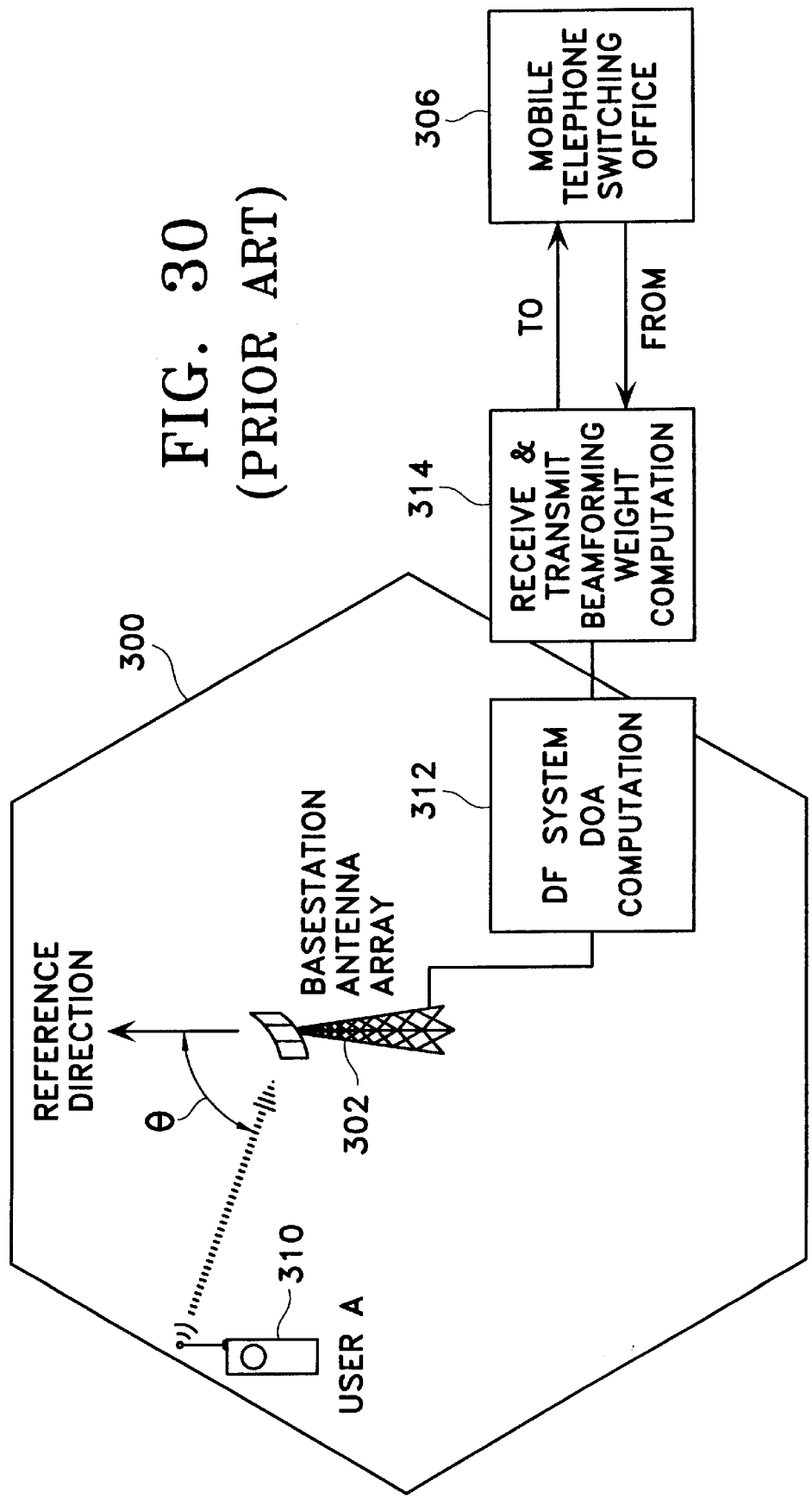
FIG. 30 is a schematic diagram depicting how a communication system of the prior art separates cochannel signals.

ADMA, which is shown in FIG. 30, uses multi-source direction finding (DF) and beamforming technology to isolate and recover the signals from the transmitting cochannel users in a cell. Each base station 302 is equipped with a receiving array connected to an N-channel receiver (not shown), where N is the number of antennas in the receive array. The received signals are processed by a multi-source DF system 312 to determine the directions or angles of arrival (DOAs) of the signals on a given frequency. Any multi-source DF algorithm can be used to perform the DF function, such as MUSIC, ESPRIT, or WSF, all of which are well known in the signal processing engineering literature. Each user 310 is characterized by a single unique DOA. Beamforming weight vectors are then computed, as indicated in block 314, from the estimated directions that enable the cochannel signals to be recovered (separated and copied). A transformation matrix, whose rows are the beamforming weight vectors, multiplies the array signals, and the product yields the recovered cochannel signals. Each row of the transformation matrix (i.e., each weight vector) consists of complex numbers that steer the array to one particular signal while putting directional nulls in the directions of the other cochannel signals. The transmitted user signals can be recovered free of cochannel interference provided the users are angularly dispersed such that they have distinct bearing angles measured at the receive array. ADMA is described in a recent patent by Roy and Ottersten (Richard. H. Roy, III, and Bjorn Ottersten, *Spatial Division Multiple Access Wireless Communication Systems,* U.S. Pat. No. 5,515,378, May 7, 1996), but the patent specification uses the term SDMA.

11.2 A New Method of Multiple Access Communication:

The present invention achieves a new method for channel access in wireless communications that is distinct from the six basic methods described above. The new method is termed diversity path multiple access (DPMA). It overcomes three limitations of ADMA.

First, wireless channels (characterized by their angle spread, delay spread, and Doppler spread) are dominated by multipath. The transmitting user signals arrive at a base station from a multiplicity of directions simultaneously. Angle spread arises due to multipath from local scatterers and remote scatterers. The local scatterers are near the user and near the base station. Measurements have shown that angle spreads for cellular channels generally lie in the range from 2 to 360 degrees. Therefore multipath cannot be ignored, and the idea that a user's signal arrives from a single unique direction is demonstrably not true. The ADMA concept of a single wave arriving from a single direction characterized by a pair of angles for each cochannel signal source is valid in free-space communications, perhaps, but is not valid for wireless communication networks operating in the ultra high frequency (UHF) band in urban, suburban, or rural environments.

Second, most multi-source DF algorithms generally do not work properly or well in a multipath environment. Although well-known techniques such as spatial smoothing and temporal smoothing can be used to DF on the individual multipath components of an arriving signal, the resultant system/processing complexities make such approaches impractical.

Third, even when multipath is absent, ADMA requires the transmitting cochannel users DOAs to be distinct. That is, the angular separation between users cannot be zero. The users must be separated in angle from one another by some minimum angle. The assignment of a frequency to several cochannel users must take this geometric restriction into account. This limits the utility of ADMA.

The cochannel signal separation capability of the CURE algorithms overcomes the limitations of ADMA. CURE algorithms recover generalized steering vectors as opposed to ordinary steering vectors. An ordinary steering vector is the value of the array manifold at a single angle corresponding to a source's DOA. However, in a multipath environment, the wavefield at the receiving array is composed of more than one plane wave for each source signal. Consequently, sources cannot be characterized unique DOAs or steering vectors.

The CURE signal recovery process is blind to the array manifold. The CURE algorithms find, for each source, a generalized steering vector that corresponds to the sum of all the mutually coherent multipath components of a signal source incident on the array. The generalized steering vector depends on the relative power levels, phases, and ordinary steering vectors of the multipath components. Formally, each generalized steering vector is a complex weighted sum of the array manifold steering vectors at the multipath arrival directions. The complex weights account for path length and attenuation differences among the multipath arrivals. In some cases, the multipath structure consists of a continuum rather than a few discrete components. In such cases the generalized steering vector becomes an integral of the array manifold over all directions. The CURE system determines the generalized steering vectors directly from the received signals, not from the array manifold. Indeed, the various embodiments of the CURE system do not need the array manifold to perform signal separation and recovery.

Once the generalized steering vectors for the cochannel sources have been obtained, it is unnecessary to convert them to source DOAs by using the array manifold, as would generally be done in a system employing DF such as ADMA. Using CURE, the beamforming weight vectors for signal recovery are computed directly from the generalized steering vectors. This is done by one of two methods: (1) projecting each generalized steering vector into the orthogonal complement of subspace or span of the vectors of the other sources; (2) using the minimum variance distortionless beamformer (MVDR) equations to determine the recovery weight vectors from the generalized steering vectors. These solutions are both well known in the signal processing engineering literature. If the generalized steering vectors are determined perfectly, i.e., no estimation error, then the former solution would provide zero crosstalk (i.e., maximum signal-to-interference ratio) among the recovered signals at the beamformer output. The latter solution would provide recovered signals having maximum signal-to-interference-plus-noise ratio (SINR).

Figure 31:
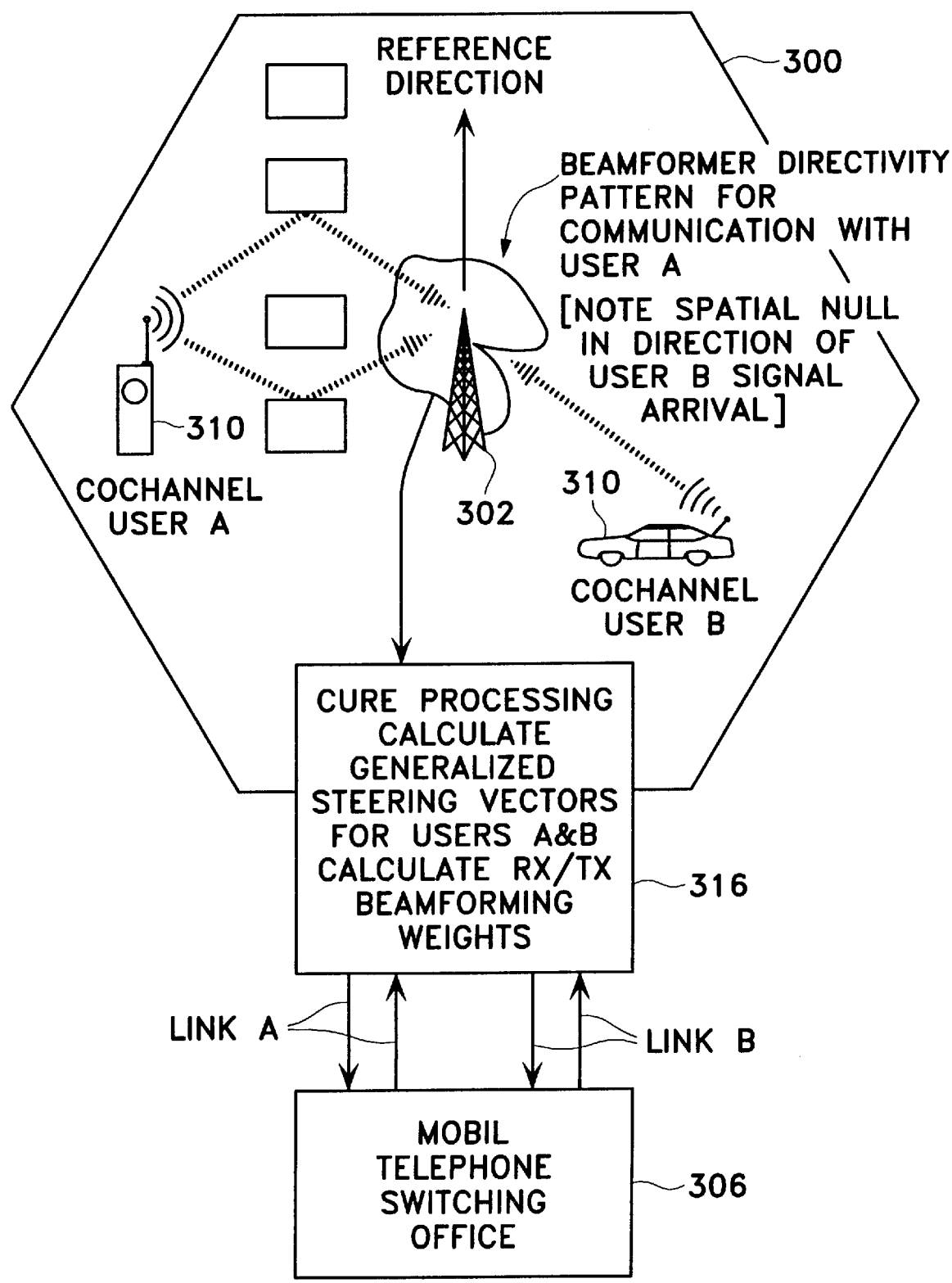
FIG. 31 is a schematic diagram depicting how the present invention operates in the environment of a cellular telephone communication system.

An illustration of how the invention is used in the context of a DPMA communication system is provided in FIG. 31, which shows a single cell 300, with a basestation 302 and two users 310. One user (A) reaches the basestation through multipath propagation, while the other has a direct propagation path to the basestation. A CURE processing system 316 receives and processes the signals received by the basestation 302. In communicating with cochannel user A the system 316 generates a beamformer directivity pattern that presents a physical null toward the other user, but presents a generalized steering vector that results in both multipath components from cochannel user A being received and combined.

A feature of the CURE systems is that the omnipresence of multipath enables the recovery (separation and copy) of signals from sources that have zero angular separation from the point of view of the receiving base station array. For example, consider two sources that are collinear with the base station such that one source lies behind the other. Although the direction to both sources is identical and the ordinary steering vectors for line of sight propagation are identical, the multipath configurations are entirely different. Therefore, the generalized steering vectors of the two sources will be entirely different. This facilitates the separation and recovery of the cochannel source signals in situations where ADMA cannot work.

Because the coherent multipath components are optimally phased, weighted, and combined in the recovery process, the CURE method realizes a diversity gain in the presence of multipath. The amount of the gain depends on the number of distinct multipaths that are sufficiently coherent to be able to be combined.

Not all multipath components of a source will be coherent and capable of being combined. The coherency requirement is that the multipath components of a signal must have high cross-correlation computed over the duration of a processing block or data collection interval. Multipath coherency can be destroyed by large path delay differences and large Doppler shift. When the multipath components of a signal source are not all mutually coherent, the CURE algorithms automatically partition the multipath arrivals into coherent groupings, and determine a generalized steering vector for each group. When this happens, multiple recovered versions of the source signal are formed. The diversity gain is diminished relative to what would have been achieved had the multipath arrivals all belonged to a single coherent group. However, the loss of diversity gain is offset by having multiple replicas of the recovered signal appear at the beamformer's outputs.

By using the multipath combining feature of the CURE algorithms, a new communication network channel access method is achieved: DPMA. In DPMA, the communication path that defines the link from a transmitting user to a receiving base station consists of a weighted combination of multipaths. The multipath processing capability of the CURE systems provide a practical means for implementing a communication network employing DPMA. The CURE algorithms determine the complex multipath-combining weights of a desired signal automatically, dynamically, and in real time, while rejecting the multipaths of cochannel other-user signals.

It is important to note the difference between DPMA and ADMA. The orthodox ADMA concept consists of a single wave arriving from a single direction for each signal source (i.e., a multipath-free environment). A direction-finding algorithm is employed to estimate the direction parameter associated with each arriving cochannel signal. Under this model, two signals are inseparable if their directions of arrival are identical (i.e., if the sources are collinear with the receive array). DPMA by contrast operates in a signal environment where multipath is a key feature. DPMA, unlike ADMA, is tolerant with regard to angular separation between sources. Even collinear sources having zero angular separation at the receiving array are separable because different multipath structures cause the sources to have different generalized steering vectors which the CURE algorithms exploit.

12.0 Application To Two-Way Mobile Wireless Communication Systems:

The CURE cochannel signal separation technology is applicable to communication networks composed of two-way communication links in which multiple transmissions occur simultaneously on the same frequency. The natural application for CURE is to the receiving end of a communication link provided it is practical to have an antenna array at the receiving end. For a two-way communication link, this would mean having a receiving antenna array at both ends of the link. In many situations, however, it is practical to have an array at only one end of a communication link. For instance, in personal mobile wireless communication networks, it is impractical to have an array built into the user's portable handheld units. In such situations, it is possible, under certain conditions, to establish and maintain isolation between different cochannel users by putting arrays at just one end of the communication link.

CURE cochannel signal separation technology can be applied to cellular communication systems in which the earth's surface is partitioned into localized regions called 'cells,' as described above with reference to FIG. 29. Examples of cellular personal mobile wireless communication systems are the Advanced Mobile Phone System (AMPS) and Global System Mobile (GSM). (See *The Bell System Technical Journal,* special issue on Advanced Mobile Phone Service, vol. 58, no. 1, January 1979.)

The CURE cochannel system has been described to this point as a technology used at the receiving ends of communication links provided the receiving ends have multi-element antenna arrays. In the case of cellular networks, however, economics dictates that arrays be put at base stations only. There are two reasons for this:

An antenna array is a large and expensive physical asset, best suited to installation at fixed base stations where proper maintenance and repair is possible. Mobile units would be larger and more expensive if they were required to have antenna arrays built in.

A single base station array can serve many users at once. Since each cell has more mobile units than base stations, total system cost is lower if arrays are employed at the base stations only.

The effect of locating arrays at base stations is to lower the initial equipment purchase cost to the subscribers while increasing the infrastructure cost, which is spread over all subscribers in the form of monthly service charge.

Like the application to cellular networks, CURE cochannel signal separation technology can be applied to satellite-based personal communication networks in which a space-based array on a satellite forms spot beams on the surface of the earth that define regions similar to the cells formed with terrestrial base stations. All communication within a spot beam is between the mobile users and the satellite. Communication that bypasses the satellite, between two users in the same spot beam, is precluded. Examples of satellite-based personal mobile wireless communication systems are Iridium, Odyssey, and Global Star.

There are several reasons and advantages relative to the use of CURE cochannel signal separation technology in personal mobile wireless communication networks.

The capacity of a network to accommodate users can be increased by employing intra-cell frequency reuse. CURE technology makes this possible by means of diversity path multiple access (DPMA) on the reverse links or uplinks from mobile user-to-base stations or satellite and by transmit beamforming on the forward links or downlinks from base station or satellite to mobile user.

Apart from capacity improvement, CURE provides diversity gain which, when used with suitable power control algorithms, can enable the mobile users to maintain reliable communication with less average transmitted power.

CURE provides general interference immunity not only from other users in the network but from arbitrary radiated interference, whether deliberate or unintentional.

12.1 Transmit Beamforming:

The selectivity that enables several users to simultaneously share a radio-frequency (RF) channel for transmission can be accomplished by beamforming at the transmitters instead of at the receivers. In the case of a cellular network, it is possible, by means of transmit beamforming, for forward link transmissions (from base station to mobile user) to be sent out with directivity patterns that reach the intended user while preventing reception at other cochannel users. Two methods can be used to accomplish the requisite transmit beamforming function: switched fixed beams and adaptive beams. The basic principles of both approaches are known in communication engineering. However, proper operation depends on integration with the receive beamforming function provided by the CURE system. This integration is described below.

Figure 32:
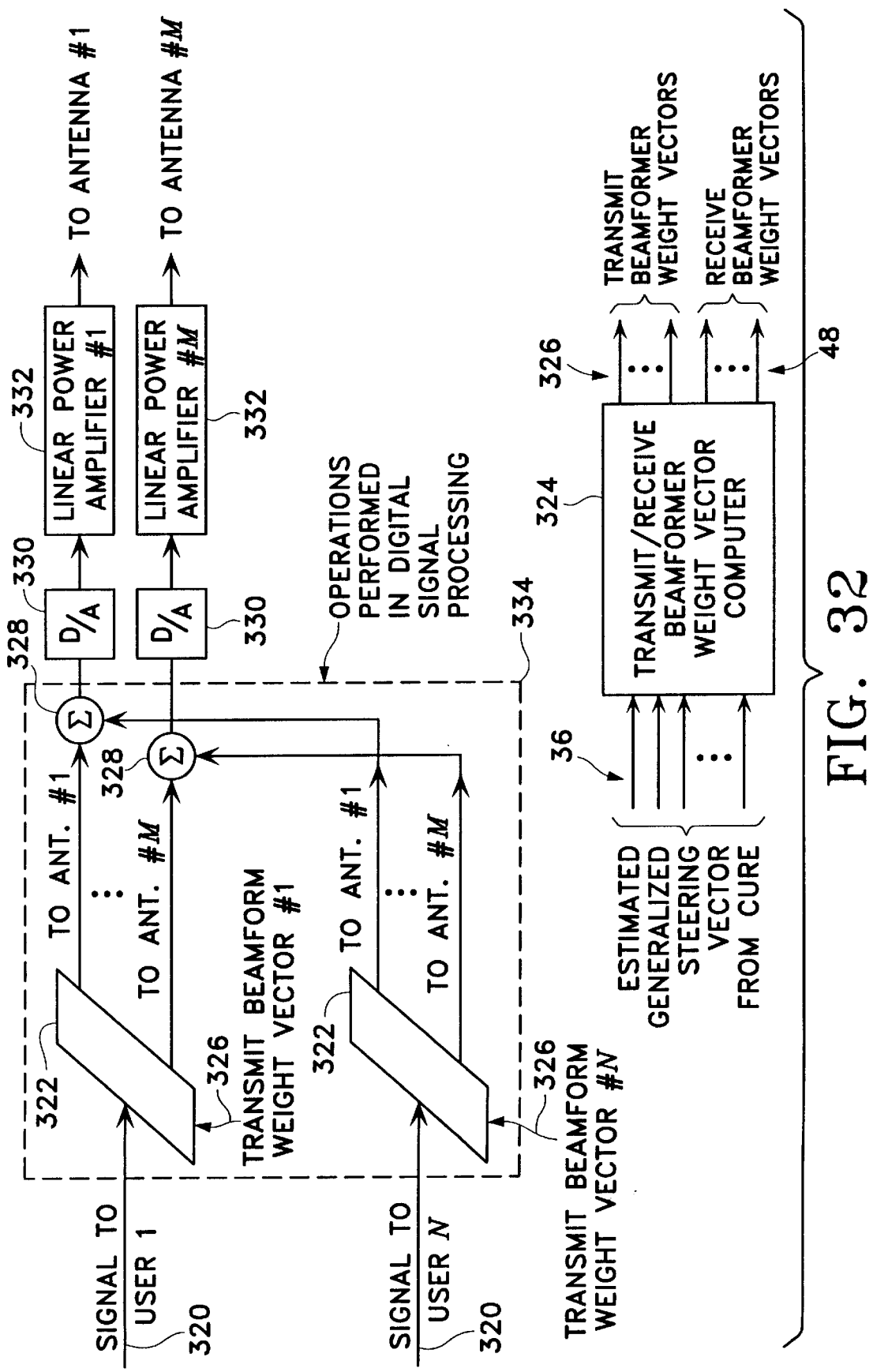
FIG. 32 is a block diagram showing major portions of a transmitter as used in conjunction with the system of the present invention.

In the switched beam approach, a transmit antenna array and a set of fixed pre-formed beams is available for transmission. The beams are formed by applying signals with appropriate gains and phases to the antennas. The gains and phases can be created either by a passive beamforming matrix that is inserted into the signal path ahead of the antenna array. The outputs of the beamforming matrices are then summed in power combiners that drive each array antenna. The preferred approach, shown in FIG. 32, eliminates the expense of RF hardware beamformers in favor of digital signal processing. In this method, a signal to be transmitted to a user is input on one of N multiple lines 320 to one of N sets of multipliers 322. Each set of multipliers has as other inputs a transmit beamformer weight vector, which is derived from a transmit/receive beamformer weight vector computer 324. The latter computer receives estimated generalized steering vectors on lines 36 from the CURE system and generates receive beamformer weights on lines 48 (see FIG. 4A), and transmit beamformer weight vectors on lines 326.

Thus, in each set of multipliers 322, a signal to be transmitted to a user is multiplied by a transmit beamformer weight vector, which is an M-dimensional complex weight vector, where M is the number of antenna elements. For each of N users, the outputs of the multipliers 322 are summed in a plurality M of summers 328. That is to say, each summer 328 sums the contributions of multiple user signals associated with a particular antenna element. The signal to be radiated by the $i^{th}$ antenna of M elements is the sum of N terms, each being a complex weighted version of the signal to a different user. An M-channel digital-to-analog converter (DAC) 330 and linear power amplifier (LPA) 332 is used to drive each antenna. This latter method does not require expensive analog rf beamforming matrices and power combiner hardware, since the multipliers 322 and summers 328 are digital processing components, as indicated by the envelope 334.

In the switched beam approach, the beamforming weight vectors are pre-computed and stored in memory. Each weight vector can be used to create a directional beam that puts transmitted energy in a different direction. The set of all such weight vectors provides a family of pencil beams that covers all directions in the cell. Only one such beam is selected for transmission on each of the L forward links. The method of selection is described below. The method mitigates, but does not eliminate, cochannel interference because the energy of a signal unintentionally radiated to other cochannel users is suppressed to the sidelobe level of the beam, assuming the other users do not fall into the main lobe of the beam. For cellular systems that use analog frequency modulation (FM) on the forward links like the AMPS system in the United States, there is, in addition to sidelobe suppression, the signal capture effect of FM discriminators that provides additional suppression of unwanted cochannel interference.

A beam is chosen for transmission to a particular user by means of logical rules embodied in a beam selection algorithm. The objective is to prevent energy from reaching the other cochannel users where it would interfere with the intended signals being sent to those users. Consider the following set of assumptions, reasonable for many wireless communication services that operate at UHF frequencies:

The base station has separate transmit and receive arrays.

The transmit and receive arrays are geometrically similar (i.e., have the same shape).

The transmit and receive arrays have the same size-frequency products (i.e., the ratio of the transmit-to-receive array sizes equals the ratio of the receive-to-transmit frequencies).

The transmit and receive arrays are mounted on a common vertical mast.

The dominant multipath scatterers are not in the immediate vicinity of the arrays, so that the arrays are in the farfield of reradiation from scatterers, and the elevation or depression angle of arrival is essentially zero at both arrays.

Under these assumptions, the best beam for sending energy to a given user is the one whose beamforming vector is most nearly orthogonal to the generalized steering vectors of the other cochannel users (the generalized steering vectors being those derived from reception of the reverse link signals at the base station). Orthogonality between two vectors is strictly defined as an inner product of zero. However, strict orthogonality is not generally possible. Fortunately, it is often good enough to pick the beam whose weight vector has the smallest inner product with the reverse link generalized steering vectors of the other cochannel users. This beam will radiate minimal sidelobe energy to the other users.

The beam selection criterion for using a fixed switched-beam array can be stated precisely: Choose the beam that maximizes the ratio of the inner product of the beam vector with the generalized steering vector of the intended user divided by the sum of the inner products with the generalized steering vectors of the unintended cochannel users.

The method just described uses a fully adaptive array for the reverse link receive function, as implemented by the CURE method, together with a switched-beam array for the forward link transmit function. The key feature of this approach is that antenna arrays are employed only at base stations.

A somewhat different approach would be to perform the transmit beamforming by using the exact generalized steering vectors as are derived by the receive function. This method requires a transmit array that is geometrically similar to the receive array as described above (i.e., the transmit and receive arrays have the same shape but are scaled by the ratio of the receive-to-transmit frequencies). For example, in the case of the AMPS analog cellular systems, the transmit and receive frequencies are offset by 45 MHz. Because the total system bandwidth is small compared to the operating frequencies, the 45 MHz offset can be regarded approximately as a 5 percent difference in scale. By using a scaled transmit array, if a generalized steering vector obtained by CURE on receive is used for transmit, then the same array directivity pattern will result. Thus, lobes and nulls will be placed at the same angles. Nulls directed to other cochannel users on receive will also be directed at the same other users on transmit, thereby enabling the base station to selectively direct a signal at a particular desired cochannel user.

In a multipath environment, the desired user and other user signals will generally be via diversity paths (i.e., the DPMA concept). In this case, the generalized steering vectors derived by CURE on receive cause the receive array (and hence the transmit array) to have a complex directivity pattern for each user that sums the multipath arrivals of the desired signal with complex weights (gains and phases) that causes them to add in phase, while simultaneously summing the multipath arrivals of each other user cochannel signal with complex weights that causes these signals to sum to zero. Thus, other users are rejected by generalized nulls or orthogonality rather than by physical nulls at specific angles. The energy transmitted to a particular user will be sent in the same direction as the receive multipath components, with the same phase and gain relationships. Therefore, the signal will reach the intended user with a substantial signal level via the diversity path. Simultaneously, the signal will reach the other users via multiple paths that will sum to zero provided the mobile users are using a simple omnidirectional antenna for both transmit and receive.

Figure 33:
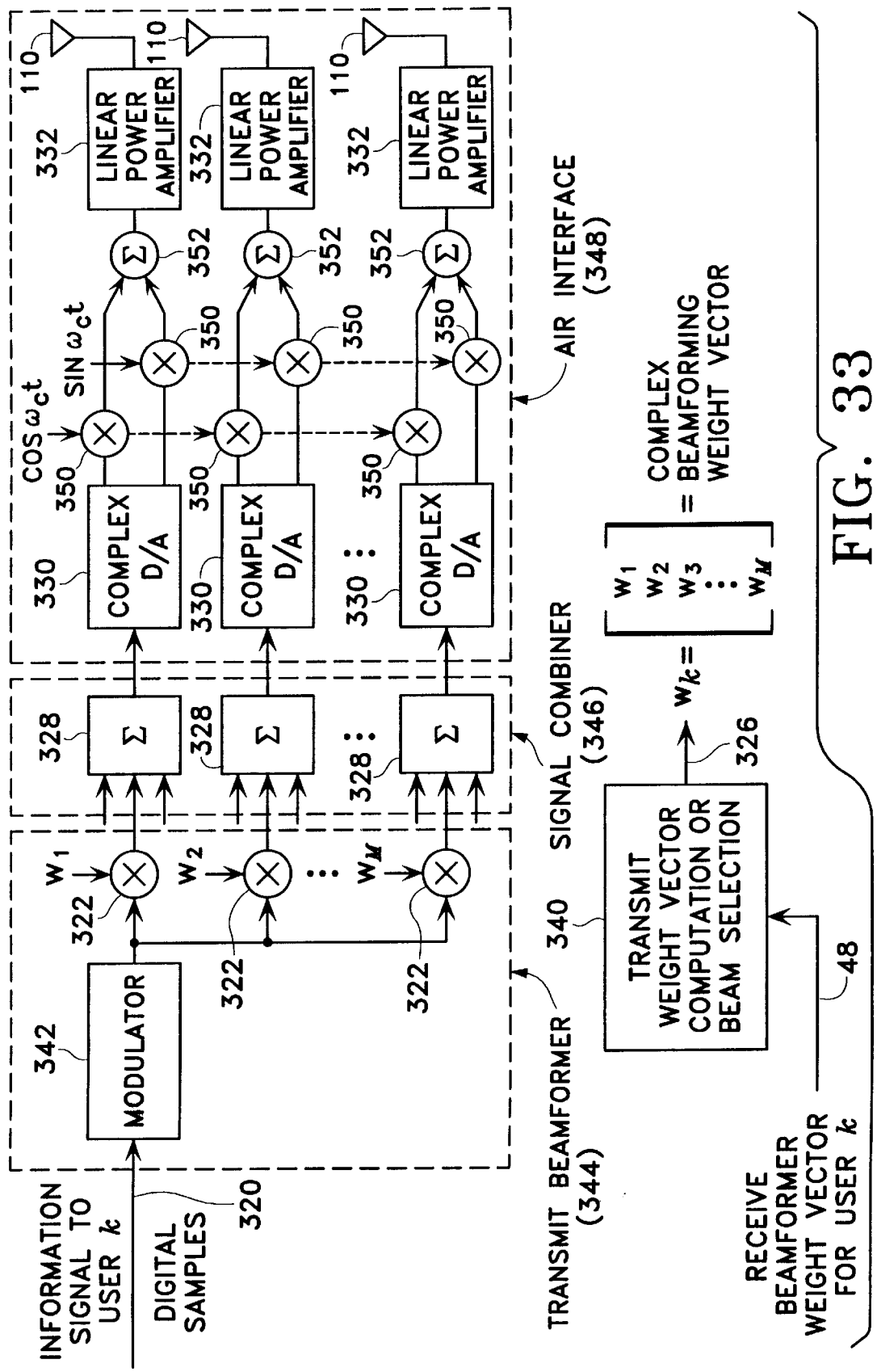
FIG. 33 is a block diagram showing a transmitter similar to the one in FIG. 32, but with more detail of some aspects of the apparatus.

FIG. 33 is block diagram of a transmitter for use in one form of the CURE system. Some of the components of the transmitter have already been introduced in the discussion of FIG. 32. A transmit weight vector computation or 315 beam selection module 340 generates on lines 326 a transmit weight vector for each user k. the module 340 generates the transmit weight vector based on either of the two approaches discussed above An information signal to be transmitted to user k is modulated in a modulator 342 and then multiplied by the transmit weight vector for user k, in a set of multipliers 328. The portion of the transmitter including the modulator 342 and multipliers 322 is referred to as the transmit beamformer 344. Next the outputs of the multipliers 322 are summed in a set of M summers 328, each summer receiving as inputs an antenna element contribution associated with each of the users. Thus each summer 322 has N inputs if there are N users. The summers 328 are collectively referred to as a signal combiner 346.

The outputs of the summers 328 are then processed in what is referred to as the air interface 348 of the transmitter. The air interface includes a set of complex digital-to-analog converters (DACs), each of which produces two outputs, the in-phase and quadrature components of the complex signals. These complex signal components are multiplied by a carrier signal in additional pairs of multipliers More specifically, each complex output pair from a complex DAC 330 is multiplied by signals proportional to $\cos \omega_c t$ and $\sin \omega_c t$, respectively, where $\omega_c$ is the angular carrier frequency. The resulting products in each pair are then added in summers 352 and coupled to one of the linear power amplifiers 332, and from there the signals are coupled to an antenna element 110.

13.0 System For Separating And Recovering Multimode Radio Signals:

This section describes a method and apparatus for mitigating polarization effects on propagated radio signals. In the case of dual-polarized radio transmissions, the effects of a polarization-changing propagation medium are avoided by separating the two received signals without regard to their polarization states.

This invention relates generally to radio communications and, more specifically, to problems that arise, due to natural propagation conditions, when multiple cochannel signals of practically the same frequency are received at approximately the same time. Propagation conditions may cause may cause unwanted polarization mixing of the signals. Separating and recovering the original signals poses difficulties in receiver design.

A related problem is multipath propagation caused by reflections from atmospheric layers, such as the D-layer, E-layer or F-layer. The problem manifests itself as frequency selective fading or phase distortion that limits the communication capability of high-frequency (HF) signals. As already discussed above in Section 9.0, the CURE system handles multipath components advantageously by combining all coherent signals arriving over different paths as a result of reflections from buildings in an urban environment. Multipath propagation effects caused by atmospheric reflections are handled in exactly the same manner.

In some communication systems electromagnetic propagating waves are used to carry two independent information signals on different polarizations of the same carrier signal. These polarizations need not be orthogonal, but do need to be linearly independent relative to two orthogonal "basis" polarizations, e.g. vertical and horizontal linear polarizations or left-hand circular and right-hand circular polarization. A traditional problem is that the polarization of a transmitted signal is changed by the propagation medium so that the signal arrives at the receiving antenna with a different polarization from the one in which it was transmitted. The polarization change may be due to reflection from oblique surfaces, refraction, or the phenomenon of Faraday rotation. Conventional receivers separate differently polarized signals because each receiver has knowledge of the expected polarization states. When the polarization of one or both signals is changed during propagation, the conventional receiver is incapable of properly separating the two signals.

The present invention separates the received signals without regard to their possibly changed polarization states. If only one signal is received with an unknown polarization is received at a dual-polarized antenna, the invention can extract the signal and determine its polarization state. If two signals are sent on orthogonal polarizations, the signal polarizations can be random and not orthogonal at the receiving site, making reception of either signal subject to cochannel interference from the other signal. CURE processing solves the problem by separating and recovering up to two independent signals arriving at the receiving array with differently polarizations, provided only that the polarizations are linearly independent (i.e., not identical). The key advantage of the invention in this application is that it is "blind" to the polarization states of the received signals. Prior knowledge of the polarization state is not needed to separate and recover the signals. In addition, the CURE approach is fast enough to enable the recovery of signals whose polarization is time-varying.

Figure 34A:
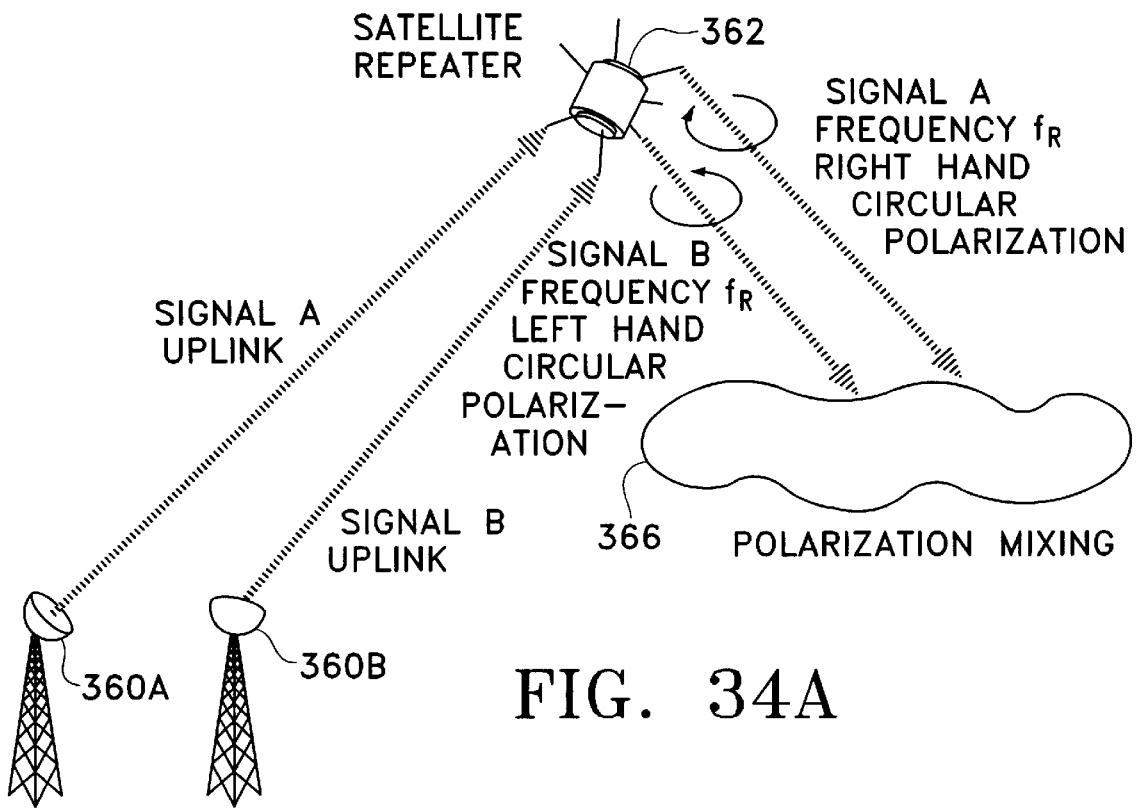
FIGS. 34A and 34B are diagrams depicting operation of the invention in recovery of dual-polarized signals.
Figure 34B:
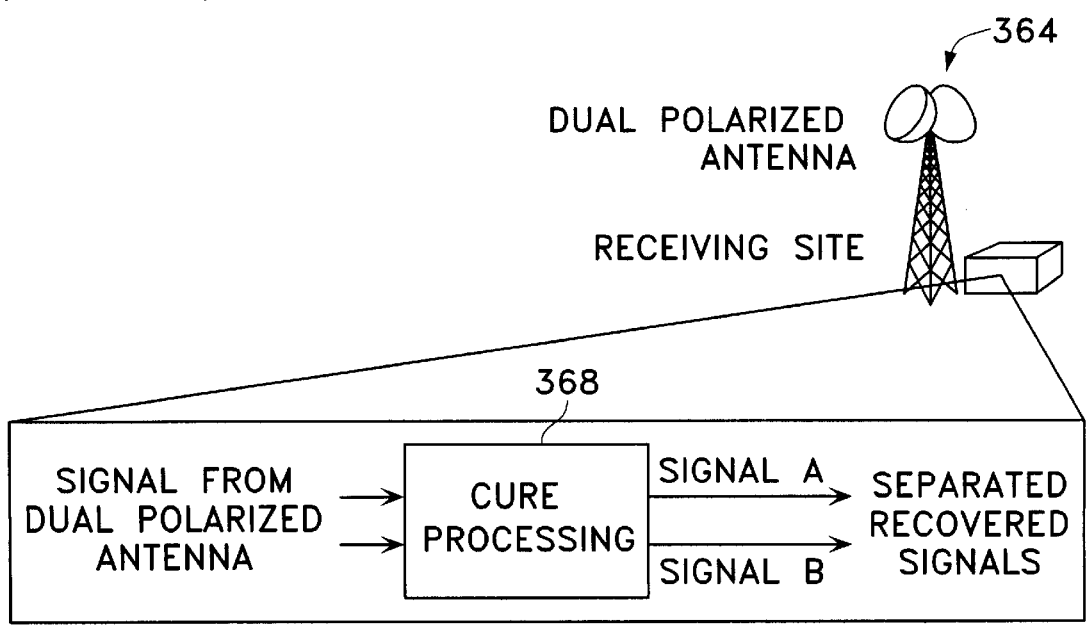

As shown in FIGS. 34A and 34B, one type of communication system makes use of dual-polarized signals at the same frequency. For example, transmitters 360A and 360B transmit uplink signals A and B to a communication satellite 362, which retransmits the signals, with different polarization states, to a dual-polarized antenna 364 on the ground at a receiving site. However, an atmospheric layer 366 causes polarization mixing of the two signals, which arrive at the receiving antenna with scrambled polarization states. The received signals are processed by a CURE processing system 368, which effectively separates out the signals A and B without regard to their scrambled polarization states. Because of the CURE processing system 368 is "blind" to antenna configuration, and to the polarization state of the received signals, separation and recovery of signals A and B can be effected even when both have their polarization states altered during propagation from the satellite transmitter.

14.0 Application to Separation of Signals Transmitted Over "Waveguide":

This section describes a method and apparatus for separating and recovering signals transmitted onto a "waveguide." As mentioned earlier, the term "waveguide" as used in this specification is intended to include any bounded transmission medium, such as a waveguide operating at microwave frequencies, an optical fiber operating at, a coaxial cable, or even twisted-pair conductors operating at lower frequencies. Regardless of the waveguide medium, the signals are received at an array of sensor probes installed in the waveguide, and are fed to a cumulant recovery (CURE) system that separates and recovers the original signals without regard to how the original propagation modes may have become scrambled as a result of transmission along the waveguide.

Waveguides and optical fibers are widely used for the transmission of multiple independent cochannel signals simultaneously, by using a different propagating mode for each signal. However, due to kinks, bends and surface and refractive irregularities in the waveguide or fiber, a phenomenon called mode conversion occurs, and the propagated energy is converted from one mode to another during propagation along the waveguide or optical fiber medium. Over a long distance of propagation, the signals tend to become scrambled across the propagating modes.

A well known approach to conserving bandwidth is to employ different propagating modes for different signals of the same frequency, and to rely on the different propagating modes to effect separation of the signals as the receiving end of the waveguide or optical fiber. Unfortunately, however, mode conversion often occurs, especially in long waveguides or fibers, as a result of kinks, bends, and surface and refractive irregularities of the propagation medium. The modes become scrambled and separation at the receiving end becomes difficult. For optical systems, these difficulties are somewhat reduced by the use of expensive single-mode fiber.

Figure 35:
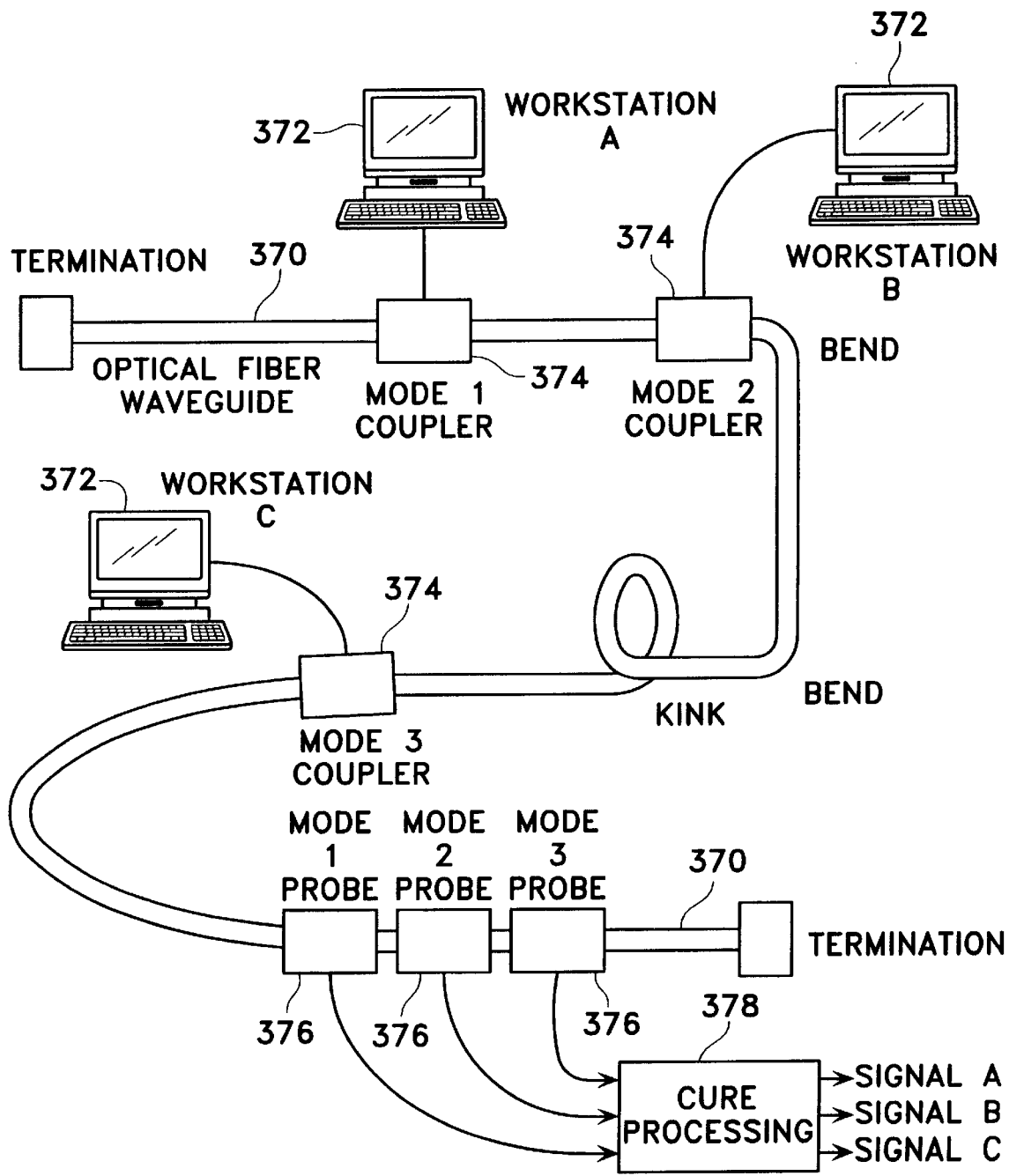
FIG. 35 is a schematic diagram depicting the invention as used in conjunction with an optical fiber network.

FIG. 35 shows, by way of example, a computer network employing an optical fiber 370 and having a plurality of computer workstations 372 connected to the fiber by couplers 104, each of which couples a workstation to the fiber using a different propagation mode, but at the same optical frequency. In accordance with the invention, a plurality of probes 376 are also coupled to the fiber 370, providing three output signal lines for connection to a cumulant recovery (CURE) processing system 378, which generates separated signals A, B and C at its signal recovery ports.

15.0 Application to Radio Direction Finding:

This section describes a method and apparatus for finding accurate directions of multiple radio signal sources without the need for a fully calibrated antenna array. Signals from the antenna array are processed in a cumulant recovery (CURE) processing system to recover the signals and obtain estimated steering vectors for the multiple sources. Signals from a subarray of antennas that are calibrated are combined with the steering vector estimates to obtain accurate directional locations for all of the sources. There need be only as few as two calibrated antenna elements in the subarray.

This invention relates generally to direction finding (DF) systems and, more particularly, to DF systems using arrays of radio antennas. Traditional super-resolution direction finding systems require an array of N+1 calibrated antennas and receiving channels to resolve N source locations (directions). Maintaining large arrays of antennas in calibration adds to the cost of the system. Moreover, traditional DF systems do not always converge rapidly on the direction solutions.

Figure 36:
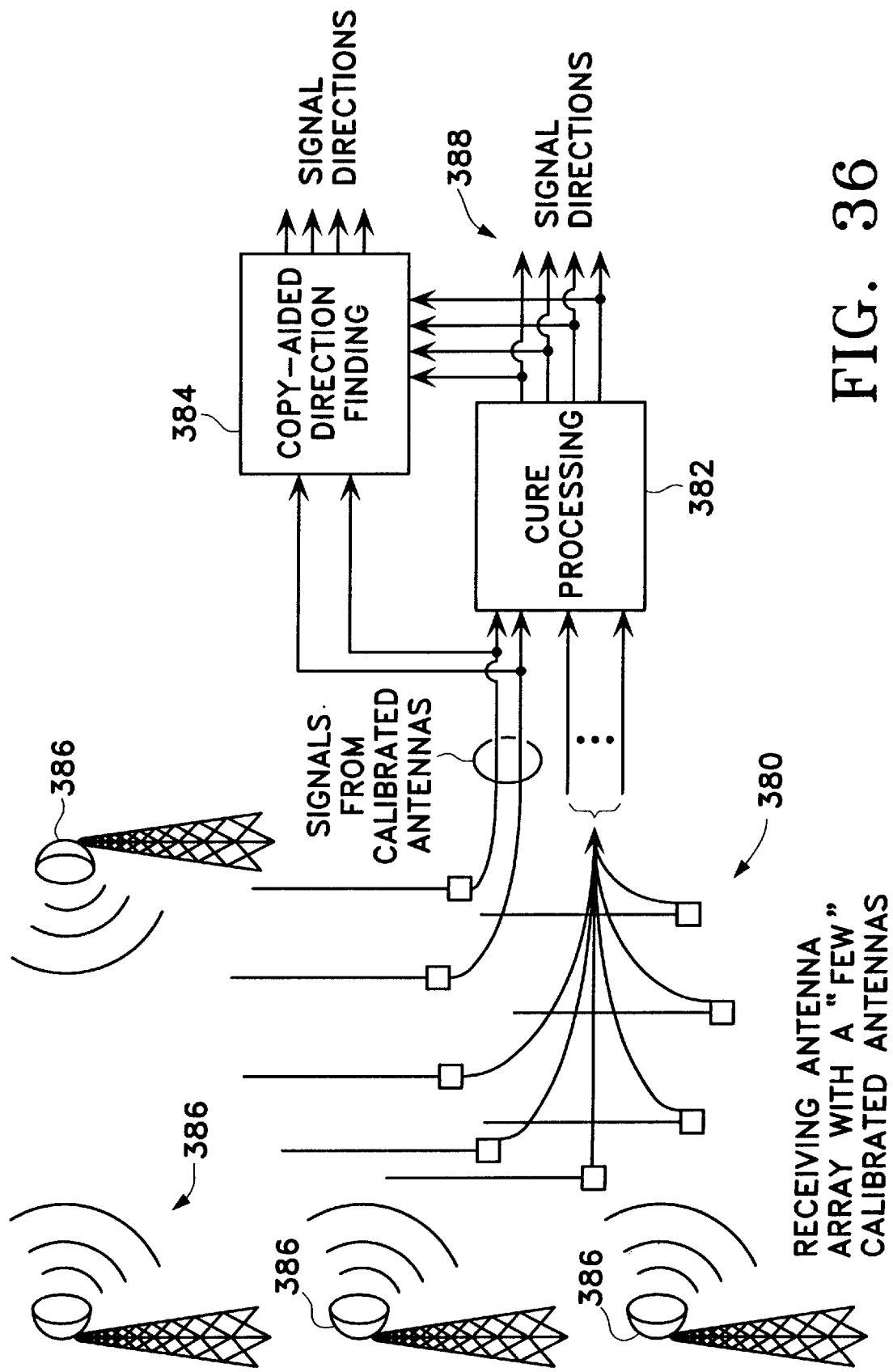
FIG. 36 is a schematic diagram depicting the invention as used in copy-aided direction finding.

FIG. 36 shows a direction finding system in accordance with the invention, including an array of antennas 380, only two of which are calibrated, a CURE processing system 382 and a copy-aided direction finding system 384. Signals are received from multiple sources 386 at different directional locations with respect to the antenna array 380. As described in detail in the foregoing descriptive sections, the CURE processing system 382 separates and recovers the signals from the sources 386 and outputs the recovered signals from separate output ports, as indicated at 388. A by-product of the signal recovery process is a set of steering vector estimates for the multiple sources 386.

Assume that the $k^{th}$ port provides the steering vector estimate $a_k(m)$ from its analysis of the $m^{th}$ block of data "snapshots," and the steering vector from the calibration table for the bearing $\theta$ is denoted as $a(\theta)$. When an antenna array is "calibrated," a calibration table is generated, associating every bearing angle with an antenna steering vector. The dimensionality of $a(\theta)$ is equal to the number of calibrated sensors, which must be greater than or equal to two. After the steering vectors are estimated, a search is done to estimate the directions of arrival for the sources captured by the ports.

The bearing $\theta_k$ of the source captured by the port k is estimated by the maximizer of the DOA spectrum:

$$\theta_k = \underset{\theta}{\operatorname{argmax}} \frac{|a_k^H(m)a(\theta)|}{\|a_k(m)\| \|a(\theta)\|}.$$

Some alternative methods to that just described were given by B. Agee in "The Copy/DF Approach to Signal Specific Emitter Location," Proc. Twenty-Fifth Asilomar Conference on Signals, Systems, and Computers, pp. 994–999, Pacific Grove, Calif., November 1991. Agee concludes that the copy-aided DF method gives more accurate DOA estimates than other systems, such as MUSIC (discussed at length in the Background of the Invention section), and that these estimates require less computation than does MUSIC. An additional advantage is that only two calibrated sensors are adequate for azimuth estimation since the search is performed using the estimated steering vector for one source instead of the signal subspace. In the case of multipath propagation, more sources can be resolved by the copy-aided DF approach than by MUSIC when spatial smoothing is used.

16.0 Application to Extending the Dynamic Range of Receiving Systems:

This section describes a method and apparatus for extending the effective dynamic range of a radio receiving system by removing the principle products of distortion through the use of a cumulant recovery processing system. A received signal of interest is separated from the products of distortion, which are independent of the signal of interest. The signal is forwarded for further processing and the products of distortion are discarded, resulting in an extended dynamic range.

The dynamic range is a measure of the useful output of a receiver in relation to noise and other unwanted components. It is limited by the intermodulation and distortion products that result from analog and digital nonlinearities. Analog nonlinear distortion products or spurs can be generated due to signal overload or saturation of the first stage, mixer noise, and other sources. Digital systems employ analog-to-digital (A/D) converters that produce nonlinear distortion due to uniform quantization noise, A/D saturation, non-monotonicity of the A/D characteristic, sampler aperture jitter, and other physical effects. Accordingly, there has been an ongoing need for significant improvement in the dynamic range of a receiver system.

Figure 37:
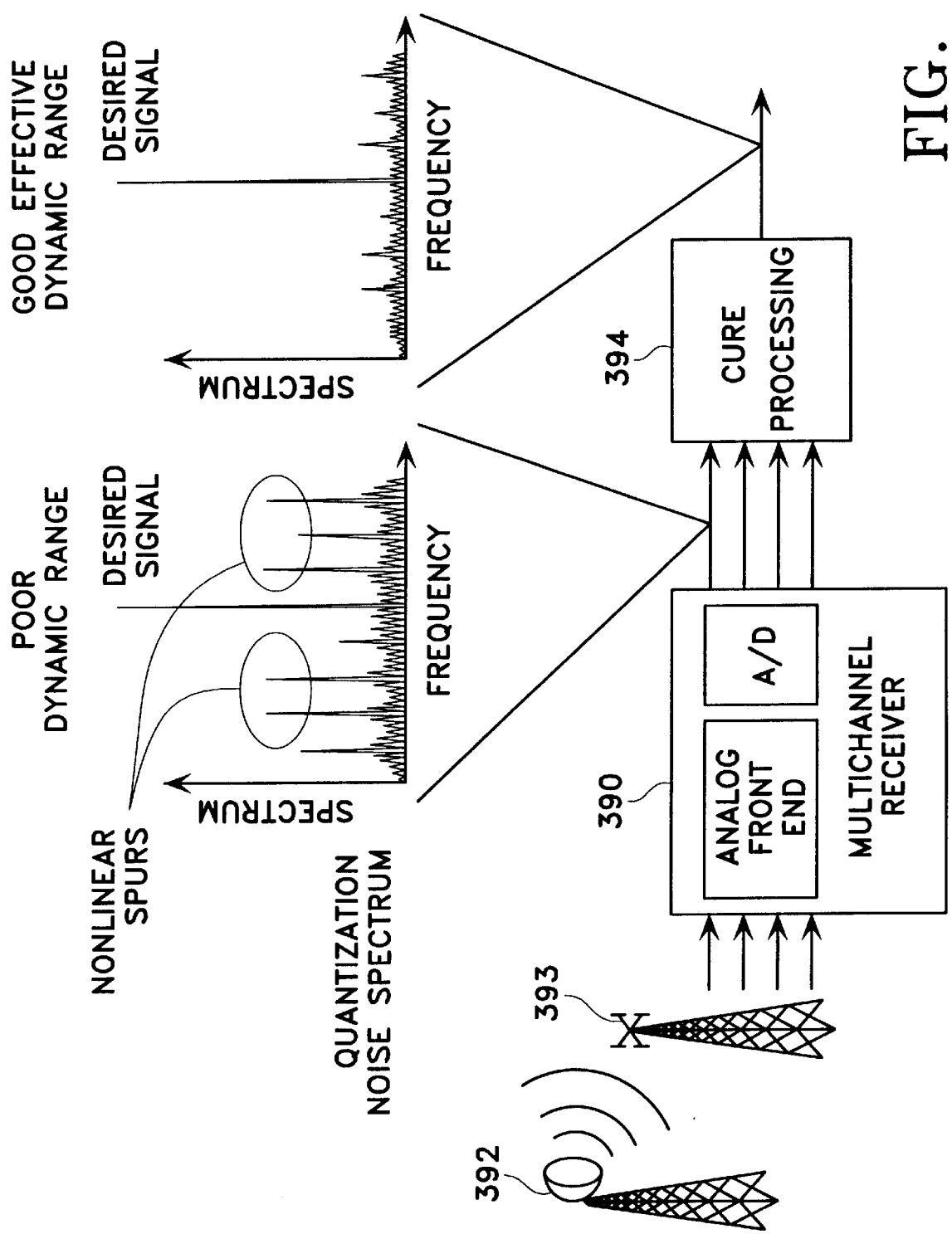
FIG. 37 is a schematic diagram depicting the invention as used in extending the dynamic range of a receiver.

FIG. 37 shows a multichannel receiver 390, receiving signals from sources 392 through an antenna array 393 and coupling the input signals to a cumulant recovery (CURE) processing system 394. The received signals, after analog processing and analog-to-digital conversion, have a spectrum that includes a number of products of distortion, in the form of nonlinear spurs in the spectrum, as well as lower-level quantization noise across the entire spectrum of interest. The effect of CURE processing is to separate and recover (or discard) received signals. In this case, the CURE processing system provides an output port for the desired signal, and generates other outputs corresponding to the principal products of distortion, which may be discarded. The resulting spectrum after CURE processing exhibits improved effective dynamic range, and contains only lower intensity spurs, and low level noise. Accordingly, the invention eliminates a number of distortion products in the receiver output and provides a desired output signal with fewer and lesser products of distortion.

17.0 Application to High Density Recording:

This section describes a method and apparatus for separating and recovering data recorded on closely spaced tracks on a recording medium. An array of sensors senses recorded data from multiple tracks simultaneously, and a cumulant recovery processing system separates and recovers the data from each of the multiple tracks, without crosstalk or mutual interference. Use of the invention permits recording of data at much higher densities than is conventional, so that more data can be stored on a recording disk without increasing its physical size.

For space efficiency, magnetic recordings use multiple parallel tracks to record information. Both rotating disks and linear tape use parallel tracks. Tracks can be laid down in the recording medium side-by-side on the surface and on top of one another at different vertical depths. On playback, a playback head attempts to sense individual tracks without crosstalk or interference from adjacent tracks, but at sufficiently high recording densities and small track sizes, crosstalk becomes a significant problem. Accordingly, designers of such systems are constantly seeking to improve playback head performance and the precision with which the playback head can be positioned to read information from each track. The present invention provides for increased recording density without crosstalk or mutual interference between adjacent tracks.

Figure 38:
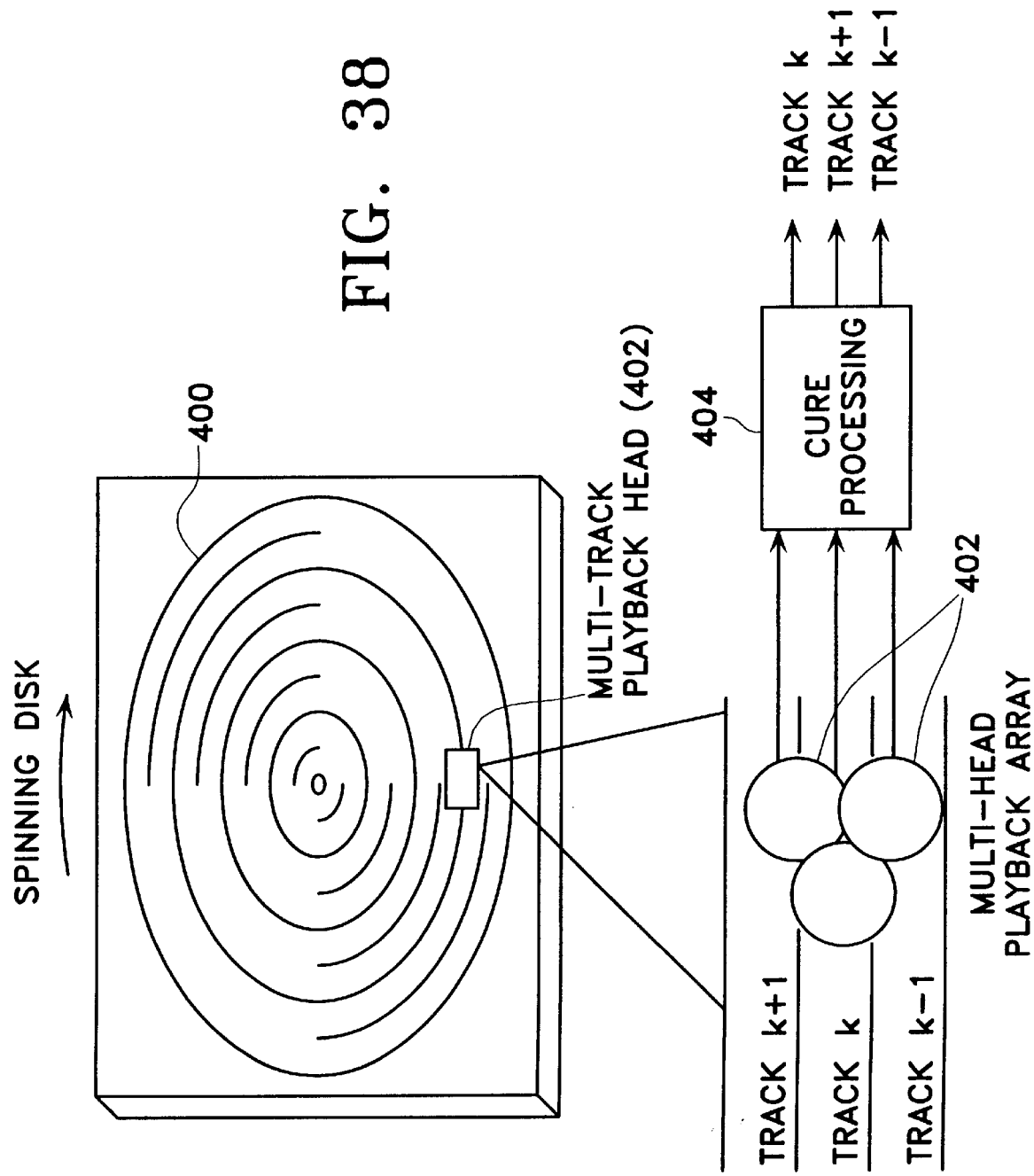
FIG. 38 is a schematic diagram depicting the invention as used in disk recording system.

As shown in FIG. 38, which depicts a recording disk 400 by way of example, playback or retrieval of recorded information is effected by means of a multisensor array 402, which has individual sensor elements that can sense recorded information on more than one track simultaneously. In general, N sensors will permit separation of information from N adjacent tracks. In the illustrated form of the invention, there are three sensors in the array 402 and the array spans across three adjacent recording tracks. The signals from the three sensors are processed as independent cochannel signals by a cumulant recovery (CURE) processing system 404, which generates outputs on three ports, corresponding to the signals on the three tracks over which the sensor array is positioned. Depending on the design of the system, selection from among the three outputs may be simply a matter of choosing the strongest signal, which should correspond to the track above which the array is centered, or utilizing the information in all three tracks, based on identifying data contained on the tracks themselves. Accordingly, the invention represents a significant improvement in recording and playback techniques using high-density recording media.

18.0 Application to Complex Phase Equalization

This section describes a method and apparatus for effecting automatic phase rotation equalization of a quadrature amplitude modulated (QAM) signal received from a transmitter. Because QAM signals are subject to an unknown phase rotation during propagation, de-rotation or phase rotation equalization is required before the received signal can be QAM demodulated. In this invention, received downconverted QAM signals are subject to processing in a cumulant recovery (CURE) processing system, which recovers the originally transmitted I and Q signals and automatically provides phase rotation equalization, without knowledge of the amount of rotation. Thus the invention provides the correct amount of phase compensation automatically, even as channel propagation conditions change.

This invention relates generally to communication systems and, more particularly, to phase rotation equalization in communication systems. Many communication systems use a form of modulation referred to as quadrature amplitude modulation (QAM) for transmitting digital data. In QAM, the instantaneous phase and amplitude of a carrier signal represents a selected data state. For example, 16-ary QAM has sixteen distinct phase-amplitude combinations, which may be represented in a "signal constellation" diagram as sixteen points arranged on a square matrix. A special case of QAM signals is the phase-shift keyed (PSK) signals for which the instantaneous phase alone represents a selected state. For example, 16-PSK has sixteen distinct phase selections, and can be represented as sixteen equally spaced points on the unit circle.

Figure 39:
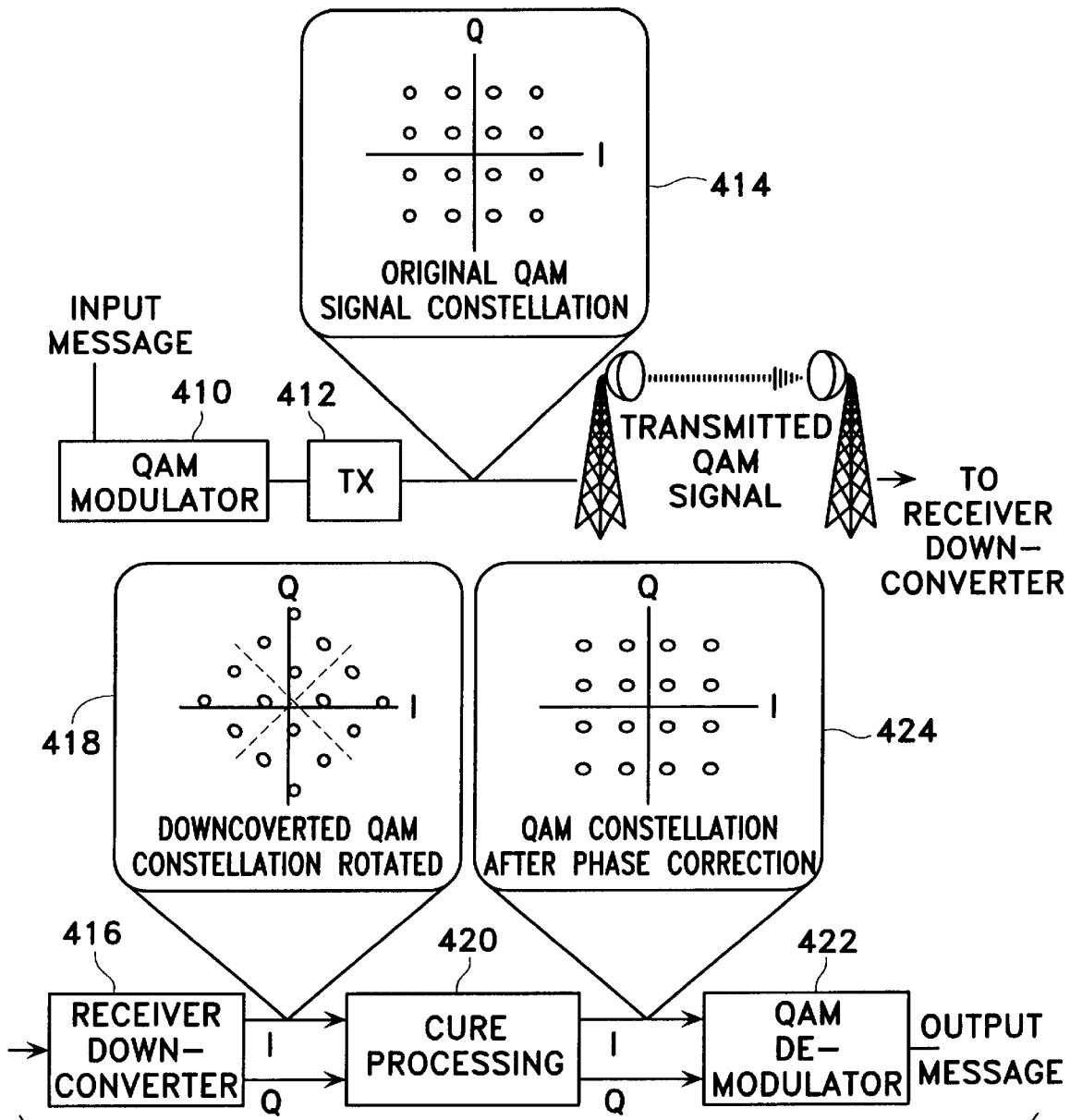
FIG. 39 is a schematic diagram depicting the invention as used to effect automatic phase rotation equalization of a QAM signal.

Transmission of the modulated signal causes an unknown phase rotation of the signals, and phase rotation correction, or equalization, is required at the receiver before the QAM signals can be demodulated. The present invention provides a convenient and automatic approach to effecting this phase rotation equalization. FIG. 39 shows a conventional transmitter, including a QAM modulator 410 and a transmitter 412. At the point of transmission, the signal constellation diagram is as shown at 414, with sixteen phase-modulus points arranged in a square matrix. Each point on the diagram represents a unique data state. At the receiver site, a receiver and downconverter 416 generates I and Q signal components. The signal constellation diagram corresponding to these signals is as shown at 418. The constellation has been rotated and must be corrected before QAM demodulation can take place. The receiver site also has a cumulant recovery (CURE) processing system 420 installed between the receiver/downconverter 416 and a QAM demodulator 422. As will be further explained, CURE processing has the effect of compensating for the phase rotation induced during propagation of the signal to the receiver site, as indicated by the phase-corrected QAM signal constellation at 424.

Figure 40A:
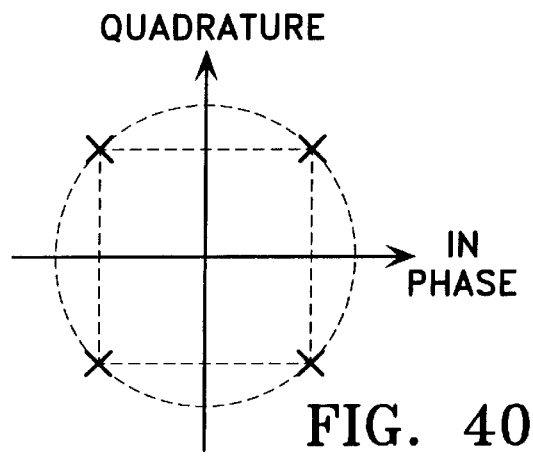
FIG. 40A is a signal constellation diagram for a QAM system with four amplitude-phase states by way of illustration.

The in-phase and quadrature components (I and Q) of a digital communication signal are independent and identically distributed at the transmitter output, as indicated in FIG. 40Aa). If x(t) is the original communication signal (in analytic representation) with in-phase component $x_p(t)$ and quadrature component $x_q(t)$, respectively, then $x_p(t)$ and $x_q(t)$ are statistically independent. After transmission, the channel distorts the transmitted signal and the receiver recovers it with gain and phase ambiguity (ignoring measurement noise), i.e. if y(t) is the output of the receiver, we have:

$$y(t) = g \exp(j\theta) \cdot x(t).$$

If $y_p(t)$ and $y_q(t)$ denote the in-phase and quadrature components of y(t) respectively, then we can write:

$$\begin{bmatrix} y_p(t) \\ y_q(t) \end{bmatrix} = G \cdot \begin{bmatrix} \cos(\theta) & -\sin(\theta) \\ \sin(\theta) & \cos(\theta) \end{bmatrix} \begin{bmatrix} x_p(t) \\ x_q(t) \end{bmatrix}.$$

The gain term G is real-valued and affects only the scale of the signal constellation, but not the constellation's shape or alignment with the I and Q axes. Therefore, without loss of generality, we may assume that G=1.

Figure 40B:
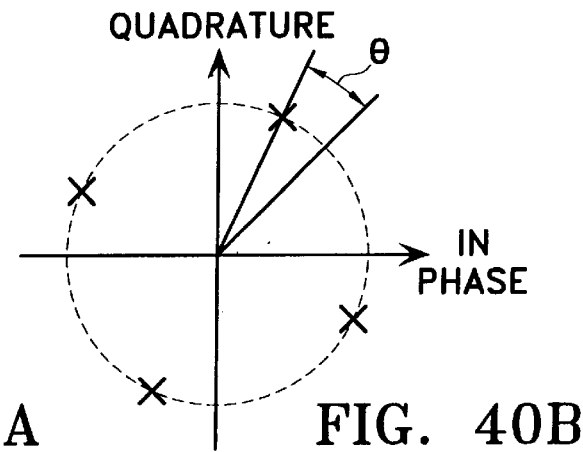
FIG. 40B is a diagram similar to FIG. 40A, showing a phase rotation of θ as a result of propagation of the signal to the receiver.

The effect of transmission is to rotate the entire signal constellation by the unknown phase angle θ, as is shown in FIG. 40B. In order to demodulate the signal correctly, the constellation must be "de-rotated" back to its original position prior to demodulation. This de-rotation operation must be accomplished by complex phase equalization or phase correction of the I and Q signals, which compensates for the distortion introduced by the communication channel and the lack of phase reference in the receiver downconverter's local oscillator.

The CURE method can be applied to provide a unique solution to the problem of complex phase rotation equalization. The signal's center frequency for downconversion must be known accurately enough so rotation does not occur during a processing block. The following two paragraphs help explain how the CURE system effects complex phase correction:

1) $y_p(t)$ and $y_q(t)$ are not independent but are uncorrelated. The absence of statistical independence is evident by inspection of FIG. 40B. Uncorrelatedness is implied by the equation. Because the signals are uncorrelated, second-order statistics such as cross-correlation functions provide no information to correct for the rotation of the signal constellation.

2) The rotation correction problem can be considered as a blind signal separation problem in which there are two sensor signals $y_p(t)$ and $y_q(t)$, each of which is a linear combination of two independent source signals $x_p(t)$ and $x_q(t)$. This is precisely a problem model to which the CURE processing system can be applied. By applying the CURE method to the components of the analytic signal, the vector channel is phase equalized, the original independent I and Q signals are recovered, and the received signal constellation is de-rotated. In addition, since $y_p(t)$ and $y_q(t)$ are uncorrelated, the covariance matrix used in the CURE system will be a scaled identity matrix, which simplifies the preprocessing required in the CURE system.

The principal advantage of using the CURE system as an equalization technique is that the rotation angle θ need not be known. The CURE system compensates for the angle automatically to provide independent output signals. Moreover, the equalization process adapts as channel conditions change.

The CURE system can be used to adjust the complex phase for single-dimensional constellations, such as pulse-amplitude modulation (PAM). In this case, the scenario can be considered as a two-sensor, single-source, signal enhancement problem, which can be handled by the CURE processing system.

19.0 Extension to Wideband Signal Separation

The present invention is fundamentally a method for separating and recovering narrowband cochannel signals illuminating a sensorarray. However, it is possible to extend the method to the separation and recovery of wideband signals. This is accomplished by:

1) Partitioning the wideband spectrum into multiple narrowband segments.
2) Using an array of cochannel processors to perform signal separation in each narrowband segment.
3) Combining the narrowband results to recover the original wideband source waveforms.

Steps 1 and 2 are straightforward. Step 3, however, is intricate and requires a special cumulant test to associate the ports at one frequency segment with the ports at adjacent frequency segments. Methods to accomplish these steps are described below. The overall method is capable of separating and reconstructing wideband signals with no special constraints on the signals or their spectra other than that the components of the signals in each narrowband segment must be non-Gaussian. A key advantage of this method is that the signal spectra are not required to be gap-free (i.e., have a convex support set).

19.1 Partitioning Wideband Measurements to Narrowbands

Figure 41:
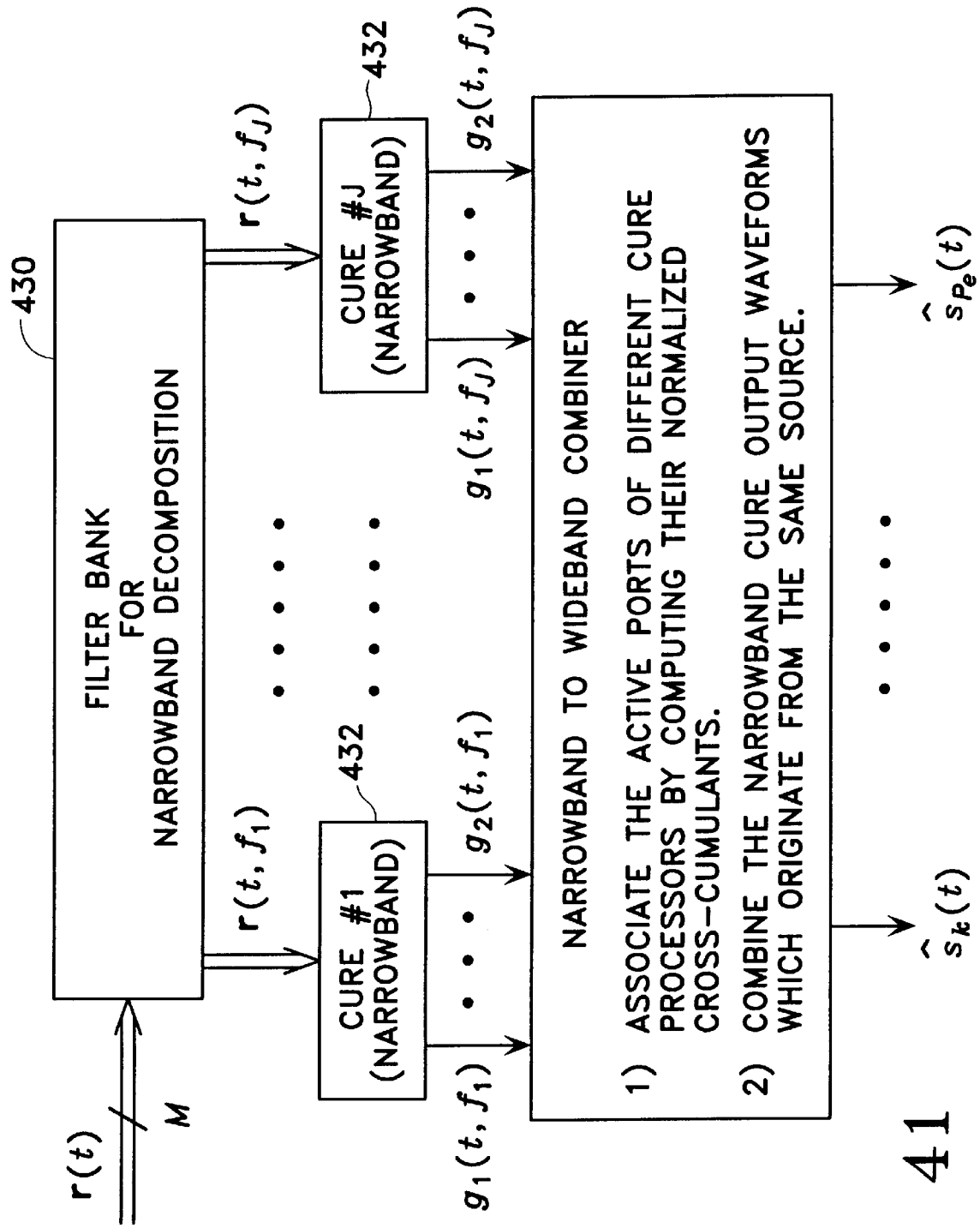
FIG. 41 is a block diagram showing extension of the cumulant recovery system of the invention to cover a wide frequency band.
Figure 42:
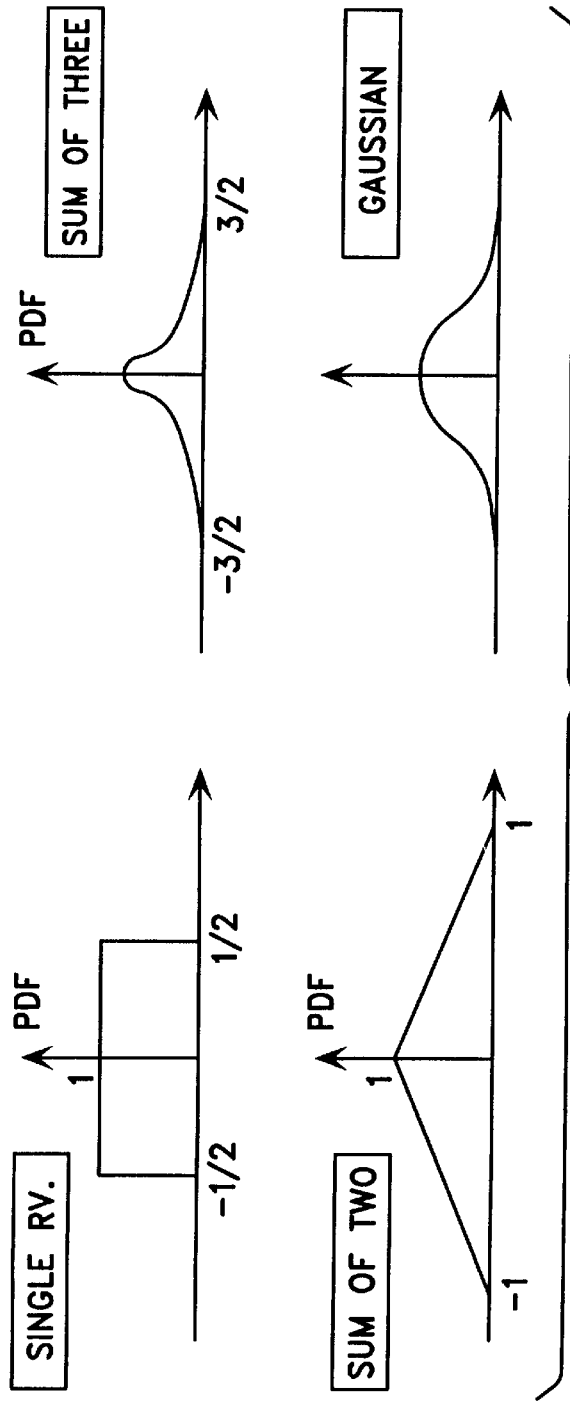
FIG. 42 is a set of graphs demonstrating how the probability density unction (PDF) of the sum of three random variables approaches Gaussian form.

To apply the CURE algorithm to separate the signals, it is necessary to decompose the sensor measurements into narrowband components. This decomposition step is depicted in block 430 of FIG. 41. If r(t) is the array snapshot at time t, then let r(t,f) denote the measurement component filtered by a bandpass filter centered at frequency f. The bandpass filters are designed to satisfy the expression:

$$r(t) = \sum_{f=f_l}^{f_u} r(t, f).$$

where $f_l < f < f_u$ is the wideband analysis spectrum. With this analysis approach, the signal model for each band is expressed as $$r(t,f) = A(f)s(t,f) + n(t,f).$$

The following important fact about the cross-cumulants of bandpass filtered signals will be exploited in order to associate the ports of different signal separation processors operating in different frequency bands:

$$\text{cum } (s_k(t,f_1), s_k^*(t,f_1), s_l(t,f_2), s_l^*(t,f_2)) = \gamma_{4,k}(f_1,f_2)\delta_{k,l},$$

where $\gamma_{4,k}(f_1,f_2) \neq 0$ in general, and $\delta_{k,l}$ is the Kronecker delta function $$\delta_{k,l} = \begin{cases} 1 & \text{if } k = l \\ 0 & \text{otherwise} \end{cases}$$

In other words, the cross-cumulant is nonzero for different frequency components from the same source and zero for different sources.

This property is in contrast to the cross-correlation between the components of signals at different frequencies which, except for signals that exhibit second-order cyclostationarity, is generally given by $$E\{s_k(t,f_1)s_l^*(t,f_2)\} = \sigma_k^2(f_1)\delta_{k,l}\delta_{f_1,f_2}.$$

Here, we see that the components of a given signal at different frequency bands are uncorrelated and the components of different signals are uncorrelated.

The advantage of the cumulant property noted above is that it provides a method (described below) for associating the narrowband parts of a wideband signal that is broadly applicable to all signal types regardless of whether a given signal exhibits 2nd-order cyclostationarity.

19.2 Signal Separation in Narrowbands

Each narrowband component (r(t,f)) is fed to a different CURE signal separation processor 432 that separates and recovers the signals that comprise the narrowband component.

Let $g_k(t,f)$ be the waveform recovered by the $k^{th}$ port of the CURE subsystem that operates in band f processing r(t,f). We shall show a method of determining which narrowband port signals are part of a common wideband signal, and how to combine these port signals in order to reconstruct and recover the wideband signal.

19.3 Combining Narrowbands

The problem of combining the recovered narrowband signals to form wideband signals is complicated primarily by the fact that the ports for different bands capture different sources. The combing step is indicated as block 434 in FIG. 41. In general, $$\hat{s}_k(t) \neq \sum_{f=f_l}^{f_u} g_k(t, f).$$

Consider first the case in which the wideband analysis band is broken into two narrow bands $f_1, f_2$, and two processors, each equipped with L signal extraction ports to independently process the bands.

Suppose the first port of the processor operating in band $f_1$ has captured a signal and we wish to find whether some port of a second processor assigned to a different band $f_2$ captures the same signal. This determination is made by the following test. Compute the following quantity for the active ports (indexed by l) of the second processor:

$$d(f_1, 1; f_2, l) = \frac{E\{|g_1(t, f_1)|^2\}E\{|g_l(t, f_2)|^2\}}{|\text{cum}(g_1(t, f_1), g_1^*(t, f_1), g_l(t, f_2), g_l^*(t, f_2))|}.$$

We associate a port of the second processor to the first port of the first processor if both ports jointly minimize the quantity and if the minimum is below a threshold. The threshold is set to limit the number of false association decisions on average. For example, if port 3 of the second processor provides a minimum below threshold, then the waveforms from the two processors would be combined according to $$\hat{s}_1(t) = g_1(t,f_1) + g_3(t,f_2).$$

Conversely, if the maximum is below threshold, then we let $$\hat{s}_1(t) = g_1(t,f_1).$$

In the general case, there are J signal separation processors operating in J bands, each having active signal energy on up to L output ports. The method of band association in the general case is to first compute the "distance" between all pairs of ports by computing the pseudo-metric:

$$d(i, k; j, l) = \frac{E\{|g_k(t, f_i)|^2\}E\{|g_l(t, f_j)|^2\}}{|\text{cum}\{g_k(t, f_i), g_k^*(t, f_1), g_l(t, f_j), g_l^*(t, f_j)\}|},$$

for $1 \leq i,j \leq J$, and $1 \leq k, l \leq L$,
where $g_k(t,f_i)$ denotes the waveform from the $k^{th}$ port of the processor in the $i^{th}$ band. $d(i,k; j,l)$ is not a true mathematical metric because it does not satisfy two of the three required metric properties: $d(i,k; j,l) \neq 0$ and the triangle inequality are not satisfied. Nevertheless, as a pseudo-metric, it does enable port associations to be found.

The next step is to associate ports two at a time. This is done with a clustering algorithm borrowed from the field of statistical pattern recognition. An agglomerative hierarchical clustering algorithm is used. Standard algorithms for such clustering are described in textbooks (e.g., Richard O. Duda and Peter E. Hart, Pattern Classification and Scene Analysis, John Wiley & Sons, 1973, pp. 228–237). This type of clustering algorithm searches through the inter-port distances to find the two nearest ports. If the distance is below a threshold, the ports are "merged" or associated and all distances to the two ports that are merged are replaced by distances to the new "merged" signal. This process is repeated until only distances greater than the threshold remain. Constraints are imposed on the clustering algorithm to prevent the merging of same-band ports because, if the ports are from the same processor, they cannot capture the same signal.

The distances between same-band ports are used to compute the threshold that controls whether ports are sufficiently close to permit them to be merged. The threshold is computed by a statistical L-estimator operating on the same-band distances. The distances are sorted into ascending order, and a particular distance is selected based on its rank. This distance is multiplied by a constant to obtain the threshold. Both the rank and the constant depend on J and L and are chosen to maintain the probability of false port association, $P_{fpa}$, below some small specified level (e.g., 0.001).

After the ports are logically merged or associated into clusters, each cluster will correspond to exactly one wideband signal. The final step is to recover the waveforms of the wideband signals. This is done by adding together the output port signals from all the ports merged or associated to each cluster.

20.0 Conclusion

As described in detail above, the present invention provides a cochannel signal processing and separation that has many facets. Implementation of the basic cumulant recovery (CURE) processing engine may take the form of any of the proposed embodiments, including eCURE (as described in Section 3.0). CiCURE (described in Section 4.0) or pipeCURE (described in Section 5.0), and its capabilities may be further extended using $\alpha$-$\beta$CURE or $\mu$CURE (described in Section 6.0), wideband processing (described in Section 19.0), or direct (non-iterative) computation (described in Section 7.0).

Applications of a selected form of the CURE processing engine are numerous, and probably not all have been described here. Of prime importance is the application of CURE processing to communication systems (described in Sections 8.0 through 12.0), and in particular the concept of diversity path multiple access (DPMA, described in Section 11.0), which not only permits operation in the presence of multipath propagation, but also takes advantage of multiple coherent signals to provide a diversity gain, and uses a generalized steering vector representative of all the multipath components to generate corresponding transmit weight vectors ensuring that each user receives intended transmissions, even in the presence of multipath effects. Other communication system applications include signal recovery in the presence of strong interfering signals (described in Section 10.0), recovery of multimode signals that have been subject to unwanted mode mixing (described in Section 13.0), and recovery of signal from a bounded waveguide of any type (described in Section 14.0). Other applications include radio direction finding (described in Section 15.0), extending the dynamic range of receiver systems (described in Section 16.0), high density recording (described in Section 17.0), and complex phase equalization (described in Section 18.0).

It will be appreciated from the foregoing that the present invention represents a significant advance in all of these diverse fields of application. It will also be understood that, although a number of different embodiments and applications of the invention have been described in detail, various modifications may be made without departing from the spirit and scope of the invention. Accordingly, the invention should not be limited except as by the appended claims.

21.0 Mathematical Basis for the Invention

This section presents the mathematical basis for the invention. In particular, it provides theoretical support for FIGS. 1 through 7, which illustrate the concepts of the various embodiments of the invention. The section is organized as follows:

21.1 Signal Model
21.2 Problem Statement
21.3 Insufficiency of Second Order Statistics for Blind Separation
21.4 Cumulants: Definitions and Properties
21.4.1 Cumulants of Real Random Variables
21.4.2 Sample Estimates of Cumulants
21.4.3 Extension to Random Processes
21.4.4 Extension to Complex Random Processes
21.4.5 Properties of Cumulants
21.5 Motivations to use Cumulants
21.6 Derivations for the Cumulant Recovery (CURE) System
21.6.1 CURE Algorithm as a Cumulant Strength Maximizer
21.6.2 CURE Algorithm as a Structured Eigenvector Computer
21.6.2.1 Cumulant Matrix
21.6.2.2 Limitations of Previous Cumulant-based Approaches
21.6.2.3 Cumulant-based Iterative Blind Separation
21.6.2.4 Direct versus Beamforming-based Computation of the Cumulant Iteration
21.6.3 Reference Signal Exploitation Framework for the CURE Blind Signal Separator
21.6.3.1 Reference Signal Exploitation Framework
21.6.3.2 Relationships with Other Algorithms
21.6.3.2.1 CURE and CMA Relationship
21.6.3.2.2 CURE and SCORE Relationship
21.7 Convergence of the Blind Signal Separator
21.7.1 Superexponential Convergence
21.7.2 Assessment of Convergence
21.7.3 Initialization using a Simple Cumulant-based Eigendecomposition Method
21.8 Implementation Details and Flowchart
21.9 Simulation Results
21.1 Signal Model The signal model for the narrowband array case can be described by the following equation:

$$r(t)=As(t)+n(t),$$

in which r(t) denotes the array measurements collected by M sensors. The ith row, jth column element of the steering matrix A denotes the response of the ith element to the wavefront(s) arriving from the jth source. The jth column of A is called as the (generalized) steering vector for the jth source. We assume for each analysis block, N snapshots are collected and there are P sources contributing to the measurements. We also assume that the measurement noise n(t) is spatially white, and the noise powers at each sensor are identical but unknown and are denoted by $\sigma^2$.

In this invention, we propose approaches for both coherent and noncoherent sources. In the case of coherent sources, the response of the array to the source is measured in terms of a generalized steering vector, which is defined as a weighted sum of steering vectors from all multipath directions that a source is contributing to the measurements. Mathematically, if a source is illuminating the array from L paths, the generalized steering vector a can be represented as:

$$a = \sum_{l=1}^{L} \alpha_l a(\theta_l)$$

in which $\alpha_l$ and $a(\theta_l)$ denote the multipath coefficient and the steering vector corresponding for the lth multipath arrival respectively. In the case of a single arrival (incoherent source), L=1.

21.2 Problem Statement

Blind source separation/steering vector identification problem statement:

For the signal model: r(t)=As(t)+n(t)
  Determine the steering matrix A (blind steering vector identification) and estimate the source waveforms, s(t) (blind source separation), using only the array measurements, r(t).

The real difficulty with the blind separation/identification problem is that we are limited to use only the array measurements but not any information about the array responses. This is the main difference of blind source separation and conventional direction methods such as MUSIC and ESPRIT.

With no information on the array response, the only way to find a solution is to use the array measurements alone r(t). However, in the next section, we show that conventional second-order statistics based analysis of the array measurements is not sufficient to solve the separation problem in general.

21.3 Insufficiency of Second-Order Statistics for Blind Separation

In this section, we show that cochannel sources can not be separated by second-order statistics alone. Additional analysis is necessary to determine the steering vectors and waveforms of the sources.

Let us consider the array covariance matrix and assume that the sources are independent and the steering matrix A represents the effects of source correlation and propagation. Under the independence assumption, the source correlation matrix $R_{ss}$, and the array covariance matrix $R=E\{r(t)r^H(t)\}$, can be factored as follows:

$$R=E\{r(t)r^H(t)\}=AR_{ss}A^H+\sigma^2 I=(AR_{ss}^{1/2})(AR_{ss}^{1/2})^H+\sigma^2 I$$

in which $R_{ss}=\text{diag}(\sigma_1^2, \ldots, \sigma_p^2)$, $\Lambda_n=\sigma_n^2 I$. It is clear that for source separation purposes, estimating either A or $AR_{ss}^{1/2}$ is identical, because $R_{ss}$ is a diagonal matrix. We have the following singular value decomposition for $AR_{ss}^{1/2}$, based on the assumption of the linear independence of steering vectors:

$$AR_{ss}^{1/2}=USV$$

where U is an M×P matrix and V is a P×P matrix, and they satisfy $U^H U=I$, and $V^H V=I_p$. The P×P diagonal matrix S denotes the singular values (all positive). Assuming that we are after the normalized source waveforms, $s_c(t)$, each component having unit variance:

$$s_c(t)=R_{ss}^{-1/2}s(t),\ r(t)=AR_{ss}^{1/2}s_c(t)+n(t)$$

We can determine least-squares estimates of normalized source waveforms using the SVD:

$$\hat{s}_c(t)=(R_{ss}^{1/2}A^H AR_{ss}^{1/2})^{-1}R_{ss}^{1/2}A^H r(t)=(V^H SU^H USV)^{-1}V^H SU^H r(t)$$

Using $U^H U=I_p$ and $V^H V=I_p$, we have $$\hat{s}_c(t)=(V^H S^2 V)^{-1}V^H SU^H r(t)=V^H S^{-2}VV^H SU^H r(t)=V^H S^{-1}U^H r(t)$$

Therefore, to estimate the source waveforms, we need the matrix V in addition to U and S. But observing the array covariance matrix $$R=(USV)(USV)^H+\sigma_n^2 I=US(VV^H)SU^H=US^2 U^H+\sigma_n^2 I$$

we see that R is insensitive (blind) to the presence of the matrix V. The unitary matrix V cannot be estimated from the covariance matrix without ambiguity: one cannot distinguish between the correct $AR_{ss}^{1/2}=USV$ and 'a' version modified as $AR_{ss}^{1/2}U_{am}=US(VU_{am})$ (with $U_{am}^H U_{am}=I_p$), since both choices yield the same covariance matrix. On the other hand, we can recover U and S from the eigendecomposition of R:

$$R=US^2 U^H+\sigma_n^2 I=E_s\Lambda_s E_s^H+\sigma_n^2 E_r E_n^H$$

from which we isolate the signal-only components $$AR_{ss}A^H=US^2 U^H=E_s(\Lambda_s-\sigma_n^2 I)E_s^H$$

with the result $$U=E_s \text{ and } S=(\Lambda_s-\sigma_n^2 I)^{1/2}$$

Here we note that source separation with the covariance matrix is only possible in the hypothetical case when the steering vectors are orthogonal to each other ($a_k^H a_l=0$, if $k\neq l$) and source powers are all different ($\sigma_k^2$'s are all different). In this case, $V=I_p$, so there is no need to estimate it ($AR_{ss}^{1/2}=USI_p$). The source powers can be determined as the diagonal elements of S. If some of the source powers are identical, then the corresponding diagonal elements of S will be identical, which in turn forces the corresponding eigenvalues of the array covariance matrix to be equal. As a result, corresponding eigenvectors will not be uniquely determined: any linear combination of the eigenvectors with a common eigenvalue will be an eigenvector for the covariance matrix with the same eigenvalue, so that there will be no guarantee that the eigenvectors are the true steering vectors.

Using U and S, we can perform a part of the signal estimation task and decrease the observation dimension from M to P without losing any information about the signals:

$$y(t)=T^H r(t), \text{ where } T \triangleq E_s(\Lambda_s - \sigma_n^2 I)^{-1/2} = US^{-1}$$

This transformation can be rewritten as $$y(t)=T^H(AR_{ss}^{1/2} s_c(t)+n(t))=S^{-1}U^H(USVs_c(t)+T^H n(t))=Vs_c(t)+T^H n(t)$$

which results in the modified observation model $$y(t) = \sum_{k=1}^{P} \underbrace{(v_k / \sigma_k) s_k(t)}_{\triangleq b_k} + T^H n(t) = Bs(t) + \underbrace{T_H u(t)}_{\triangleq u(t)}$$

in which the vector $v_k$ is the kth column of V. Since V is a unitary matrix, we have the following relationship between the modified steering vectors ($b_k$s):

$$b_k^H b_j = \frac{1}{\sigma_k^2} \delta_{k,j}$$

The signal components of the P-vector y(t) are uncorrelated since $$E\{u(t)u^H(t)\}=T^H AR_{ss}A^H T=T^H US^2 U^H T=(S^{-1}U^H)US^2 U^H(US^{-1})=I_p$$

is an identity matrix. However, this does not mean that sources are separated; they are combined in a such a way that they are only uncorrelated (i.e., with the modified steering vectors $b_k$'s which are orthogonal to each other). Second-order statistics of y(t) provide no information about $b_k$'s, which highlights the need for additional (statistical) information for source separation.

The transformation defined by T indicates that multiple, stationary, zero-mean, directional Gaussian sources cannot be separated by any method, because the covariance matrix contains all the information about them, and this information (as explained above) is insufficient for the source separation problem. However, if there is only one Gaussian directional source in addition to other non-Gaussian sources, and we can determine the steering vectors of the non-Gaussian ones, then the Gaussian source waveform can be recovered by observing the signal subspace of the covariance matrix and the space spanned by the steering vectors of the non-Gaussian sources. Specifically, if the only Gaussian source is the first one, and the steering matrix can be decomposed as $A=[a_1, A_r]$, in which $A_r$ is known (or estimated), we can find the weight vector in the signal subspace that has perfect nulls on all the sources except the first one by computing the principal component of $$(I_M - A_r(A_r^H A_r)^{-1} A_r^H) E_s.$$

21.4 Cumulants-Definitions and Properties

This section gives an introduction to the definitions and properties of cumulants. Basic information on higher order statistics (the bispectrum in particular) can be found in A. Papoulis, *Probability, Random Variables, and Stochastic Processes*, Third Edition, 688 pp., McGraw-Hill, 1991. For a more comprehensive introduction to the world of higher order statistics, the reader should consult the following publications (listed in order of increasing difficulty):

1. A. Papoulis, Probability, Random Variables, and Stochastic Processes, 3rd Edition, McGraw-Hill, 1991, 688 pp. [Cf. section 11-7, pp. 389–395.]
2. Chrysostomos L. Nikias and Jerry M. Mendel, "Signal Processing with Higher-Order Spectra," IEEE Signal Processing Magazine, vol. 10, no. 3, pp. 10–37, July 1993.
3. Chrysostomos L. Nikias and Mysore R. Raghuveer, "Bispectrum Estimation: A Digital Signal Processing Framework," Proc. IEEE, vol. 75, no. 7, pp. 869–891, July 1987.
4. Jerry M. Mendel, "Tutorial on Higher-Order Statistics (Spectra) in Signal Processing and System Theory: Theoretical Results and Some Applications," Proc. IEEE, vol. 79, no. 3, pp. 278–305, March 1991.
5. Chrysostomos L. Nikias and Athina P. Petropulu, "Higher-Order Spectra Analysis: A Nonlinear Signal Processing Framework," PTR Prentice Hall, Inc., 1993.

21.3.1 Cumulants of Real Random Variables

The cumulants of a set of random variables give an alternate description to statistical moments. The underlying idea behind cumulants is simple. The probability density function (PDF) of a sum of independent random variables is equal to the convolution of the constituent PDFs. It follows that the characteristic function of the sum, which is the Fourier transform of the convolution PDF, is the product of the constituent characteristic functions. Hence, the logarithm of the characteristic function is the sum of the constituent log-characteristic functions, and the Maclaurin series coefficients of the log-characteristic function are the sums of the Maclaurin series coefficients of the constituent log-characteristic functions. These coefficients are the cumulants. In the multivariate case, joint cumulants are obtained as the generalization of these properties to the case of random vectors. The multilinearity properties, which are summarized below in [CP1] to [CP7], are an immediate consequence.

Cumulants can be defined in terms of mathematical expectations of products of random variables (i.e., moments) or terms of partial derivatives of the logarithm of the joint characteristic function of a set of random variables. The definitions that result are equivalent. If the goal is to compute estimates of cumulants, then the definition in terms of moments is more convenient. The alternate definition in terms of the characteristic function is more useful for analysis, such as the proof that the nth order cumulants of Gaussian random variables are identically zero whenever n>2. We present below the basic definitions of first- through fourth-order cumulants in terms of moments.

Definitions: We give the moment definitions of first- through fourth-order joint cumulants. Let $\{w,x,y,z\}$ be zero-mean random variables (real or complex) defined on a probability space. The first-order cumulant of a random variable x is its mean.

$$c_1^x = \text{cum}(x)$$
$$= E\{x\}$$

The second-order joint cumulant of two random variables x and y is their covariance.

$$c_2^{x,y} = \text{cum}(x, y)$$
$$= E\{xy\} - E\{x\}E\{y\}$$
$$= E\{xy\}, \text{ zero-mean case}$$

The third- and fourth-order joint cumulants are defined as follows.

$$c_3^{x,y,z} = \text{cum}(x, y, z)$$
$$= E\{xyz\} - E\{x\} - E\{y\} - E\{z\}$$
$$= E\{xyz\}, \text{ zero-mean case}$$

$$c_4^{w,x,y,z} = \text{cum}(w, x, y, z)$$
$$= E\{wxyz\} - E\{wxy\}E\{z\} - E\{wxz\}E\{y\} - E\{wyz\}E\{x\} -$$
$$E\{xyz\}E\{w\} - E\{wx\}E\{yz\} - E\{wy\}E\{xz\} - E\{wz\}E\{xy\} +$$
$$2E\{wx\}E\{y\}E\{z\} + 2E\{wy\}E\{x\}E\{z\} + 2E\{wz\}E\{x\}E\{y\} +$$
$$2E\{xy\}E\{w\}E\{z\} + 2E\{xz\}E\{w\}E\{y\} + 2E\{yz\}E\{w\}E\{x\} -$$
$$6E\{w\}E\{x\}E\{y\}E\{z\}$$
$$= E\{wxyz\} - E\{wx\}E\{yz\} - E\{wy\}E\{xz\} -$$
$$E\{wz\}E\{xy\}, \text{ zero-mean case}$$

Joint cumulants of order n≧3, can be defined as the difference between the corresponding nth-order joint moment of the given random variables and the nth-order joint moment of n Gaussian random variables that have the same mean vector and covariance matrix as the given random variables.

This definition of a joint cumulant as the difference between the nth-order moment of a random vector and that of a Gaussian random vector having the same mean and covariance matrix is reminiscent of the definition of the entropy power of a random process in information theory. In that definition, however, the entropy power of a stationary random process is defined as the variance of a Gaussian process having the same entropy as the process in question.

21.3.2 Sample Estimates of Cumulants

Sample estimates of the cumulants are straightforward to define. Let $\{(w_i, x_i, y_i, z_i) i=1,2, \ldots n\}$, a set of n-tuples (samples) that result from repeated trials of the random experiment that defines $\{w,x,y,z\}$. Then we can define the sample estimates of the cumulants by $$\hat{c}_3^{x,y,z} = \frac{1}{n}\sum_{i=1}^{n} x_i y_i z_i$$

$$\hat{c}_4^{w,x,y,z} = \frac{1}{n}\sum_{i=1}^{n} w_i x_i y_i z_i - \frac{1}{n^2}\sum_{i=1}^{n} w_i x_i \sum_{j=1}^{n} y_j z_j -$$
$$\frac{1}{n^2}\sum_{i=1}^{n} w_i y_i \sum_{j=1}^{n} x_j z_j - \frac{1}{n^2}\sum_{i=1}^{n} w_i x_i \sum_{j=1}^{n} x_j y_j$$

Under mild regularity conditions, the sample estimates of the cumulants converge to the cumulants as the number of samples n gets large.

21.3.3 Extension to Random Processes

We can define the random variables to be the values of a random process x(t) at four instants of time. Or we can define them to be the values of four random processes at the same instant of time, such as the output produced by a four-element array whose antennas are simultaneously sampled to produce an array snapshot. For example, third- and fourth-order cumulant function with arguments $t_k$ can be defined by $$c_3^{x,y,z}(t_1, t_2) = \text{cum}(x(t), y(t+t_1), z(t+t_2))$$
$$= E\{x(t)y(t+t_1)z(t+t_2)\}$$
$$c_4^{w,x,y,z}(t_1, t_2, t_3) = \text{cum}(w(t), x(t+t_1), y(t+t_2), z(t+t_3))$$

21.3.4 Extension to Complex Random Processes

In narrowband array processing applications, it is often necessary to use complex signals. Therefore, we need a definition for the cumulant of complex random processes. In particular, we will focus on the definition of fourth-order statistics because the third order statistics of signals that are common in array processing applications are zero.

The fourth-order cumulant of four zero-mean, complex random processes $\{v(t), x(t), y(t), z(t)\}$ is defined in a "balanced" way:

$$c_4^{w,x,y,z}(t_1, t_2, t_3) = \text{cum}(w^*(t), x(t+t_1), y^*(t+t_2), z(t+t_3))$$
$$= E\{w^*(t)x(t+t_1)y^*(t+t_2)z(t+t_3)\} -$$
$$E\{w^*(t)x(t+t_1)\}E\{y^*(t+t_2)z(t+t_3)\} -$$
$$E\{w^*(t)x(t+t_3)\}E\{y^*(t+t_2)x(t+t_1)\} -$$
$$E\{w^*(t)y^*(t+t_2)\}E\{x(t+t_1)z(t+t_3)\}$$

Furthermore, this cumulant can be estimated from the sample measurements as:

$$\text{cum}(w^*(t), x(t+t_1), y^*(t+t_2), z(t+t_3)) \approx$$
$$\frac{1}{N}\sum_{t=1}^{N} w^*(t)x(t+t_1)y^*(t+t_2)z(t+t_3) -$$
$$\frac{1}{N^2}\sum_{t,v=1}^{N} w^*(t)x(t+t_1)y^*(v+t_2)z(v+t_3) -$$
$$\frac{1}{N^2}\sum_{t,v=1}^{N} w^*(t)z(t+t_3)x(v+t_1)y^*(v+t_2) -$$
$$\frac{1}{N^2}\sum_{t,v=1}^{N} w^*(t)y^*(t+t_2)x(v+t_1)y^*(v+t_3)$$

21.3.5 Properties of Cumulants

Seven properties of cumulants, denoted [CP1] through [CP7] are listed below. Property [CP1] follows directly from the log-characteristic-function definition of cumulants. Properties [CP2] through [CP7] are as given in [Jerry M. Mendel, "Tutorial on Higher-Order Statistics (Spectra) in Signal Processing and System Theory: Theoretical Results and Some Applications," *Proc. IEEE*, vol. 79, no. 3, pp. 278–305, March 1991]. Cumulants can be treated as an operator, similar to the Riemann integral, the Fourier and Laplace transforms, and mathematical expectation. This is due to multilinearity, which is a consequence of the following six cumulant properties.

[CP1] Cumulants of jointly Gaussian random variables are identically zero, i.e. if $\{x_1, x_2, \ldots, x_n\}$ are jointly Gaussian random variables, then $$\text{cum}(x_1, x_2, \ldots, x_n) = 0$$

[CP2] Cumulants of scaled quantities (where the scale factors are non-random) equal the product of all the scale factors times the cumulant of the unscaled quantities, i.e., if $\{\lambda_1, \lambda_2, \ldots, \lambda_n\}$ are constants, and $\{x_1, x_2, \ldots, x_n\}$ are random variables, then $$\text{cum}(\lambda_1 x_1, \ldots, \lambda_n x_n) = \left(\prod_{i=1}^{n} \lambda_i\right) \text{cum}(x_1, \ldots, x_n)$$

[CP3] Cumulants are symmetric in their arguments, for example $$\text{cum}(x_1, \ldots x_n) = \text{cum}(x_{i_1}, \ldots x_{i_n})$$

where $\{i_1, \ldots, i_n\}$ is a permutation of $\{1, \ldots, n\}$. This means the arguments of the cumulant can be interchanged without changing the value of the cumulant.

[CP4] Cumulants are additive in their arguments, i.e., cumulants of sums equal sums of cumulants. Hence the name "cumulant." So, for example, even when $x_0$ and $y_o$ are not statistically independent, it is true that $$\text{cum}(x_0+y_0, z_1, \ldots, z_n) = \text{cum}(x_0, z_1, \ldots, z_n) + \text{cum}(y_0, z_1, \ldots, z_n)$$

[CP5] Cumulants are blind to additive constants, i.e., if $\alpha$ is a constant, then $$\text{cum}(\alpha+z_1, z_2, \ldots, z_n) = \text{cum}(z_1, z_2, \ldots, z_n)$$

[CP6] Cumulants of a sum of statistically independent quantities equal the sum of the cumulants of the individual quantities, i.e., if the random variables $\{x_1, x_2, \ldots, x_n\}$ are independent of the random $\{y_1, y_2, \ldots, y_n\}$, then $$\text{cum}(x_1+y_1, \ldots, x_n+y_n) = \text{cum}(x_1, \ldots, x_n) + \text{cum}(y_1, \ldots, y_n)$$

Note that if $x_i$ and $y_i$ are not independent, then by [CP3], there would be $2^n$ terms on the right-hand side of $\text{cum}(x_1+y_1, \ldots, x_n+y_n)$. Statistical independence reduces this number to two terms. [CP7] If some subset of the n random variables $\{x_1, x_2, \ldots, x_n\}$ is independent of the rest, then $$\text{cum}(x_1, \ldots, x_n) = 0$$

We would like to note that these properties apply equally well to the complex signals case.

21.5 Motivations to Use Cumulants

The main motivation to use higher that second-order statistics (or cumulants) is the inadequacy of second-order statistics for the blind source separation problem. Since the use of second-order statistics is not sufficient to solve the blind separation problem, it is necessary to exploit other statistics of measurements.

Cumulants have long been used to measure the non-Gaussianity of a process, for example, the fourth-order cumulant of a Gaussian process is identically zero. On the other hand, a binary sequence of equal probability ±1's has a fourth-order cumulant of −1 and variance of unity.

When multiple independent processes are added together, the resulting process tends to approach a Gaussian process because the individual probability density functions (PDFs) of the individual processes are convolved together to give the PDF of the resulting process. Therefore, it may be possible to adjust a linear beamformer weight vector so that the beamformer output will be as non-Gaussian as possible. The utility function to adjust the linear beamformer should:

Measure the deviation from non-Gaussianity

It should be scale invariant (i.e., amplification of the beamformer output should not change the non-Gaussianity measure).

One such utility function is the fourth-order cumulant strength:

$$f(w) = \frac{|\text{cum}(g^*(t), g(t), g^*(t), g(t))|}{E^2\{|g(t)|^2\}}, \text{ where } g(t) = w^H r(t)$$

Figure 43:
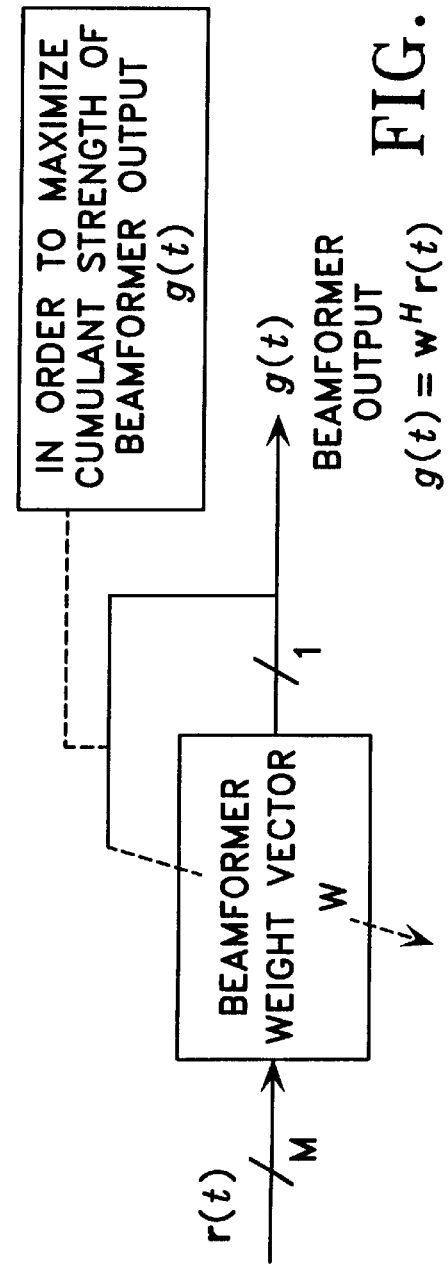
FIG. 43 is a block diagram showing the function of a cumulant strength based processor in separating one of many cochannel sources.

It can be shown that this function is at a maximum when a source can be separated by the linear beamformer weight vector w. A basic block diagram of a processor that attempts to separate a source among multiple sources based on cumulant strength is depicted in FIG. 43. This interpretation provides us a way to develop a solution to the blind signal separation problem which will be detailed in the following sections.

21.6 Derivations for the Cumulant Recovery (CURE) System

In this section, we provide two different approaches to derive the cumulant recovery (CURE) system which attempts to extract one of the multiple cochannel sources illuminating an antenna array.

The first approach stems from the cumulant strength maximization concept, we may try to evaluate the derivative of the cumulant strength utility function with respect to the linear beamformer weight vector w and equate the result to zero and solve for w. The second approach involves the evaluation of cumulant matrices and their principal eigenvalues and vectors by a method that will be defined as the constrained double-power method. The first method does not provide convergence properties, but its equivalence with the second approach will help us examine the convergence properties in the next section.

21.6.1 CURE Algorithm as a Cumulant Strength Maximizer

In the following our goal is to maximize the cumulant strength utility function:

$$f(w) = \frac{|\text{cum}(g^*(t), g(t), g^*(t), g(t))|}{E^2\{|g(t)|^2\}}, \text{ where } g(t) = w^H r(t)$$

Let us take the derivative of the above utility function with respect to the weight vector and set the result equal to zero. The cumulant can be expressed as:

$$\text{cum}(g^*(t), g(t), g^*(t), g(t)) = E\{|w^H r(t) r^H(t) w|^2\} - 2E\{w^H r(t) r^H(t) w\} - E\{|w^H r(t)|^2\} E\{|r^H(t) w|^2\}$$

Then, its derivative can be calculated by treating $w^H$ as the variable and $w$ as a constant:

$$\frac{\partial}{\partial w^H}\text{cum}(g^*(t), g(t), g^*(t), g(t)) = 2E\{w^H r(t)r^H(t)wr(t)r^H(t)w\} -$$
$$4E\{r(t)r^H(t)w\} - 2E\{(w^H r(t))r(t)\}E\{[r^H(t)w]^2\}$$

This expression can be put in a more convenient form as follows:

$$d = \frac{\partial}{2\partial w^H}\text{cum}(g^*(t), g(t), g^*(t), g(t))$$
$$= E\{|g(t)|^2 g^*(t)r(t)\} - 2E\{r(t)g^*(t)\} -$$
$$E^*\{g^2(t)\}E\{r(t)g(t)\}$$
$$d_k = \frac{\partial}{2\partial w^H}\text{cum}(g^*(t), g(t), g^*(t), r_k(t)),$$
$$= \text{cum}(g^*(t), g(t), g^*(t), r_k(t)), 1 \leq k \leq M.$$

Using the above result for the derivative of the cumulant expression, the derivative of the utility function can be calculated as:

$$\frac{\partial}{\partial w^H}f(w) = \frac{\text{sign}(\gamma_{4,g})\cdot(\sigma_g^2)^2\cdot 2\cdot d - 2\cdot|\gamma_{4,g}|\cdot E\{r(t)r^H(t)w\}}{(\sigma_g^2)^4} = 0$$

Equating the derivative to zero, we obtain the following necessary condition for the weight vector $w$ to be at an extrema of the cumulant strength utility function:

$$\gamma_{4,g}\cdot E\{r(t)r^H(t)\}w = (\sigma_g^2)^2\cdot d \rightarrow w = \frac{\gamma_{4,g}}{(\sigma_g^2)^2}R^{-1}d$$

This equation is called as the covariance inversion CURE iteration. In general, inverting the covariance matrix results in numerical problems if the signal to noise ratios are high. Therefore, a practical way of doing the above computation is to evaluate the eigendecomposition of the covariance matrix R, and use it in place of the covariance matrix inverse as follows:

$$w = \frac{\gamma_{4,g}}{(\sigma_g^2)^2}E_{ss}\Lambda_{ss}^{-1}E_{ss}^H d$$

This equation is called as the eigenCURE iteration in the measurement space. Since the scale factors are not important for the output signal to noise ratio performance, we can compute the weight, without using the scalar $$\frac{\gamma_{4,g}}{(\sigma_g^2)^2}.$$

Then, the whole process can be summarized as:

Using a weight vector $w$, obtain a signal $g(t)$:

$$g(t) = w^H r(t)$$

Using the signal $g(t)$, calculate the cumulant vector d:

$$d_k = \text{cum}(g^*(t), g(t), g^*(t), r_k(t)), 1 \leq k \leq M.$$

Calculate the new weights as:

$$w = E_{ss}\Lambda_{ss}^{-1}E_{ss}^H d$$

Obtain a new signal $g(t)$ using the new weights (after a possible normalization), and continue to iterate.

It is possible to compute the necessary weight vectors if the original measurements $r(t)$ are preprocessed by a transformation matrix so that the dimensionality is reduced from M to P and the preprocessing is done in such a way that the resulting measurements have an identity covariance matrix:

$$y(t) = T^H r(t), T = E_{ss}\Lambda_{ss}^{-1/2}$$
$$E\{y(t)y^H(t)\} = I_P$$

Then, the zero derivative condition translates itself to the following:

$$g(t) = v^H y(t)$$
$$d_k = \text{cum}(g^*(t), g(t), g^*(t), y_k(t)), 1 \leq k \leq P.$$
$$v = d$$

in which v is the weight vector in the reduced dimensionality space. Therefore, the signal separation process using the preprocessed measurements can be summarized as:

Using the eigenstructure of the covariance matrix, preprocess the measurements:

$$y(t) = T^H r(t), T = E_{ss}\Lambda_{ss}^{-1/2}$$

Using a weight vector v, obtain a signal $g(t)$:

$$g(t) = w^H y(t)$$

Calculate the new weights as:

$$v_k = \text{cum}(g^*(t), g(t), g^*(t), y_k(t)), 1 \leq k \leq P.$$

Obtain a new signal $g(t)$ using the new weight vector v (after a possible normalization), and continue to iterate.

Summarizing, we have shown how the derivative of the cumulant strength utility function can be computed both in the measurement space and the signal subspace. We proposed iterative methods that force this derivative to zero, and thereby find extremal points of the utility function The issue of algorithm convergence is covered below. To address convergence, we examine the structure of the cumulants of the measurements in detail below.

21.6.2 CURE Algorithm as Structured Eigenvector Computer

In this section, we first introduce a cumulant matrix C of size $P^2 \times P^2$ of the preprocessed array measurements. Using C, we describe the limitations of the previous cumulant based signal separation methods. Finally, using the structure in C we propose a cumulant based signal separation method that results in the maximization of cumulant strength.

21.6.2.1 Cumulant Matrix

In this section, we introduce a $P^2 \times P^2$ (here we assume the number of sources and its estimate are identical) cumulant matrix C:

$$C(P \cdot (i-1)+j, P \cdot (k-1)+l) = \text{cum } (y_i^*(t), y_j(t), y_k(t), y_l^*(t)) \quad 1 \leq i,j,k,l \leq P$$

in which the measurements that are used to compute the C matrix are the output of the preprocessor:

$$y(t) = T^H r(t), \text{ where } T \triangleq E_s (\Lambda_s - \sigma_n^2 I)^{-1/2} = US^{-1}$$

With finite samples, we can estimate the cumulant matrix C as follows:

$$C(P \cdot (i-1)+j, P \cdot (k-1)+l) = \frac{1}{N}\sum_{t=1}^{N} y_i^*(t)y_j(t)y_k(t)y_l^*(t) -$$

$$\frac{1}{N^2}\sum_{t_1=1}^{N} y_i^*(t_1)y_j(t_1)\sum_{t_2=1}^{N} y_k(t_2)y_l^*(t_2) -$$

$$\frac{1}{N^2}\sum_{t_1=1}^{N} y_i^*(t_1)y_k(t_1)\sum_{t_2=1}^{N} y_j(t_2)y_l^*(t_2) -$$

$$\frac{1}{N^2}\sum_{t_1=1}^{N} y_i^*(t_1)y_l(t_1)\sum_{t_2=1}^{N} y_j(t_2)y_k(t_2)$$

$$1 \leq i, j, k, l \leq P$$

Let the pair $(\gamma_{4,m}, \sigma_m^2)$ denote the fourth order cumulant and power of the mth source respectively. Using the statistical independence of the signals illuminating the array and the properties of fourth order cumulants, it can be proved that the cumulant matrix C can be decomposed as:

$$C = \sum_{m=1}^{P} \gamma_{4,m}(b_m^* \otimes b_m)(b_m^* \otimes b_m)^H, \text{ in which, } b_m = T^H a_m$$

in which '$\otimes$' denotes the Kronecker product. The P dimensional vector $b_m = T^H a_m$, denotes the effective steering vector of the mth source after the transformation:

$$y(t) = \sum_{k=1}^{P} T^H a_m s_m(t) + T^H n(t) = \sum_{k=1}^{P} b_m s_m(t) + T^H n(t)$$

If we recall the singular value decomposition $AR_{ss}^{1/2} = USV$, then we have the following relation:

$$b_m = \frac{1}{\sigma_m^2} v_m, \quad 1 \leq m \leq P.$$

and therefore, we can rewrite C as:

$$C = \sum_{m=1}^{P} \gamma_{4,m}(b_m^* \otimes b_m)(b_m^* \otimes b_m)^H$$

$$= \sum_{m=1}^{P} \frac{\gamma_{4,m}}{(\sigma_m^2)^2}(v_m^* \otimes v_m)(v_m^* \otimes v_m)^H$$

Since the $v_m$'s are orthogonal to each other, the eigendecomposition of the Hermitian matrix C can be found rather easily. Its eigenvectors are:

$$e_m = (\sigma_m^2)^2 (b_m^* \otimes b_m) = (v_m^* \otimes v_m), \quad 1 \leq m \leq P.$$

with the corresponding eigenvalues:

$$\lambda_m = \frac{\gamma_{4,m}}{(\sigma_m^2)^2}$$

We observe that modulus of the mth principal eigenvalue is a measure of the strength of non-Gaussianity of the mth source, and it is a scale invariant quantity (multiplying $s_m(t)$ with any nonzero constant will not change $|\lambda_m|$).

From this analysis, we determine that if the eigenvalues of C are all distinct (in other words, if they have different strength of non-Gaussianity), then the eigendecomposition of C is unique, and the principal eigenvectors reveal the modified steering vectors $b_m$ in a Kronecker product form ($e_m = (\sigma_m^2)^2 (b_m^* \otimes b_m)$, $1 \leq m \leq P$.). However, if there are sources of the same modulation type their cumulant strengths will be identical and the cumulant matrix C will have repetitive eigenvalues.

Let us define an operator "unvec(.)" that converts a $P^2$-vector h to a $P \times P$ square matrix G:

$$G = \text{unvec } (h) \Rightarrow g(i,j) = h(M \cdot (j-1)+i) \quad 1 \leq m \leq P$$

Therefore, after performing an eigendecomposition on C, we obtain em and use this vector to estimate the mth modified steering vector:

$$G_m(i,j) \triangleq \text{ unvec } (e_m) = \text{unvec } (\sigma_m^2(b_m^* \otimes b_m)) \quad 1 \leq m \leq P$$

which yields $$G_m = \sigma_m^2 b_m b_m^H = v_m v_m^H.$$

This result indicates that the columns of the unitary matrix V (i.e., $v_m$'s) can be obtained as the principal component of $G_m$ within a phase ambiguity (if $v_m$ is the principal component of $G_m$, then so is $v_m \exp(j2\pi \theta)$ with $0 \leq \theta < 1$). It also indicates the limitations of blind steering vector estimation: since both source powers and modified steering vectors $b_m$'s are unknown, we cannot not identify both of them uniquely without a scale factor ambiguity. Furthermore, the eigendecomposition of C will yield an ordering of the eigenvectors ($e_m$'s) with respect to the magnitude of their eigenvalues ($\gamma_{4,m}/(\sigma_m^2)^2$). Therefore, the unitary matrix V is determined up to an ordering of its columns in addition to a phase ambiguity, which can be expressed as $$\tilde{V} = V D_s^H P_s^H$$

where $P_S$ is a $P \times P$ permutation matrix that describes the reordering encountered during the eigendecomposition of C. The $P \times P$ diagonal matrix $D_S$ contains phase ambiguity factors associated with the columns of the unitary matrix $\tilde{V}$.

Using $\tilde{V}$, we can estimate the source waveforms as $$\tilde{V}^H r(t) = P_s D_s \hat{s}_c(t)$$

which implies a reordering and phase rotation for the normalized source waveform estimates and it is equivalent to obtaining $\hat{s}_c(t)$ for signal separation purposes. In addition, we can find the steering vectors as $$E_s(\Lambda_s - \sigma_n^2 I)^{1/2} \tilde{V} = A D_s^H P_s^H.$$

The steering vectors A are needed for retrieving directional information. The presence of phase ambiguities and reordering does not introduce a problem in the single block analysis, but for the block-by-block analysis of array measurements, continuity constraints between blocks will be necessary in order to prevent random (spurious) modulation of separated signals due to $D_S$ and change of their ordering (port switching) due to $P_S$. This issue will be discussed in later sections.

21.6.2.2 Limitations of Previous Cumulant-based Approaches

We note that during this cumulant-based signal separation procedure, two levels of eigendecompositions are required:

1. The eigendecomposition of the $P^2$ by $P^2$ cumulant matrix C to determine the P by P, $G_m$ matrices (there are P of them);
2. Principal component analysis of $G_m$ matrices for each of the P sources that contribute to the measurements.

When we also consider the eigendecomposition performed on the covariance matrix before cumulant computations, the demand becomes intense for real-time applications.

An even more important problem arises when there are sources of the same type, which result in identical eigenvalues ($\gamma_{4,m}/(\sigma_m^2)^2$). Let us consider the presence of two identical sources (P=2). Then the 4 by 4 cumulant matrix C will be rank two, but since the eigendecomposition is not unique in this case (any linear combination of the two principal eigenvectors will be a valid eigenvector), the matrices $G_1$ and $G_2$ will both be rank two, and their principal components will not yield the steering vectors of interest. In the presence of more identical sources, the situation gets more complicated. This is a major problem for previously existing cumulant based blind signal separation algorithms (see for example the following two papers: 1) J. F. Cardoso and A. Souloumiac, "Blind Beamforming for non-Gaussian Signals," *IEE Proceedings Part F*, vol. 140, no. 6, pp. 362–370, December 1993, and 2) L. Tong, J. Inouye and R. Liu, "Waveform Preserving Blind Identification of Multiple Independent Sources," *IEEE Trans. on Signal Processing*, vol. 41, no. 7, pp. 2461–2470, July 1993).

We end this section indicating the high level of redundancy incorporated in the structure of the cumulant matrix C. For practical applications, it is important to use the symmetries in the cumulant matrix to reduce the computations. In the next section, we describe an approach to overcome the problems related to the eigendecomposition of C, and the complications originating from the presence of similar modulations. In the pipeline structure, computation of C is the major load in the processing, and to ensure a forward looking processing structure, multiple parallel processors may be dedicated to compute C, although we show a single unit as the cumulant matrix computer.

21.6.2.3 Cumulant-based Iterative Blind Separation

We introduce the multiple port signal recovery unit as a solution to finding the eigenvectors of the cumulant matrix C using the power method. Since we know the structure of the eigenvectors (the Kronecker product structure):

$$e_m = (\sigma_m^2)^2 (b_m^* \otimes b_m), \; 1 \leq m \leq P.$$

We should exploit this information in order to

Reduce the computations

Eliminate the problems associated with the presence of sources with identical statistics.

At each iteration, the power method computes the following, using the $P^2$ by $P^2$ cumulant matrix C:

$$f = C(w^* \otimes w)$$

and using w as a substitute for one of the columns of the unitary matrix V.

After proper normalization, the result f will be used to repeat this matrix-vector multiplication until some form of convergence criterion is met (w will be parallel to one of the $v_m$'s at convergence). Instead of an arbitrary $P^2$-vector, we use $(w^* \otimes w)$, since we know that the eigenvectors must be of this form. This multiplication will result in $$f = C(w^* \otimes w) = \sum_{m=1}^{P} \frac{\gamma_{4,m}}{(\sigma_m^2)^2}(v_m^* \otimes v_m)(v_m^* \otimes v_m)^H(w^* \otimes w) = \sum_{m=1}^{P} \frac{\gamma_{4,m}}{(\sigma_m^2)^2}(v_m^* \otimes v_m)|v_m^H w|^2.$$

For the next iteration of the power method, we need to obtain a P-vector from f that is a $P^2$ vector. Using the unvec(.) operation yields $$F = \text{unvec}(f) = \sum_{m=1}^{P} \frac{\gamma_{4,m}}{(\sigma_m^2)^2}(|v_m^H v|^2) v_m v_m^H$$

We observe that the eigenvectors of F are the columns of the unitary matrix V ($v_m$'s). Since our substitute for $v_m$ is w, we can reuse this weight vector for the power method on F:

$$Fw = \sum_{m=1}^{P} \frac{\gamma_{4,m}}{(\sigma_m^2)^2} |v_m^H v|^2 (v_m^H w) v_m$$

Therefore, the overall iteration can be thought of a cascade of two power method iterations, and it can be described as $$w_{b+1} = a_{b+1} \cdot \text{unvec}\,(C(w_b^* \otimes w_b))\, w_b$$

where the constant $a_{b+1}$ is chosen so that the norm of $w_{b+1}$ is unity.

Using cumulant properties, it is possible to perform the iteration without computing the cumulant matrix C and performing unvec(.) operation. To see this, we rewrite the iteration as $$w_{b+1}(j) = a_{b+1} \cdot \sum_{i,k,l=1}^{P} \text{cum}(y_i^*(t),\, y_j(t),\, y_k(t),\, y_l^*(t)) w_b(i) w_b^*(k) w_b(l),$$

$1 \leq j \leq P.$

Using the multilinearity property of the cumulants, followed by the permutation property, we obtain $$w_{b+1}(j) = \alpha_{b+1} \cdot \sum_{i,k,l=1}^{P} \text{cum}(w_b(i)y_i^*(t), w_b^*(k)y_k(t), w_b(l)y_l^*(t), y_j(t))$$

Finally, using the additivity property of cumulants, $$w_{b+1}(k) = \alpha_{b+1} \cdot \text{cum}\left(\sum_{i=1}^{P} w_b(i)y_i^*(t), \sum_{k=1}^{P} w_b^*(k)y_k(t), \sum_{l=1}^{P} w_b(l)y_l^*(t), y_j(t)\right)$$

Noting that $\Sigma_{k=1}^{P} w_b^*(k)y_k(t)$ is the inner product $w_b^H y(t)$, we have $$w_{b+1}(j) = a_{b+1} \cdot \text{cum}(g_b^*(t), g_b(t), g_b^*(t), y_j(t)) \quad 1 \leq j \leq P$$

where the waveform gb(t) is obtained as $$g_b(t) = w_b^H(t)y(t).$$

With true cumulants, the weight vector w will satisfy the following relationship at convergence:

$$w = \alpha \cdot \sum_{m=1}^{P} \frac{\gamma_{4,m}}{(\sigma_m^2)^2} |v_m^H w|^2 (v_m^H w) v_m = \alpha R_c(w) w.$$

The matrix $R_c(w)$ has the same structure as an array covariance matrix R, if we consider $(\gamma_{4,m}/(\sigma_m^2)^2)|w^H v_m|^2$ as source powers. The introduction of weight vector w enables us to tune the effective source powers in $R_c(w)$, using the cumulants of processed measurements. For this reason, we named the proposed signal separation method the Cumulant-Recovery (CURE) algorithm. The idea of using the preprocessed signals provided by a transformation obtained from the eigendecomposition of the covariance matrix finalizes the name as the eigenCURE algorithm.

Solutions to the convergence relationship are of the main interest here, and we note that they include the set of vectors $v_1, v_2, \ldots, v_P$ which are the target vectors for source separation. To see this, we note that $v_k^H v_m = \delta_{k,m}$, and let $w = v_k$, which yields $$R_c(v_k)v_k = \sum_{m=1}^{P} \frac{\gamma_{4,m}}{(\sigma_m^2)^2} \delta_{k,m}$$

$$v_m = \frac{\gamma_{4,k}}{(\sigma_k^2)^2} v_k = \alpha v_k.$$

21.6.2.4 Direct versus Beamforming-based Computation of the Cumulant Iteration

In this section, we summarize beamforming and direct computation approaches for cumulant iteration.

21.6.2.5 Cumulant Iteration Using Beamforming

In this section, we briefly describe the fundamentals of a single port operation for the capture of a single source among P sources.

1. Transformation of Steering Vectors: Project the steering vector estimate $a_{init}$, onto the reduced dimensional space by the transformation matrix T, provided by normalization:

$$b_{init} = T^H a_{init}, \quad w = \frac{b_{init}}{\|b_{init}\|}$$

2. Beamforming: Using the projected and normalized steering vector w, combine the preprocessed measurements y(t) and form the auxilary signal g(t):

$$g(t) = w^H y(t)$$

3. Computation of Cross-Cumulant Vector: Using the auxilary signal and projected measurements y(t), compute the cumulant vector $$b_j = \text{cum}(g^*(t), g(t), g^*(t), y_j(t)) \quad 1 \leq j \leq P$$

and normalize its norm:

$$b = \frac{b}{\|b\|}$$

4. Orthogonalization of Cross-Cumulant Vector: Using Gram-Schmidt and Port Priorities, orthogonalize the cross-cumulant vector with respect to cross-cumulant vectors of sources with higher priority. Obtain a unit norm vector d by processing b.

5. Continue Iterations: Using the unit norm d vector obtained in step 4, as a new weight vector, go to step 2, and use beamforming to obtain a new auxiliary signal. Repeat Steps 2 through 5 until convergence criteria are met.

6. Backprojection: Use the final estimates of the d vector from Step 4 after convergence, use backprojection to estimate the steering vectors in the measurements space using the eigenstructure of the covariance matrix for the current block:

$$\hat{a} = E_s(\Lambda_s - \hat{\sigma}^2 I_P)^{+\frac{1}{2}} d$$

7. Signal Extraction and Steering Vector Propagation: Use the steering vector estimate a for recovering the source waveform for the current block and as an initial estimate of the next block's adaptation, i.e., for the current block, set:

$$a_{init} = \hat{a}.$$

21.6.2.5 Direct Cumulant Iteration

In this section, we provide a way to compute the cross cumulant vector b, defined as:

$$b_j = \text{cum}(g^*(t), g(t), g^*(t), y_j(t)) \quad 1 \leq j \leq P$$

in Step 3 of the previous section, using a $P^2$ by $P^2$ cumulant matrix C.

The matrix under consideration is defined as:

$$C(P \cdot (i-1) + j, P \cdot (k-1) + l) = \text{cum}(y_i^*(t), y_j(t), y_k(t), y_l^*(t)) \quad 1 \leq i,j,k,l \leq P$$

Now, let us consider the following matrix vector multiplication that involves Kronecker products:

$$b=(w^*\otimes I)^H C(w^*\otimes w)$$

Using the definition of the C matrix, and the definition of matrix multiplication and Kronecker product:

$$b_j = \sum_{i,k,l=1}^{P} \text{cum}(y_i^*(t), y_k(t), y_l^*(t), y_j(t))[w_i w_k^* w_l], \ 1 \le j \le P$$

Using the multilinearity property of the cumulants:

$$b_j = \sum_{i,k,l=1}^{P} \text{cum}(w_i y_i^*(t), w_k^* y_k(t), w_l y_l^*(t), 1 \cdot y_j(t))$$

Finally, using the additivity property of cumulants, $$b_j = \text{cum}\left(\sum_{i=1}^{P} w_i y_i^*(t), \sum_{k=1}^{P} w_k^* y_k(t), \sum_{l=1}^{P} w_l y_l^*(t), y_j(t)\right)$$

Noting that $\Sigma_{k=1}^{P} w_k^* y_k(t)$ is the inner product $w^H y(t)$, we have $$b_j = \text{cum}(g^*(t), g(t), g^*(t), y_j(t)) \ 1 \le j \le P$$

where the waveform g(t) is obtained as $$g(t)=w^H(t)y(t).$$

The last two equations prove that:

$$b=(w^*\otimes I)C(w^*\otimes w) \Leftrightarrow b_j=\text{cum}(g^*(t),g(t),g^*(t),y_j(t)) \ 1 \le j \le P.$$

This is the equivalence of direct computation to the beamforming approach. It is evident that the b vector is identical to the d vector for the cumulant strength maximization approach; both methods are identical except for the transformation matrix T.

21.6.3 Reference Signal Exploitation Framework for the CURE Blind Signal Separator In this section, we provide a framework that enables us to visualize the CURE algorithm as a reference signal based processor that uses the cross-cumulants of the reference signal that is generated from the array measurements in order to estimate the steering vectors of sources and their waveforms.

Using this framework, we investigate the relationship of the CURE algorithm with the CMA and SCORE algorithms that exploit properties of signals of interest. We determine that CMA and SCORE are special cases of the CURE algorithm if desired signal properties are incorporated in the reference signal that CURE uses to compute cross-cumulants. Based on this observation, we propose extensions of the CURE algorithm to use properties of the desired signals more efficiently to achieve signal separation.

21.6.3.1 Reference Signal Exploitation Framework

Conventional adaptive beamformers use a reference signal to determine the steering vector of a desired signal, i.e., $$\hat{a}=E\{r(t)g^*(t)\}$$

in which â is the estimate of the steering vector, r(t) is the M channel measurement vector, and g(t) is the reference signal which is only correlated with the signal of interest and uncorrelated with the other sources that contribute to the measurements. After the steering vector estimate is available, we can determine the weight vector using the MVDR beamformer:

$$w=\beta R^{-1}\hat{a}$$

where β is a constant that does not change the signal to interference ratio, but can control the power of the recovered signal. The waveform estimate can be obtained as follows:

$$\hat{s}_d(t)=w^H r(t)$$

If the original measurement vector is projected onto the signal subspace using the transformation matrix $T=E_s\Lambda_s^{-1/2}$:

$$y(t)=T^H r(t), E\{y(t)y^H(t)\}=I_P$$

where P is the number of sources. Then, using a reference signal g(t), the steering vector estimate for the reduced dimensional space, b (P-vector), can be obtained as:

$$\hat{b}=E\{y(t)g^*(t)\}$$

and the desired source waveform can be obtained using $\hat{s}_d(t)=\beta \hat{b}^H r(t)$, since the covariance matrix of reduced dimensional measurements is the identity matrix, i.e., $$E\{y(t)y^H(t)\}=I_P.$$

Now, let us consider the CURE iteration, in which we provide the estimate of the steering vector b for the reduced dimensional measurements using a cross-cumulant vector computation:

$$\hat{b}=E\{g^*(t)g(t)g^*(t)y(t)\}-E\{|g(t)|^2\}E\{y(t)g^*(t)\}-E^*\{g^2(t)\}E\{y(t)g^*(t)\},$$
with $g(t)=v^H y(t)$ in which the weight vector v can be chosen to have unit norm, i.e., $\|v\|=1$, so that the signal g(t) will have unit power, i.e., $E\{|g(t)|^2\}=1$, which results in simplifications in the computation of $\hat{b}$.

Now, let us step back from the cumulant-based steering vector estimation, and consider the case for which we have three different reference signals, instead of only one, i.e., we have $g_1(t), g_2(t), g_3(t)$ which are only correlated with the signal of interest and uncorrelated with the remaining part of the measurements.

If we use all of the three reference signals in the cross-cumulant-based steering vector estimation for the reduced dimensional space, then we need to compute the following cross-cumulant vector:

$$\hat{b}=E\{g_1^*(t)g_2(t)g_3^*(t)y(t)\}-E\{g_1^*(t)g_2(t)\}E\{y(t)g_3^*(t)\}-$$
$$E\{g_3^*(t)g_2(t)\}E\{y(t)g_1^*(t)\}-E^*\{g_1(t)g_3(t)\}E\{y(t)g_2(t)\}$$

Therefore, our cumulant-based signal separation technique, that uses a eight vector to generate a reference signal g(t) and use the cross-cumulants of g(t) and reprocessed measurements y(t) can be considered as a special application of the three reference signals case in which we choose to select: $g_1(t)=g_2(t)=g_3(t)=g(t)=v^H y(t)$.

From this it follows that if we have multiple guesses for the weight vector, then we can form reference signals with them and use (at most three of such reference signals) to calculate the steering vector estimate $\hat{b}$.

Finally, once $\hat{b}$ is computed, the steering vector estimate $\hat{a}$ in the original measurement space can be computed using:

$$\hat{a} = E_s \Lambda_s^{1/2} \hat{b}$$

21.6.3.2 Relationships with Other Algorithms

Constant modulus algorithm (CMA) and cyclostationary-restoral (SCORE) algorithms are developed with assumptions about the signal of interest. In the development of CURE algorithm, we assumed that signals of interest are non-Gaussian. In CMA, signals of interest are assumed to be constant-modulus signals, and in SCORE algorithm, it is assumed that signals of interest possess cycle frequencies which are known a priori or can be estimated reliably. In this section, we show how we can reduce the CURE algorithm to CMA and SCORE algorithms using assumptions on the signal of interest.

21.6.3.2.1 CURE and CMA Relationship

In this section, we assume that the signals of interest have constant modulus. Therefore, we can further improve the quality of the reference signal $g(t) = v^H y(t)$, by normalizing its amplitude to be unity and the new reference signal can be obtained as:

$$g_n(t) = g(t)/|g(t)|$$

We can then set $g_1(t) = g_2(t) = g_3(t) = g_n(t)$, and compute the cross-cumulant vector to estimate $\hat{b}$:

$$\hat{b} = E\{y(t)g^*(t)/|g(t)|\} - 2 \cdot 1 \cdot E\{y(t)g^*(t)/|g(t)|\} - E^*\{g(t)g(t)/|g(t)|^2\}E\{y(t)g(t)/|g(t)|\}$$

For circularly symmetric signals, the second term in the above expression is theoretically zero, and therefore the expression can be simplified as:

$$\hat{b} = E\{y(t)g^*(t)/|g(t)|\}$$

In this last equation, we ignored the sign multiplier, because it does not change the signal to noise ratio of a beamformer that uses $\hat{b}$ for beamforming. If we choose to implement this algorithm without projecting the measurements onto the signal subspace, then the estimate of the steering vector will be:

$$\hat{a} = E\{r(t)g^*(t)/|g(t)|\}$$

which is used to compute the weight vector using the inverse of the covariance matrix R:

$$w = \beta R^{-1} \hat{a}.$$

By comparing the last two equations to the LS-CMA [described in: B. Agee, "The least-Squares CMA: A New Technique for Rapid Correction of Constant Modulus Signals," *Proc. ICASSP-86*, pp. 953–956, Tokyo, Japan, April 1986], we find that they are identical. Therefore, LS-CMA can be viewed as a version of the CURE algorithm when the desired signals are assumed to be constant modulus and circularly symmetric.

We note that LS-CMA is a wrong implementation of the cumulant algorithm for signals that are not circularly symmetric. The reason for this problem is that we cannot ignore the term $E^*\{g(t)g(t)/|g(t)|^2\}E\{y(t)g(t)/|g(t)|\}$ in the fourth-order cumulant expression in such a scenario. Therefore, the results of the LS-CMA for such sources are not expected to be satisfactory and one example is the two BPSK signals with zero carrier offsets. In this case, LS-CMA combines the sources to form a 4-QAM type of signal which is constant modulus and circular y symmetric.

Finally, we note that intermediate algorithms can be developed by choosing different reference signals for the cross-cumulant computation. For example, be may choose $g_1(t) = g_2(t) = g(t) = v^H y(t)$, and $g_3(t) = g_n(t)$, and obtain a steering vector estimate using:

$$\hat{b} = E\{g^*(t)|g(t)|y(t)\} - E\{|g(t)|^2\}E\{y(t)g^*(t)/|g(t)|\} -$$
$$E\{|g(t)|\}E\{y(t)g^*(t)\} - E^*\{g(t)g(t)/|g(t)|\}E\{y(t)g(t)\}$$

If the signal recovered by the weight vector v is circularly symmetric and v is unit norm, we can simplify the expression:

$$\hat{b} = E\{g^*(t)|g(t)|y(t)\} - E\{y(t)g^*(t)/|g(t)|\} - E\{|g(t)|\}E\{y(t)g^*(t)\}$$

21.6.3.2.2 CURE and SCORE Relationship

In CURE algorithm, we obtain a reference signal $g(t)$ by using the linear beamformer and use this reference signal to update the weights of the beamformer through a cumulant vector computation. In certain scenarios, frequency-shifted and delayed versions of the desired signal is correlated with itself, and if we want CURE algorithm to extract the waveform from such a source, we can make use of the modified reference signal $g_n(t)$:

$$g_n(t) = g(t-\tau) \exp(j2\pi\alpha t) = v^H y(t-\tau) \exp(j2\pi\alpha t)$$

We can compute the cumulant vector using $g_n(t)$:

$$\hat{b}_l = \text{cum}(g_n^*(t), g_n(t), g_n^*(t), y_l(t)), \quad 1 \leq l \leq M.$$

Now, in an effort to reduce the computations, we can use the fact that the phase of $g_n(t)$ is very similar to that of the desired signal near convergence and that the information content of $g_n(t)$ may very well be represented by its phase (amplitude is assumed to carry relatively small information): we can use $h(t) = g_n(t)/|g_n(t)|$, as the reference signal:

$$\hat{b}_l = \text{cum}(h^*(t), h(t), h^*(t), y_l(t)), \quad 1 \leq l \leq M.$$

For circularly symmetric signals, this approach results in a hybrid form which has relations to CMA and SCORE (scale factors are ignored):

$$\hat{b} = E\{y(t)g^*(t-\tau) \exp(-j2\pi\alpha t)/|g(t-\tau)|\}$$

which possesses the capture effect of CMA in the case of multiple cyclostationarity sources with the same cycle frequency and signal selectivity property of SCORE for resistance against noise capture.

Finally, we note that a specific mix of reference signals $g_n(t)$ and $h(t) = g_n(t)/|g_n(t)|$, in the cumulant vector $$\hat{b}_l = \text{cum}(g_n^*(t), g_n(t), h^*(t), y_l(t)), \quad 1 \leq l \leq M.$$

gives the power-SCORE iteration [B. G. Agee, S. V. Schell, and W. A. Gardner, "Spectral Self-Coherence Restoral: A New Approach to Blind Adaptive Signal Extraction Using Antenna," *Proceedings of the IEEE*, vol.78, pp.753–767, April 1990]:

$$\hat{b} = E\{y(t)g^*(t-\tau) \exp(-j2\pi\alpha t)\}$$

when we ignore the scale factors and assume circular symmetry.

21.7 Convergence of the Blind Signal Separator

In this section, we analyze the convergence characteristics of the blind signal separator based on cumulants. We also provide optional methods for assessment of convergence, and initialization methods for better initialization of the iterative algorithm.

21.7.1 Superexponential Convergence

We now analyze the convergence characteristics of the cumulant-based iterations. Let us assume that the initial weight vector $w_0$ is arbitrarily chosen (but has unit norm) and can be expressed as $$w_0 = \sum_{k=1}^{P} \beta_k(0) v_k$$

since the set $v_1, \ldots, v_P$ forms an orthonormal basis for the P dimensional space. Since $w_0$ has unit norm, we have $\sum_{k=1}^{P} |\beta_k(0)|^2 = 1$. After an iteration, we obtain $w_1$ as:

$$w_1 = \alpha_1 \sum_{k=1}^{P} \underbrace{\frac{\gamma_{4,k}}{(\sigma_k^2)^2} |\beta_k(0)|^2 \beta_k^*(0)}_{\beta_k(1)} v_k$$

where $\alpha_1$ is a scale factor to make the norm of $w_1$ be equal to unity.

The last expression is derived using the orthogonality of $\{v_k\}_{k=1}^{P}$. We can express the weight vector after the Lth iteration in the following form:

$$w_L = \alpha_L \sum_{k=1}^{P} \beta_k(L) v_k$$

where $\alpha_L$ is a scale factor to make the norm of $w_L$ be equal to unity, i.e., $\sum_{k=1}^{P} |\beta_k(L)|^2 = 1/\alpha_L^2$. The coefficients $\{\beta_k(L)\}_{k=1}^{P}$ determine the decomposition of the weight vector at the Lth iteration in terms of the basis vectors $\{v_k\}_{k=1}^{P}$. At convergence, we want the modulus of only one of the $b_k$'s to be unity and the rest be all zeros (since w has to be unit norm). We can obtain the recursive relation $$\beta_k(L) = \frac{\gamma_{4,k}}{(\sigma_k^2)^2} |\beta_k(L-1)|^2 \beta_k^*(L-1)$$

To determine the signal contributions, we are interested in the norm of $\beta_k(L)$. From the recursive relation, we obtain $$|\beta_k(L)| = \left|\frac{\gamma_{4,k}}{(\sigma_k^2)^2}\right|^{(3^{L+1}-3)/6} |\beta_k(0)|^{3^L}$$

Note that the norm of $\beta_k(L)$ grows superexponentially unlike other algorithms that grow in an exponential fashion.

Let us compare the ratio of the contributions from two sources (a multiple-source case can be treated in the same way); we define $c(L) \triangleq |\beta_1(L)/\beta_2(L)|$ and $\gamma \triangleq |(\gamma_{4,1}/\gamma_{4,2})(\sigma_2^4/\sigma_1^4)|$. We have the following recursive relation:

$$c(L) = \gamma [c(L-1)]^3 = \gamma^{(3^{L+1}-3)/6} [c(0)]^{3^L}$$

As L increases c(L) may tend to $+\infty$, zero, or a finite positive number. If $c(L) \to +\infty$, then this implies the weight vector converges to $v_1$. If $c(L) \to 0$, then the weight vector converges to $v_2$. But if c(L) converges to a finite positive constant, then the weight vector will be a linear combination of $v_1$ and $v_2$, which is not a desired result. We now investigate for which values of g and c(0) this undesired situation may happen, as $L \to +\infty$. Take the logarithm of c(L) to obtain $$(3^L) \log(c(0)) + (3^{L+1}-3)/6 \log(\gamma) = \text{finite constant}$$

Figure 44:
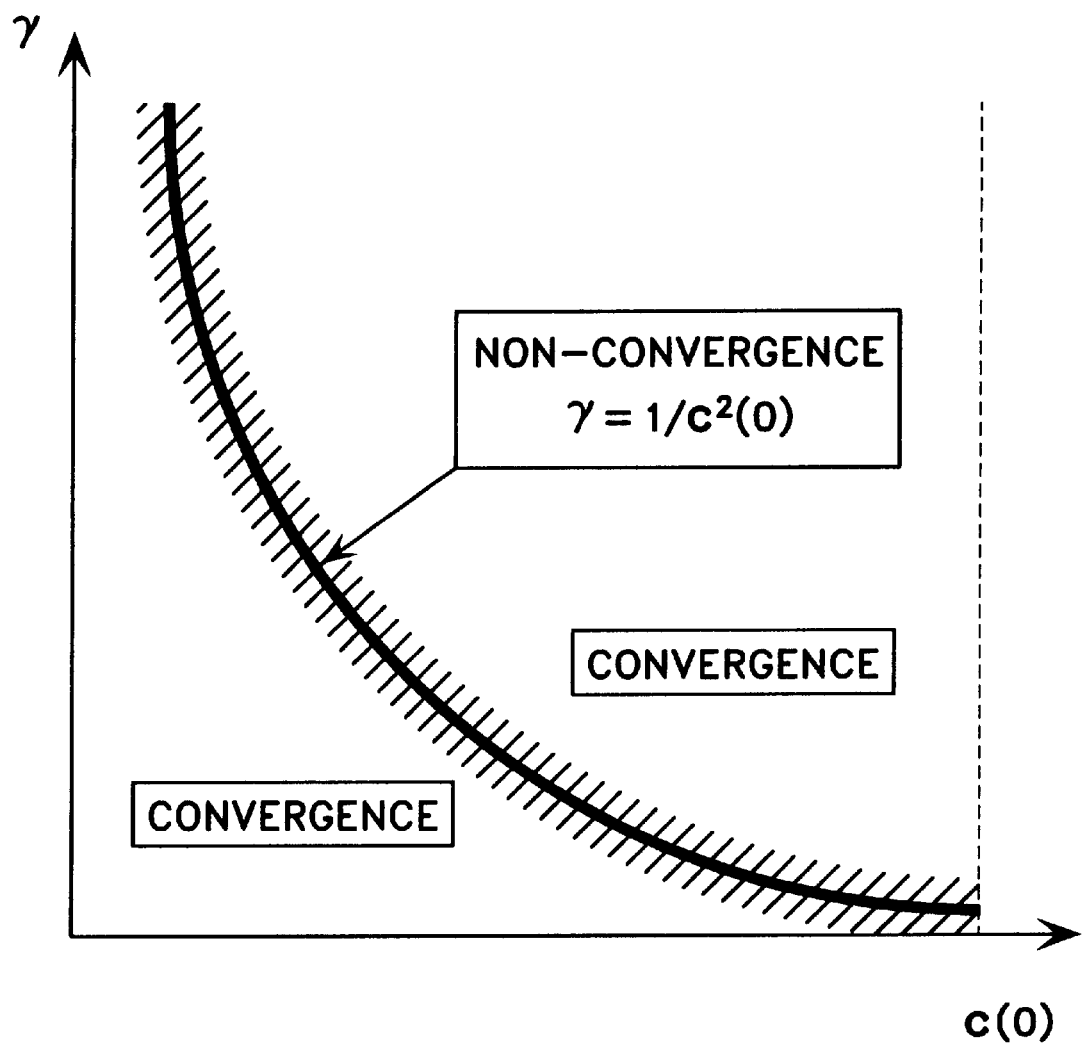
FIG. 44 is a graph showing regions of convergence as a function of initialization and source statistics, and demonstrating an unstable nonconvergence condition.

Divide both sides by $3^L$ and let $L \to +\infty$, to obtain $$2 \log(c(0)) + \log(\gamma) = 0$$

which yields the nonconvergence condition (depicted in FIG. 44.).

$$\gamma = \frac{1}{(c(0))^2}.$$

However, this is an unstable condition since it is a strict equality that has almost zero probability of occurrence; errors in the estimated cumulants lead the solution to convergence. We also note that in the case of sources with identical cumulant strengths (i.e., g=1), convergence is still possible if $c(0) \neq 1$ (i.e., the initial weight vector has different gains on different sources). This surprising result is due to our exploitation of the structure of C using the double-power method.

21.7.2 Assessment of Convergence

Since we are using an iterative algorithm to estimate the steering vectors and waveforms of cochannel sources, it is necessary to have a rule to stop iterations. It is possible to perform "a few" iterations each block and continue for some applications. However, in some other cases it may be desirable to monitor convergence of the iterations, and react in the case of bad initialization or impose conditions to speed the convergence of the iterative process.

To accomplish our goal, we return to the conditions of convergence: With true cumulants, the weight vector w will satisfy the following relationship at convergence:

$$w = \alpha \cdot \sum_{m=1}^{P} \frac{\gamma_{4,m}}{(\sigma_m^2)^2} |v_m^H w|^2 (v_m^H w) v_m = \alpha R_c(w) w.$$

Since the vectors $v_m$'s form an orthonormal set, at convergence, $R_c(w)$ should be rank 1, and its principal eigenvector should be w. Therefore, after iterations, we can form the cumulant matrix $R_c(w)$, using its definition:

$$R_c(w) = E\{|g(t)|^2 y(t) y^H(t)\} - E\{|g(t)|^2\} E\{y(t) y^H(t)\} - |E\{g(t) y(t)\}|^2$$

and compute its eigenvalues. The first two eigenvalues are sufficient to identify the convergence situation: the principal eigenvalue should dominate the second one. If this is the case, a further improved weight vector estimate is the principal eigenvector of the matrix $R_c(w)$. If the first two eigenvalues are very close to each other, then the convergence is not established and initialization of the iterations is not satisfactory. Then we may try to compute the first two eigenvectors, and form a random combination of them to replace the weight vector w.

Computation of eigenvalues and eigenvectors for the matrix $R_c(w)$ can be done using the power method as well. This will eliminate the need to estimate the matrix, and compute only cumulant vectors instead of a cumulant matrix. For example, to compute the first eigenvector, e, we can iteratively compute:

Beamform: $\tilde{g}(t)=e^H y(t)$, with $e$ unit norm.

Update: $e=E\{g(t)\tilde{g}^*(t)\tilde{g}^*(t)y(t)\}-E\{|g(t)|^{2}\}E\{\tilde{g}^*(t)y(t)\}-$
$E\{g(t)\tilde{g}^*(t)\}E\{\tilde{g}^*(t)y(t)\}-E\{\tilde{g}^*(t)\tilde{g}^*(t)\}E\{g(t)y(t)\}$, Normalize: $e=e/\|e\|$, Start over: $\tilde{g}(t)=e^H y(t)$ 21.7.3 Initialization Using a Simple Cumulant-based Eigendecomposition Method In this section, we briefly describe a simple eigendecomposition-based signal separator that operates on a matrix of cumulants of size P by P. We may use this simple method to roughly estimate the steering vectors and provide these as starting points (initialization) for the iterative approach that will follow. In addition, it is possible to perform tracking by comparing the steering vectors from the previous block by the results for the current block of the simple method. The cumulant matrix under consideration is defined as follows:

$H(i,j)=$cum $(r_k^*(t),r_l(t),y_i(t),y_j^*(t))$ $1 \leq i,j \leq P$, $1 \leq k,l \leq M$.

Note that two of the arguments came from the unprocessed measurements and they are fixed for the whole matrix, and the remaining two vary over the preprocessed measurements. Using the properties of cumulants and the signal model, we can express H as below:

$$H = \sum_{m=1}^{P} \frac{\gamma_{4,m}}{(\sigma_m^2)^2} \cdot (a_{m,k}^* a_{m,l} \sigma_m^2) \cdot v_m v_m^H = \sum_{m=1}^{P} \mu_m \cdot v_m v_m^H,$$

where $\mu_m = \frac{\lambda_{4,m}}{(\sigma_m^2)^2} \cdot (a_{m,k}^* a_{m,l} \sigma_m^2)$ in which $\alpha_{m,l}$ indicates the response of the lth sensor to the mth source. Provided that $\mu_m$'s are all different, then we can easily conclude that the eigenvectors of the matrix H are the set of vectors $v_m$'s (multiply H from right with $v_m$). Using an inverse transformation, it is possible to estimate the steering vectors for the sources, and using the eigenvectors of H it is possible to estimate source waveforms.

The problems with this approach arises when some of the $\mu_m$'s are very close to each other. There is no way to select the best possible channels k and l. It is quite possible that some of the sources may be received very poorly by these channels and their steering vectors can not be identified accurately. Nevertheless, this approach gives us initialization points to start the iterative algorithm of the next section and furthermore allows us to check whether the sources that existed in the previous block are still present by multiplying H with their projection to the signal subspace and test whether these projected vectors are eigenvectors of H.

21.8 Implementation Details and Flow Chart

The heart of the CURE algorithm (signal subspace computations) is summarized in the following iterative process:

Using the eigenstructure of the covariance matrix, preprocess the measurements as follows:

$y(t)=T^H r(t)$, $T=E_{ss}(\Lambda_{ss}-\hat{\sigma}^2)^{-\frac{1}{2}}$

Using a P dimensional weight vector v, obtain a signal g(t):

$g(t)=w^H y(t)$

Calculate the new weights as:

$v_k=$cum $(g^*(t),g(t),g^*(t),y_k(t))$, $1 \leq k \leq P$.

Obtain a new signal g(t) using the new weight vector v (after a possible normalization), and continue to iterate.

Although the above steps form the core of the algorithm, there are additional steps that are necessary to reduce the algorithm to practice. One issue is how to capture different sources. Another important one is to undo arbitrary phase and gain modulations on the recovered signals.

In the eigenCURE algorithm, multiple parallel ports are used to extract different sources. To ensure that each port extracts a different source, the weight vectors in the P dimensional space are constrained to be orthogonal. The orthogonalization is achieved by a Gram-Schmidt processor and the order of orthogonalization is based on port priorities. Port priority for each signal extraction port is computed as a function of the cumulant strength of the waveform it produces used a steering vector from a previous block and the current block measurements.

In the pipeCURE algorithm, since we have the entire cumulant matrix provided by the cumulant matrix computer, the iterations can be done as simple matrix vector multiplications for which commercial processors have the built-in functions to handle very efficiently. This enables us to make multiple iterations to improve our results.

Let us assume that we have P sources, and we have an estimate of the steering matrix denoted by $\tilde{A}$, which can be either the initial (startup) values or the results provided from the pipeCURE for the previous block.

The following indicates the flow of operations consistent with the block diagram of FIG. 7.:

1. Transformation of Steering Vectors: Project the steering matrix estimate onto the reduced dimensional space by the transformation matrix T:

$\tilde{B}=T^H \tilde{A}$

2. Cumulant Strength Computation: Normalize the norm of each column of $\tilde{B}$ and store the results in $\tilde{V}$, and then compute the cumulant strength for each signal extracted by the weights using the matrix vector multiplication:

$O_m=|(\tilde{v}_m^* \otimes \tilde{v}_m)^H C(\tilde{v}_m^* \otimes \tilde{v}_m)|$, for $1 \leq m \leq P$.

3. Priority Determination: Reorder the columns of $\tilde{V}$ and form the matrix $\tilde{W}$ so that the first column of $\tilde{W}$ yields the highest cumulant strength and the last column of $\tilde{W}$ yields the smallest cumulant strength.

4. Recovery of the First Signal: Starting with the first column of $\tilde{W}$, proceed with the double-power method followed by Gram-Schmidt orthogonalization with respect to higher priority columns of $\tilde{W}$, i.e., for column k:

$$\tilde{w}_k(b+1) = a_{b+1} \cdot \text{unvec}\ (C(\tilde{w}_k^*(b) \otimes \tilde{w}_k(b)))\ \tilde{w}_k(b)$$

where the constant $a_{b+1}$ is chosen so that the norm of $\tilde{w}_k(b+1)$ is unity and b is the iteration number. This operation is followed by the Gram-Schmidt orthogonalization:

$$\tilde{w}_k(b+1) = \beta_{b+1} \cdot \left( \tilde{w}_k(b+1) - \sum_{l=1}^{k-1} w_l \cdot \left( w_l^H \tilde{w}_k(b+1) \right) \right),$$

since $\|w_l\| = 1$ where the constant $b_{b+1}$ is chosen so that the norm of $\tilde{w}_k(b+1)$ is unity. In the last expression, $w_1$ denotes the final weight vector with source of priority 1.

5. Multiple Signal Recovery: Repeat Step 4 for each column for a redetermined K times. After iterations are complete for the kth column, declare the resultant vector as $w_k$, and proceed with the remaining columns. After all sources are separated, form the matrix W that consists of $w_k$'s as its columns.

6. Port Association: After all the power method and Gram-Schmidt iterations are complete, compare the angle between columns of W and the columns of $\tilde{V}$. This can be obtained by taking the absolute values of the elements of the matrix $W^H \tilde{V}$, and take the arccosine of each component. To find the port number assigned to the first column of W in the previous block, simply take the index of the column of the matrix $W^H \tilde{V}$, and look for the entry with the maximum absolute value. For the second column of W, proceed the same way except this time we do not consider previously selected ports. Using this rule, reorder the columns of W, such that there is no port switching involved. Let us denote the resultant matrix as $\hat{V}$.

7. Steering Vector Adjustment: Due to the blindness of the problem, estimated steering vectors are subject to arbitrary gain and phase ambiguities. The gain ambiguities are corrected by the unit amplitude constraint on the columns of $\hat{V}$. However, this does not prevent phase modulations on the columns of this matrix. To maintain this continuity, we compute the inner product of each column of $\hat{V}$ with the corresponding column in $\check{v}$ and use the resulting scalar to undo the phase modulation, i.e., $$\epsilon_m = \text{angle}\ (\tilde{v}_m^H v_m), \text{ and } v_m = v_m \cdot \exp(-j\epsilon_m)$$

8. Backprojection: In order to use the current steering vector estimates for the next processing block, we need to backproject the steering vector estimates for the reduced dimensional space to the measurement space. This yields the estimate of the steering matrix and can be accomplished as:

$$\hat{A} = E_s (\Lambda_s - \hat{\sigma}^2 I_{P_e})^{+\frac{1}{2}} \hat{V}$$

$\hat{A}$ will be used in the next block as $\hat{A}$ as an estimate of the steering matrix in the first step of the multiple port signal extraction unit.

9. Beamforming: It is important to note that beamforming for P sources requires a matrix multiplication of two matrices: the $\hat{V}$ matrix that is P by P, and the reduced dimensional observation matrix y(t), which is P by N, where N is the number of snapshots. Usually N is larger than P and this matrix multiplication may take a long time because of its size. Therefore, it may be appropriate to do final beamforming in another processor since it does not introduce any feedback. Final beamforming is accomplished as:

$$\hat{s}(t) = \hat{V}^H y(t)$$

The estimated signals will be sent to the correct post processing units because of the orderings involved.

The cumulant-based post-processing unit that estimates the steering vectors and source waveforms for the sources in a blind fashion using higher order statistics of the reduced dimensional observations. The use of higher order statistics appears in the multiplications that contain the cumulant matrix C. Other than the last step of beamforming, the processing does not involve multiplication of large time-consuming matrices.

21.9 Simulations

In this section, we describe simulation experiments to illustrate the operation of the eCURE algorithm on both stationary and nonstationary environments. The eCURE algorithm has four ports to recover at most four sources at any given time. We use an eight-element linear antenna array with uniform (half-wavelength) spacing and identical sensors, and the steering vectors take the form:

$$a(\theta) = [1, \exp(j\pi \sin(\theta)), \ldots, \exp(j\pi 7 \sin(\theta))]^T$$

in which $\theta$ is the direction of arrival. We use the MATLAB computational environment to generate and process the data.

21.9.1 Experiment 1-Non-Transient Sources

In this experiment, we simulate a case in which there are three far-field sources. Two of the sources are single-tone frequency modulated (FM) signals and the third source is an amplitude modulated (AM) speech waveform. The single-tone FM signals can be described in analytic signal representation:

$$s_k(t) = A_k \exp(j2\pi(f_k t + \beta_k \sin(2\pi\alpha_1))), k=1,2$$

For the first source, we have $$A_1 = 10, f_1 = 0.04, \beta_1 = 0.4, \alpha_1 = 0.1$$

and for the second source, we have $$A_2 = 10, f_2 = -0.02, \beta_2 = 0.3, \alpha_2 = 0.07$$

Figure 45:
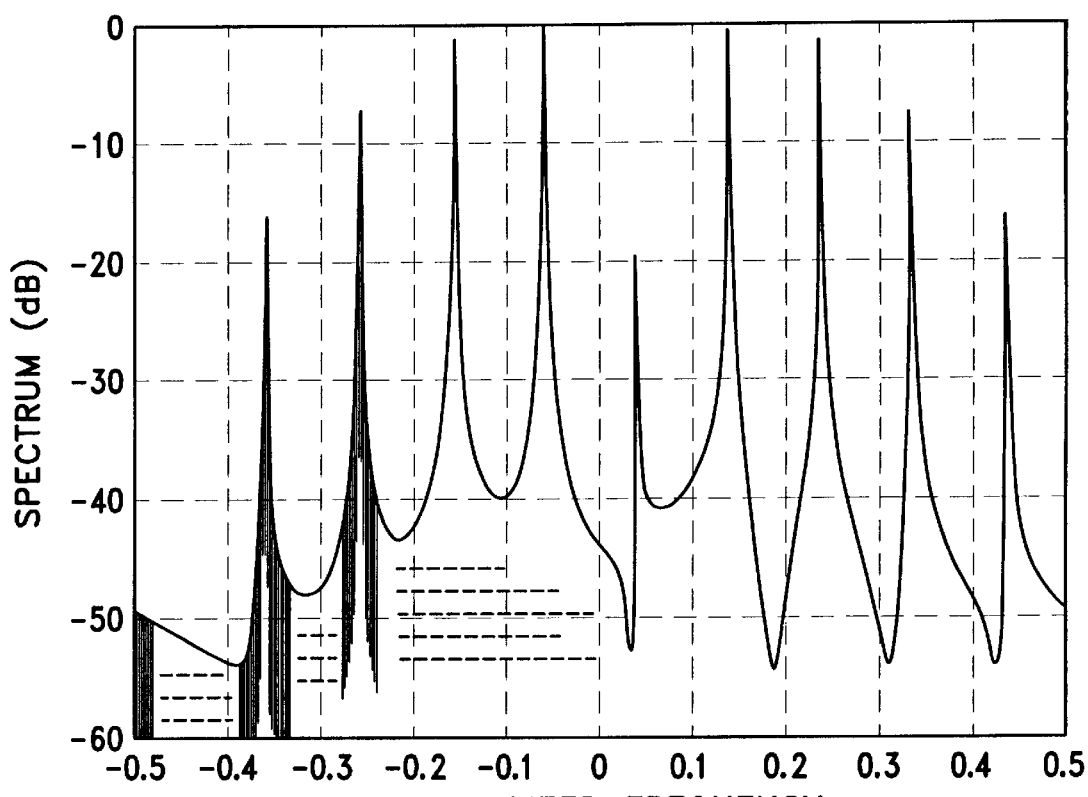
FIGS. 45 and 46 are spectra of first and second frequency-modulated (FM) sources as used in simulation experiments using the invention.
Figure 46:
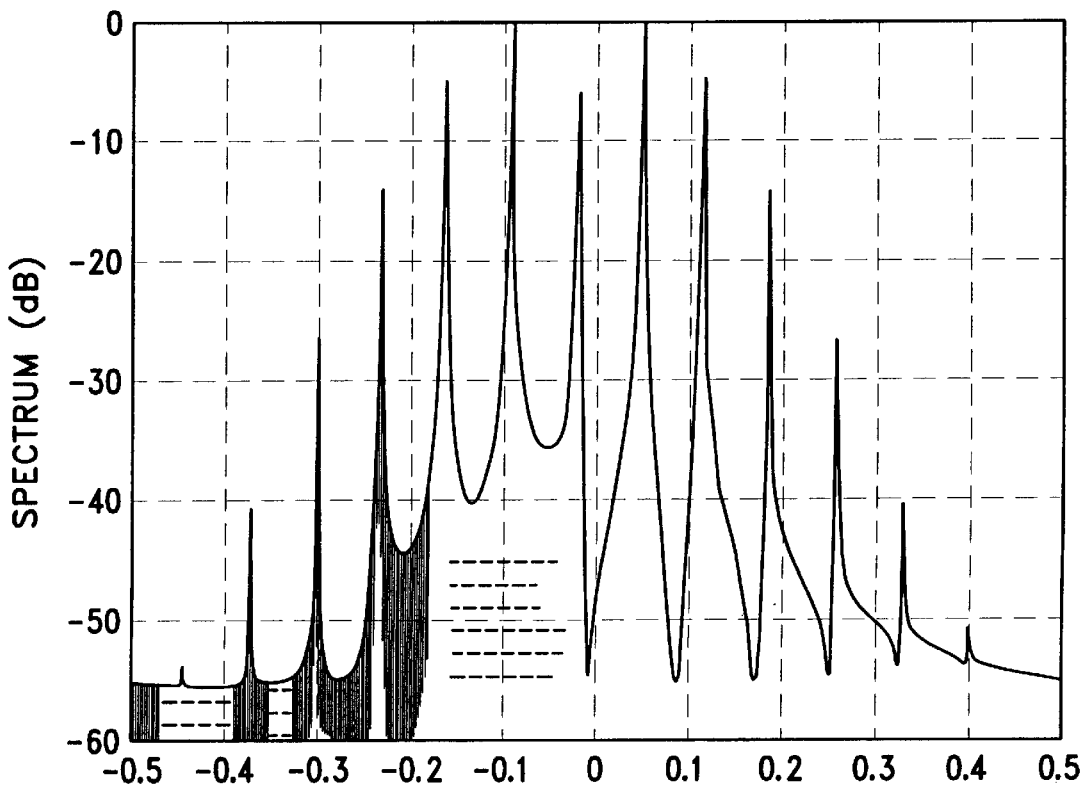

The directions of arrival are $\theta_1 = -5°$, and $\theta_2 = 0°$. The measurement noise component is Gaussian, spatially and temporally white, and has equal power (0 dB) at all the sensors. Therefore, both FM sources have a power level of 20 dB. The spectra of the FM signals is illustrated in FIGS. 45 and 46. It is important to note that the envelope of the FM sources is constant (i.e., $|s_1(t)| = |s_2(t)| = 100$.

Figure 47:
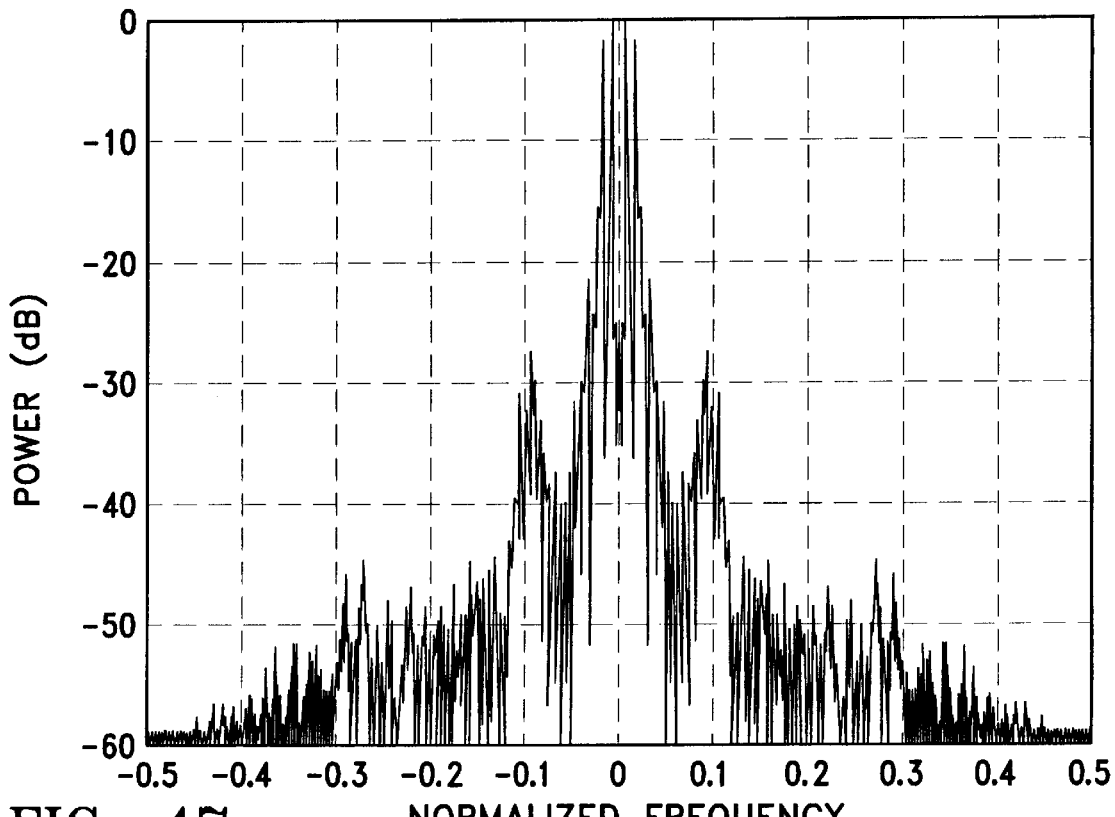
FIG. 47 is a spectrum of an amplitude-modulated (AM) source as used in the simulation experiments.

The AM signal is created using samples from a real speech signal. We assume that it is centered at the center frequency of analysis and there is no carrier (double-sideband suppressed carrier AM (DSB-SC AM)). Therefore, the analytic representation of the third signal is identical to the speech samples. We collected 15,000 samples of the speech waveform and scaled it in such a way that it has a power of 15 dB. However, since the amplitude of the speech waveform varies over time (unlike the FM signals), its power changes from block to block. Spectrum of the speech signal is calculated by using the samples (14,001 to 15,000), which are displayed in FIG. 47.

The eCURE algorithm with a block size of 1,000 snapshots is used to analyze the generated measurements and therefore, we have 15 blocks for the simulation. We used the version of the eCURE in which waveform continuity is maintained by normalizing the waveform estimate by the first component of the estimated steering vector for each port. The capture strengths used for the eCURE are only a function of the angles between the projected steering vector from the previous block ($v_k = T^H a_k(m-1)$) and the current block cumulant vector for each port ($b_k(m)$), i.e., the capture strength for the kth port for the mth block is $|v_k^H b_k(m)|/\|v_k\|$. The number of sources detector provided correct estimates for all the blocks.

Figure 48:
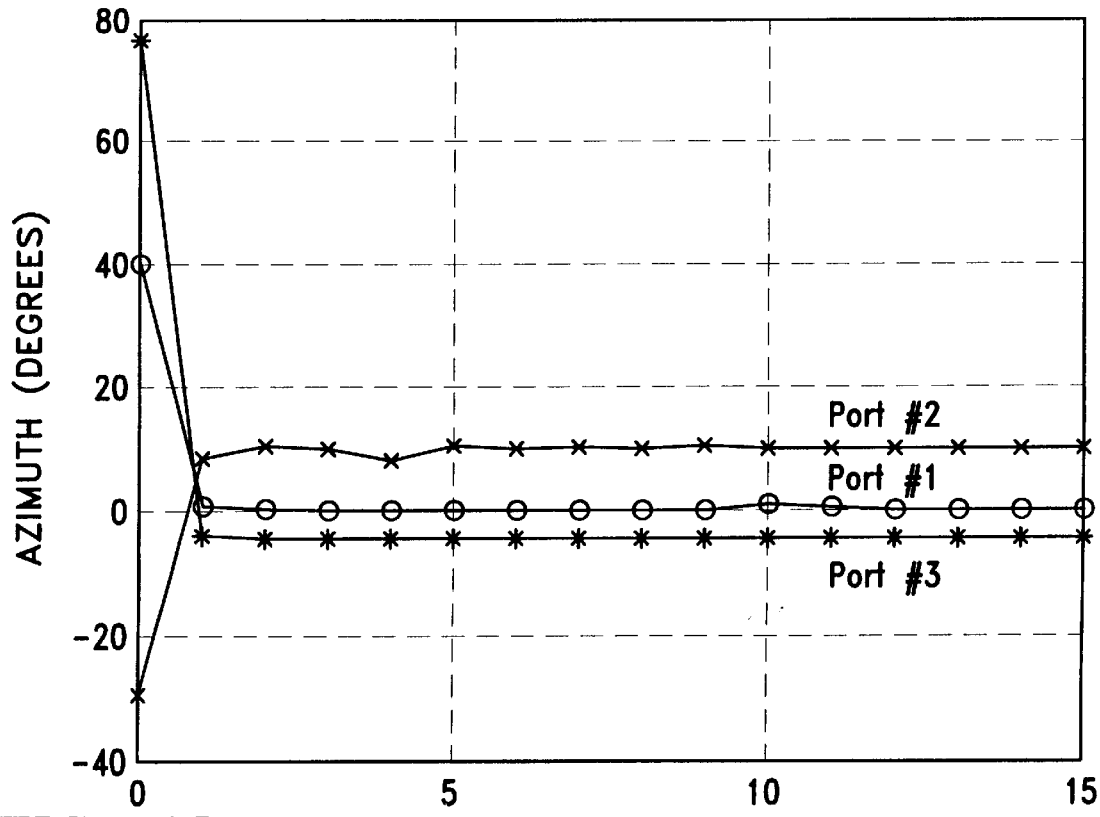
FIG. 48 is a graph of direction estimates obtained from active ports in the simulation experiments.

FIG. 48 shows the bearing estimates from the ports. As it can be seen from the figure, Port 1 captures the second FM source, Port 2 captures the AM source, and Port 3 captures the first FM source. The eCURE algorithm does not use array calibration information but the results illustrated in FIG. 48 are given to indicate the fast convergence speed of the eCURE algorithm to the correct steering vectors in spite of the random initialization which is far away from the true values. In FIG. 48, each point on the plot indicates the bearing estimate provided by the analysis of the block that ends at that point. After just one block, the bearing estimates are very close to true values and port switching is not observed. The port that captures the AM source undergoes some variation during the fourth block since during this period the speech signal has very low power and the bearing estimate based on this block cannot be accurate. The estimates from the fourth port are not shown, since this port is not activated.

Figure 49:
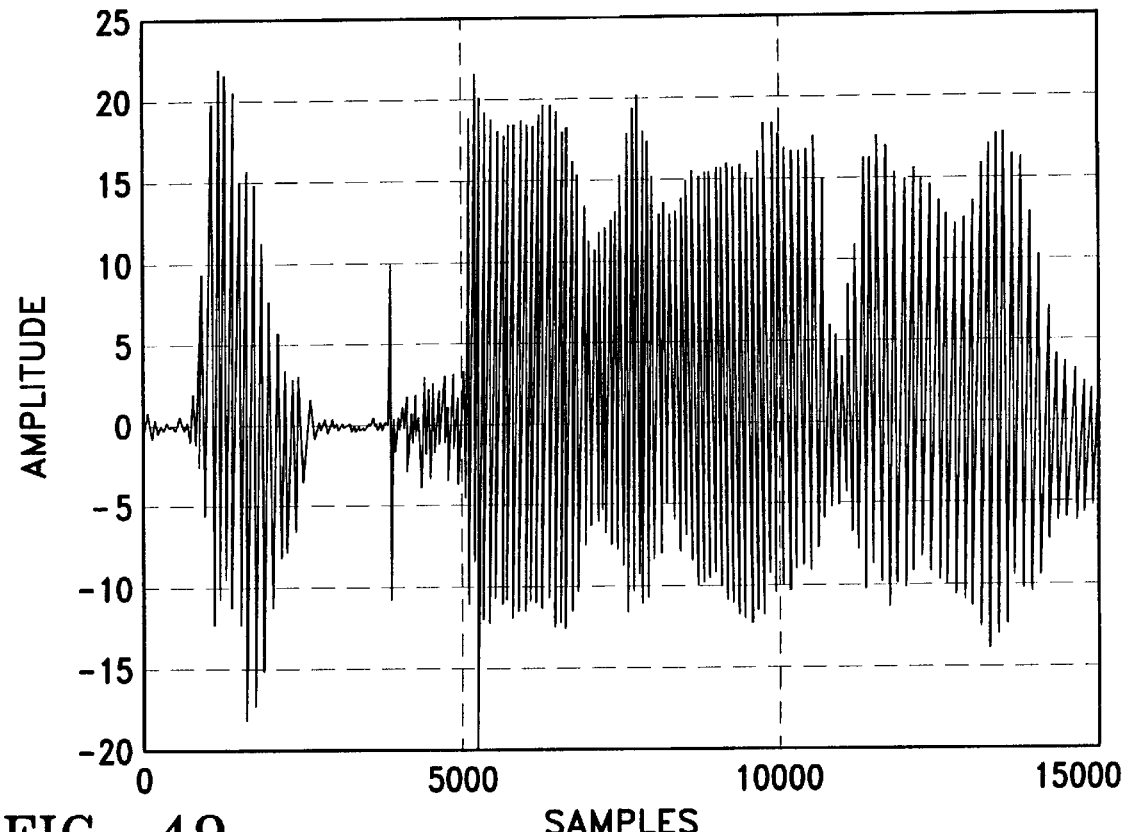
FIG. 49 is a graph of samples of an original speech waveform as used in the simulation experiments.
Figure 50:
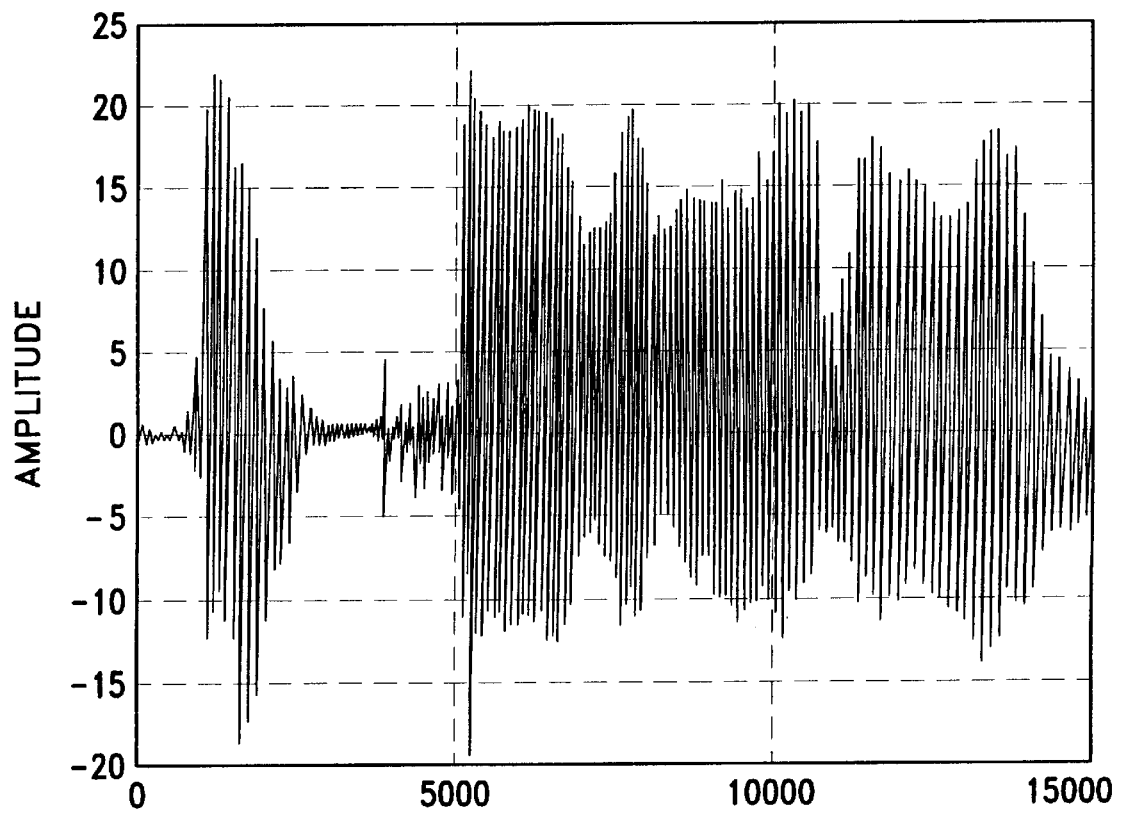
FIG. 50 is a graph of samples of a recovered waveform as used in the simulation experiments.

Next, we compare the original speech waveform and its estimate provided by the second port. FIG. 49 illustrates the original speech waveform. It is important to note the power variation of the speech signal. The waveform recovered by port 2 is shown in FIG. 50. It is clear that the eCURE algorithm exhibits rapid convergence for waveform recovery, after the second block the waveform estimate closely follows the original speech waveform. Many blind signal separation algorithms (e.g., the constant modulus algorithm) fail to separate signals with high amplitude variations. In this example, we observe that eigenCURE can also provide good waveform continuity in addition to separation.

Figure 51:
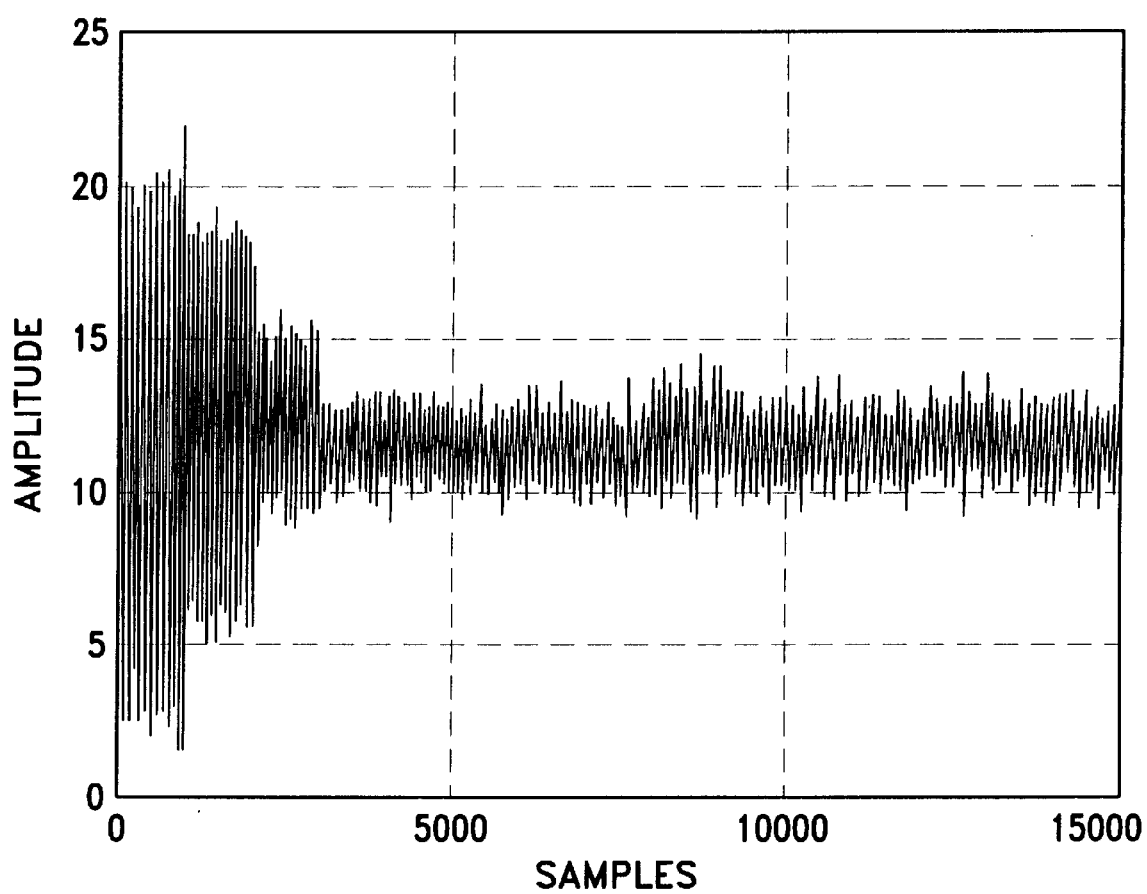
FIG. 51 is a graph showing magnitudes of a port output signal, as used in the simulation experiments.

In FIG. 51, we show the magnitude of the Port 1 output which captures the second FM source that illuminates the array from 0 degree. The ideal output should be constant since the FM signal is constant modulus. The variations decrease as the algorithm adapts, and reach a minimum that is determined by the scenario under consideration.

Figure 52:
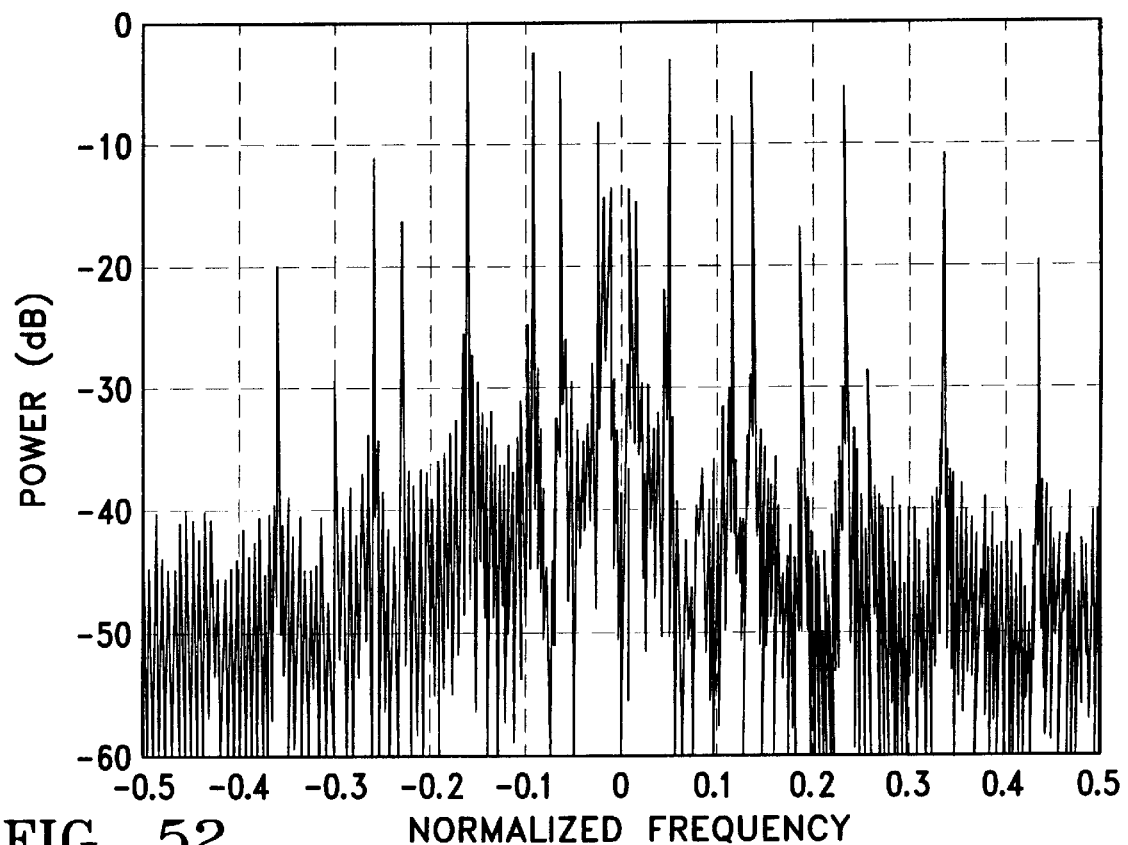
FIG. 52 is a spectrum of measurements at a first sensor in the simulation experiments.
Figure 53:
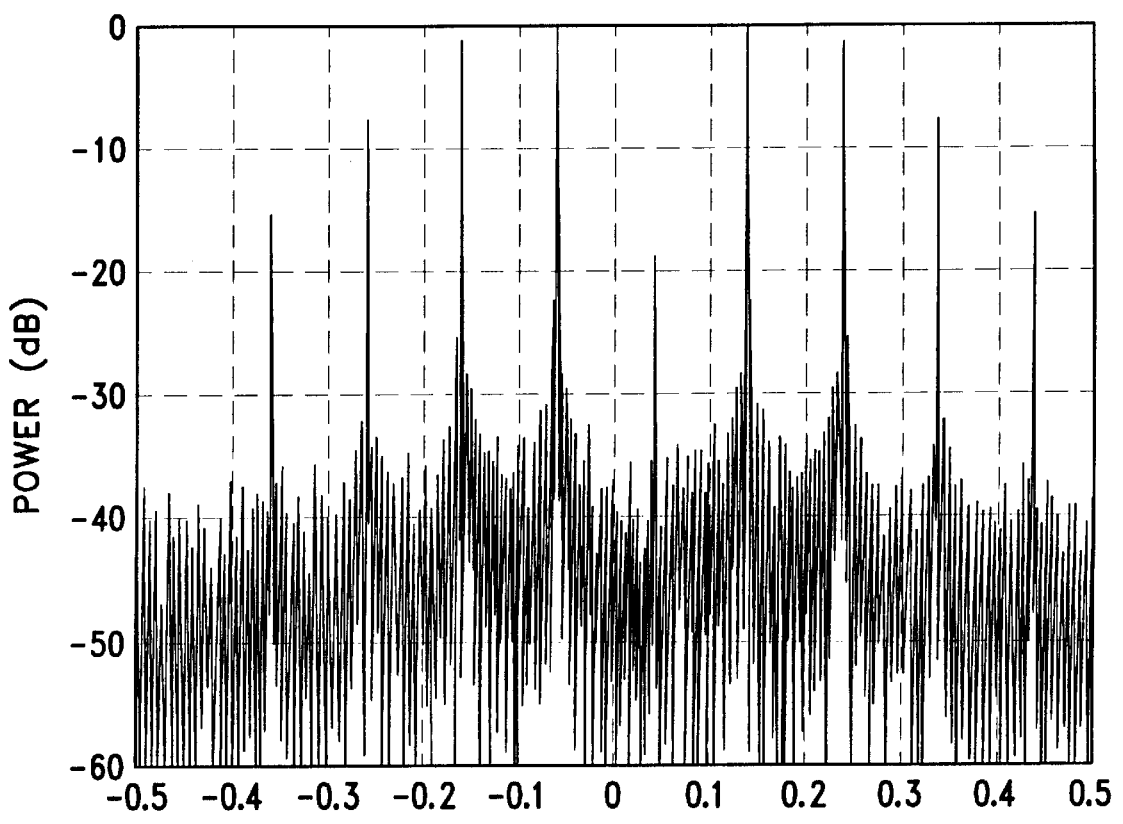
FIG. 53 is a spectrum of a port output signal, as used in the simulation experiments.

Finally, we compare the spectrum of the port 3 output, and the spectrum of the first FM signal which it is tracking. We first illustrate the spectrum of the first sensor measurement in FIG. 52, which shows the contributions from the three directional signals. FIG. 53 shows the spectrum of port 3 output, which closely resembles to the first FM source it is tracking. For comparison, we refer the reader to FIG. 45.

21.9.2 Experiment 2—Transient Sources

In this experiment, we simulate a case in which there are five farfield sources and 25,000 snapshots. We use the eCURE algorithm with the same parameters of the first experiment, the block size is 1000 snapshots. The first source is the DSB-SC AM source from the previous experiment. We scale it so that its power is 30 dB with respect to spatially white measurement noise which is at 0 dB. The second source is a single-tone FM signal at 30 dB, with the following parameters:

$$f_2 = 0.04, \beta_2 = 0.4, \alpha_2 = 0.1$$

The third and fifth signals are Gaussian noise modulated phase modulated (PM) signals which can be characterized as below:

$$s_k(t) = A_k \exp(j2\pi(f_k t + \beta_k e_k(t))), k=3,5$$

in which $\{e_3(t), e_5(t)\}$ are independent Gaussian processes with zero mean and unit variance. We have the amplitudes adjusted so that the PM signals are at 30 dB when they are ON. In addition, we set $$f_3 = -0.02, \beta_3 = 0.2,$$
$$f_5 = -0.2, \beta_5 = 0.2,$$

The third source is OFF during the interval [6301,15000], and the fifth source is OFF during the interval [8901,11200]. Therefore, the third source is absent in blocks [8,15], and the fifth source is absent in blocks [10,11]. Finally, the fourth source is a continuous-wave (CW) which turns on after 17,900 snapshots, and can be expressed as:

$$s_4(t) = A_4 \exp(j2\pi(-0.4t)),$$

This source is also at 30 dB when it is ON. The directions of arrival for these five sources are: $\theta_1 = 10°$, $\theta_2 = 0°$, $\theta_3 = 5°$, $\theta_4 = 15°$, $\theta_5 = 20°$. The fourth source turns ON after all of the four ports are allocated to existing sources and hence incorporated in this experiment to demonstrate the ability of the eCURE algorithm to eliminate port switching in the case of new interferers.

Figure 54:
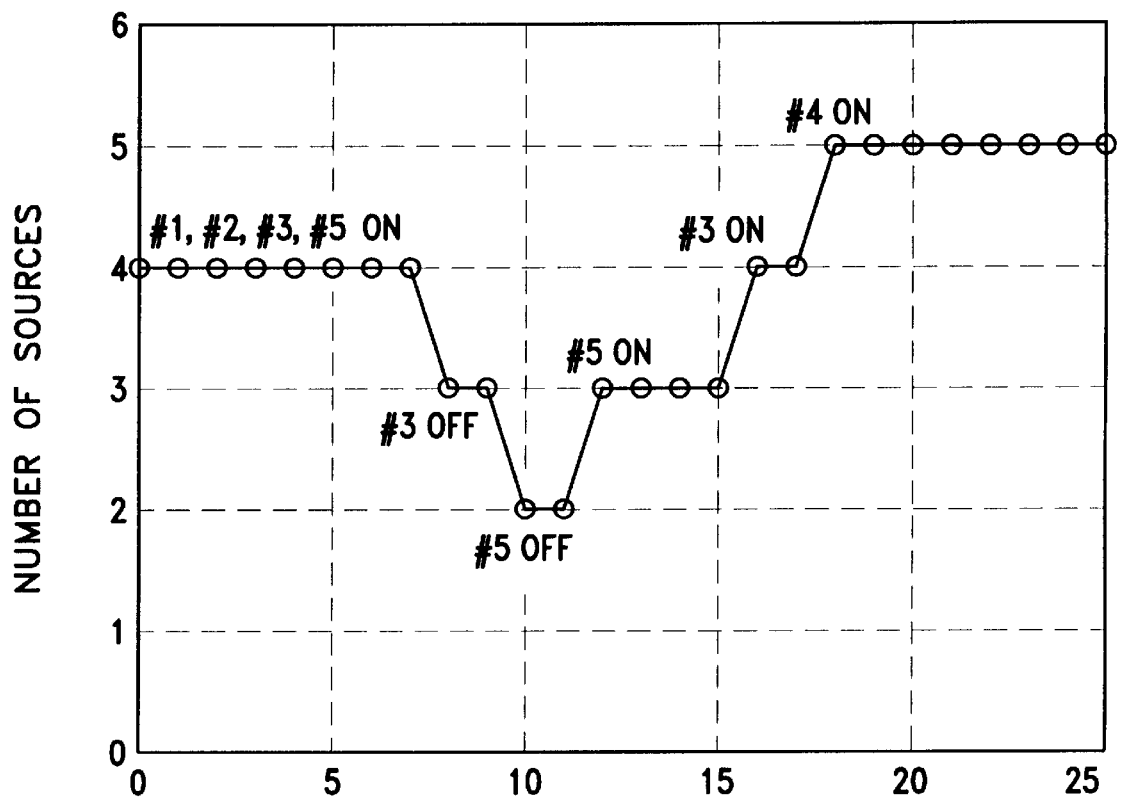
FIG. 54 is a graph of results from a number-of-sources estimator, as used in the simulation experiments.

In FIG. 54, we show the results from the number of sources estimator. In this figure, each point shows the estimated number of sources preceding itself. For example, the second point gives us an estimate of sources in the snapshots [1001,2000]. For every block, the results are accurate. Source transitions are indicated in the figure.

Figure 55:
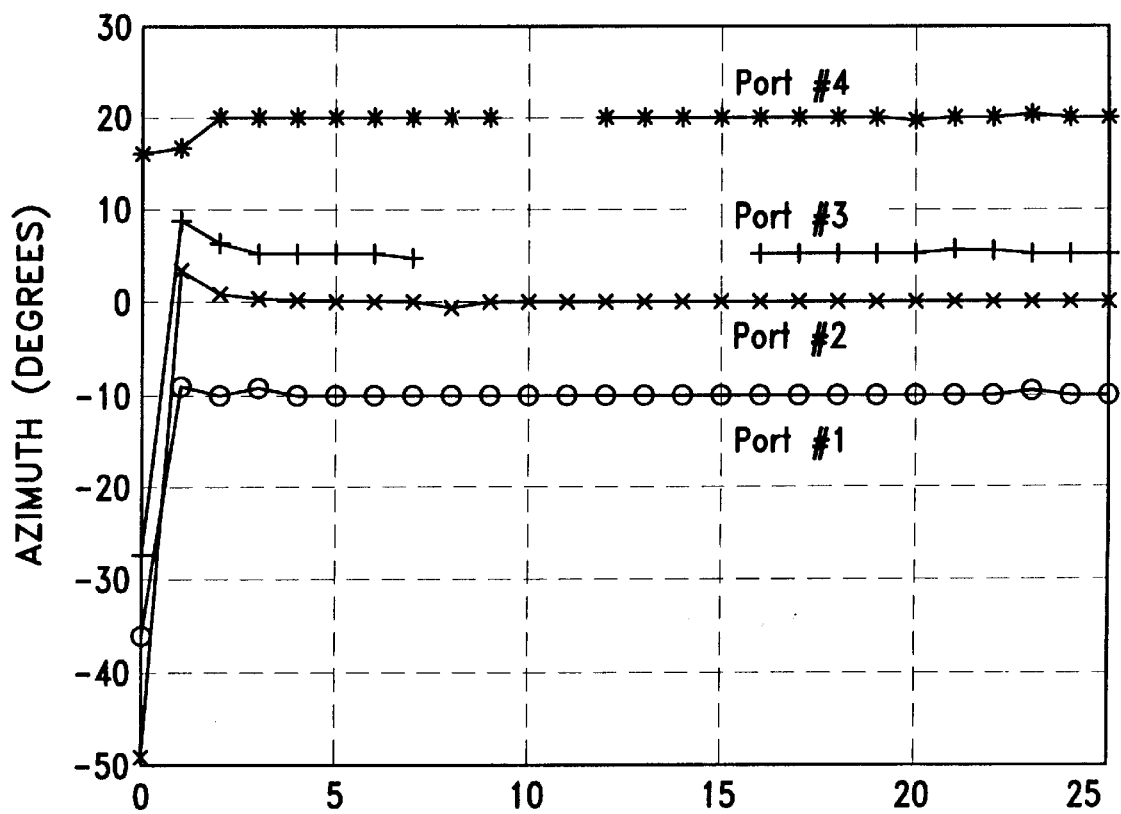
FIG. 55 is a graph of bearing estimates from the optional copy-aided DF unit, which obtains the steering vectors from active ports, as used in the simulation experiments.

FIG. 55 shows the bearing estimates obtained from the steering vector lo estimates provided by the eCURE algorithm. Similar to FIG. 54, each point for a specific port shows the bearing estimate for the block of snapshots preceding itself. For example, the third point for port 1, gives the bearing estimate for the source captured by port 1 during the interval of [2001,3000] snapshots. The lack of a point (or discontinuity in the graph) indicates port shutdown for that interval during which no bearing estimate is provided. We observe that Port 1 captures Source 1, Port 2 captures Source 2, Port 3 captures Source 3, and Port 4 captures Source 5. In addition, ports shutdown when the sources they are tracking are turned OFF. It is very important to observe that when the sources that disappeared, turn ON again, they are captured by the same port. Finally, the fourth source cannot cause port switching when it turns ON, all of the four ports continue to track their sources.

To illustrate the waveform recovery performance of the eCURE algorithm, we display the output of port 1 in FIG.

Figure 56A:
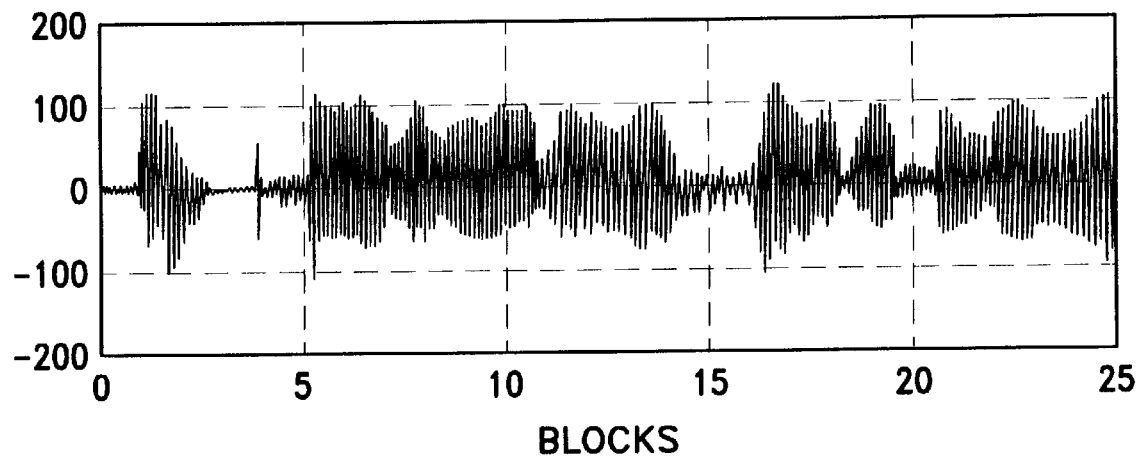
FIGS. 56A and 56B shows a pair of graphs comparing an original speech waveform with its estimate obtained from an active port in the simulation experiments.
Figure 56B:
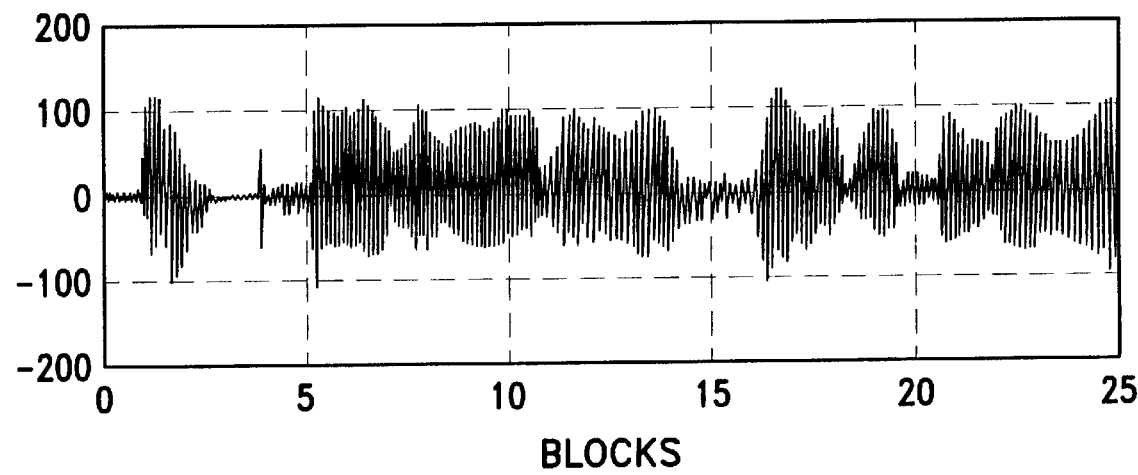

56A and compare it to the original speech signal in FIG. 56B. These figures indicates that eCURE converges rapidly to extract the speech waveform.

We claim:

1. A signal processing system for deriving at least one output quantity of interest from received cochannel input signals, the system comprising:

a signal receiving system, including means for generating a set of conditioned receiver signals from received signals of any modulation or type;

an estimated generalized steering vector (EGSV) generator, for computing an EGSV that results in optimization of a utility function that depends on fourth or higher even-order statistical cumulants derived from the received signals, the EGSV being indicative of a combination of signals received at the signal receiving system from a signal source; and a supplemental computation module, for deriving at least one output quantities of interest from the conditioned receiver signals and the EGSV.

2. A signal processing system as defined in claim 1, wherein:

the EGSV generator uses an iterative technique to generate the EGSV and includes means for generating successively more accurate EGSVs based on iterative optimization of the utility function.

3. A signal processing system as defined in claim 2, wherein the means for generating successively more accurate EGSVs includes:

a linear combiner, for repeatedly computing a single channel combined signal from the conditioned receiver signals and an EGSV;

means for supplying an initial EGSV to the linear combiner, to produce the initial output of a single channel combined signal;

an EGSV computation module, for computing successive values of the EGSV from successive values of the single channel combined signal received from the linear combiner and the conditioned receiver signals; and means for feeding the successive values of the EGSV back to the linear combiner for successive iteration cycles; and means for terminating iterative operation upon convergence of the EGSV to a sufficiently accurate value.

4. A signal processing system as defined in claim 2, wherein the means for generating successively more accurate EGSVs includes:

a cross-cumulant matrix computation module, for generating a matrix of cross-cumulants of all combinations of the conditioned receiver signals;

a structured quadratic form computation module, for computing successive cumulant strength functions derived from successive EGSVs and the cross-cumulant matrix;

means for supplying an initial EGSV to the structured quadratic form computation module, to produce the initial output of a cumulant strength function;

an ESGV computation module, for generating successive EGSVs from successive cumulant strength functions received from the structured form computation module; and means for feeding the successive values of the EGSV back to the structured quadratic form computation module for successive iteration cycles; and means for terminating iterative operation upon convergence of the EGSV to a sufficiently accurate value.

5. A signal processing system as defined in claim 1, wherein the EGSV generator uses a direct computational technique to generate the EGSV, and includes:

a cross-cumulant matrix computation module, for generating a matrix of cross-cumulants of all combinations of the conditioned receiver signals; and an EGSV computation module for computing the EGSV directly from the cross-cumulant matrix by solving a fourth degree polynomial equation.

6. A signal processing system as defined in one of claims 1–5, wherein:

the means for generating the set of conditioned signals includes an eigendecomposition module for generating an estimate of the number of signal sources, a transformation matrix for conditioning the receiver signals, and an eigenstructure derived from the receiver signals; and the EGSV generator employs signals output by the eigendecomposition module to compute EGSVs.

7. A signal processing system as defined in one of claims 1–5, wherein:

the means for generating the set of conditioned signals includes a covariance matrix computation module and a matrix decomposition module, for generating a matrix; and the system further includes a beamformer, for generating a recovered signal from the receiver signals, the EGSV and the matrix obtained from the matrix decomposition module.

8. A signal processing system as defined in one of claims 1–5, wherein:

the means for generating the set of conditioned signals includes an eigendecomposition module for generating and estimate of the number of signal sources, a transformation matrix for conditioning the receiver signals, and an eigenstructure derived from the receiver signals;

the EGSV generator employs signals output by the eigendecomposition module to compute EGSVs the system further comprises a multiple port signal recovery unit, including means for matching current EGSVs with EGSVs from a prior data block to impose waveform continuity from block to block.

9. A signal processing system as defined in one of claims 2–4, wherein:

signals are processed in successive blocks of data; and the initial of EGSVs for each new processing block are computed by a means for combining a prior block EGSV and a cumulant vector derived from the utility function.

10. A signal processing system as defined in claim 9, wherein:

the means for combining takes the sum of the prior block EGSV multiplied by a first factor, and the cumulant vector multiplied by a second factor, wherein the first and second factors are selected to provide an initial EGSV that anticipates and compensates for movement of a signal source.

11. A signal processing system as defined in claim 3, wherein:

the system functions to separate a plurality (P) of received cochannel signals;

there is a plurality (P) of EGSV generators, including P EGSV computation modules and P linear combiners, for generating an equal plurality (P) of EGSVs associated with P signal sources; and the supplemental computation module functions to recover P separate received signals from the P generalized steering vectors and the conditioned receiver signals.

12. A signal processing system as defined in claim 11, wherein:
the supplemental computation module includes a recovery beamformer weight vector computation module, for generating from all of the EGSVs a plurality (P) of receive weight vectors, and a plurality (P) of recovery beamformers, each coupled to receive one of the P receive weight vectors and the conditioned receiver signals, for generating a plurality (P) of recovered signals.

13. A signal processing system as defined in claim 4, wherein:
the system functions to separate a plurality (P) of received cochannel signals;
there is a plurality (P) of EGSV generators, including P EGSV computation modules and P structured quadratic form computation modules, for generating an equal plurality (P) of EGSVs associated with P signal sources; and
the supplemental computation module functions to recover P separate received signals from the P generalized steering vectors and the conditioned receiver signals.

14. A signal processing system as defined in claim 13, wherein:
the supplemental computation module includes a recovery beamformer weight vector computation module, for generating from all of the EGSVs a plurality (P) of receive weight vectors, and a plurality (P) of recovery beamformers, each coupled to receive one of the P receive weight vectors and the conditioned receiver signals, for generating a plurality (P) of recovered signals.

15. A signal processing system as defined in claim 5, wherein:
the system functions to separate a two received cochannel signals;
the ESGV computation module generates two EGSVs from the cross-cumulant matrix data; and
the supplemental computation module functions to recover two separate received signals from the two generalized steering vectors and the conditioned receiver signals.

16. A signal processing system as defined in claim 15, wherein:
the supplemental computation module includes a recovery beamformer weight vector computation module, for generating from both of the EGSVs two receive weight vectors, and two recovery beamformers, each coupled to receive one of the receive weight vectors and the conditioned receiver signals, for generating two recovered signals.

17. A signal processing system as defined in one of claims 1–10, wherein:
the system functions to derive a direction of arrival (DOA) of a received signal;
the supplemental computation module includes a memory for storing sensor array calibration data, and means for deriving the DOA of a received signal from its associated generalized steering vector and the stored sensor array manifold data.

18. A signal processing system as defined in claim 17, wherein:
the sensor array manifold data includes a table associating multiple DOA values with corresponding steering vectors; and
the means for deriving the DOA includes means for performing a reverse table lookup function to obtain an approximated DOA value from a steering vector supplied by the generalized steering vector generator.

19. A signal processing system as defined in claim 18, wherein:
the means for deriving the DOA further includes means for interpolating between two DOA values to obtain a more accurate result.

20. A signal processing system as defined in one of claims 1–10, wherein the supplemental computation module includes:
a signal recovery module for generating received signal beamformer weights from the conditioned receiver signals and the EGSV; and for recovering the received signal therefrom; and
a transmitter, for generating transmit signal beamformer weights from the received signal beamformer weights, and for transmitting signals containing information in a direction determined by the transmit signal beamformer weights.

21. A signal processing system as defined in claim 12 or 14, wherein the supplemental computation module further includes:
a transmit weight vector computation module, for generating P transmit beamforming weight vectors from receive weight vectors generated by the recovery beamformer weight vector computation module; and
P linear combiners, for combining each of the P information signals to be transmitted with its associated transmit weight vector, to obtain a weighted transmit beam for each of the information signals to be transmitted, and then combining corresponding components of the weighted transmit beams, for coupling to a transmit array.

22. A signal processing system as defined in one of claims 11–16, wherein:
the signal receiving system includes a plurality of waveguide sensors for receiving signals transmitted onto a waveguide in different modes, wherein the modes are subject to scrambling in the waveguide; and
the supplemental computation module separates and recovers the signals and mitigates the effect of mode mixing in the waveguide.

23. A signal processing system as defined in claim 22, wherein the waveguide is a microwave waveguide.

24. A signal processing system as defined in claim 22, wherein the waveguide is an optical fiber.

25. A signal processing system as defined in claim 22, wherein the waveguide is a coaxial cable.

26. A signal processing system as defined in claim 22, wherein the waveguide includes at least one twisted pair of conductors.

27. A signal processing system as defined in one of claims 11–16, wherein:
the signals received by the signal receiving system are in-phase and quadrature components of two-dimensional communication signal, which has been subject to phase rotation during propagation; and
the recovered signals generated automatically from the supplemental computation module are in-phase and quadrature components of a two-dimensional communication signal that has been corrected for phase rotation, wherein the system functions as a complex phase equalizer.

28. A signal processing system as defined in one of claims 1–5, wherein:

the signals received by the signal receiving system have been subject to distortion by analog processing and analog-to-digital conversion in a radio receiving system; and the output quantities include a recovered signal having significantly less distortion than the received signals, whereby the receiving system has improved dynamic range as a result of the use of the signal processing system.

29. A signal processing system as defined in one of claims 11–16, wherein:

the signals received by the signal receiving system include signals from a relatively weak desired source and much stronger signals from at least one interfering source;

wherein the recovered and separated signals include those from the relatively weak desired source, free of interference, and those from the stronger interfering source, which can be discarded.

30. A method for processing cochannel signals received at a sensor array, the method comprising the steps of:

conditioning a set of signals received at a sensor array;

generating an estimated generalized steering vector (EGSV) that results in optimization of a utility function that depends on fourth or higher even-order statistical cumulants derived from the received signals, the EGSV being indicative of a combination of signals received at the sensors from a signal source; and performing supplemental computation to derive at least one output quantity of interest from the conditioned receiver signals and the EGSV.

31. A method as defined in claim 30, wherein:

the step of generating an EGSV includes providing an initial EGSV and then iteratively generating successive EGSVs until an acceptable convergence is attained.

32. A method as defined in claim 31, wherein generating an EGSV includes:

computing in a linear combiner successive values of a single channel combined signal derived from an input EGSV and the received signals;

supplying an initial EGSV to the linear combiner;

computing successive EGSVs from the received signals and the successive values of the single channel combined signal;

feeding the successive EGSVs back to the linear combiner for further iteration; and terminating further iteration when the EGSV has satisfactorily converged.

33. A method as defined in claim 31, wherein generating an EGSV includes:

computing a matrix of cross-cumulants of the received signals;

computing in a structured quadratic form computation module successive values of a cumulant strength function derived from an input EGSV and the cross-cumulants of the received signals;

supplying an initial EGSV to the structured quadratic form computation module;

computing successive EGSVs from the successive values of the cumulant strength;

feeding the successive EGSVs back to the structured quadratic form computation module for further iteration; and terminating further iteration when the EGSV has satisfactorily converged.

34. A method as defined in claim 30, wherein generating an EGSV includes:

generating a matrix of cross-cumulants of all combinations of the received signals; and computing the EGSV directly from the cross-cumulants by solving a fourth degree polynomial equation.

35. A method as defined in one of claims 30–34, wherein:

conditioning the received signals includes generating by eigendecomposition an estimate of the number of signal sources, a transformation matrix for conditioning the receiver signals, and an eigenstructure derived from the receiver signals; and the step of generating EGSVs employs signals generated in the foregoing step of generating by eigendecomposition.

36. A method as defined in one of claims 30–34, wherein:

conditioning the received signals includes generating a covariance matrix and generating therefrom another matrix; and the method further comprises beamforming to generate a recovered signal from the receiver signals, the EGSV and the other matrix obtained from the covariance matrix.

37. A method as defined in one of claims 30–34, wherein:

conditioning the received signals includes generating by eigendecomposition an estimate of the number of signal sources, a transformation matrix for conditioning the receiver signals, and an eigenstructure derived from the receiver signals;

the step of generating EGSVs employs signals generated in the foregoing step of generating by eigendecomposition the method further comprises the step of matching current EGSVs with EGSVs from a prior data block to impose waveform continuity from block to block.

38. A method as defined in one of claims 31–33, wherein:

signals are processed in successive blocks of data; and the method further comprises a step of computing an initial EGSV for each new processing block by combining a prior block EGSV and a cumulant vector derived from the utility function.

39. A method as defined in claim 38, wherein:

the combining step includes taking the sum of the prior block EGSV multiplied by a first factor, and the cumulant vector multiplied by a second factor, wherein the first and second factors are selected to provide an initial EGSV that anticipates and compensates for movement of a signal source.

40. A method as defined in claim 32, wherein:

the method separates a plurality (P) of received cochannel signals;

the step of generating an EGSV is performed in a plurality (P) of EGSV generators, including P EGSV computation modules and P linear combiners, for generating an equal plurality (P) of EGSVs associated with P signal sources; and the step of performing supplemental computation includes recovering P separate received signals from the P generalized steering vectors and the conditioned receiver signals.

41. A method as defined in claim 40, wherein:

the step of performing supplemental computation further includes generating, in a recovery beamformer weight vector computation module, from all of the EGSVs a plurality (P) of receive weight vectors, and generating a plurality (P) of recovered signals in a plurality (P) of recovery beamformers, each coupled to receive one of the P receive weight vectors and the conditioned receiver signals.

42. A method as defined in claim 33, wherein:

the system functions to separate a plurality (P) of received cochannel signals;

the step of generating EGSVs includes generating a plurality (P) of EGSVs associated with P signal sources; and the step of performing supplemental computation includes recovering P separate received signals from the P generalized steering vectors and the conditioned receiver signals.

43. A method as defined in claim 42, wherein:

the step of performing supplemental computation further includes generating from of the EGSVs, in a recovery beamformer weight vector computation module, a plurality (P) of receive weight vectors, and generating a plurality (P) of recovered signals in a plurality (P) of recovery beamformers, each coupled to receive one of the P receive weight vectors and the conditioned receiver signals.

44. A method as defined in claim 34, wherein:

the system functions to separate two received cochannel signals;

the step of generating EGSVs generates two EGSVs from the cross-cumulant matrix data; and the step of performing supplemental computation includes recovering two separate received signals from the two generalized steering vectors and the conditioned receiver signals.

45. A method as defined in claim 44, wherein:

the step of performing supplemental computation includes generating from both of the EGSVs two weight vectors, and generating two recovered signals in two recovery beamformers, each coupled to receive one of the weight vectors and the conditioned receiver signals.

46. A method as defined in one of claims 30–39, wherein:

the method functions to derive a direction of arrival (DOA) of a received signal;

the step of performing supplemental computation module storing sensor array manifold data in a memory, deriving the DOA of a received signal from its associated generalized steering vector and the stored sensor array manifold data.

47. A method as defined in claim 46, wherein:

the sensor array manifold data includes a table associating multiple DOA values with corresponding steering vectors; and the step of deriving the DOA includes performing a reverse table lookup function to obtain an approximated DOA value from a steering vector supplied by the generalized steering vector generator.

48. A method as defined in claim 47, wherein:

the step of deriving the DOA further includes interpolating between two DOA values to obtain a more accurate result.

49. A method as defined in one of claims 30–39, wherein the step of performing supplemental computation includes:

generating received signal beamformer weights from the conditioned receiver signals and the EGSV;

recovering the received signal therefrom;

generating transmit signal beamformer weights from the received signal beamformer weights; and transmitting signals containing information in a direction determined by the transmit signal beamformer weights.

50. A method as defined in claim 41 or 43, wherein the step of performing supplemental computation further includes:

generating P transmit beamforming weight vectors from receive weight vectors generated by the recovery beamformer weight vector computation module; and P linear combiners, for combining each of the P information signals to be transmitted with its associated transmit weight vector, to obtain a weighted transmit beam for each of the information signals to be transmitted, and then combining corresponding components of the weighted transmit beams, for coupling to a transmit array.

51. A method as defined in one of claims 40–45, wherein:

the method further comprises receiving signals from a plurality of waveguide sensors positioned to detect signals transmitted onto a waveguide in different modes, wherein the modes are subject to scrambling in the waveguide; and the step of performing supplemental computation includes separating and recovering the signals, while mitigating the effect of mode mixing in the waveguide.

52. A method as defined in claim 51, wherein the waveguide is a microwave waveguide.

53. A method as defined in claim 51, wherein the waveguide is an optical fiber.

54. A method as defined in claim 51, wherein the waveguide is a coaxial cable.

55. A method as defined in claim 51, wherein the waveguide includes at least one twisted pair of conductors.

56. A method as defined in one of claims 40–45, wherein:

the signals received by the signal receiving system are in-phase and quadrature components of two-dimensional communication signal, which has been subject to phase rotation during propagation; and the step of recovering signals automatically generating in-phase and quadrature components of a two-dimensional communication signal that has been corrected for phase rotation, wherein the method functions as a complex phase equalizer.

57. A method as defined in one of claims 30–34, wherein:

the received signals have been subject to distortion by analog processing and analog-to-digital conversion in a radio receiving system; and the output quantities include a recovered signal having significantly less distortion than the received signals, whereby the receiving system has improved dynamic range as a result of the use of the signal processing method.

58. A method as defined in one of claims 40–45, wherein:

the received signals include signals from a relatively weak desired source and much stronger signals from at least one interfering source;

wherein the step of recovering the signals includes recovering a signal from the relatively weak desired source, free of interference, and discarding signals from the stronger interfering source.

59. A method for recovery and separation of multiple cochannel signals of any modulation or type received at an array of sensors, the method comprising the steps of:

receiving a plurality of cochannel signals from separate signal sources at an array of sensors;

preprocessing the received signals to provide preprocessed signals;

coupling the preprocessed signals to a plurality of signal extraction ports, each of which is in one of two states referred to as an active state and an inactive state;

in association with each signal extraction port in the active state, generating an estimated steering vector and a recovered signal corresponding to one of the signal sources, without regard for manifold data of the sensor array;

orthogonalizing the estimated steering vectors to ensure that each signal extraction port generates a recovered signal for a separate signal source; and controlling the steps of orthogonalizing and generating recovered signals to ensure an orderly association of signal sources with signal extraction ports.

60. A method as defined in claim 59, wherein the step of preprocessing includes:

estimating the number of signal sources of which the signals are being received at the sensor array; and transforming the received signals, which have a dimensionality based on the number sensors, to preprocessed signals, which have a dimensionality based on the estimated number of signal sources.

61. A method as defined in claim 60, wherein the step of preprocessing further includes:

performing an eigendecomposition of the received signals, to produce signal subspace and noise subspace eigenvalues and eigenvectors, and noise subspace eigenvalues and eigenvectors; and computing a transformation matrix from eigenvalues and eigenvectors, for use in the transforming step.

62. A method as defined in claim 60, wherein the step of generating an estimated recovered signal in each active signal recovery port includes:

computing an even-order cumulant vector of fourth or higher order from the preprocessed signals and auxiliary signals related to the estimated recovered a signals; and using the even-order cumulant vector to compute an estimated recovered signal, in an iterative process that rapidly converges on a solution for the recovered signal.

63. A method as defined in claim 61, wherein the step of generating an estimated recovered signal includes:

initially selecting a random vector to serve as an initial steering vector $a_k$;

computing a weight value $v_k$ from the steering vector $a_k$, by using the transformation matrix computed in the preprocessing step, wherein the weight vector has a dimensionality based on the estimated number of sources $P_e$ and the weight value has a dimensionality based on the number sensors in the array;

computing an estimate of the recovered signal $g_k(t)$ from the value $v_k$ and the preprocessed signal $y(t)$;

computing an auxiliary signal $u_k(t)$ from the value $v_k$ and the preprocessed input signal $y(t)$;

computing a fourth-order cumulant vector $b_k$ from the preprocessed signals $y(t)$ and the auxiliary signal $v_k$;

orthogonalizing the cumulant vector $b_k$ in the orthogonalizer, to produce an orthogonalized cumulant vector $d_k$;

deriving an updated steering vector $a_k$ from the orthogonalized cumulant vector $d_k$; and repeating the steps of computing the value $v_k$, computing an estimate of the recovered signal, computing an auxiliary signal $u_k(t)$, computing a fourth-order cumulant, orthogonalizing, and deriving an updated steering vector, until the recovered signal converges to an acceptably accurate solution.

64. A method as defined in claim 63, wherein the step of generating a recovered signal further includes:

calculating a capture strength $c_k$ for the each active port.

65. A method as defined in claim 63, and further comprising the step of:

demodulating each of the recovered signals from the signal extraction ports.

66. A method as defined in claim 63, and further comprising the step of:

generating direction finding data, by converting the steering vector from each active signal extraction port to a corresponding angular position in three-dimensional space.

67. A method as defined in claim 63, wherein the step of computing a fourth-order cumulant vector uses as input variables the auxiliary signal $v_k$, two instances of the complex conjugate of the auxiliary signal $u_k^*(t)$ and the preprocessed signals $y(t)$.

68. A method as defined in claim 64, wherein the controlling step includes:

detecting changes in the number of signal sources; and, if the number of signal sources is changed;

identifying which signal extraction port was processing a lost source; and identifying which signal extraction port will process a new source.

69. A receiver/transmitter system for receiving cochannel signals simultaneously from multiple remote units and transmitting cochannel signals to the remote units simultaneously, the system comprising:

a signal receiving system, including means for generating from signals received at a receive sensor array a set of conditioned receiver signals;

a plurality of estimated generalized steering vector (EGSV) generators, for computing for each transmitting remote unit an EGSV that results in optimization of a utility function that depends on fourth or higher even-order statistical cumulants derived from the received signals, each EGSV being indicative of a combination of signals received at the sensors from the remote unit;

a recovery beamformer weight vector computation module, for generating from all of the EGSVs a plurality of receive beamforming weight vectors;

a plurality of recovery beamformers, each coupled to receive one of the receive beamforming weight vectors and the conditioned receiver signals, for generating a plurality of recovered signals;

a transmit weight vector computation module, for generating transmit beamforming weight vectors from the receive beamforming weight vectors generated by the recovery beamformer weight vector computation module; and a plurality of linear combiners, for combining each information signal to be transmitted with an associated transmit weight vector, to obtain a weighted transmit beam for each of the information signals to be transmitted, and then combining corresponding components of the weighted transmit beams, for coupling to a transmit array.

70. A receiver/transmitter system as defined in claim 69, wherein:

signals received from at least one particular remote unit are propagated over multiple paths to the receive sensor array;

the ESGV associated with the signal received over multiple paths is representative of a composite of all coherent components of the signal arriving over the multiple paths, wherein multipath components of the same signal are automatically and dynamically combined but non-coherent cochannel signals are separated; and the transmit weight vector used to transmit signals back to the particular remote unit results in transmit array directivity pattern that achieves transmission over generally the same multiple paths traversed by the received signals, using a weighted combination of the multiple paths;

whereby the receiver/transmitter system achieves diversity gain by virtue of its combination of multipath components.

71. A receiver/transmitter system as defined in claim 69, wherein the transmit weight vector computation module includes:

means for selecting from a plurality of fixed pre-formed transmit weight vectors, based on the receive beamforming weight vectors.

72. A receiver/transmitter system as defined in claim 69, wherein the transmit weight vector computation module includes:

means for generating transmit weight vectors adaptively to reflect as accurately as possible the characteristics of the receive beamforming weight vectors, whereby signals are transmitted to the respective remote units with minimum interference because a transmit weight vector associated with a particular remote unit is selected to be practically orthogonal to all of the estimated generalized steering vectors associated with transmissions to and from the other remote units.

73. A receiver/transmitter system as defined in claim 72, wherein:

the system includes receive and transmit sensor arrays that are identical in shape but are scaled in dimension in the same ratio as transmit and receive frequencies, respectively.

74. A method for using a receiver/transmitter system for receiving cochannel signals simultaneously from multiple remote units and transmitting cochannel signals to the remote units simultaneously, the method comprising the steps of:

receiving signals from a receive sensor array;

generating from the received signals a set of conditioned receiver signals;

computing for each transmitting remote unit an estimated generalized steering vector that results in optimization of a utility function that depends on fourth or higher even-order statistical cumulants derived from the received signals, the estimated generalized steering vector being indicative of a combination of signals received at the sensors from the remote unit;

generating from all of the generalized steering vectors a plurality of receive beamforming weight vectors;

generating from the receive beamforming weight vectors and the conditioned receiver signals a plurality of recovered signals corresponding to the signals received from the respective remote units;

generating transmit beamforming weight vectors from the receive beamforming weight vectors;

combining each information signal to be transmitted with an associated transmit weight vector, to obtain a weighted transmit beam for each of the information signals to be transmitted; and combining corresponding components of the weighted transmit beams, for coupling to a transmit array.

75. A method as defined in claim 74, wherein:

signals received from at least one particular remote unit are propagated over multiple paths to the receive sensor array;

the estimated generalized steering vector associated with the signal received over multiple paths is representative of a composite of all coherent components of the signal arriving over the multiple paths, wherein multipath components of the same signal are automatically and dynamically combined but non-coherent cochannel signals are separated; and the transmit weight vector used to transmit signals back to the particular remote unit results in transmit array directivity pattern that achieves transmission over generally the same multiple paths traversed by the received signals, using a weighted combination of the multiple paths;

whereby the receiver/transmitter system achieves diversity gain by virtue of its combination of multipath components.

76. A method defined in claim 74, wherein the step of generating transmit beamforming weight vectors includes:

selecting from a plurality of fixed pre-formed transmit weight vectors, based on the receive beamforming weight vectors.

77. A method as defined in claim 74, wherein the step of generating transmit beamforming weight vectors includes:

generating transmit weight vectors adaptively to reflect as accurately as possible the characteristics of the receive beamforming weight vectors, whereby signals are transmitted to the respective remote units with minimum interference because a transmit weight vector associated with a particular remote unit is selected to be practically orthogonal to all of the generalized steering vectors associated with transmissions to and from the other remote units.

78. A method as defined in claim 77, and further comprising:

selecting receive and transmit sensor arrays that are identical in shape but are scaled in dimension in the same ratio as transmit and receive frequencies.

79. A two-way communication system using cochannel signals and diversity path multiple access (DPMA) for transmission in both directions, the system comprising:

at least one receiver/transmitter base station for communicating with a plurality of mobile devices having omnidirectional antennas for transmitting uplink signals at an assigned frequency and receiving downlink signals at another assigned frequency, wherein the receiver/transmitter base station includes a receive antenna array, a plurality of estimated generalized steering vector (EGSV) generators, for computing for each mobile device an EGSV that results in optimization of a utility function that depends on fourth or higher even-order statistical cumulants derived from the received signals, the EGSV being indicative of a combination of uplink signals received at the receive antenna array from the mobile device over possible multiple paths, receiver processing means for generating from the EGSVs a recovered signal corresponding to each uplink signal from a mobile device, and a receive beamforming weight vector corresponding to the uplink signal, a transmitter, including means for generating from each receive beamforming weight vector a corresponding transmit beamforming weight vector, and a modulator for modulating a downlink transmission signal with a desired information signal, a transmit antenna array coupled to the transmitter and having a similar geometrical shape as the receive antenna array, wherein downlink transmission signals intended for a particular mobile device are propagated along generally the same multiple paths as the received uplink signals from the same mobile device;

wherein coherent uplink signals received over multiple paths from the same mobile device are automatically combined, providing a gain enhancement effect that allows weaker transmissions to be detected, and downlink signals transmitted over the same multiple paths also benefit from the gain enhancement effect and provide a stronger downlink signal to the mobile device.

80. A two-way communication system as defined in claim 79, wherein the receiver processing means includes:

a recovery beamformer weight vector computation module, for generating from all of the EGSVs the plurality of receive beamforming weight vectors; and a plurality of recovery beamformers, each coupled to receive one of the receive beamforming weight vectors and conditioned receiver signals, for generating the plurality of recovered signals.

81. A two-way communication system as defined in claim 80, wherein the transmitter includes:

a transmit weight vector computation module, for generating transmit beamforming weight vectors from the receive beamforming weight vectors generated by the recovery beamformer weight vector computation module; and a plurality of linear combiners, for combining each information signal to be transmitted with an associated transmit weight vector, to obtain a weighted transmit beam for each of the information signals to be transmitted, and then combining corresponding components of the weighted transmit beams, for coupling to the transmit antenna array.

82. A two-way communication system as defined in claim 79, wherein:

the uplink and downlink transmission frequencies are offset from each other to avoid interference between mobile devices; and the transmit antenna array has dimensions scaled with respect to those of the receive antenna array in the inverse ratio of the uplink and downlink transmission frequencies.

83. A two-way communication system as defined in claim 81, wherein the transmit weight vector computation module includes:

means for selecting from a plurality of fixed pre-formed transmit weight vectors, based on the receive beamforming weight vectors.

84. A two-way communication system as defined in claim 81, wherein the transmit weight vector computation module includes:

means for generating transmit weight vectors adaptively to reflect as accurately as possible the characteristics of the receive beamforming weight vectors, whereby downlink signals are transmitted to the respective mobile devices with minimum interference because a transmit weight vector associated with a particular mobile device is selected to be practically orthogonal to all of the generalized steering vectors associated with transmissions to and from the other mobile devices.

85. A method of radio direction finding (DF) using a subarray of calibrated antennas, the method comprising the steps of:

receiving signals from multiple sources, at an antenna array of which only a small number of antenna elements are calibrated;

separating the signals using a cumulant recovery (CURE) system to generate the separated signals and estimates of their generalized steering vectors; and processing the estimated generalized steering vectors and signals from the calibrated antenna elements, to obtain accurate signal directions for the multiple sources.

* * * * *